US008592543B2

(12) United States Patent
McPhee et al.

(10) Patent No.: US 8,592,543 B2
(45) Date of Patent: *Nov. 26, 2013

(54) POLYFARNESENES

(76) Inventors: Derek James McPhee, Emeryville, CA (US); Adam Safir, Emeryville, CA (US); Craig Reeder, Emeryville, CA (US); Joseph G. Doolan, Emeryville, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/409,129

(22) Filed: Mar. 1, 2012

(65) Prior Publication Data
US 2012/0165474 A1    Jun. 28, 2012

Related U.S. Application Data

(63) Continuation-in-part of application No. 12/552,282, filed on Sep. 1, 2009, now Pat. No. 8,217,128.

(60) Provisional application No. 61/220,587, filed on Jun. 26, 2009, provisional application No. 61/220,588, filed on Jun. 26, 2009, provisional application No. 61/094,059, filed on Sep. 4, 2008.

(51) Int. Cl.
| C08F 12/34 | (2006.01) |
| C08F 36/22 | (2006.01) |
| C08F 36/08 | (2006.01) |
| C08F 36/00 | (2006.01) |
| C08F 236/22 | (2006.01) |

(52) U.S. Cl.
USPC ........ 526/340.3; 526/335; 526/336; 526/338; 526/341; 526/342; 526/344; 526/348.2; 526/317.1; 526/319; 526/312

(58) Field of Classification Search
None
See application file for complete search history.

(56) References Cited

U.S. PATENT DOCUMENTS

| 4,102,876 A | 7/1978 | Brenner et al. |
| 4,173,695 A | 11/1979 | Brenner et al. |
| 4,221,887 A | 9/1980 | Brenner et al. |
| 4,388,220 A | 6/1983 | Hartshorn et al. |
| 4,433,100 A * | 2/1984 | Laurito ............ 525/54.42 |
| 5,112,882 A | 5/1992 | Babu et al. |
| 5,209,971 A | 5/1993 | Babu et al. |
| 5,668,207 A | 9/1997 | Huang et al. |
| 5,698,751 A | 12/1997 | Ishida et al. |

(Continued)

FOREIGN PATENT DOCUMENTS

| EP | 0007758 | 2/1980 |
| FR | 1450512 A | 8/1966 |
| GB | 1145378 | 3/1969 |
| JP | 11335327 A | 12/1999 |

OTHER PUBLICATIONS

Sigma-Aldrich data sheet for palmitoleic acid (2013).*
Sigma-Aldrich data sheet for oleic acid (2013).*
Sigma-Aldrich data sheet for undecylenic acid (2013).*
Sigma-Aldrich data sheet for dicyclopentadiene (2013).*
Sigma-Aldrich data sheet for farnesene (2013).*
Data Sheet 6 (2013).*

(Continued)

Primary Examiner — Alicia Chevalier
Assistant Examiner — Frank D Ducheneaux
(74) Attorney, Agent, or Firm — Kam W. Law; Squire Sanders

(57) ABSTRACT

Provided herein are polyfarnesenes derived from a farnesene and at least two different vinyl monomers. Also provided herein are polyfarnesenes derived from a farnesene; at least two different vinyl monomers, such as (meth)acrylic acid, (meth)acrylic esters, styrene, and substituted styrenes; and at least one functional comonomer such as maleic anhydride.

27 Claims, 42 Drawing Sheets

(56) References Cited

U.S. PATENT DOCUMENTS

| | | | |
|---|---|---|---|
| 6,031,009 A | 2/2000 | Gonzalez | |
| 6,384,130 B1 | 5/2002 | Pantone et al. | |
| 6,448,335 B1 | 9/2002 | Braga et al. | |
| 7,309,817 B2 * | 12/2007 | Green et al. | 800/295 |
| 7,371,791 B2 | 5/2008 | Hattori et al. | |
| 7,655,739 B1 | 2/2010 | McPhee et al. | |
| 7,759,444 B1 | 7/2010 | McPhee | |
| 7,868,114 B1 | 1/2011 | McPhee | |
| 7,868,115 B1 | 1/2011 | McPhee | |
| 8,048,976 B2 * | 11/2011 | McPhee | 526/340.3 |
| 2005/0020788 A1 | 1/2005 | Wass | |
| 2010/0056714 A1 | 3/2010 | McPhee | |
| 2010/0056743 A1 | 3/2010 | McPhee | |
| 2010/0331511 A1 * | 12/2010 | McPhee | 526/340 |
| 2010/0331800 A1 * | 12/2010 | McPhee | 604/366 |

OTHER PUBLICATIONS

Data Sheet 7 (2013).*
Data Sheet 8 (2013).*
Applicants-provided excerpt from "Nomenclature of Organic Chemistry, Sections A, B, C, D, E, F and H"; Pergamon Press, Oxford; 1979.*
ISR, Dec. 4, 2009.
IPRP, Sep. 7, 2010.
Monakov et al., The Reactivity of Isoprene and Its Copolymerization with Straightchain Tetraene, Prom.-et. Sint. Kauch., 1979, 4; Chem. Abstr. 1979, 91, 176428p.
Newmark et al.,13C-NMR Spectra of cis-Polymyrcene and cis-Polyfarnesene, J. of Polymer Sci.: Part A: Polymer Chemistry, 1988, vol. 26, p. 71-77.

* cited by examiner

POLYFARNESENES

PRIOR RELATED APPLICATIONS

This application is a continuation-in-part application of U.S. Non-Provisional patent application Ser. No. 12/552,282 which claims the benefit of U.S. Provisional Patent Application No. 61/094,059, filed Sep. 4, 2008; U.S. Provisional Application No. 61/220,587, filed Jun. 26, 2009; and U.S. Provisional Application No. 61/220,588, filed Jun. 26, 2009, all of which are incorporated herein by reference in their entirety.

FIELD OF THE INVENTION

This invention provides polyfarnesenes derived from a farnesene and at least two different vinyl monomers. Also provided herein are polyfarnesenes derived from a farnesene, at least two different vinyl monomers, and at least one functional comonomer.

BACKGROUND OF THE INVENTION

Terpenes or isoprenoid compounds are a large and varied class of organic molecules that can be produced by a wide variety of plants, such as conifers, and by some insects, such as swallowtail butterflies. Some isoprenoid compounds can also be made from organic compounds such as sugars by microorganisms, including bioengineered microorganisms. Because terpenes or isoprenoid compounds can be obtained from various renewable sources, they are ideal monomers for making eco-friendly and renewable polymers.

Terpene polymers derived from terpenes or isoprenoid compounds are useful polymeric materials. For example, polyisoprene, polypinene and polylimonene have been used in various applications such as in the manufacture of paper coatings, adhesives, rubber compounds, and other industrial products. Most existing terpene polymers are generally derived from $C_5$ and $C_{10}$ terpenes, for example, isoprene, limonene, myrcene, 3-carene, ocimene, and pinene. These terpene monomers can be polymerized or co-polymerized with other comonomers to form the corresponding terpene homopolymers or copolymers. However, the polymers or copolymers of terpenes or isoprenoid compounds having at least 15 carbon atoms are less well known or non-existent. Because of their long chain length, isoprenoid compounds, such as farnesene, farnesol, nerolidol, valencene, humulene, germacrene, and elemene, may provide polymers or copolymers with unique physical, chemical and biological properties.

There is a need for more environmentally friendly and/or renewable polymers, for instance, polymers derived from isoprenoid compounds that can be obtained from natural sources. Further, there is also a need for novel polymers that have unique physical, chemical and biological properties.

SUMMARY OF THE INVENTION

The aforementioned needs are met by various aspects disclosed herein. In one aspect, provided herein is a polyfarnesene comprising one or more polymer molecules, each of the molecules independently having formula (X'):

wherein each of n and m is independently an integer from 1 to about 100,000; X is derived from a farnesene and has one or more of formulae (I')-(VIII'):

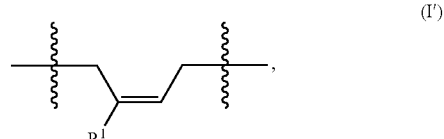

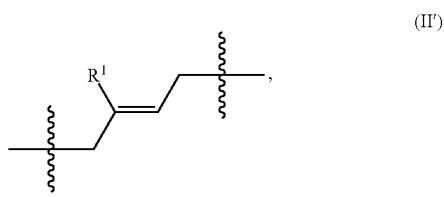

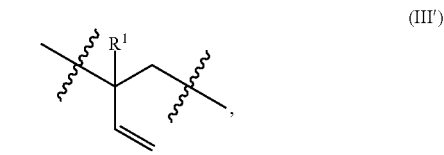

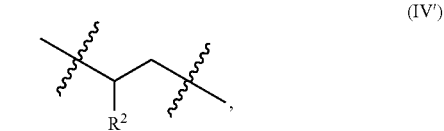

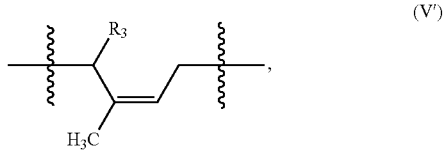

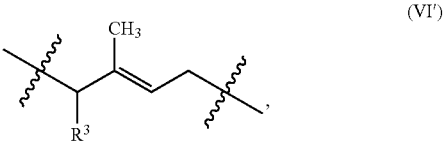

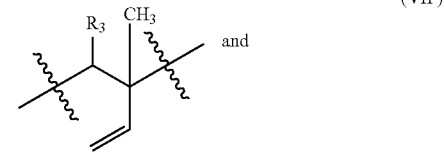

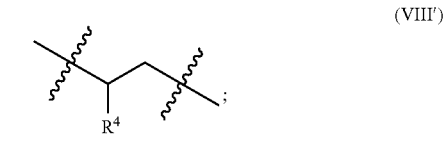

and

Y has formula (IX'):

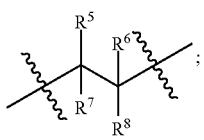

wherein $R^1$ has formula (XI):

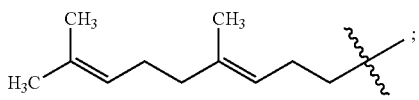

$R^2$ has formula (XII):

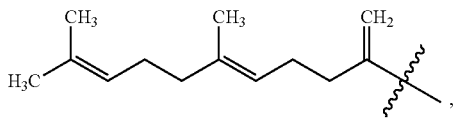

$R^3$ has formula (XIII):

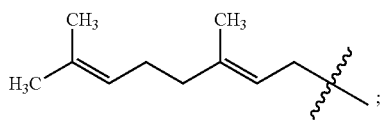

and
$R^4$ has formula (XIV):

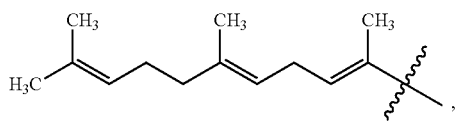

wherein $R^5$ is carboxy, alkoxycarbonyl, hydroxyalkoxycarbonyl, aminoalkoxycarbonyl, 2-methylphenyl, 4-methylphenyl, 2-ethylphenyl, 4-ethylphenyl, 2,4-dimethylphenyl, 4-fluorophenyl, pyridyl, cyano, halo or acyloxy; $R^7$ is H, alkyl or halo; and each of $R^6$ and $R^8$ is independently H, wherein the farnesene is α-farnesene or β-farnesene or a combination thereof, with the proviso that $R^5$, $R^6$, $R^7$ and $R^8$ are not all H. In certain embodiments, none of $R^5$, $R^6$, $R^7$ and $R^8$ of formula (IX') is or comprises alkenyl, cycloalkenyl or alkynyl. In some embodiments, the amount of the farnesene is greater than 20 mole %, based on the total amount of the polyfarnesene. In other embodiments, when one of $R^5$, $R^6$, $R^7$ and $R^8$ is H or alkyl, at least one of the remaining $R^5$, $R^6$, $R^7$ and $R^8$ is not H. In some embodiments, each of n and m is independently an integer from 1 to about 5,000, from 1 to about 1,000 or from 1 to about 500.

In certain embodiments, the $R^5$ of formula (X') is carboxy; and $R^7$ is H or alkyl. In other embodiments, the $R^5$ is alkoxycarbonyl; and $R^7$ is H or alkyl. In some embodiments, the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, decoxycarbonyl, isodecoxycarbonyl, lauroxycarbonyl or stearoxycarbonyl.

In some embodiments, $R^5$ is hydroxyalkoxycarbonyl or aminoalkoxycarbonyl; and $R^7$ is H or alkyl. In certain embodiments, the hydroxyalkoxycarbonyl is 2-hydroxyethoxycarbonyl; and the aminoalkoxycarbonyl is 2-aminoethoxycarbonyl, 2-(dimethylamino)ethoxycarbonyl or 2-(diethylamino)ethoxycarbonyl.

In certain embodiments, the $R^5$ is 2-methylphenyl, 4-methylphenyl, 2-ethylphenyl, 4-ethylphenyl, 2,4-dimethylphenyl or 4-fluorophenyl; and $R^7$ is H. In some embodiments, the $R^5$ is pyridyl or cyano; and $R^7$ is H.

In some embodiments, the $R^5$ is acyloxy; and $R^7$ is H. In certain embodiments, the acyloxy is $CH_3C(=O)-O-$.

In certain embodiments, $R^5$ is halo; and $R^7$ is H or halo. In some embodiments, $R^5$ is chloro; and $R^7$ is H. In certain embodiments, $R^5$ is fluoro; and $R^7$ is fluoro.

In another aspect, provided herein is a polyfarnesene comprises one or more polymer molecules, each of the molecules independently having formula (X"):

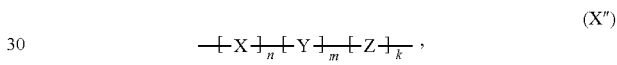

wherein each of n, m and k is an integer from 1 to about 100,000; X has one or more of formulae (I')-(VIII'):

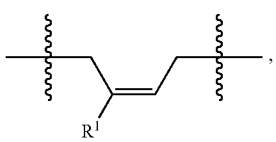

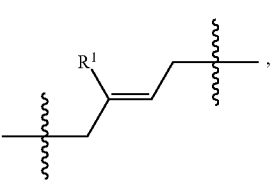

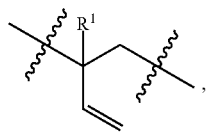

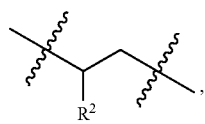

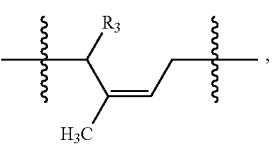

-continued

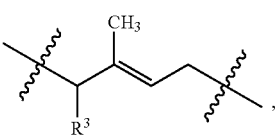

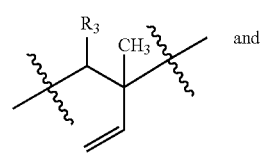 and

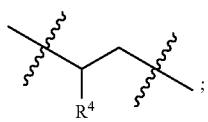 ;

wherein $R^1$ has formula (XI):

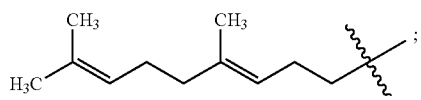 ;

$R^2$ has formula (XII):

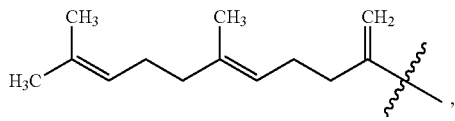 , $R^3$ has formula (XIII):

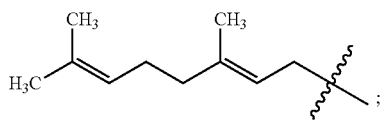 ;

and $R^4$ has formula (XIV):

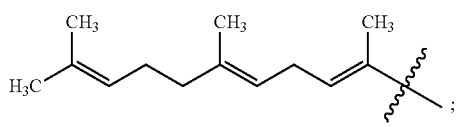 ;

and each of Y and Z independently has formula (IX'):

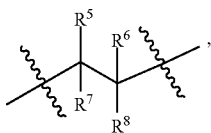

(IX')

wherein each of $R^5$, $R^6$, $R^7$ and $R^8$ is independently H, hydrocarbyl, substituted hydrocarbyl, heterohydrocarbyl, substituted heterohydrocarbyl, heterocyclyl, substituted heterocyclyl or a functional group containing O, N, S, P or a combination thereof, with the proviso that $R^5$, $R^6$, $R^7$ and $R^8$ are not all H. In certain embodiments, none of $R^5$, $R^6$, $R^7$ and $R^8$ of formula (IX') is or comprises alkenyl, cycloalkenyl or alkynyl. In some embodiments, the amount of the farnesene is greater than 20 mole %, based on the total amount of the polyfarnesene. In other embodiments, when one of $R^5$, $R^6$, $R^7$ and $R^8$ of Y is H or alkyl, at least one of the remaining $R^5$, $R^6$, $R^7$ and $R^8$ of Y is not H. In further embodiments, when one of $R^5$, $R^6$, $R^7$ and $R^8$ of Z is H or alkyl, at least one of the remaining $R^5$, $R^6$, $R^7$ and $R^8$ of Z is not H. In some embodiments, each of n, m and k is independently an integer from 1 to about 5,000, from 1 to about 1,000 or from 1 to about 500.

In certain embodiments, $R^5$ of Y of formula (X") is carboxy or alkoxycarbonyl; $R^7$ of Y is H or alkyl; and each of $R^6$ and $R^8$ of Y is independently H. In some embodiments, $R^5$ of Z of formula (X") is alkoxycarbonyl, hydroxyalkoxycarbonyl or aminoalkoxycarbonyl; $R^7$ of Z is H or alkyl; and each of $R^6$ and $R^8$ of Z is independently H. In other embodiments, the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, decoxycarbonyl, isodecoxycarbonyl, lauroxycarbonyl or stearoxycarbonyl; the hydroxyalkoxycarbonyl is hydroxyethoxycarbonyl; and the aminoalkoxycarbonyl is 2-aminoethoxycarbonyl, 2-(dimethylamino)ethoxycarbonyl or 2-(diethylamino)ethoxycarbonyl.

In some embodiments, $R^5$ of Z of formula (X") is alkyl or aryl; and each of $R^6$, $R^7$ and $R^8$ of Z is independently H. In certain embodiments, $R^5$ of Z is aryl selected from phenyl, 2-methylphenyl, 4-methylphenyl, 2-ethylphenyl, 4-ethylphenyl, 2,4-dimethylphenyl and 4-fluorophenyl.

In certain embodiments, $R^5$ of Y of formula (X") is alkoxycarbonyl or hydroxyalkoxycarbonyl; $R^7$ of Y is alkyl; and each of $R^6$ and $R^8$ of Y is H; $R^5$ of Z is alkoxycarbonyl; $R^7$ of Z is H or alkyl; and each of $R^6$ and $R^8$ of Z is H.

In some embodiments, $R^5$ of Y of formula (X") is phenyl; each of $R^6$, $R^7$ and $R^8$ of Y is H; $R^5$ of Z is cyano; and each of $R^6$, $R^7$ and $R^8$ of Z is H.

In another aspect, provided herein is a polyfarnesene comprises one or more polymer molecules, each of the molecules independently having formula (X'''):

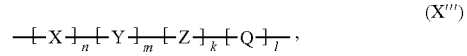

(X''')

wherein each of n, m, k and l is an integer from 1 to about 100,000; X has one or more of formulae (I')-(VIII'):

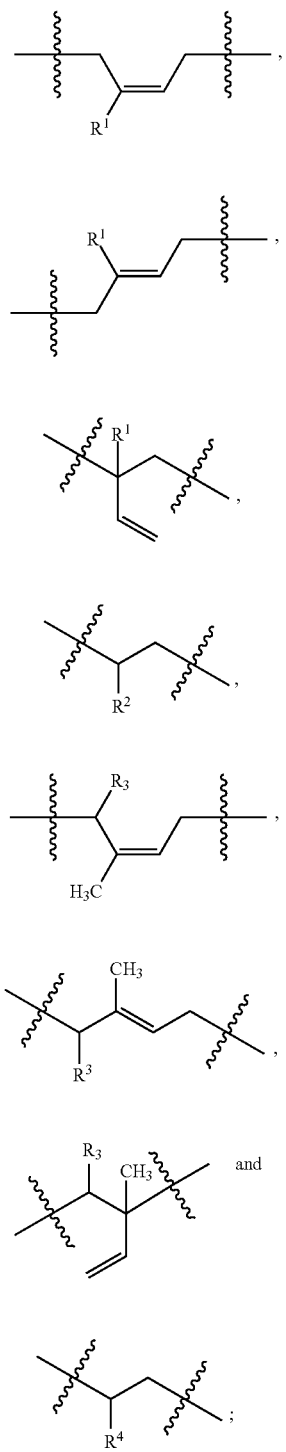

(I'),
(II'),
(III'),
(IV'),
(V'),
(VI'),
(VII') and
(VIII');

wherein R¹ has formula (XI):

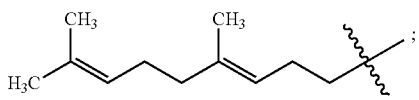
(XI)

R² has formula (XII):

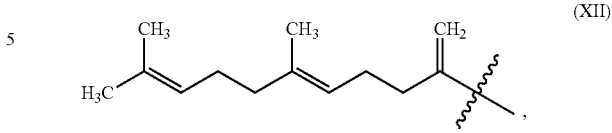
(XII)

R³ has formula (XIII):

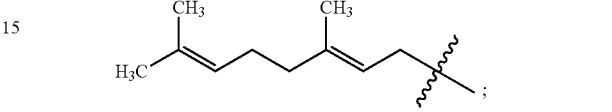
(XIII);

and
R⁴ has formula (XIV):

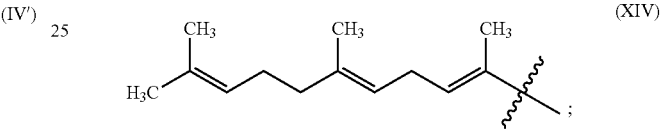
(XIV);

and
each of Y, Z and Q independently has formula (IX'):

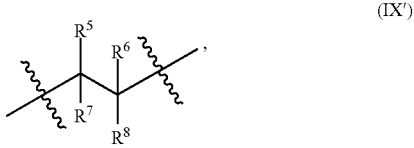
(IX')

wherein each of $R^5$, $R^6$, $R^7$ and $R^8$ is independently H, hydrocarbyl, substituted hydrocarbyl, heterohydrocarbyl, substituted heterohydrocarbyl, heterocyclyl, substituted heterocyclyl or a functional group containing O, N, S, P or a combination thereof, with the proviso that $R^5$, $R^6$, $R^7$ and $R^8$ are not all H. In certain embodiments, none of $R^5$, $R^6$, $R^7$ and $R^8$ of formula (IX') is or comprises alkenyl, cycloalkenyl or alkynyl. In some embodiments, the amount of the farnesene is greater than 20 mole %, based on the total amount of the polyfarnesene. In other embodiments, when one of $R^5$, $R^6$, $R^7$ and $R^8$ of Y is H or alkyl, at least one of the remaining $R^5$, $R^6$, $R^7$ and $R^8$ of Y is not H. In further embodiments, when one of $R^5$, $R^6$, $R^7$ and $R^8$ of Z is H or alkyl, at least one of the remaining $R^5$, $R^6$, $R^7$ and $R^8$ of Z is not H. In still further embodiments, when one of $R^5$, $R^6$, $R^7$ and $R^8$ of Q is H or alkyl, at least one of the remaining $R^5$, $R^6$, $R^7$ and $R^8$ of Q is not H. In some embodiments, each of n, m, k and l is independently an integer from 1 to about 5,000, from 1 to about 1,000 or from 1 to about 500.

In some embodiments, $R^5$ of Y of formula (X''') is carboxy or alkoxycarbonyl; $R^7$ of Y is H or alkyl; and each of $R^6$ and $R^8$ of Y is independently H. In some embodiments, $R^5$ of Z of formula (X''') is alkoxycarbonyl, hydroxyalkoxycarbonyl or aminoalkoxycarbonyl; $R^7$ of Z is H or alkyl; and each of $R^6$ and $R^8$ of Z is independently H. In other embodiments, the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, decoxycarbonyl, isodecoxycarbonyl, lauroxycarbonyl or stearoxycarbonyl; the hydroxyalkoxycarbonyl is hydroxyethoxycarbonyl; and the aminoalkoxycarbonyl is 2-aminoethoxycarbonyl, 2-(dimethylamino)ethoxycarbonyl or 2-(diethylamino) ethoxycarbonyl.

In some embodiments, each of $R^5$ and $R^6$ of Q of formula (X''') is carboxy or $R^5$ and $R^6$ together form —C(=O)—O—C(=O)—.

In certain embodiments, $R^5$ of Y of formula (X''') is carboxy; $R^7$ of Y is H or alkyl; and each of $R^6$ and $R^8$ of Y is independently H. In some embodiments, $R^5$ of Z of formula (X''') is alkoxycarbonyl; $R^7$ of Z is H or alkyl; and each of $R^6$ and $R^8$ of Z is independently H.

In some embodiments, $R^5$ of Q of formula (X''') is alkyl or aryl; and each of $R^6$, $R^7$ and $R^8$ of Q is independently H. In some embodiments, $R^5$ of Q of formula (X''') is alkoxycarbonyl; and each of $R^6$, $R^7$ and $R^8$ of Q is independently H.

Additional aspects of the invention and characteristics and properties of various embodiments of the invention become apparent with the following description.

DETAILED DESCRIPTION OF THE INVENTION

General Definitions

Figure 1:
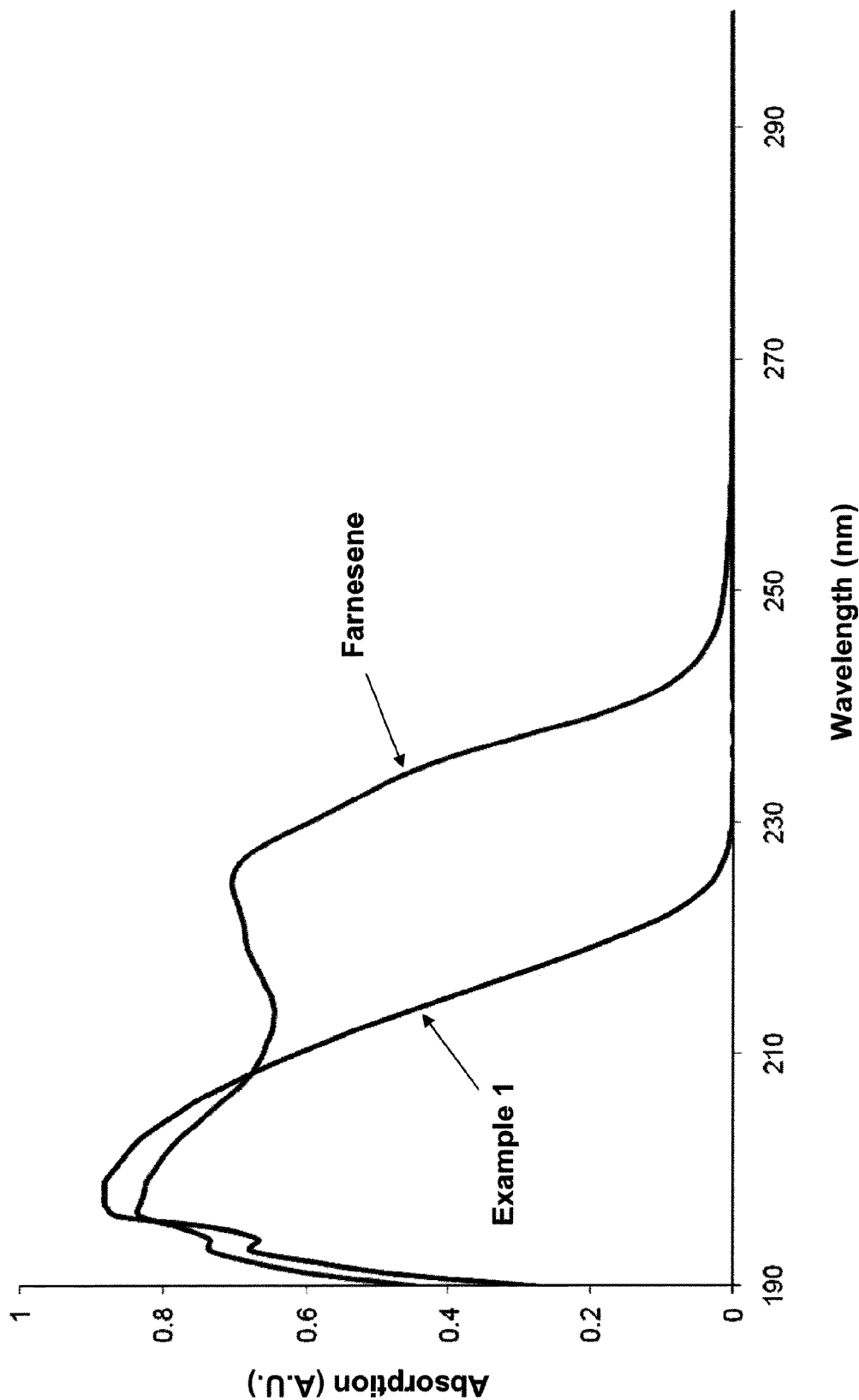
FIG. 1 depicts Ultraviolet-Visible (UV-Vis) spectra of Example 1 and β-farnesene.

"Polymer" refers to a polymeric compound prepared by polymerizing monomers, whether of the same or a different type. The generic term "polymer" embraces the terms "homopolymer," "copolymer," "terpolymer" as well as "interpolymer."

"Interpolymer" refers to a polymer prepared by the polymerization of at least two different types of monomers. The generic term "interpolymer" includes the term "copolymer" (which generally refers to a polymer prepared from two different monomers) as well as the term "terpolymer" (which generally refers to a polymer prepared from three different types of monomers). It also encompasses polymers made by polymerizing four or more types of monomers.

"Organyl" refers to any organic substituent group, regardless of functional type, having one free valence at a carbon atom, e.g., $CH_3CH_2$—, $ClCH_2$—, $CH_3C(=O)$—, 4-pyridylmethyl.

"Hydrocarbyl" refers to any univalent group formed by removing a hydrogen atom from a hydrocarbon, such as alkyl (e.g., ethyl), cycloalkyl (e.g., cyclohexyl) and aryl (e.g., phenyl).

"Heterocyclyl" refers to any univalent group formed by removing a hydrogen atom from any ring atom of a heterocyclic compound.

"Alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, $(C_1-C_8)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

"Cycloalkyl" or "cycloalkyl group" refers to a univalent group derived from a cycloalkane by removal of a hydrogen atom from a non-aromatic, monocyclic or polycyclic ring comprising carbon and hydrogen atoms. Examples of cycloalkyl groups include, but are not limited to, $(C_3-C_7)$ cycloalkyl groups, such as cyclopropyl, cyclobutyl, cyclopentyl, cyclohexyl, and cycloheptyl, and saturated cyclic and bicyclic terpenes and $(C_3-C_7)$cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

"Aryl" or "aryl group" refers to an organic radical derived from a monocyclic or polycyclic aromatic hydrocarbon by removing a hydrogen atom. Non-limiting examples of the aryl group include phenyl, naphthyl, benzyl, or tolanyl group, sexiphenylene, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

"Acrylic ester" refers to a compound having the formula

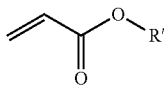

where R' is hydrocarbyl, substituted hydrocarbyl, heterohydrocarbyl, substituted heterohydrocarbyl, heterocyclyl or substituted heterocyclyl. In certain embodiments, R' is alkyl, cycloalkyl, aryl, alkaryl, arylalkyl, substituted alkyl, substituted cycloalkyl, substituted aryl, substituted alkaryl or substituted arylalkyl. In some embodiments, R' is methyl, ethyl, propyl, butyl, pentyl, isopentyl, neopentyl, hexyl, heptyl, octyl, decyl, isodecyl, lauryl, stearyl, hydroxyalkyl (e.g., 2-hydroxyethyl), aminoalkyl (e.g., 2-aminoethyl, 2-(dimethylamino)ethyl or 2-(diethylamino)ethyl). In further embodiments, R' is substituted. Some non-limiting examples of acrylic ester include methyl acrylate, ethyl acrylate, butyl acrylate, isobutyl acrylate, n-hexyl acrylate, ethylhexyl acrylate, n-heptyl acrylate, 2-methylheptyl acrylate, octyl acrylate, isooctyl acrylate, n-nonyl acrylate, iso-nonyl acrylate, decyl acrylate, isodecyl acrylate, dodecyl acrylate, tridecyl acrylate, lauryl acrylate, stearyl acrylate, isobornyl acrylate, glycidyl acrylate, acetoacetoxyethyl acrylate, acetoacetoxypropyl acrylate, tetrahydrofurfuryl acrylate, cyclohexyl acrylate, 2-ethoxyethyl acrylate, isodecyl acrylate, caprolactone acrylate, benzyl acrylate, hydroxyalkyl acrylates (e.g., 2-hydroxyethyl acrylate), aminoalkyl acrylates (e.g., 2-aminoethyl acrylate, 2-(dimethylamino)ethyl acrylate, and 2-(diethylamino)ethyl acrylate), alkoxyalkyl acrylates (e.g., 2-ethoxyethyl acrylate), aroxyalkyl acrylates (e.g., 2-phenoxyethyl acrylate) and combinations thereof.

"Methacrylic ester" refers to a compound having the formula

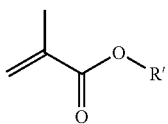

where R' is hydrocarbyl, substituted hydrocarbyl, heterohydrocarbyl, substituted heterohydrocarbyl, heterocyclyl or substituted heterocyclyl. In certain embodiments, R' is alkyl, cycloalkyl, aryl, alkaryl, arylalkyl, substituted alkyl, substituted cycloalkyl, substituted aryl, substituted alkaryl or substituted arylalkyl. In some embodiments, R' is methyl, ethyl, propyl, butyl, pentyl, isopentyl, neopentyl, hexyl, heptyl, octyl, decyl, isodecyl, lauryl, stearyl, hydroxyalkyl (e.g., 2-hydroxyethyl), aminoalkyl (e.g., 2-aminoethyl, 2-(dimethylamino)ethyl or 2-(diethylamino)ethyl). In further embodiments, R' is substituted. Some non-limiting examples of methacrylic ester include methyl methacrylate, ethyl methacrylate, butyl methacrylate, isobutyl methacrylate, n-hexyl methacrylate, ethylhexyl methacrylate, n-heptyl methacrylate, 2-methylheptyl methacrylate, octyl methacrylate, isooctyl methacrylate, n-nonyl methacrylate, iso-nonyl methacrylate, decyl methacrylate, isodecyl methacrylate, dodecyl methacrylate, tridecyl methacrylate, lauryl methacrylate, stearyl methacrylate, isobornyl methacrylate, glycidyl methacrylate, acetoacetoxyethyl methacrylate, acetoacetoxypropyl methacrylate, allyl methacrylate, tetrahydrofurfuryl methacrylate, cyclohexyl methacrylate, benzyl methacrylate, caprolactone methacrylate, hydroxyalkyl methacrylates (e.g., 2-hydroxyethyl methacrylate), aminoalkyl methacrylates (e.g., 2-aminoethyl methacrylate, 2-(dimethylamino)ethyl methacrylate, and 2-(diethylamino)ethyl methacrylate), alkoxyalkyl methacrylates (e.g., 2-ethoxyethyl methacrylate), aroxyalkyl methacrylates (e.g., 2-phenoxyethyl methacrylate) and combinations thereof.

"Alkoxycarbonyl" refers to a univalent group having the general formula R'O—C(=O)—, where R' is alkyl or substituted alkyl. In some embodiments, R' is methyl, ethyl, propyl, butyl, pentyl, isopentyl, neopentyl, hexyl, heptyl, octyl, decyl, isodecyl, lauryl, stearyl, hydroxyalkyl (e.g., 2-hydroxyethyl), aminoalkyl (e.g., 2-aminoethyl, 2-(dimethylamino)ethyl or 2-(diethylamino)ethyl). In certain embodiments, the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, decoxycarbonyl, isodecoxycarbonyl, lauroxycarbonyl or stearoxycarbonyl. In certain embodiments, the alkoxycarbonyl is a substituted alkoxycarbonyl such as hydroxyalkoxycarbonyl (e.g., 2-hydroxyethoxycarbonyl) and amino alkoxycarbonyl (e.g., 2-aminoethoxycarbonyl, 2-(dimethylamino)ethoxycarbonyl or 2-(diethylamino)ethoxycarbonyl).

"Vinyl monomer" refers to a compound having formula (XV):

where each of $R^5$, $R^6$, $R^7$ and $R^8$ is independently H, an organyl group or a functional group. In some embodiments, each of $R^5$, $R^6$, $R^7$ and $R^8$ is as defined herein.

"Isoprenoid" and "isoprenoid compound" are used interchangeably herein and refer to a compound derivable from isopentenyl diphosphate.

"Substituted" as used to describe a compound or chemical moiety refers to that at least one hydrogen atom of that compound or chemical moiety is replaced with a second chemical moiety. The second chemical moiety can be any desired substituent that does not adversely affect the desired activity of the compound. Examples of substituents are those found in the exemplary compounds and embodiments disclosed herein, as well as halogen; alkyl; heteroalkyl; alkenyl; alkynyl; aryl, heteroaryl, hydroxyl; alkoxyl; aroxyl; alkoxyalkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; glycidyl; oxiranyl; acetoacetoxyoxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl; aryl; aryl-lower alkyl; —CO$_2$CH$_3$; —CONH$_2$; —OCH$_2$CONH$_2$; —NH$_2$; —SO$_2$NH$_2$; —OCHF$_2$; —CF$_3$; —OCF$_3$; —NH(alkyl); —N(alkyl)$_2$; —NH(aryl); —N(alkyl)(aryl); —N(aryl)$_2$; —CHO; —CO(alkyl); —CO(aryl); —CO$_2$(alkyl); and —CO$_2$(aryl); and such moieties can also be optionally substituted by a fused-ring structure or bridge, for example —OCH$_2$O—. These substituents can optionally be further substituted with a substituent selected from such groups. All chemical groups disclosed herein can be substituted, unless it is specified otherwise.

"Organolithium reagent" refers to an organometallic compound with a direct bond between a carbon and a lithium atom. Some non-limiting examples of organolithium reagents include vinyllithium, aryllithium (e.g., phenyllithium), and alkyllithium (e.g., n-butyl lithium, sec-butyl lithium, tert-butyl lithium, methyllithium, isopropyllithium or other alkyllithium reagents having 1 to 20 carbon atoms).

A composition that is "substantially free" of a compound means that the composition contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the compound, based on the total volume of the composition.

A polymer that is "substantially linear" means that the polymer contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the branched, star-shaped or other regular or irregular structures, based on the total volume of the composition.

A polymer that is "substantially branched" means that the polymer contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the linear, star-shaped or other regular or irregular structures, based on the total volume of the composition.

A polymer that is "substantially star-shaped" means that the polymer contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the branched, linear or other regular or irregular structures, based on the total volume of the composition.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

The compositions disclosed herein generally comprise a polyfarnesene and optionally a tackifier. In other embodiments, the compositions disclosed herein do not comprise a tackifier. In further embodiments, the compositions disclosed herein comprise a tackifier.

In some embodiments, the polyfarnesene is a farnesene homopolymer, a farnesene interpolymer or a combination thereof. In certain embodiments, the polyfarnesene is a farnesene homopolymer comprising units derived from at least one farnesene such as α-farnesene, β-farnesene or a combination thereof. In other embodiments, the polyfarnesene is a farnesene interpolymer comprising units derived from at least one farnesene and units derived from at least one copolymerizable vinyl monomer. In some embodiments, the farnesene interpolymer is derived from styrene and at least one farnesene. In other embodiments, the farnesene interpolymer is derived from methyl methacrylate and at least one farnesene. In other embodiments, the farnesene interpolymer is derived from maleic anhydride and at least one farnesene. In other embodiments, the farnesene interpolymer is derived from methacrylic acid, styrene and at least one farnesene. In further embodiments, the farnesene interpolymer is derived from methacrylic acid, methyl methacrylate and at least one farnesene. In further embodiments, the farnesene interpolymer is derived from methacrylic acid, methyl methacrylate, butyl acrylate and at least one farnesene. In still further embodiments, the farnesene interpolymer is a random, block or alternating interpolymer. In still further embodiments, the farnesene interpolymer is a di-block, tri-block or other multi-block interpolymer.

In some embodiments, the farnesene homopolymer is prepared by polymerizing β-farnesene in the presence of any catalyst suitable for polymerizing olefins such as ethylene, styrene or isoprene. In other embodiments, the farnesene homopolymer comprises one or more units having formula (I), (II), (III), (IV), a stereoisomer thereof or a combination thereof:

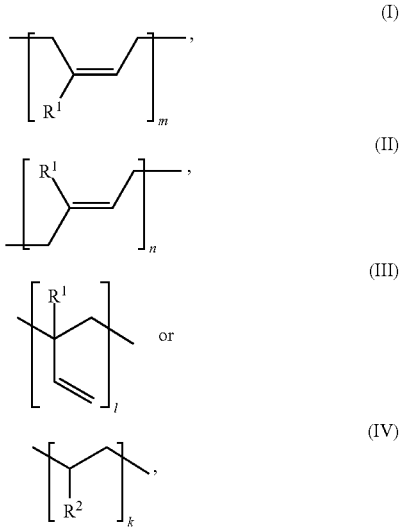

wherein $R^1$ has formula (XI):

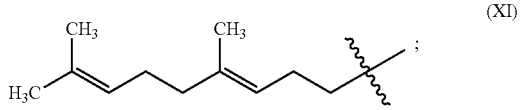 [SMILES: *CC/C=C(\C)CCC=C(C)C]
(XI)

and
$R^2$ has formula (XII):

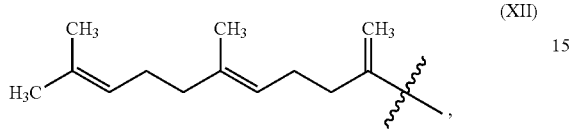
(XII)

wherein each of m, n, l and k is independently an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000. In some embodiments, each of m, n, l and k is independently an integer from 1 to 100,000. In other embodiments, each of m, n, l and k is independently an integer from 2 to 100,000.

In certain embodiments, the farnesene homopolymer comprises at least one unit having formula (I) wherein m is greater than about 300, greater than about 500 or greater than about 1000. In other embodiments, the farnesene homopolymer comprises at least one unit having formula (II) wherein n is greater than about 300, greater than about 500 or greater than about 1000. In further embodiments, the farnesene homopolymer comprises at least one unit having formula (III) wherein l is greater than about 300, greater than about 500 or greater than about 1000. In still further embodiments, the farnesene homopolymer comprises at least one unit having formula (IV) wherein k is greater than about 300, greater than about 500 or greater than about 1000.

In some embodiments, the farnesene homopolymer comprises at least one unit having formula (I) and at least one unit having formula (II), wherein the sum of m and n is greater than about 300, greater than about 500 or greater than about 1000. In other embodiments, the farnesene homopolymer comprises at least one unit having formula (I) and at least one unit having formula (III), wherein the sum of m and l is greater than about 300, greater than about 500 or greater than about 1000. In other embodiments, the farnesene homopolymer comprises at least one unit having formula (II) and at least one unit having formula (III), wherein the sum of n and l is greater than about 300, greater than about 500 or greater than about 1000. In still further embodiments, the farnesene homopolymer comprises at least one unit having formula (I), at least one unit having formula (II) and at least one unit having formula (III), wherein the sum of m, n and l is greater than about 300, greater than about 500 or greater than about 1000. In still further embodiments, the farnesene homopolymer comprises at least one unit having formula (I), at least one unit having formula (II), at least one unit having formula (III) and at least one unit having formula (IV), wherein the sum of m, n, l and k is greater than about 300, greater than about 500 or greater than about 1000. In still further embodiments, the one or more units having formula (I), (II), (III) or (IV) in the farnesene homopolymer disclosed herein can be in any order.

In certain embodiments, the farnesene homopolymer is prepared by polymerizing α-farnesene in the presence of any catalyst suitable for polymerizing olefins. In other embodiments, the farnesene homopolymer comprises one or more units having formula (V), (VI), (VII), (VIII), a stereoisomer thereof or a combination thereof:

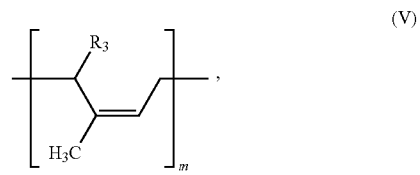
(V)

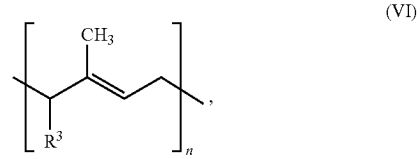
(VI)

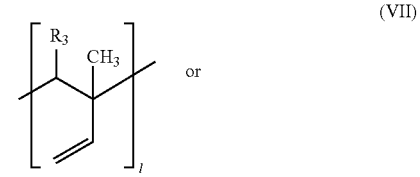
(VII)

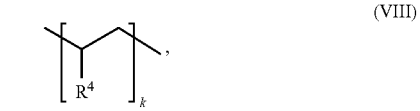
(VIII)

wherein $R^3$ has formula (XIII):

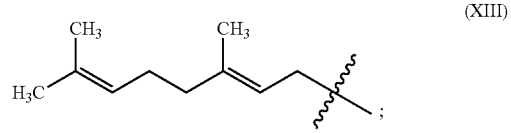 [SMILES: *C/C=C(\C)CCC=C(C)C]
(XIII)

and
$R^4$ has formula (XIV):

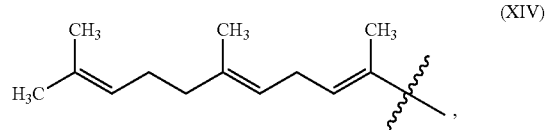 [SMILES: */C(C)=C/C/C=C(\C)CCC=C(C)C]
(XIV)

wherein each of m, n, l and k is independently an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000. In some embodiments, each of m, n, l and k is independently an integer from 1 to 100,000. In other embodiments, each of m, n, l and k is independently an integer from 2 to 100,000.

In certain embodiments, the farnesene homopolymer comprises at least one unit having formula (V) wherein m is greater than about 300, greater than about 500 or greater than about 1000. In other embodiments, the farnesene homopolymer comprises at least one unit having formula (VI) wherein n is greater than about 300, greater than about 500 or greater than about 1000. In further embodiments, the farnesene homopolymer comprises at least one unit having formula (VII) wherein l is greater than about 300, greater than about 500 or greater than about 1000. In still further embodiments, the farnesene homopolymer comprises at least one unit having formula (VIII) wherein k is greater than about 300, greater than about 500 or greater than about 1000.

In some embodiments, the farnesene homopolymer comprises at least one unit having formula (V) and at least one unit having formula (VI), wherein the sum of m and n is greater than about 300, greater than about 500 or greater than about 1000. In other embodiments, the farnesene homopolymer comprises at least one unit having formula (V) and at least one unit having formula (VII), wherein the sum of m and l is greater than about 300, greater than about 500 or greater than about 1000. In other embodiments, the farnesene homopolymer comprises at least one unit having formula (VI) and at least one unit having formula (VII), wherein the sum of n and l is greater than about 300, greater than about 500 or greater than about 1000. In still further embodiments, the farnesene homopolymer comprises at least one unit having formula (V), at least one unit having formula (VI) and at least one unit having formula (VII), wherein the sum of m, n and l is greater than about 300, greater than about 500 or greater than about 1000. In still further embodiments, the farnesene homopolymer comprises at least one unit having formula (V), at least one unit having formula (VI), at least one unit having formula (VII) and at least one unit having formula (VIII), wherein the sum of m, n, l and k is greater than about 300, greater than about 500 or greater than about 1000. In still further embodiments, the one or more units having formula (V), (VI), (VII) or (VIII) in the farnesene homopolymer disclosed herein can be in any order.

In some embodiments, the farnesene homopolymer is prepared by polymerizing a mixture of α-farnesene and β-farnesene in the presence of any catalyst suitable for polymerizing olefins. In other embodiments, the farnesene homopolymer comprises one or more units having formula (I), (II), (III), (IV), (V), (VI), (VII) or (VIII) disclosed herein, a stereoisomer thereof or a combination thereof. In further embodiments, the one or more units having formula (I), (II), (III), (IV), (V), (VI), (VII) or (VIII) in the farnesene homopolymer disclosed herein can be in any order.

In some embodiments, the farnesene homopolymer comprises two or more units having two different formulae selected from formulae (I), (II), (III), (IV), (V), (VI), (VII), (VIII), stereoisomers thereof and combinations thereof. In other embodiments, such farnesene homopolymer can be represented by the following formula: $A_xB_y$ wherein each of x and y is at least 1, and wherein each of A and B independently has formula (I), (II), (III), (IV), (V), (VI), (VII) or (VIII) and A and B are different. In further embodiments, each of x and y is independently greater than 1, such as 2, 3, 4, 5, 6, 7, 8, 9, 10, 15, 20, 25, 30, 35, 40, or higher. In some embodiments, the As and Bs are linked in a substantially linear fashion, as opposed to a substantially branched or substantially star-shaped fashion. In other embodiments, the As and Bs are randomly distributed along the farnesene homopolymer chain. In other embodiments, the As and Bs are in two "segments" to provide a farnesene homopolymer having a segmented structure, for example, AA—A-BB—B. In other embodiments, the As and Bs are alternatively distributed along the farnesene homopolymer chain to provide a farnesene homopolymer having an alternative structure, for example, A-B, A-B-A, A-B-A-B, A-B-A-B-A or the like.

In some embodiments, the farnesene homopolymer comprises three or more units having three different formulae selected from formulae (I), (II), (III), (IV), (V), (VI), (VII), (VIII), stereoisomers thereof and combinations thereof. In other embodiments, such farnesene homopolymer can be represented by the following formula: $A_xB_yC_z$ wherein each of x, y and z is at least 1, and wherein each of A, B and C independently has formula (I), (II), (III), (IV), (V), (VI), (VII) or (VIII) and A, B and C are different. In further embodiments, each of x, y and z is independently greater than 1, such as 2, 3, 4, 5, 6, 7, 8, 9, 10, 15, 20, 25, 30, 35, 40, or higher. In some embodiments, the As, Bs and Cs are linked in a substantially linear fashion, as opposed to a substantially branched or substantially star-shaped fashion. In other embodiments, the As, Bs and Cs are randomly distributed along the farnesene homopolymer chain. In other embodiments, the As, Bs and Cs are in three "segments" to provide a farnesene homopolymer having a segmented structure, for example, AA—A-BB—B-CC—C. In other embodiments, the As, Bs and Cs are alternatively distributed along the farnesene homopolymer chain to provide a farnesene homopolymer having an alternative structure, for example, A-B-C-A-B, A-B-C-A-B-C or the like.

In certain embodiments, the polyfarnesene is a farnesene interpolymer. In other embodiments, the farnesene interpolymer is prepared by polymerizing at least one farnesene and at least one vinyl monomer in the presence of any catalyst suitable for polymerizing olefins and vinyl monomers. In further embodiments, the farnesene interpolymer disclosed herein comprises (a) one or more units having at least one of formulae (I), (II), (III) and (IV) disclosed herein; and (b) one or more units having formula (IX):

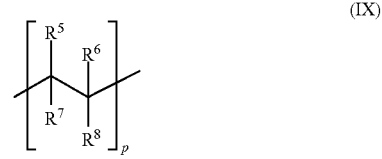

(IX)

wherein p is an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000; and each of $R^5$, $R^6$, $R^7$ and $R^8$ is independently H, an organyl group, or a functional group. In some embodiments, each of $R^5$, $R^6$, $R^7$ and $R^8$ disclosed herein is not a monovalent hydrocarbon group containing 4-8 carbon atoms. In some embodiments, each of $R^5$, $R^6$, $R^7$ and $R^8$ disclosed herein is not an alkyl group containing 4-8 carbon atoms.

In some embodiments, the farnesene interpolymer disclosed herein comprises (a) one or more units having at least one of formulae (V), (VI), (VII) and (VIII) disclosed herein; and (b) one or more units having formula (IX) disclosed herein. In other embodiments, the farnesene interpolymer disclosed herein comprises (a) one or more units having at least one of formulae (I), (II), (III), (IV), (V), (VI), (VII) and (VIII) disclosed herein; and (b) one or more units having formula (IX) disclosed herein.

In some embodiments, the farnesene interpolymer is prepared by polymerizing at least one farnesene and at least two vinyl monomers in the presence of any catalyst suitable for polymerizing olefins and vinyl monomers disclosed herein. In certain embodiments, the farnesene interpolymer disclosed herein comprises (a) one or more units having at least one of formulae (I), (II), (III), (IV), (V), (VI), (VII) and (VIII) disclosed herein; (b) one or more units having formula (IX):

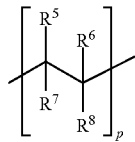

wherein each of $R^5$, $R^6$, $R^7$ and $R^8$ is independently H, alkyl, cycloalkyl, aryl, alkenyl, cycloalkenyl, alkynyl, heterocyclyl (e.g., pyridyl), alkoxy, aryloxy, carboxy (i.e., —COOH), alkoxycarbonyl (e.g., methoxycarbonyl, ethoxycarbonyl, n-propoxycarbonyl, isopropoxycarbonyl, n-butoxycarbonyl), aminoalkoxycarbonyl (e.g., 2-aminoethoxycarbonyl), hydroxyalkoxycarbonyl (e.g., 2-hydroxyethoxycarbonyl), aminocarbonyl, alkylaminocarbonyl, dialkylaminocarbonyl, acyloxy (e.g., $CH_3$—C(=O)—O), nitrile or halo (e.g., F, Cl, Br and I); and (c) one or more units having formula (IX):

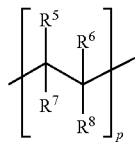

wherein $R^5$ is carboxy or alkoxycarbonyl; $R^7$ is H or alkyl; and each of $R^6$ and $R^8$ is independently H, and wherein each p is independently an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000.

In some embodiments, the farnesene interpolymer is prepared by polymerizing at least one farnesene and at least two vinyl monomers in the presence of any catalyst suitable for polymerizing olefins and vinyl monomers. In certain embodiments, the farnesene interpolymer disclosed herein comprises (a) one or more units having at least one of formulae (I), (II), (III), (IV), (V), (VI), (VII) and (VIII) disclosed herein; (b) one or more units having formula (IX):

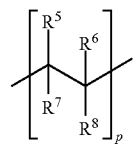

wherein each of $R^5$, $R^6$, $R^7$ and $R^8$ is independently H, alkyl, cycloalkyl, aryl, alkenyl, cycloalkenyl, alkynyl, heterocyclyl (e.g., pyridyl), alkoxy, aryloxy, carboxy (i.e., —COOH), alkoxycarbonyl (e.g., methoxycarbonyl, ethoxycarbonyl, n-propoxycarbonyl, isopropoxycarbonyl, n-butoxycarbonyl), aminoalkoxycarbonyl (e.g., 2-aminoethoxycarbonyl), hydroxyalkoxycarbonyl (e.g., 2-hydroxyethoxycarbonyl), aminocarbonyl, alkylaminocarbonyl, dialkylaminocarbonyl, acyloxy (e.g., $CH_3$—C(=O)—O), nitrile or halo (e.g., F, Cl, Br and I); (c) one or more units having formula (IX):

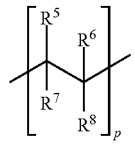

wherein each of $R^5$ and $R^6$ is independently carboxy or $R^5$ and $R^6$ together form —C(=O)—O—C(=O)—; $R^7$ is H or alkyl; and $R^8$ is H; and (d) one or more units having formula (IX):

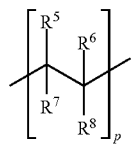

wherein $R^5$ is alkoxycarbonyl; $R^7$ is H or alkyl; and each of $R^6$ and $R^8$ is independently H, and wherein each p is independently an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000.

In some embodiments, the farnesene interpolymer disclosed herein is a random interpolymer. In other embodiments, the farnesene interpolymer disclosed herein is a random interpolymer wherein the vinyl monomer units and the farnesene units are randomly distributed. In further embodiments, the farnesene interpolymer disclosed herein is a random interpolymer wherein the vinyl monomer units and the farnesene units are randomly distributed and wherein two or more of formulae (I), (II), (III), (IV), (V), (VI), (VII), (VIII) and (XI) in the farnesene units are distributed randomly, alternatively or in blocks.

In some embodiments, the farnesene interpolymer disclosed herein is an alternating interpolymer. In other embodiments, the farnesene interpolymer disclosed herein is an alternating interpolymer wherein the vinyl monomer units and the farnesene units are alternatively distributed. In further embodiments, the farnesene interpolymer disclosed herein is an alternating interpolymer wherein the vinyl monomer units and the farnesene units are alternatively distributed and wherein two or more of formulae (I), (II), (III), (IV), (V), (VI), (VII), (VIII) and (XI) in the farnesene units are distributed randomly, alternatively or in blocks.

In certain embodiments, the farnesene interpolymer is a block interpolymer having one or more first blocks comprising the one or more units having formula (I), (II), (III), (IV) or a combination thereof and one or more second blocks comprising the one or more units having formula (IX). In further embodiments, the farnesene interpolymer is a block interpolymer having one or more first blocks comprising the one or more units having formula (V), (VI), (VII), (VIII) or a combination thereof and one or more second blocks comprising the one or more units having formula (IX). In still further embodiments, there are one first block and two second blocks and wherein the first block is between the two second blocks. In still further embodiments, each of the second blocks comprises units derived from styrene. In some embodiments, the farnesene block interpolymer is a polystyrene-polyfarnesene di-block polyfarnesene, polystyrene-polyfarnesene-polystyrene tri-block polyfarnesene or a combination thereof.

In some embodiments, the farnesene interpolymer can be represented by the following formula: $P_xQ_y$, wherein each of x and y is at least 1, and wherein P has formula (IX) and Q has formula (I), (II), (III), (IV), (V), (VI), (VII) or (VIII). In further embodiments, each of x and y is independently greater than 1, such as 2, 3, 4, 5, 6, 7, 8, 9, 10, 15, 20, 25, 30, 35, 40, or higher. In some embodiments, the Ps and Qs are linked in a substantially linear fashion, as opposed to a substantially branched or substantially star-shaped fashion. In other embodiments, the Ps and Qs are randomly distributed along the farnesene interpolymer chain. In other embodiments, the Ps and Qs are in two or more blocks or segments to provide a farnesene interpolymer having a block structure, for example, PP—P-QQ—Q or PP—P-QQ—Q-P—PP. In other embodiments, the Ps and Qs are alternatively distributed along the farnesene interpolymer chain to provide a farnesene interpolymer having an alternative structure, for example, P-Q, P-Q-P, P-Q-P-Q, P-Q-P-Q-P or the like. In some embodiments, each Q has formula $A_xB_y$ or $A_xB_yC_z$ as disclosed herein.

In certain embodiments, the amount of formula (I) in the polyfarnesene disclosed herein is at most about 85 wt. %, at most about 80 wt. %, at most about 70 wt. %, at most about 60 wt. %, or at most about 50 wt. %, based on the total weight of the polyfarnesene. In other embodiments, the amount of formula (III) in the polyfarnesene disclosed herein is at least about 10 wt. %, at least about 15 wt. %, at least about 20 wt. %, at least about 25 wt. %, at least about 30 wt. %, at least about 40 wt. %, at least about 50 wt. %, at least about 60 wt. %, at least about 70 wt. %, at least about 80 wt. %, at least about 90 wt. %, at least about 95 wt. %, or at least about 99 wt. %, based on the total weight of the polyfarnesene. In further embodiments, the amount of formula (II) in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In still further embodiments, the amount of formula (IV) in the polyfarnesene disclosed herein is at most about 0.1 wt. %, at most about 0.5 wt. %, at most about 1 wt. %, at most about 2 wt. %, or at most about 3 wt. %, based on the total weight of the polyfarnesene. In some embodiments, the polyfarnesene disclosed herein is substantially free of formula (I), (II), (III) or (IV).

In certain embodiments, the amount of formula (V), (VI), (VII) or (VIII) in the polyfarnesene disclosed herein is at most about 1 wt. %, at most about 5 wt. %, at most about 10 wt. %, at most about 20 wt. %, at most about 30 wt. %, at most about 40 wt. %, at most about 50 wt. %, at most about 60 wt. %, at most about 70 wt. %, at most about 80 wt. %, or at most about 90 wt. %, based on the total weight of the polyfarnesene. In other embodiments, the amount of formula (V), (VI), (VII) or (VIII) in the polyfarnesene disclosed herein is at least about 1 wt. %, at least about 2 wt. %, at least about 3 wt. %, at least about 5 wt. %, at least about 10 wt. %, at least about 20 wt. %, at least about 30 wt. %, at least about 40 wt. %, at least about 50 wt. %, at least about 60 wt. %, based on the total weight of the polyfarnesene. In further embodiments, the amount of formula (V), (VI), (VII) or (VIII) in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In some embodiments, the polyfarnesene disclosed herein is substantially free of formula (V), (VI), (VII) or (VIII).

In other embodiments, the sum of m and n disclosed herein is greater than about 250, greater than about 300, greater than about 500, greater than about 750, greater than about 1000, or greater than about 2000. In further embodiments, the sum of m and l disclosed herein is greater than about 250, greater than about 300, greater than about 500, greater than about 750, greater than about 1000, or greater than about 2000. In certain embodiments, the sum of m, n and l disclosed herein is greater than about 250, greater than about 300, greater than about 500, greater than about 750, greater than about 1000, or greater than about 2000. In some embodiments, the sum of m, n, l and k disclosed herein is greater than about 250, greater than about 300, greater than about 500, greater than about 750, greater than about 1000, or greater than about 2000.

In certain embodiments, the number-average molecular weight ($M_n$), weight-average molecular weight ($M_w$), or viscosity-average molecular weight ($M_z$) of the polyfarnesene disclosed herein is greater than about 1,000, greater than about 5,000, greater than about 10,000, greater than about 50,000, greater than about 100,000, greater than 200,000, greater than 300,000, greater than about 500,000, greater than 750,000, greater than 1,000,000, greater than 1,500,000, or greater than about 2,000,000. In some embodiments, the $M_n$, $M_w$ or $M_z$ of the polyfarnesene disclosed herein is less than about 10,000,000, less than about 5,000,000, less than about 1,000,000, less than about 750,000, less than about 500,000, less than about 100,000, less than about 50,000, less than about 10,000, or less than about 5,000.

In some embodiments, the polyfarnesene disclosed herein has at least a glass transition temperature ($T_g$) of less than 50° C., less than 40° C., less than 30° C., less than 20° C., less than 10° C., less than 0° C., less than −10° C., less than −20° C., less than −30° C., less than −40° C., less than −50° C., less than −55° C., less than −60° C., less than −65° C., less than −70° C. or less than −75° C., as measured according to ASTM D7426-08 titled "*Standard Test Method for Assignment of the DSC Procedure for Determining $T_g$ of a Polymer or an Elastomeric Compound,*" which is incorporated herein by reference. In some embodiments, the polyfarnesene disclosed herein has at least a glass transition temperature ($T_g$) of greater than 50° C., greater than 40° C., greater than 30° C., greater than 20° C., greater than 10° C., greater than 0° C., greater than −10° C., greater than −20° C., greater than −30° C., greater than −40° C., or greater than −50° C. In certain embodiments, the polyfarnesene has at least a glass transition temperature ($T_g$) from about −20° C. to about 40° C., from about −15° C. to about 35° C., from about −10° C. to about 30° C., from about −5° C. to about 25° C., from about 0° C. to about 20° C., or from about 5° C. to about 15° C., as measured according to ASTM D7426-08.

In some embodiments, the amount of formula (I) is at most about 80 wt. %, based on the total weight of the polyfarnesene. In other embodiments, the sum of m, n and l is greater than about 300. In further embodiments, at least a portion of the double bonds in one or more of formulae (I), (II), (III), (IV), (IX), (XI), (XII) and stereoisomers thereof is hydrogenated.

In some embodiments, the polyfarnesene is a farnesene interpolymer. In further embodiments, the farnesene interpolymer disclosed herein comprises one or more units derived from a farnesene in an amount of at least about 5 mole percent, at least about 10 mole percent, at least about 15 mole percent, at least about 20 mole percent, at least about 25 mole percent, at least about 30 mole percent, at least about 40 mole percent, at least about 50 mole percent, at least about 60 mole percent, at least about 70 mole percent, at least about 80 mole percent, or at least about 90 mole percent of the whole farnesene interpolymer. In still further embodiments, the farnesene interpolymer disclosed herein comprises one or more units derived from the vinyl monomer in an amount of at least about 5 mole percent, at least about 10 mole percent, at least about 15 mole percent, at least about 20 mole percent, at least about 30 mole percent, at least about 40 mole percent, at least about 50 mole percent, at least about 60 mole percent, at least about 70 mole percent, at least about 80 mole percent, or at least about 90 mole percent of the whole farnesene interpolymer.

In certain embodiments, the polyfarnesene comprises one or more polymer molecules, each of the molecules independently having formula (X'):

(X')

wherein n is an integer from 1 to about 500, from 1 to about 1,000, from 1 to about 5,000, from 1 to about 10,000, from 1 to about 50,000, from 1 to about 100,000, from 1 to about 200,000, or from 1 to about 500,000; m is an integer from 0 to about 500, from 0 to about 1,000, from 0 to about 5,000, from 0 to about 10,000, from 0 to about 50,000, from 0 to about 100,000, from 0 to about 200,000, or from 0 to about 500,000; X is derived from a farnesene; and Y is derived from a vinyl monomer, with the proviso that when m is 0, n is at least 2. In some embodiments, m is an integer from 1 to about 500, from 1 to about 1,000, from 1 to about 5,000, from 1 to about 10,000, from 1 to about 50,000, from 1 to about 100,000, from 1 to about 200,000 or from 1 to about 500,000. In certain embodiments, the sum of m and n is from 2 to about 500, from 2 to about 1,000, from 2 to about 5,000, from 2 to about 10,000, from 2 to about 50,000, from 2 to about 100,000, from 2 to about 200,000 or from 2 to about 500,000

In some embodiments, X has one or more of formulae (I')-(VIII'):

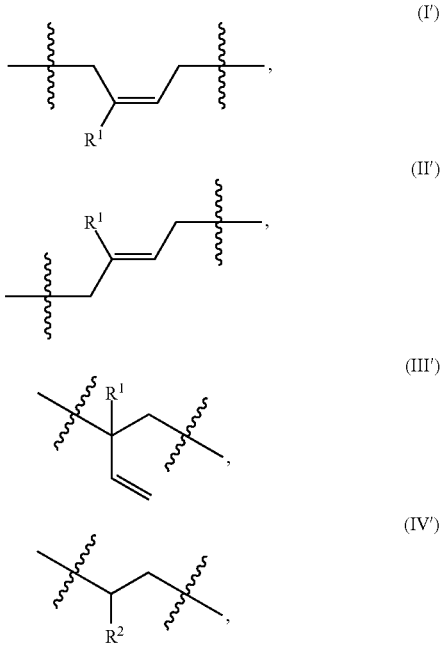

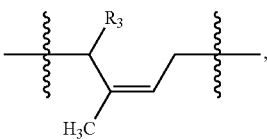

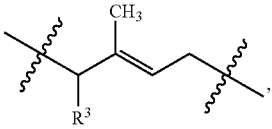

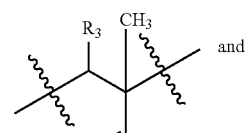

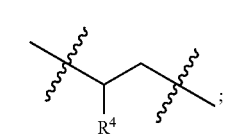

where $R^1$, $R^2$, $R^3$, $R^4$ are as defined herein.

In certain embodiments, Y has formula (IX'):

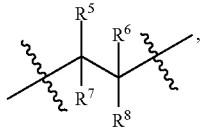

where each of $R^5$, $R^6$, $R^7$ and $R^8$ is independently H, an organyl group or a functional group. In some embodiments, each of $R^5$, $R^6$, $R^7$ and $R^8$ is independently H, hydrocarbyl, substituted hydrocarbyl, heterohydrocarbyl, substituted heterohydrocarbyl, heterocyclyl, substituted heterocyclyl or a functional group containing O, N, S, P or a combination thereof.

In some embodiments, each of $R^5$, $R^6$, $R^7$ and $R^8$ is independently H, alkyl, cycloalkyl, aryl, alkenyl, cycloalkenyl, alkynyl, heterocyclyl (e.g., pyridyl), alkoxy, aryloxy, carboxy (i.e., —COOH), alkoxycarbonyl (e.g., methoxycarbonyl, ethoxycarbonyl, n-propoxycarbonyl, isopropoxycarbonyl, n-butoxycarbonyl), aminoalkoxycarbonyl (e.g., 2-aminoethoxycarbonyl), hydroxyalkoxycarbonyl (e.g., 2-hydroxyethoxycarbonyl), aminocarbonyl, alkylaminocarbonyl, dialkylaminocarbonyl, acyloxy (e.g., CH₃—C(=O)—O), nitrile or halo (e.g., F, Cl, Br and I).

In certain embodiments, the $R^5$ of formula (X') is carboxy; and $R^7$ is H or alkyl. In other embodiments, the $R^5$ is alkoxycarbonyl; and $R^7$ is H or alkyl. In some embodiments, the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, decoxycarbonyl, isodecoxycarbonyl, lauroxycarbonyl or stearoxycarbonyl.

In some embodiments, $R^5$ is hydroxyalkoxycarbonyl or aminoalkoxycarbonyl; and $R^7$ is H or alkyl. In certain embodiments, the hydroxyalkoxycarbonyl is 2-hydroxyethoxycarbonyl; and the aminoalkoxycarbonyl is 2-aminoethoxycarbonyl, 2-(dimethylamino)ethoxycarbonyl or 2-(diethylamino)ethoxycarbonyl.

In certain embodiments, the $R^5$ is 2-methylphenyl, 4-methylphenyl, 2-ethylphenyl, 4-ethylphenyl, 2,4-dimethylphenyl or 4-fluorophenyl; and $R^7$ is H. In some embodiments, the $R^5$ is pyridyl or cyano; and $R^7$ is H. In some embodiments, the $R^5$ is acyloxy; and $R^7$ is H. In certain embodiments, the acyloxy is $CH_3C(=O)-O-$. In certain embodiments, $R^5$ is halo; and $R^7$ is H or halo. In some embodiments, $R^5$ is chloro; and $R^7$ is H. In certain embodiments, $R^5$ is fluoro; and $R^7$ is fluoro.

In certain embodiments, the polyfarnesene comprises one or more polymer molecules, each of the molecules independently having formula (X"):

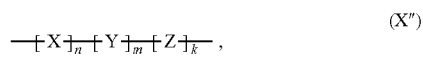
(X")

wherein n is an integer from 1 to about 500, from 1 to about 1,000, from 1 to about 5,000, from 1 to about 10,000, from 1 to about 50,000, from 1 to about 100,000, from 1 to about 200,000 or from 1 to about 500,000; each of m and k is independently an integer from 0 to about 500, from 0 to about 1,000, from 0 to about 5,000, from 0 to about 10,000, from 0 to about 50,000, from 0 to about 100,000, from 0 to about 200,000 or from 0 to about 500,000; X is derived from a farnesene; and each of Y and Z is independently derived from a vinyl monomer, with the proviso that when m is 0 and k is 0, n is at least 2. In some embodiments, each of m and k is independently from 1 to about 500, from 1 to about 1,000, from 1 to about 5,000, from 1 to about 10,000, from 1 to about 50,000, from 1 to about 100,000, from 1 to about 200,000 or from 1 to about 500,000. In certain embodiments, the sum of n, m and k is from 3 to about 500, from 3 to about 1,000, from 3 to about 5,000, from 3 to about 10,000, from 3 to about 50,000, from 3 to about 100,000, from 3 to about 200,000 or from 3 to about 500,000.

In some embodiments, the sum of n, m and k is greater than about 2, about 3, about 4, about 5, about 6, about 7, about 8, about 9 or about 10. In other embodiments, the sum of n, m and k is greater than about 15, about 20, about 25, about 30, about 35, about 40, about 45, about 50, about 55, about 60, about 65, about 70, about 75, about 80, about 85, about 90, about 95 or about 100. In further embodiments, the sum of n, m and k is greater than about 500, about 1,000, about 1,500, about 2,000, about 3,000, about 4,000, about 5,000, about 6,000, about 7,000, about 8,000, about 9,000, about 10,000, about 50,000, about 100,000, about 500,000 or about 1,000,000. In still further embodiments, the sum of n, m and k is less than about 2,500, about 5,000, about 6,000, about 7,000, about 8,000, about 9,000, about 10,000, about 50,000, about 100,000, about 500,000 or about 1,000,000.

In certain embodiments, the sum of m and k is greater than about 2, about 3, about 4, about 5, about 6, about 7, about 8, about 9 or about 10. In other embodiments, the sum of m and k is greater than about 15, about 20, about 25, about 30, about 35, about 40, about 45, about 50, about 55, about 60, about 65, about 70, about 75, about 80, about 85, about 90, about 95 or about 100. In further embodiments, the sum of m and k is greater than about 500, about 1,000, about 1,500, about 2,000, about 3,000, about 4,000, about 5,000, about 6,000, about 7,000, about 8,000, about 9,000, about 10,000, about 50,000 or about 100,000. In some embodiments, the sum of m and k is less than about 2, about 3, about 4, about 5, about 6, about 7, about 8, about 9 or about 10. In other embodiments, the sum of m and k is less than about 15, about 20, about 25, about 30, about 35, about 40, about 45, about 50, about 55, about 60, about 65, about 70, about 75, about 80, about 85, about 90, about 95 or about 100. In further embodiments, the sum of m and k is less than about 500, about 1,000, about 1,500, about 2,000, about 3,000, about 4,000, about 5,000, about 6,000, about 7,000, about 8,000, about 9,000, about 10,000.

In some embodiments, each of m and k is independently greater than 1, about 2, about 3, about 4, about 5, about 6, about 7, about 8, about 9 or about 10. In other embodiments, each of m and k is independently greater than about 15, about 20, about 25, about 30, about 35, about 40, about 45, about 50, about 55, about 60, about 65, about 70, about 75, about 80, about 85, about 90, about 95 or about 100. In further embodiments, each of m and k is independently greater than about 500, about 1,000, about 1,500, about 2,000, about 3,000, about 4,000, about 5,000, about 6,000, about 7,000, about 8,000, about 9,000, about 10,000. In certain embodiments, each of m and k is independently less than about 2, about 3, about 4, about 5, about 6, about 7, about 8, about 9 or about 10. In other embodiments, each of m and k is independently less than about 15, about 20, about 25, about 30, about 35, about 40, about 45, about 50, about 55, about 60, about 65, about 70, about 75, about 80, about 85, about 90, about 95 or about 100. In further embodiments, each of m and k is independently less than about 500, about 1,000, about 1,500, about 2,000, about 3,000, about 4,000, about 5,000, about 6,000, about 7,000, about 8,000, about 9,000, about 10,000.

In some embodiments, X is as defined herein. In certain embodiments, each of Y and Z independently has formula (IX'):

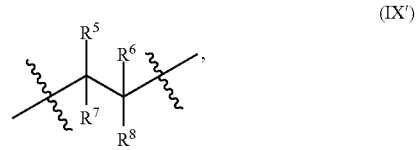
(IX')

where each of $R^5$, $R^6$, $R^7$ and $R^8$ is as defined herein.

In certain embodiments, $R^5$ of Y of formula (X") is carboxy or alkoxycarbonyl; $R^7$ of Y is H or alkyl; and each of $R^6$ and $R^8$ of Y is independently H. In some embodiments, $R^5$ of Z of formula (X") is alkoxycarbonyl, hydroxyalkoxycarbonyl or aminoalkoxycarbonyl; $R^7$ of Z is H or alkyl; and each of $R^6$ and $R^8$ of Z is independently H. In other embodiments, the alkoxycarbonyl is the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, decoxycarbonyl, isodecoxycarbonyl, lauroxycarbonyl or stearoxycarbonyl; the hydroxyalkoxycarbonyl is hydroxyethoxycarbonyl; and the aminoalkoxycarbonyl is 2-aminoethoxycarbonyl, 2-(dimethylamino)ethoxycarbonyl or 2-(diethylamino)ethoxycarbonyl.

In some embodiments, $R^5$ of Z of formula (X") is alkyl or aryl; and each of $R^6$, $R^7$ and $R^8$ of Z is independently H. In certain embodiments, $R^5$ of Z is aryl selected from phenyl, 2-methylphenyl, 4-methylphenyl, 2-ethylphenyl, 4-ethylphenyl, 2,4-dimethylphenyl and 4-fluorophenyl.

In certain embodiments, $R^5$ of Y of formula (X") is alkoxycarbonyl or hydroxyalkoxycarbonyl; $R^7$ of Y is alkyl; and each of $R^6$ and $R^8$ of Y is H; $R^5$ of Z is alkoxycarbonyl; $R^7$ of Z is H or alkyl; and each of $R^6$ and $R^8$ of Z is H. In some embodiments, $R^5$ of Y of formula (X") is phenyl; each of $R^6$, $R^7$ and $R^8$ of Y is H; $R^5$ of Z is cyano; and each of $R^6$, $R^7$ and $R^8$ of Z is H.

In certain embodiments, the polyfarnesene comprises one or more polymer molecules, each of the molecules independently having formula (X'''):

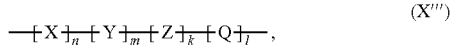

wherein n is an integer from 1 to about 500, from 1 to about 1,000, from 1 to about 5,000, from 1 to about 10,000, from 1 to about 50,000, from 1 to about 100,000, from 1 to about 200,000 or from 1 to about 500,000; each of m, k and l is independently an integer from 0 to about 500, from 0 to about 1,000, from 0 to about 5,000, from 0 to about 10,000, from 0 to about 50,000, from 0 to about 100,000, from 0 to about 200,000 or from 0 to about 500,000; X is derived from a farnesene; and each of Y, Z and Q is independently derived from a vinyl monomer, with the proviso that when m is 0, k is 0 and l is 0, n is at least 2. In some embodiments, each of m, k and l is independently an integer from 1 to about 500, from 1 to about 1,000, from 1 to about 5,000, from 1 to about 10,000, from 1 to about 50,000, from 1 to about 100,000, from 1 to about 200,000 or from 1 to about 500,000. In certain embodiments, the sum of n, m, k and l is independently from 4 to about 500, from 4 to about 1,000, from 4 to about 5,000, from 4 to about 10,000, from 4 to about 50,000, from 4 to about 100,000, from 4 to about 200,000 or from 4 to about 500,000.

In some embodiments, the sum of n, m, k and l is greater than about 2, about 3, about 4, about 5, about 6, about 7, about 8, about 9 or about 10. In other embodiments, the sum of n, m, k and l is greater than about 15, about 20, about 25, about 30, about 35, about 40, about 45, about 50, about 55, about 60, about 65, about 70, about 75, about 80, about 85, about 90, about 95 or about 100. In further embodiments, the sum of n, m, k and l is greater than about 500, about 1,000, about 1,500, about 2,000, about 3,000, about 4,000, about 5,000, about 6,000, about 7,000, about 8,000, about 9,000, about 10,000, about 50,000, about 100,000, about 500,000 or about 1,000,000. In still further embodiments, the sum of n, m, k and l is less than about 2,500, about 5,000, about 6,000, about 7,000, about 8,000, about 9,000, about 10,000, about 50,000, about 100,000, about 500,000 or about 1,000,000.

In certain embodiments, the sum of m, k and l is greater than about 2, about 3, about 4, about 5, about 6, about 7, about 8, about 9 or about 10. In other embodiments, the sum of m, k and l is greater than about 15, about 20, about 25, about 30, about 35, about 40, about 45, about 50, about 55, about 60, about 65, about 70, about 75, about 80, about 85, about 90, about 95 or about 100. In further embodiments, the sum of m, k and l is greater than about 500, about 1,000, about 1,500, about 2,000, about 3,000, about 4,000, about 5,000, about 6,000, about 7,000, about 8,000, about 9,000, about 10,000, about 50,000 or about 100,000. In some embodiments, the sum of m, k and l is less than about 2, about 3, about 4, about 5, about 6, about 7, about 8, about 9 or about 10. In other embodiments, the sum of m, k and l is less than about 15, about 20, about 25, about 30, about 35, about 40, about 45, about 50, about 55, about 60, about 65, about 70, about 75, about 80, about 85, about 90, about 95 or about 100. In further embodiments, the sum of m, k and l is less than about 500, about 1,000, about 1,500, about 2,000, about 3,000, about 4,000, about 5,000, about 6,000, about 7,000, about 8,000, about 9,000, about 10,000, about 50,000 or about 100,000.

In some embodiments, each of m, k and l is independently greater than 1, about 2, about 3, about 4, about 5, about 6, about 7, about 8, about 9 or about 10. In other embodiments, each of m, k and l is independently greater than about 15, about 20, about 25, about 30, about 35, about 40, about 45, about 50, about 55, about 60, about 65, about 70, about 75, about 80, about 85, about 90, about 95 or about 100. In further embodiments, each of m, k and l is independently greater than about 500, about 1,000, about 1,500, about 2,000, about 3,000, about 4,000, about 5,000, about 6,000, about 7,000, about 8,000, about 9,000, about 10,000. In certain embodiments, each of m, k and l is independently less than about 2, about 3, about 4, about 5, about 6, about 7, about 8, about 9 or about 10. In other embodiments, each of m, k and l is independently less than about 15, about 20, about 25, about 30, about 35, about 40, about 45, about 50, about 55, about 60, about 65, about 70, about 75, about 80, about 85, about 90, about 95 or about 100. In further embodiments, each of m, k and l is independently less than about 500, about 1,000, about 1,500, about 2,000, about 3,000, about 4,000, about 5,000, about 6,000, about 7,000, about 8,000, about 9,000, about 10,000.

In some embodiments, X is as defined herein. In certain embodiments, each of Y, Z and Q independently has formula (IX'):

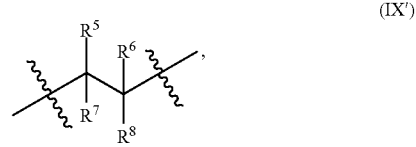

where each of $R^5$, $R^6$, $R^7$ and $R^8$ is as defined herein.

In some embodiments, $R^5$ of Y of formula (X''') is carboxy or alkoxycarbonyl; $R^7$ of Y is H or alkyl; and each of $R^6$ and $R^8$ of Y is independently H. In some embodiments, $R^5$ of Z of formula (X''') is alkoxycarbonyl, hydroxyalkoxycarbonyl or aminoalkoxycarbonyl; $R^7$ of Z is H or alkyl; and each of $R^6$ and $R^8$ of Z is independently H. In other embodiments, the alkoxycarbonyl is the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, decoxycarbonyl, isodecoxycarbonyl, lauroxycarbonyl or stearoxycarbonyl; the hydroxyalkoxycarbonyl is hydroxyethoxycarbonyl; and the aminoalkoxycarbonyl is 2-aminoethoxycarbonyl, 2-(dimethylamino)ethoxycarbonyl or 2-(diethylamino)ethoxycarbonyl.

In some embodiments, each of $R^5$ and $R^6$ of Q of formula (X''') is carboxy or $R^5$ and $R^6$ together form —C(=O)—O—C(=O)—. In certain embodiments, $R^5$ of Y of formula (X''') is carboxy; $R^7$ of Y is H or alkyl; and each of $R^6$ and $R^8$ of Y is independently H. In some embodiments, $R^5$ of Z of formula (X') is alkoxycarbonyl; $R^7$ of Z is H or alkyl; and each of $R^6$ and $R^8$ of Z is independently H. In some embodiments, $R^5$ of Q of formula (X''') is alkyl or aryl; and each of $R^6$, $R^7$ and $R^8$ of Q is independently H. In some embodiments, $R^5$ of Q of formula (X''') is alkoxycarbonyl; and each of $R^6$, $R^7$ and $R^8$ of Q is independently H.

In general, the polyfarnesene comprising a mixture of polymer molecules, each of which has formula (X') wherein each of n and m independently has a specific value. The average and distribution of the n or m values disclosed herein depend on various factors such as the molar ratio of the starting materials, the reaction time and temperature, the presence or absence of a chain terminating agent, the amount of an initiator if there is any, and the polymerization conditions. The farnesene interpolymer of Formula (X') may include unreacted comonomers, although the concentrations of the comonomer would generally be small if not extremely small or undetectable. The extent of polymerization, as specified with n and m values, can affect the properties of the resulting polymer. In some embodiments, n is an integer from 1 to about 5,000, from 1 to about 10,000, from 1 to about 50,000, from 1 to about 100,000, from 1 to about 200,000, or from 1 to about 500,000; and m is an integer from 0 to about 5,000, from 0 to about 10,000, from 0 to about 50,000, from 0 to about 100,000, from 0 to about 200,000, or from 0 to about 500,000. In other embodiments, n is independently from about 1 to about 5000, from about 1 to about 2500, from about 1 to about 1000, from about 1 to about 500, from about 1 to about 100 or from about 1 to about 50; and m is from about 0 to about 5000, from about 0 to about 2500, from about 0 to about 1000, from about 0 to about 500, from about 0 to about 100 or from about 0 to about 50. A person of ordinary skill in the art will recognize that additional ranges of average n and m values are contemplated and are within the present disclosure.

In some embodiments, formula (X'), (X") or (X''') comprises two end groups as shown by the formula ($X_a$), ($X_b$) or ($X_c$) respectively:

($X_a$)

($X_b$)

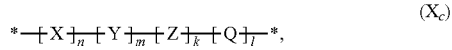
($X_c$)

where each of the asterisks (*) in the formula represents an end group which may or may not vary between different polymer molecules of the polyfarnesene depending on many factors such as the molar ratio of the starting materials, the presence or absence of a chain terminating agent, and the state of the particular polymerization process at the end of the polymerization step.

In some embodiments, Xs and Ys of formula (X') or ($X_a$) are linked in a substantially linear fashion. In other embodiments, Xs and Ys of formula (X') or ($X_a$) are linked in substantially branched fashion. In further embodiments, Xs and Ys of formula (X') or ($X_a$) are linked in substantially star-shaped fashion. In still further embodiments, each of Xs and Ys independently forms at least a block along the polymer chain so as to provide a di-block, tri-block or multi-block farnesene interpolymer having at least one X block and at least one Y block. In still further embodiments, Xs and Ys are randomly distributed along the polymer chain so as to provide a random farnesene interpolymer. In still further embodiments, Xs and Ys are alternatively distributed along the polymer chain so as to provide an alternating farnesene interpolymer.

In some embodiments, Xs, Ys and Zs of formula (X") or ($X_b$) are linked in a substantially linear fashion. In other embodiments, Xs, Ys and Zs of formula (X") or ($X_b$) are linked in substantially branched fashion. In further embodiments, Xs, Ys and Zs of formula (X") or ($X_b$) are linked in substantially star-shaped fashion. In still further embodiments, each of Xs, Ys and Zs independently forms at least a block along the polymer chain so as to provide a tri-block or multi-block farnesene interpolymer having at least one X block and at least one Y block, at least one Z block. In still further embodiments, Xs, Ys and Zs are randomly distributed along the polymer chain so as to provide a random farnesene interpolymer. In still further embodiments, Xs, Ys and Zs are alternatively distributed along the polymer chain so as to provide an alternating farnesene interpolymer.

In some embodiments, Xs, Ys, Zs and Qs of formula (X''') or ($X_c$) are linked in a substantially linear fashion. In other embodiments, Xs, Ys, Zs and Qs of formula (X''') or ($X_c$) are linked in substantially branched fashion. In further embodiments, Xs, Ys, Zs and Qs of formula (X''') or ($X_c$) are linked in substantially star-shaped fashion. In still further embodiments, each of Xs, Ys, Zs and Qs independently forms at least a block along the polymer chain so as to provide a tetra-block or multi-block farnesene interpolymer having at least one X block, at least one Y block, at least one Z block, and at least one Q block. In still further embodiments, Xs, Ys, Zs and Qs are randomly distributed along the polymer chain so as to provide a random farnesene interpolymer. In still further embodiments, Xs, Ys, Zs and Qs are alternatively distributed along the polymer chain so as to provide an alternating farnesene interpolymer.

In some embodiments, the amount of the farnesene in the farnesene interpolymer disclosed herein is greater than about 1.5 mole %, greater than about 2.0 mole %, greater than about 2.5 mole %, greater than about 5 mole %, greater than about 10 mole %, greater than about 15 mole %, greater than 20 mole %, greater than 21 mole %, greater than 22 mole %, greater than 23 mole %, greater than 24 mole %, greater than 25 mole %, or greater than about 30 mole %, based on the total amount of the farnesene interpolymer. In other embodiments, the amount of the farnesene in the farnesene interpolymer disclosed herein is less than about 90 mole %, less than about 80 mole %, less than about 70 mole %, less than about 60 mole %, less than about 50 mole %, less than about 40 mole %, or less than about 30 mole %, based on the total amount of the farnesene interpolymer.

In some embodiments, the amount of the vinyl monomer(s) in the farnesene interpolymer disclosed herein is greater than about 1.5%, greater than about 2.0%, greater than about 2.5%, greater than about 5%, greater than about 10%, greater than about 15%, or greater than about 20%, based on the total mole or weight of the farnesene interpolymer. In other embodiments, the amount of the vinyl monomer(s) in the farnesene interpolymer disclosed herein is less than about 90%, less than about 80%, less than about 70%, less than about 60%, less than about 50%, less than about 40%, or less than about 30%, based on the total mole or weight of the farnesene interpolymer. In further embodiments, the amount of the vinyl monomer(s) in the farnesene interpolymer disclosed herein is from about 1% to about 90%, from about 5% to about 80%, from about 10% to about 70%, from about 10% to about 60%, from about 10% to about 50%, from about 10% to about 40%, or from 10% about to about 30%, based on the total mole or weight of the farnesene interpolymer.

In certain embodiments, the mole percent ratio of the farnesene to the at least one vinyl monomer (i.e., the mole percent ratio of X to Y, or X to the sum of Y and Z, or X to the sum of Y, Z and Q) in the farnesene interpolymer disclosed herein is from about 1:5 to about 100:1. In other embodiments, the mole percent ratio of X to Y, or X to the sum of Y and Z, or X to the sum of Y, Z and Q is from about 1:4 to about 100:1; from about 1:3.5 to about 100:1, from about 1:3 to about 100:1, from about 1:2.5 to about 100:1, or from about 1:2 to about 100:1. In some embodiments, m is 1 or greater, the mole percent ratio of X to Y, or X to the sum of Y and Z, or X to the sum of Y, Z and Q is from about 1:4 to about 100:1

In certain embodiments, the amount of formula (I') in the polyfarnesene disclosed herein is at most about 85 wt. %, at most about 80 wt. %, at most about 70 wt. %, at most about 60 wt. %, or at most about 50 wt. %, based on the total weight of the polyfarnesene. In other embodiments, the amount of formula (III') in the polyfarnesene disclosed herein is at least about 10 wt. %, at least about 15 wt. %, at least about 20 wt. %, at least about 25 wt. %, at least about 30 wt. %, at least about 40 wt. %, at least about 50 wt. %, at least about 60 wt. %, at least about 70 wt. %, at least about 75 wt. %, at least about 80 wt. %, at least about 85 wt. %, at least about 90 wt. %, at least about 95 wt. %, or at least about 99 wt. %, based on the total weight of the polyfarnesene. In further embodiments, the amount of formula (II') in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In still further embodiments, the amount of formula (IV') in the polyfarnesene disclosed herein is at most about 0.1 wt. %, at most about 0.5 wt. %, at most about 1 wt. %, at most about 2 wt. %, or at most about 3 wt. %, based on the total weight of the polyfarnesene. In some embodiments, the polyfarnesene disclosed herein is substantially free of formula (I'), (II'), (III') or (IV').

In certain embodiments, the amount of formula (V'), (VI'), (VII') or (VIII') in the polyfarnesene disclosed herein is at most about 1 wt. %, at most about 5 wt. %, at most about 10 wt. %, at most about 20 wt. %, at most about 30 wt. %, at most about 40 wt. %, at most about 50 wt. %, at most about 60 wt. %, at most about 70 wt. %, at most about 80 wt. %, or at most about 90 wt. %, based on the total weight of the polyfarnesene. In other embodiments, the amount of formula (V'), (VI'), (VII') or (VIII') in the polyfarnesene disclosed herein is at least about 1 wt. %, at least about 2 wt. %, at least about 3 wt. %, at least about 5 wt. %, at least about 10 wt. %, at least about 20 wt. %, at least about 30 wt. %, at least about 40 wt. %, at least about 50 wt. %, at least about 60 wt. %, based on the total weight of the polyfarnesene. In further embodiments, the amount of formula (V'), (VI'), (VII') or (VIII') in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In some embodiments, the polyfarnesene disclosed herein is substantially free of formula (V'), (VI'), (VII') or (VIII').

Any compound containing a vinyl group, i.e., —CH=CH$_2$, that is copolymerizable with farnesene can be used as a vinyl monomer for making the farnesene interpolymer disclosed herein. Useful vinyl monomers disclosed herein include ethylene, i.e., CH$_2$=CH$_2$. In certain embodiments, the vinyl monomer has formula (XV):

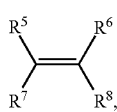

(XV)

where each of $R^5$, $R^6$, $R^7$ and $R^8$ is independently H, an organyl group or a functional group.

In some embodiments, at least one of $R^5$, $R^6$, $R^7$ and $R^8$ of formula (IX), (IX') or (XV) is an organyl group. In further embodiments, the organyl group is hydrocarbyl, substituted hydrocarbyl, heterohydrocarbyl, substituted heterohydrocarbyl, heterocyclyl or substituted heterocyclyl. In certain embodiments, each of $R^5$, $R^6$, $R^7$ and $R^8$ of formula (IX), (IX') or (XV) is independently H, alkyl, cycloalkyl, aryl, alkenyl, cycloalkenyl, alkynyl, heterocyclyl (e.g., pyridyl), alkoxy, aryloxy, carboxy (i.e., —COOH), alkoxycarbonyl (e.g., methoxycarbonyl, ethoxycarbonyl, n-propoxycarbonyl, isopropoxycarbonyl, n-butoxycarbonyl), aminoalkoxycarbonyl (e.g., 2-aminoethoxycarbonyl), hydroxyalkoxycarbonyl (e.g., 2-hydroxyethoxycarbonyl), aminocarbonyl, alkylaminocarbonyl, dialkylaminocarbonyl, acyloxy (e.g., CH$_3$—C(=O)—O), nitrile or halo (e.g., F, Cl, Br and I). In certain embodiments, $R^5$ of formula (IX), (IX') or (XV) is aryl; and each of $R^6$, $R^7$ and $R^8$ is H. In further embodiments, $R^5$ of formula (IX), (IX') or (XV) is phenyl; and each of $R^6$, $R^7$ and $R^8$ is H. In some embodiments, $R^5$ of formula (IX), (IX') or (XV) is carboxy, alkoxycarbonyl, aminocarbonyl, alkylaminocarbonyl, dialkylaminocarbonyl, acyloxy or nitrile; $R^7$ is H or alkyl; and each of $R^6$ and $R^8$ is H. In other embodiments, $R^5$ of formula (IX), (IX') or (XV) is carboxy or alkoxycarbonyl; $R^7$ is alkyl; and each of $R^6$ and $R^8$ is H. In further embodiments, $R^5$ of formula (IX), (IX') or (XV) is carboxy or alkoxycarbonyl; each of $R^6$, $R^7$ and $R^8$ is H.

In certain embodiments, at least one of $R^5$, $R^6$, $R^7$ and $R^8$ of formula (IX), (IX') or (XV) is H. In other embodiments, each of $R^5$, $R^6$, $R^7$ and $R^8$ of formula (IX), (IX') or (XV) is H. In further embodiments, $R^5$ of formula (IX), (IX') or (XV) is hydrocarbyl; and each of $R^6$, $R^7$ and $R^8$ is H. In still further embodiments, the hydrocarbyl is alkyl, cycloalkyl or aryl. In still further embodiments, none of $R^5$, $R^6$, $R^7$ and $R^8$ of formula (IX), (IX') or (XV) is or comprises alkenyl, cycloalkenyl or alkynyl. In still further embodiments, none of $R^5$, $R^6$, $R^7$ and $R^8$ of formula (IX), (IX') or (XV) is or comprises a hydrocarbyl, substituted hydrocarbyl, heterocyclyl or substituted heterocyclyl.

In certain embodiments, at least one of $R^5$, $R^6$, $R^7$ and $R^8$ of formula (IX), (IX') or (XV) is a functional group containing halo, O, N, S, P or a combination thereof. Some non-limiting examples of suitable functional groups include hydroxy, alkoxy, aryloxy, amino, nitro, thiol, thioether, imine, cyano, amido, phosphonato (—P(=O)(O-alkyl)$_2$, —P(=O)(O-aryl)$_2$, or —P(=O)(O-alkyl))O-aryl), phosphinato (—P(=O)(O-alkyl)alkyl, —P(=O)(O-aryl)alkyl, —P(=O)(O-alkyl)aryl, or —P(=O)(O-aryl)aryl), carboxyl, thiocarbonyl, sulfonyl (—S(=O)$_2$alkyl, or —S(=O)$_2$aryl), sulfonamide (—SO$_2$NH$_2$, —SO$_2$NH(alkyl), —SO$_2$NH(aryl), —SO$_2$N(alkyl)$_2$, —SO$_2$N(aryl)$_2$, or —SO$_2$N(aryl)(alkyl)), ketone, aldehyde, ester, oxo, amino (primary, secondary or tertiary), —CO$_2$CH$_3$, —CONH$_2$, —OCH$_2$CONH$_2$, —NH$_2$, —OCHF$_2$, —OCF$_3$, —NH(alkyl), —N(alkyl)$_2$, —NH(aryl), —N(alkyl)(aryl), —N(aryl)$_2$, —CHO, —CO(alkyl), —CO(aryl), —CO$_2$(alkyl), or —CO$_2$(aryl). In some embodiments, the functional group is or comprises alkoxy, aryloxy, carboxy (i.e., —COOH), alkoxycarbonyl (e.g., methoxycarbonyl, ethoxycarbonyl, n-propoxycarbonyl, isopropoxycarbonyl, n-butoxycarbonyl), aminoalkoxycarbonyl (e.g., 2-aminoethoxycarbonyl), hydroxyalkoxycarbonyl (e.g., 2-hydroxyethoxycarbonyl), aminocarbonyl, alkylaminocarbonyl, dialkylaminocarbonyl, acyloxy (e.g., CH$_3$—C(=O)—O), nitrile or halo (e.g., F, Cl, Br and I). In certain embodiments, the functional group is or comprises carboxy, alkoxycarbonyl, aminoalkoxycarbonyl, hydroxyalkoxycarbonyl aminocarbonyl, alkylaminocarbonyl, dialkylaminocarbonyl, acyloxy or nitrile. In some embodiments, the functional group is or comprises carboxy or alkoxycarbonyl. In other embodiments, none of $R^5$, $R^6$, $R^7$ and $R^8$ of formula (IX), (IX') or (XV) is or comprises a functional group. In other embodiments, none of $R^5$, $R^6$, $R^7$ and $R^8$ of formula (IX), (IX') or (XV) is or comprises alkoxy, aryloxy, carboxy, alkoxycarbonyl, aminoalkoxycarbonyl, hydroxyalkoxycarbonyl, aminocarbonyl, alkylaminocarbonyl, dialkylaminocarbonyl, acyloxy, nitrile or halo.

In some embodiments, the vinyl monomer is a substituted or unsubstituted olefin such as ethylene or styrene, vinyl halide (e.g., vinyl chloride), vinyl ether, vinyl acetate, vinyl pyridine, vinylidene fluoride, acrylonitrile, acrylic acid, an acrylic ester, methacrylic acid, a methacrylic ester, acrylamide, methacrylamide or a combination thereof. In other embodiments, the styrene, vinyl halide, vinyl ether, vinyl acetate, vinyl pyridine, vinylidene fluoride, acrylonitrile, acrylic acid, acrylic ester, methacrylic acid, methacrylic ester, acrylamide or methacrylamide is unsubstituted. In certain embodiments, the styrene, vinyl halide, vinyl ether, vinyl acetate, vinyl pyridine, vinylidene fluoride, acrylonitrile, acrylic acid, acrylic ester, methacrylic acid, methacrylic ester, acrylamide or methacrylamide is substituted. Some non-limiting examples of substituted styrene include 2-fluorostyrene, 4-fluorostyrene, 2-methylstyrene, 3-methylstyrene, 4-methylstyrene, 2-ethylstyrene, 3-ethylstyrene, 4-ethylstyrene, 2,4-dimethylstyrene, 2,5-dimethylstyrene and combinations thereof.

In some embodiments, the vinyl monomer is a substituted or unsubstituted olefin such as ethylene or styrene, acrylic acid, an acrylic ester, methacrylic acid, a methacrylic ester, acrylamide, methacrylamide or a combination thereof. In certain embodiments, the vinyl monomer is a substituted or unsubstituted olefin such as styrene, acrylic acid, an acrylic ester, methacrylic acid, a methacrylic ester or a combination thereof. In other embodiments, the vinyl monomer is ethylene, an α-olefin or a combination thereof. Some non-limiting examples of suitable α-olefins include styrene, propylene, 1-butene, 1-hexene, 1-octene, 4-methyl-1-pentene, norbornene, 1-decene, 1,5-hexadiene and combinations thereof.

In some embodiments, the vinyl monomer is an aryl such as styrene, α-methyl styrene, or di-vinyl benzene. Additional examples include the functionalized vinyl aryls such as those disclosed by U.S. Pat. No. 7,041,761 which is incorporated herein by reference.

In some embodiments, the farnesene interpolymers disclosed herein are derived from at least one farnesene and at least one olefin monomer. An olefin refers to an unsaturated hydrocarbon-based compound with at least one carbon-carbon double bond. In certain embodiments, the olefin is a conjugated diene. Depending on the selection of catalysts, any olefin may be used in embodiments of the invention. Some non-limiting examples of suitable olefins include $C_{2-20}$ aliphatic and $C_{8-20}$ aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_{1-20}$ hydrocarbyl or cyclohydrocarbyl groups. Other non-limiting examples of suitable olefins include mixtures of such olefins as well as mixtures of such olefins with $C_{4-40}$ diolefin compounds.

Some non-limiting examples of suitable olefin or α-olefin monomers include styrene, ethylene, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_{4-40}$ dienes and combinations thereof. In certain embodiments, the olefin monomer is propylene, 1-butene, 1-pentene, 1-hexene, 1-octene or a combination thereof. In some embodiments, the $C_{4-40}$ dienes include, but not limited to, 1,3-butadiene, 1,3-pentadiene, 1,4-hexadiene, 1,5-hexadiene, 1,7-octadiene, 1,9-decadiene, isoprene, myrcene, other $C_{4-40}$ α-olefins and combinations thereof.

In some embodiments, the farnesene interpolymers disclosed herein are derived from at least one farnesene and one vinyl monomer selected from styrene, substituted styrene, $C_{4-40}$ dienes, vinyl halides, vinyl ether, vinyl acetate, vinyl pyridine, vinylidene fluoride, acrylonitrile, acrylic acid, acrylic esters, methacrylic acid, methacrylic esters, acrylamide, and methacrylamide. In certain embodiments, the farnesene interpolymers disclosed herein are derived from at least one farnesene and one methacrylic ester such as methyl methacrylate, stearyl methacrylate, lauryl methacrylate, isodecyl methacrylate, a hydroxyalkyl methacrylate (e.g., 2-hydroxyethyl methacrylate), or an aminoalkyl methacrylate (e.g., 2-aminoethyl methacrylate, 2-(dimethylamino)ethyl methacrylate, and 2-(diethylamino)ethyl methacrylate). In certain embodiments, the farnesene interpolymers disclosed herein are derived from at least one farnesene and one acrylic ester such as methyl acrylate, ethyl acrylate, butyl acrylate, a hydroxyalkyl acrylate (e.g., 2-hydroxyethyl acrylate), or an aminoalkyl acrylate (e.g., 2-aminoethyl acrylate, 2-(dimethylamino)ethyl acrylate, and 2-(diethylamino)ethyl acrylate). In certain embodiments, the farnesene interpolymers disclosed herein are derived from at least one farnesene and vinyl acetate. In certain embodiments, the farnesene interpolymers disclosed herein are derived from at least one farnesene and acrylic acid. In certain embodiments, the farnesene interpolymers disclosed herein are derived from at least one farnesene and methacrylic acid.

In some embodiments, the farnesene interpolymers disclosed herein are derived from at least one farnesene and two vinyl monomers selected from styrene, substituted styrene, $C_{4-40}$ dienes, vinyl halides, vinyl ether, vinyl acetate, vinyl pyridine, vinylidene fluoride, acrylonitrile, acrylic acid, acrylic esters, methacrylic acid, methacrylic esters, acrylamide, methacrylamide and combinations thereof. In certain embodiments, the farnesene interpolymers disclosed herein are derived from at least one farnesene and two methacrylic esters (e.g., methyl methacrylate, 2-hydroxyethyl methacrylate, stearyl methacrylate, lauryl methacrylate and isodecyl methacrylate). In certain embodiments, the farnesene interpolymers disclosed herein are derived from at least one farnesene and two acrylic esters, (e.g., methyl acrylate, ethyl acrylate and butyl acrylate). In certain embodiments, the farnesene interpolymers disclosed herein are derived from at least one farnesene, one methacrylic ester and one acrylic ester. In certain embodiments, the farnesene interpolymers disclosed herein are derived from at least one farnesene, one methacrylic ester or one acrylic ester, and acrylic acid or methacrylic acid. In certain embodiments, the farnesene interpolymers disclosed herein are derived from at least one farnesene, styrene and acrylonitrile.

In some embodiments, the farnesene interpolymers disclosed herein are derived from at least one farnesene and three vinyl monomers selected from styrene, substituted styrene, $C_{4-40}$ dienes, vinyl halides, vinyl ether, vinyl acetate, vinyl pyridine, vinylidene fluoride, acrylonitrile, acrylic acid, acrylic esters, methacrylic acid, methacrylic esters, acrylamide, methacrylamide and combinations thereof.

Some non-limiting examples of $C_{4-40}$ dienes include isoprene, butadiene and myrcene). Some non-limiting examples of substituted styrene include 2-methylstyrene, 4-methylstyrene, 2-ethylstyrene, 4-ethylstyrene, 2,4-dimethylstyrenen and 4-fluorostyrene. Some non-limiting examples of vinyl halides include vinyl chloride and vinylidene fluoride.

The farnesene interpolymers disclosed herein may derived from a farnesene and styrene. The farnesene interpolymers may further comprise at least one $C_{2-20}$ olefin, at least one $C_{4-18}$ diolefin, at least one alkenylbenzene or a combination thereof. Suitable unsaturated comonomers useful for polymerizing with farnesene include, for example, ethylenically unsaturated monomers, polyenes such as conjugated or non-conjugated dienes, alkenylbenzenes, and the like. Examples of such comonomers include ethylene, $C_{2-20}$ olefins such as propylene, isobutylene, 1-butene, 1-hexene, 1-pentene, 4-methyl-1-pentene, 1-heptene, 1-octene, 1-nonene, 1-decene, and the like. Other suitable monomers include styrene, halo- or alkyl-substituted styrenes, vinylbenzocyclobutane, 1,4-hexadiene, 1,7-octadiene, and cycloalkenes such as cyclopentene, cyclohexene and cyclooctene.

Some suitable non-conjugated diene monomers can be a straight chain, branched chain or cyclic hydrocarbon diene having from 6 to 15 carbon atoms. Some non-limiting examples of suitable non-conjugated dienes include straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). In certain embodiments, the diene is 5-ethylidene-2-norbornene (ENB) or 1,4-hexadiene (HD). In other embodiments, the farnesene interpolymers are not derived from a polyene such as dienes, trienes, tetraenes and the like.

In some embodiments, the farnesene interpolymers are interpolymers of farnesene, styrene, and a $C_{2-20}$ olefin. Some non-limiting examples of suitable olefins include ethylene, propylene, isobutylene, 1-butene, 1-pentene, 1-hexene, 4-methyl-1-pentene, and 1-octene. In some embodiments, the farnesene interpolymers disclosed herein are not derived from ethylene. In some embodiments, the farnesene interpolymers disclosed herein are not derived from one or more $C_{2-20}$ olefins.

In certain embodiments, the vinyl monomer does not comprise a terpene. In other embodiments, the vinyl monomer does not comprise a terpene selected from isoprene, dipentene, α-pinene, β-pinene, terpinolene, limonene (dipentene), terpinene, thujene, sabinene, 3-carene, camphene, cadinene, caryophyllene, myrcene, ocimene, cedrene, bisalbone, bisalbone, bisalbone, zingiberene, humulene, citronellol, linalool, geraniol, nerol, ipsenol, terpineol, D-terpineol-(4), dihydrocarveol, nerolidol, farnesol, eudesmol, citral, D-citronellal, carvone, D-pulegone, piperitone, carvenone, bisabolene, selinene, santalene, vitamin A, abietic acid or a combination thereof. In further embodiments, the vinyl monomer does not comprise an isoprene.

The farnesene interpolymers can be functionalized by incorporating at least one functional group in their polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to the farnesene interpolymers, or they may be copolymerized farnesene with an optional additional comonomer to form an interpolymer of farnesene, the functional comonomer and optionally other comonomer(s). Any means for grafting functional groups known to a skilled artisan can be used. One particularly useful functional group or comonomer is maleic anhydride. In some embodiments, the farnesene interpolymers are interpolymers of farnesene and a functional comonomer such as maleic anhydride. In certain embodiments, the farnesene interpolymers are interpolymers of farnesene, a functional comonomer such as maleic anhydride and a vinyl monomer comprising styrene, acrylic acid, an acrylic ester, methacrylic acid, a methacrylic ester or a combination thereof.

Any compound having at least one double bond and at least one functional group disclosed herein can be used as a functional comonomer to prepare the farnesene interpolymers disclosed herein. In some embodiments, the functional comonomer has formula (XVI), (XVII), (XVIII), (XIX) or (XX):

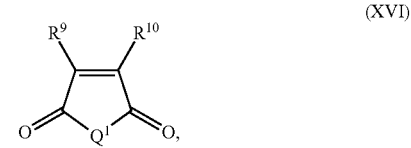

(XVI)

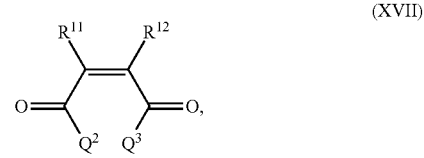

(XVII)

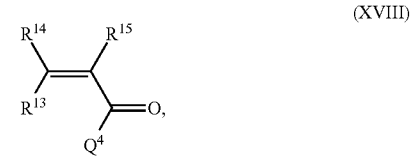

(XVIII)

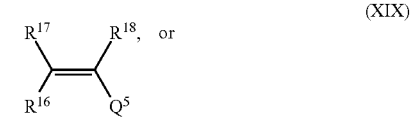

(XIX)

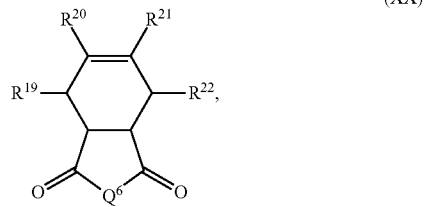

(XX)

wherein each of $Q^1$ and $Q^6$ is independently O, S, $NR^{23}$ or $N\text{-}Q^7$; each of $Q^2$, $Q^3$, $Q^4$ and $Q^5$ is independently halo, $Q^8$, $NR^{24}R^{25}$, $OR^{26}$ or $O\text{-}Q^8$; $Q^7$ and $Q^8$ respectively have the following formulae:

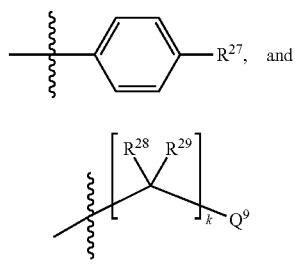

(Q⁷) and (Q⁸)

wherein k is an integer from 1 to about 10; and $Q^9$ is OH, $NH_2$, $NHR^{30}$, carboxyl, epoxy or glycidyl; and each of $R^9$ to $R^{30}$ is independently H, $C_{1-20}$ alkyl, $C_{1-20}$ alkenyl, $C_{1-20}$ alkynyl, cycloalkyl, aryl, aralkyl, alkaryl, OH, $NH_2$, carboxyl, epoxy or glycidyl, or $R^{19}$ and $R^{22}$ together form a —$(CH_2)_m$— group where m is an integer from 1 to about 6, and wherein each of the $C_{1-20}$ alkyl, $C_{1-20}$ alkenyl, $C_{1-20}$ alkynyl, cycloalkyl, aryl, aralkyl, alkaryl, epoxy, glycidyl and —$(CH_2)_m$— is optionally substituted.

In certain embodiments, the functional comonomer has formula (XVI). Some non-limiting examples of the functional comonomer having formula (XVI) include maleimide, maleic anhydride, citraconic anhydride, itaconic anhydride and combinations thereof.

In some embodiments, the functional comonomer has formula (XVII). Some non-limiting examples of the functional comonomer having formula (XVII) include mesaconic acid, maleic acid, fumaric acid, malenyl chloride, monomethyl maleate, dimethyl maleate, glycidyl maleate, dipropyl maleate, diisobutyl maleate, dihexyl maleate, dibenzyl maleate, p-chlorophenyl methyl maleate, phenylethyl maleate, dicyclopentyl meleate and combinations thereof.

In certain embodiments, the functional comonomer has formula (XVIII). Some non-limiting examples of the functional comonomer having formula (XVIII) include methacrylic acid, acrylic acid, itaconic acid, 2-hydroxyethyl methacrylate, 2-hydroxypropyl methacrylate, 3-hydroxypropyl methacrylate, 3-hydroxybutyl methacrylate, 4-hydroxybutyl methacrylate, caprolactone adduct of 2-hydroxyethyl methacrylate, ethylene oxide adduct of 2-hydroxyethyl methacrylate, propylene oxide adduct of 2-hydroxyethyl methacrylate, 2-hydroxyethyl acrylate, 2-hydroxypropyl acrylate, 3-hydroxypropyl acrylate, 3-hydroxybutyl acrylate, 4-hydroxybutyl acrylate, caprolactone adduct of 2-hydroxyethyl acrylate, ethylene oxide adduct of 2-hydroxyethyl acrylate, propylene oxide adduct of 2-hydroxyethyl acrylate, 2-hydroxyethyl crotonate, 2-hydroxypropyl crotonate, 3-hydroxypropyl crotonate, 3-hydroxybutyl crotonate, 4-hydroxybutyl crotonate, 5-hydroxypentyl crotonate, 6-hydroxyhexyl crotonate, glycidyl methacrylate, glycidyl acrylate, glycidyl ethacrylate, 3,4-epoxycyclohexylmethyl methacrylate, 3,4-epoxycyclohexylmethyl acrylate and combinations thereof.

In some embodiments, the functional comonomer has formula (XIX). Some non-limiting examples of the functional comonomer having formula (XIX) include allyl alcohol, hydroxymethyl vinyl ether, hydroxyethyl vinyl ether, hydroxypropyl vinyl ether, hydroxybutyl vinyl ether, hydroxypentyl vinyl ether, hydroxyhexyl vinyl ether, hydroxyheptyl vinyl ether, hydroxycyclohexyl vinyl ether, allylglycidyl ether, p-glycidyloxy styrene, p-glycidyloxy-α-methyl styrene, p-(3,4-epoxycyclohexylmethyloxy) styrene, p-(3,4-epoxycyclohexylmethyloxy)-α-methyl styrene, glycidyl ethylene, 3,4-epoxycyclohexylmethylethylene, glycidylvinyl ether, 3,4-epoxycyclohexylmethyl vinyl ether, 3,4-epoxycyclohexylmethyl allyl ether and combinations thereof.

In certain embodiments, the functional comonomer has formula (XX). Some non-limiting examples of the functional comonomer having formula (XX) include bicyclo[2,2,2]-oct-5-ene-2,3-dicarboxylic acid anhydride, bicyclo[2,2,1]hept-5-ene-2,3-dicarboxylic acid anhydride and combinations thereof.

In some embodiments, the farnesene interpolymers are interpolymers of farnesene, at least one vinyl monomer disclosed herein and at least one functional comonomer disclosed herein by copolymerizing the farnesene, the at least one vinyl monomer and the at least one functional comonomer in the presence of a catalyst or initiator disclosed herein. In certain embodiments, the farnesene interpolymers are interpolymers of farnesene, at least two different vinyl monomers disclosed herein and at least one functional comonomer disclosed herein by copolymerizing the farnesene, the at least two different vinyl monomers and the at least one functional comonomer in the presence of a catalyst or initiator disclosed herein. The amount of each of the farnesene, the vinyl monomer and the functional comonomer in the farnesene interpolymers is as disclosed herein.

The amount of the functional group present in the functionalized farnesene interpolymer may vary. In some embodiments, the functional group or comonomer is present in an amount of at least about 1.0 wt. %, at least about 2.5 wt. %, at least about 5 wt. %, at least about 7.5 wt. %, or at least about 10 wt. %, based on the total weight of the farnesene interpolymer. In other embodiments, the functional group is present in an amount of less than about 40 wt. %, less than about 30 wt. %, less than about 25 wt. %, less than about 20 wt. %, or less than about 15 wt. %, based on the total weight of the farnesene interpolymer.

Any catalyst that can polymerize or copolymerize farnesene can be used for making the polyfarnesenes disclosed herein. Some non-limiting examples of suitable catalysts include organolithium reagents, Ziegler-Natta catalysts, Kaminsky catalysts and other metallocene catalysts. In some embodiments, the catalyst is a Ziegler-Natta catalyst, a Kaminsky catalyst, a metallocene catalyst or a combination thereof. Other catalysts or initiators that can polymerize or copolymerize farnesene can also be used for making the polyfarnesenes disclosed herein. Some non-limiting examples of other catalysts or intiators include free radical catalysts or intiators, cationic catalysts or intiators and anionic catalysts or intiators.

In some embodiments, the catalyst further comprises a cocatalyst. In further embodiments, the cocatalyst is a hydride, alkyl or aryl of a metal or a combination thereof. In still further embodiments, the metal is aluminum, lithium, zinc, tin, cadmium, beryllium or magnesium.

In some embodiments, the catalyst is an organolithium reagent. Any organolithium reagent that can act as a catalyst to polymerize olefins can be used herein. Some non-limiting examples of suitable organolithium reagents include n-butyllithium, sec-butyllithium or tert-butyllithium. Some non-limiting examples of suitable Lewis bases include TMEDA, PMDTA or sparteine. Some organolithium reagents are disclosed in Zvi Rappoport et al., "*The Chemistry of Organolithium Compounds*," Part 1 (2004) and Vol. 2 (2006), both of which are incorporated herein by reference.

In some embodiments, the catalyst is a mixture of an organolithium reagent and a Lewis base. Any Lewis base that can deaggregate organolithium reagents, making them more soluble and more reactive, can be used herein. An aggregated organolithium reagent generally has one lithium coordinating to more than one carbon atom and one carbon coordinating to more than one lithium atom. Some non-limiting examples of suitable Lewis bases include 1,2-bis(dimethylamino)ethane (also known as tetramethylethylenediamine or TMEDA), N,N,N',N',N''-pentamethyldiethylenetriamine (PMDTA), sparteine and combinations thereof.

In some embodiments, the catalyst is a Ziegler-Natta catalyst. Generally, Ziegler-Natta catalysts can be heterogeneous or homogeneous. In some embodiments, the Ziegler-Natta catalyst used for polymerizing the polyfarnesenes disclosed herein is a heterogeneous Ziegler-Natta catalyst. Some useful Ziegler-Natta catalysts are disclosed in J. Boor, "Ziegler-Natta Catalysts and Polymerizations," Saunders College Publishing, pp. 1-687 (1979); and Malcolm P. Stevens, "*Polymer Chemistry, an Introduction*," Third Edition, Oxford University Press, pp. 236-245 (1999), both of which are incorporated herein by reference.

Heterogeneous Ziegler-Natta catalysts generally comprise (1) a transition metal compound comprising an element from groups IV to VIII; and (2) an organometallic compound comprising a metal from groups I to III of the periodic table. The transition metal compound is referred as the catalyst while the organometallic compound is regarded as the cocatalyst or activator. The transition metal compound generally comprises a metal and one or more anions and ligands. Some non-limiting examples of suitable metals include titanium, vanadium, chromium, molybdenum, zirconium, iron and cobalt. Some non-limiting examples of suitable anions or ligands include halides, oxyhalides, alkoxy, acetylacetonyl, cyclopentadienyl, and phenyl. Some other non-limiting examples of suitable anions or ligands include sulfides, oxides, oxychlorides, dialkylamino, alkoxy, alkylthio, acetylacetonate, arenes, cyclopentadienyl, indenyl, nitroso, halide (e.g., Cl, Br, I, or F), phosphate, chromate, sulfate, carboxylates, carbon monoxide or a combination thereof. Some non-limiting examples of suitable transition metal compound include $CoCl_2$, $TiCl_3$, $TiCl_4$, $TiI_4$, $Ti(OR)_4$ where R is alkyl, $VCl_3$, $VOCl_3$, $VCl_4$, $ZrCl_4$, $Ti(OC_6H_9)_4$, and $Cr(C_6H_5CN)_6$. In some embodiments, one or more electron donors such as amines, ethers and phosphines can be added to the Ziegler-Natta catalyst to increase activity.

Some other non-limiting examples of suitable transition metal compounds include $TiCl_2$, $TiBr_3$, $TiI_3$, $ZrCl_2$, $CrCl_2$, $TiCl(O-i-Pr)_3$, $CrCl_3$, $NbCl_5$, $VO(OET)Cl_2$, $VO(OET)_2Cl$, $VO(OET)_3$, $V(acac)_3$, $FeCl_2$, $FeBr_2$, $Fe(acac)_2$, $Cp_2TiCl_2$, $Cp_2Ti(alkyl)Cl$, $Cp_2Ti(C_6H_5)_2$, $Co(acac)_3$, $Ti(OPr)_4$, $Cr(acac)_3$, $VCl_3 \cdot 3THF$, $Cr(CO)_6$, $MoO_2(aeae)_2$, $MoO_2(acac)_3$, $MoO_2(alkoxy)_2$, $To(NEt_2)_4$ and combinations thereof. Some further non-limiting examples of suitable transition metal compounds include $Zr(Ot-Bu)_4$, $ZrBz_4$, $CrCl_3(THF)_3$, $Ni(dppe)Cl_2$, $Ni(COD)_2$, $Pd(OAc)_2$, $Co(dppe)Cl_2$, $Fe(acac)_3$, $TiCl_3(THF)_3$, $Me_2Si(Cp)_2ZrCl_2$, $EBTHIZrCl_2$, $Co(acac)_3$, $Nd(N(SiMe_3)_2)_3$, $TiCl_4/VOCl_3$, $Zr(OEt)_4$, $ZrCl_4(THF)_2$ and combinations thereof.

Any cocatalyst or activator that can ionize the organometallic complex to produce an active olefin polymerization catalyst can be used herein. Generally, the organometallic cocatalysts are hydrides, alkyls, or aryls of metals, such as aluminum, lithium, zinc, tin, cadmium, beryllium, and magnesium. Some non-limiting examples of suitable cocatalysts include alumoxanes (methyl alumoxane (MAO), PMAO, ethyl alumoxane, diisobutyl alumoxane), alkylaluminum compounds having formula $AlR_3$ where R is alkyl (e.g., trimethylaluminum, triethylaluminum, diethyl aluminum chloride, trimethylaluminum, triisobutylaluminum, trioctylaluminum), diethylzinc, di(i-butyl)zinc, di(n-hexyl)zinc, and ethylzinc (t-butoxide) and the like. Other suitable cocatalysts include acid salts that contain non-nucleophilic anions. These compounds generally consist of bulky ligands attached to boron or aluminum. Some non-limiting examples of such compounds include lithium tetrakis(pentafluorophenyl)borate, lithium tetrakis(pentafluorophenyl)aluminate, anilinium tetrakis(pentafluorophenyl)borate, and the like. Some non-limiting examples of suitable cocatalysts also include organoboranes, which include boron and one or more alkyl, aryl, or aralkyl groups. Other non-limiting examples of suitable cocatalysts include substituted and unsubstituted trialkyl and triarylboranes such as tris(pentafluorophenyl)borane, triphenylborane, tri-n-octylborane, and the like. These and other suitable boron-containing cocatalysts or activators are described in U.S. Pat. Nos. 5,153,157, 5,198,401, and 5,241,025, both of which are incorporated herein by reference.

In certain embodiments, the Ziegler-Natta catalyst can be impregnated on a support material. Some suitable support materials are disclosed in Malcolm P. Stevens, "*Polymer Chemistry, an Introduction*," Third Edition, Oxford University Press, p. 251 (1999), which is incorporated herein by reference.

The support material is generally a material inert or substantially inert to olefin polymerization reactions. Non-limiting examples of suitable support materials include $MgCl_2$, MgO, alumina such as activated alumina and microgel alumina, silica, magnesia, kieselguhr, fuller's earth, clays, alumina silicates, porous rare earth halides and oxylalides, and combinations thereof. The support material can have a surface area between about 5 $m^2/g$ and about 450 $m^2/g$, as determined by the BET (Brunauer-Emmet-Teller) method of measuring surface area, as described by S. Brunauer, P. H. Emmett, and E. Teller, Journal of the American Chemical Society, 60, 309 (1938), which is incorporated herein by reference. In some embodiments, the surface area of the support material is between about 10 $m^2/g$ and about 350 $m^2/g$. In further embodiments, the surface area of the support material is between about 25 $m^2/g$ and about 300 $m^2/g$.

The support material can have an average particle size ranging from about 20 to about 300 microns, from about 20 to about 250 microns, from about 20 to about 200 microns, from about 20 to about 150 microns, from about 20 to about 120 microns, from about 30 to about 100 microns, or from about 30 to about 90 microns. The compacted or tamped bulk density of the support material can vary between about 0.6 and about 1.6 g/cc, between about 0.7 and about 1.5 g/cc, between about 0.8 and about 1.4 g/cc, or between about 0.9 and about 1.3 g/cc.

In certain embodiments, the catalyst used herein is or comprises a Kaminsky catalyst, also known as homogeneous Ziegler-Natta catalyst. The Kaminsky catalyst can be used to produce polyolefins such as the polyfarnesenes disclosed herein with unique structures and physical properties. Some Kaminsky catalysts or homogeneous Ziegler-Natta catalysts are disclosed in Malcolm P. Stevens, "*Polymer Chemistry, an Introduction*," Third Edition, Oxford University Press, pp.

245-251 (1999); and John Scheirs and Walter Kaminsky, "*Metallocene-Based Polyolefins: Preparation, Properties, and Technology*," Volume 1, Wiley (2000), both of which are incorporated herein by reference.

In some embodiments, the Kaminsky catalyst suitable for making the polyfarnesene disclosed herein comprises a transition-metal atom sandwiched between ferrocene ring structures. In other embodiments, the Kaminsky catalyst can be represented by the formula $Cp_2MX_2$, where M is a transition metal (e.g., Zr, Ti or Hf); X is halogen (e.g., Cl), alkyl or a combination thereof; and Cp is a ferrocenyl group. In further embodiments, the Kaminsky catalyst has formula (XVI):

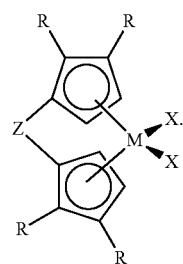

(XVI)

wherein Z is an optional divalent bridging group, usually $C(CH_3)_2$, $Si(CH_3)_2$, or $CH_2CH_2$; R is H or alkyl; M is a transition metal (e.g., Zr, Ti or Hf); X is halogen (e.g., Cl), alkyl or a combination thereof. Some non-limiting examples of Kaminsky catalysts have formulae (XVII) to (XIX):

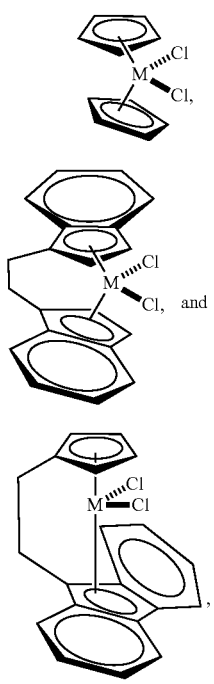

(XVII)

(XVIII)

(XIX)

wherein M is Zr, Hf or Ti.

In some embodiments, a cocatalyst is used with the Kaminsky catalyst. The cocatalyst may be any of the cocatalyst disclosed herein. In certain embodiments, the cocatalyst is methylaluminoxane (MAO). MAO is an oligomeric compound having a general formula $(CH_3AlO)_n$, where n is from 1 to 10. MAO may play several roles: it alkylates the metallocene precursor by replacing chlorine atoms with methyl groups; it produces the catalytic active ion pair $Cp_2MCH_3^+$/$MAO^-$, where the cationic moiety is considered responsible for polymerization and $MAO^-$ acts as weakly coordinating anion. Some non-limiting examples of MAO include formulae (XX) to (XXI):

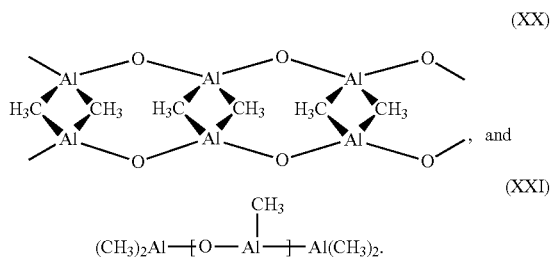

(XX)

, and (XXI)

$(CH_3)_2Al$—$[O$—$Al]$—$Al(CH_3)_2$.

In certain embodiments, the catalyst for making the farnesene interpolymer disclosed herein is or comprises a metallocene catalyst. Some metallocene catalysts are disclosed in Tae Oan Ahn et al., "*Modification of a Ziegler-Natta catalyst with a metallocene catalyst and its olefin polymerization behavior*," Polymer Engineering and Science, 39(7), p. 1257 (1999); and John Scheirs and Walter Kaminsky, "*Metallocene-Based Polyolefins: Preparation, Properties, and Technology*," Volume 1, Wiley (2000), both of which are incorporated herein by reference.

In other embodiments, the metallocene catalyst comprises complexes with a transition metal centre comprising a transition metal, such as Ni and Pd, and bulky, neutral ligands comprising alpha-diimine or diketimine. In further embodiments, the metallocene catalyst has formula (XXII):

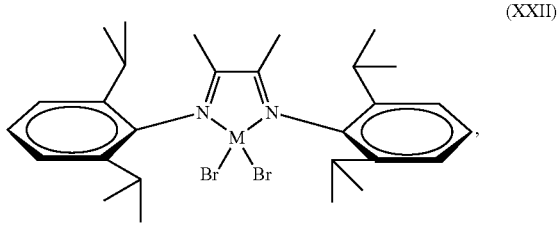

(XXII)

wherein M is Ni or Pd.

In some embodiments, the catalyst used herein is or comprises a metallocene catalyst bearing mono-anionic bidentate ligands. A non-limiting example of such a metallocene catalyst has structure (XXIII):

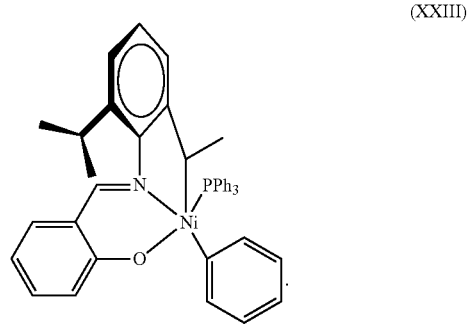

(XXIII)

In other embodiments, the catalyst used herein is or comprises a metallocene catalyst comprising iron and a pyridyl is incorporated between two imine groups giving a tridentate ligand. A non-limiting example of such a metallocene catalyst has structure (XXIV):

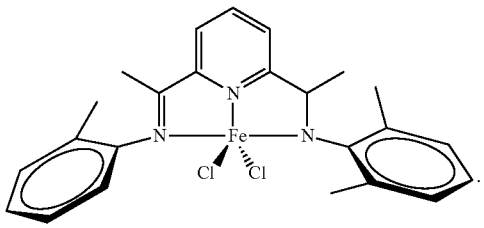

(XXIV)

In some embodiments, the catalyst used herein is or comprises a metallocene catalyst comprising a salicylimine catalyst system based on zirconium. A non-limiting example of such a metallocene catalyst has structure (XXV):

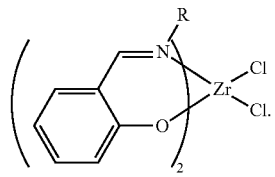

(XXV)

In some embodiments, the catalyst or intiator is a free radical catalyst or intiator. Any free radical intiator that can act as an intiator to polymerize olefins can be used herein. Some free radical intiators are disclosed in Denisov et al., "Handbook of Free Radical Initiators," Wiley-Interscience, pp. 1-904 (2003), which is incorporated herein by reference. Some non-limiting examples of suitable free radical intiators include hydrogen peroxide, hydroperoxides, dialkyl peroxides, diacyl peroxides, peroxy esters, peroxyketones, azo-compounds, organic polyoxides, photoinitiators, persulfates and combinations thereof.

Any azo-compound that can act as an intiator to polymerize olefins can be used herein. Some non-limiting examples of suitable azo-compounds include azobisisobutyronitrile, 1,1'-azobis(cyclohexanecarbonitrile), 2,2-azobis(2,4-dimethylvaleronitrile), 2,2'-azobis(2-methylbutyronitrile), 2,2'-azobis(2-amidinopropane)dihydrochloride, 4,4'-azobis(4-cyanovaleric acid) and combinations thereof. Some non-limiting examples of commercial available azo-compounds include VAZO® 52, 56, 64, 67, 68 and 88, all of which can be obtained from DuPont, Wilmington, Del.

Any hydroperoxide that can act as an intiator to polymerize olefins can be used herein. Some non-limiting examples of suitable hydroperoxides include cumene hydroperoxide, t-butyl hydrogen peroxide, t-amyl hydrogen peroxide and combinations thereof.

Any dialkyl peroxide that can act as an intiator to polymerize olefins can be used herein. Some non-limiting examples of suitable dialkyl peroxides include dicumyl peroxide, dilauryl peroxide, di-tert-butyl peroxide, diisopropyl peroxide, di(2-t-butyl peroxyisopropyl)benzene, 3,3,5-trimethyl 1,1-di(tert-butyl peroxy)cylohexane, 2,5-dimethyl-2,5-di(t-butylperoxy)hexane and combinations thereof.

Any diacyl peroxide that can act as an intiator to polymerize olefins can be used herein. Some non-limiting examples of suitable diacyl peroxides include benzoyl peroxide, acetyl peroxide, lauroyl peroxide and combinations thereof.

Any peroxy ester that can act as an intiator to polymerize olefins can be used herein. Some non-limiting examples of suitable peroxy esters include tert-butyl peroxyacetate, ethyl peroxybenzoate and combinations thereof.

Any organic polyoxide that can act as an intiator to polymerize olefins can be used herein. Some non-limiting examples of suitable organic polyoxides include dialkyl trioxides, hydrotrioxides, tetroxides and combinations thereof.

Any photoinitiator that can act as an intiator to polymerize olefins can be used herein. Some non-limiting examples of suitable photoinitiators include acetophenones, benzil and benzoin compounds, benzophenones, thioxanthones, quinone compounds, cationic photoinitiators and combinations thereof.

Some non-limiting examples of suitable acetophenones include 2-benzyl-2-(dimethylamino)-4'-morpholinobutyrophenone, 2-hydroxy-2-methylpropiophenone, 4'-ethoxyacetophenone, 4'-tert-butyl-2',6'-dimethylacetophenone, 2,2-diethoxyacetophenone, 2,2-dimethoxy-2-phenylacetophenone, 4'-hydroxyacetophenone, 4'-phenoxyacetophenone and combinations thereof.

Some non-limiting examples of suitable benzil and benzoin compounds include benzil, 4,4'-dimethylbenzil, benzoin, benzoin ethyl ether, benzoin methyl ether, 4,4'-dimethoxybenzoin and combinations thereof.

Some non-limiting examples of suitable benzophenones include 4,4'-bis(dimethylamino)benzophenone, 4,4'-bis(diethylamino)benzophenone, benzophenone, benzophenone-3,3',4,4'-tetracarboxylic dianhydride, 4-benzoylbiphenyl, 4,4'-bis[2-(1-propenyl)phenoxy]benzophenone, 4-(diethylamino)benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate and combinations thereof.

Some non-limiting examples of suitable thioxanthones include thioxanthen-9-one, 1-chloro-4-propoxy-9h-thioxanthen-9-one, 2-chlorothioxanthen-9-one, 2,4-diethyl-9H-thioxanthen-9-one, isopropyl-9H-thioxanthen-9-one, 10-methylphenothiazine and combinations thereof.

Some non-limiting examples of suitable quinone compounds include 9,10-phenanthrenequinone, 2-tert-butylanthraquinone, camphorquinone, anthraquinone-2-sulfonic acid, sodium salt and combinations thereof.

Some non-limiting examples of suitable persulfates (e.g., peroxomonosulfates and peroxodisulfates) include ammonium persulfates (ammonium peroxomonosulfate or peroxodisulfate), potassium persulfates (potassium peroxomonosulfate or peroxodisulfate), sodium persulfates (sodium peroxomonosulfate or peroxodisulfate), and combinations thereof.

Some non-limiting examples of suitable cationic photoinitiators include bis(4-tert-butylphenyl)iodonium triflate, 4-bromophenyl)diphenylsulfonium triflate, (4-tert-butylphenyl)diphenylsulfonium triflate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-fluorophenyl)diphenylsulfonium triflate, N-hydroxynaphthalimide triflate, (4-iodophenyl)diphenylsulfonium triflate, (4-methoxyphenyl)diphenylsulfonium triflate, (4-methylphenyl)diphenylsulfonium, 1-naphthyl diphenylsulfonium triflate, (4-phenoxyphenyl)diphenylsulfonium triflate, (4-phenylthiophenyl)diphenylsulfonium triflate, triphenylsulfonium perfluoro-1-butanesulfonate, triphenylsulfonium triflate, tris(4-tert-butylphenyl)sulfonium triflate and combinations thereof.

In some embodiments, the free radicals are generated by chemical processes such as thermal decomposition, photolysis, and redox reactions, all of which involve one or more of the free radical initiators disclosed herein. In certain embodiments, the free radicals are generated by a process, such as ionizing radiation (e.g., α-, β-, γ-, or x-rays), electrolysis, and sonication, all of which do not involve any free radical initiator. In other embodiments, the free radicals are generated by thermal decomposition, photolysis, redox reactions ionizing radiation, electrolysis, sonication or a combination thereof.

In certain embodiments, the free radicals are generated by thermal decomposition where the initiator (e.g., hydrogen peroxide, hydroperoxides, dialkyl peroxides, diacyl peroxides, peroxy esters, peroxyketones, azo-compounds and organic polyoxides) is heated until one or more bonds (e.g., O—O or O—N bonds) are broken to produce one or more radicals. In some embodiments, the temperature of the thermal decomposition is above about 20° C., above about 30° C., above about 40° C., above about 50° C., above about 60° C., above about 70° C., above about 80° C., above about 90° C. or above about 100° C.

In some embodiments, the free radicals are generated by photolysis where the initiator (e.g., azo-compounds) is irradiated with a radiation until one or more bonds (e.g., O—N bonds) are broken to produce one or more radicals. In certain embodiments, the radiation is visible light, ultraviolet light, x-ray, gamma ray or a combination thereof. In some embodiments, the temperature of the photolysis is below about 50° C., below about 40° C., below about 30° C., below about 20° C., below about 10° C. or below about 0° C.

In certain embodiments, the free radicals are generated by redox reactions where an oxidative free radical initiator (e.g., hydrogen peroxide, hydroperoxides, dialkyl peroxides, and diacyl peroxides) is reduced by an organic reductant (e.g., diethyl aniline, hydrazine, oxalic acid, formic acid, ascorbic acid or a combination thereof) or inorganic reductant (e.g., $Fe^{2+}$, $Cr^{2+}$, $V^{2+}$, $Ti^{3+}$, $Co^{2+}$, $Cu^+$ or a combination thereof) or a combination thereof to produce one or more radicals. In some embodiments, the temperature of the redox reaction is below about 50° C., below about 40° C., below about 30° C., below about 20° C., below about 10° C. or below about 0° C. The combination of an oxidative free radical initiator and a reductant is a redox initiator. The free radicals can be generated from the redox initiator at room temperature or at an elevated temperature.

In some embodiments, the catalyst or intiator is a cationic catalyst or intiator. Some non-limiting examples of suitable cationic intiators include strong protic acids (e.g., phosphoric acid, sulfuric acid, hydrofluric acid, triflic acid or a combination thereof), Lewis acids (e.g., $SnCl_4$, $AlCl_3$, $BF_3$, and $TiCl_4$ or a combination thereof), stable carbenium ions (trityl cation, tropylium cation or a combination thereof), In some embodiments, the catalyst or intiator is an anionic catalyst or intiator. Some non-limiting examples of suitable anionic intiators include metal amides, metal alkoxides, metal hydroxides, metal cyanides, phosphines, amines and organometallic compounds (Grignard reagents and the organolithium reagents disclosed herein). In certain embodiments, the metal is Cs, K, Na, Li, Mg, Ca or a combination thereof).

The concentration of the catalyst or intiator may be in an amount that can effect the polymerization of farnesene, one or more vinyl monomers or a combination thereof. In some embodiments, the concentration of the catalyst or intiator is at least about 0.01%, about 0.1%, about 0.25%, about 0.5%, about 0.75%, about 1%, about 2%, about 3%, about 4%, about 5%, about 6%, about 7%, about 8%, about 9%, about 10%, about 15% or about 20% by weight (or by volume), based on the total weight (or volume) of the composition or emulsion. In certain embodiments, the concentration of the catalyst or intiator is at most about 0.01%, about 0.1%, about 0.25%, about 0.5%, about 0.75%, about 1%, about 2%, about 3%, about 4%, about 5%, about 6%, about 7%, about 8%, about 9%, about 10%, about 15% or about 20% by weight (or by volume), based on the total weight (or volume) of the composition or emulsion.

In some embodiments, the farnesene homopolymer disclosed herein is prepared by a process comprising the steps of:
(a) making a farnesene from a simple sugar or non-fermentable carbon source by using a microorganism; and
(b) polymerizing the farnesene in the presence of a catalyst disclosed herein.

In certain embodiments, the farnesene interpolymer disclosed herein is prepared by a process comprising the steps of:
(a) making a farnesene from a simple sugar or non-fermentable carbon source by using a microorganism; and
(b) copolymerizing the farnesene and at least one vinyl monomer in the presence of a catalyst disclosed herein.

The polymerizing step (b) or the copolymerizing (b) of the process disclosed herein can be anionic polymerization, cationic polymerization, free radical polymerization, metal-catalyzed insertion polymerization and emulsion polymerization.

The anionic polymerization can be carried out in the presence of an anionic catalyst disclosed herein. Anionic polymerization is described in Maurice Morton, "*Anionic Polymerization: Principles and Practice*," Academic Press, pp. 1-244 (1983); and Henry Hsieh et al., "Anionic Polymerization: *Principles and Practical Applications*," CRC Press, pp. 1-744 (1996), both of which are incorporated herein by reference.

The cationic polymerization can be carried out in the presence of a cationic catalyst disclosed herein. Cationic polymerization is described in Eric J. Goethals (Editor), "*Cationic Polymerization and Related Processes*," Academic Press, pp. 1-424 (1984); and Rudolf Faust (Editor), "*Cationic Polymerization: Fundamentals and Applications*," American Chemical Society, pp. 1-210 (1997), both of which are incorporated herein by reference.

The free radical polymerization can be carried out in the presence of a free radical initiator disclosed herein. Free radical polymerization is described in G. Moad et al., "*The Chemistry of Free Radical Polymerization*," Pergamon Press, pp. 1-408 (1996), which is incorporated herein by reference.

In some embodiments, the free radical polymerization is carried out by copolymerizing a polymerizable mixture or composition in the presence of at least one free radical initiator to form a farnesene interpolymer, wherein the polymerizable mixture or composition comprises a farnesene and at least one vinyl monomer, and wherein the at least one free radical initiator is hydrogen peroxide, a hydroperoxide, a dialkyl peroxide, a diacyl peroxide, a peroxy ester, a peroxyketone, an azo-compound, an organic polyoxide, a photoinitiator, a persulfate or a combination thereof. In certain embodiments, the farnesene is in an amount greater than 20 wt. %, based on the total weight of the polymerizable mixture. In some embodiments, the farnesene is α-farnesene, β-farnesene or a combination thereof.

In certain embodiments, the at least one vinyl monomer is acrylic acid, an acrylic ester, methacrylic acid, a methacrylic ester, vinyl ether, vinyl acetate, acrylonitrile, acrylamide, methacrylamide or a combination thereof. In some embodiments, the at least one vinyl monomer is styrene, substituted styrene, a C4-40 diene, a vinyl halide, vinyl ether, vinyl acetate, vinyl pyridine, vinylidene fluoride, acrylonitrile, acrylic acid, an acrylic ester, methacrylic acid, a methacrylic ester, acrylamide, methacrylamide or a combination thereof. In some embodiments, the at least one vinyl monomer comprises a methacrylic ester. In certain embodiments, the at least one vinyl monomer comprises styrene. In some embodiments, the at least one vinyl monomer comprises butadiene. In certain embodiments, the at least one vinyl monomer comprises styrene and butadiene The metal-catalyzed insertion polymerization can be carried out in the presence of a Ziegler-Natta catalyst, Kaminsky catalyst or any other metallocene catalyst disclosed herein.

The emulsion polymerization can be carried out in an emulsion in the presence of a free radical initiator disclosed herein. Emulsion polymerization is described in Chorng-Shyan Chern., "Principles and Applications of Emulsion Polymerization," John Wiley & Sons Inc., pp. 1-252 (2008); and Peter A. Lovell (Editor), "Emulsion Polymerization and Emulsion Polymers," John Wiley & Sons Inc., pp. 1-826 (1997), both of which are incorporated herein by reference.

Emulsion polymerization is generally a type of radical polymerization that occurs in an emulsion comprising an emulsion polymerization composition. In some embodiments, the emulsion polymerization composition comprising a) a polymerizable mixture comprising a farnesene and at least one vinyl monomer disclosed herein; b) at least one emulsifier; c) at least one free radical initiator such as those disclosed herein; and d) water.

In some embodiments, the emulsion polymerization is an oil-in-water emulsion, in which droplets of monomers (the oil) are emulsified (with emulsifiers) in a continuous phase of water. In certain embodiments, the free radical initiator is water-soluble and the reaction medium is water.

In aqueous emulsion polymerization, water generally forms the continuous medium in which polymerization takes place. The water may or may not be mixed with one or more additional solvents that are miscible with water. In some embodiments, the continuous medium comprises water in an amount of at least about 30 wt. %, at least about 40 wt. %, at least about 50 wt. %, at least about 60 wt. %, at least about 70 wt. %, at least about 80 wt. %, at least about 90 wt. % or at least about 95 wt. %, based on the total weight of the continuous medium.

Some non-limiting examples of suitable emulsifiers include anionic surfactants, cationic surfactants, non-ionic surfactants, zwitterionic surfactants, and combinations thereof. In some embodiments, one or more anionic surfactants, one or more non-ionic surfactants or a combination thereof are used.

Any anionic surfactant that can emulsify an oil in water can be used herein. In some embodiments, the anionic surfactant is or comprises an alkyl sulfate, an alkyl sulfonate, an alkylaryl sulfate, an alkylaryl sulfonate (e.g., alkyl-naphthalene sulfonates and alkylbenzene sulfonates) or a combination thereof.

Any non-ionic surfactant that can emulsify an oil in water can be used herein. In some embodiments, the non-ionic surfactant is or comprises an alkyl polyoxyalkylene, an aryl polyoxyalkylene, a polyoxyalkylene block copolymers, a polyethylene oxide, a polypropylene oxide, a block copolymer of ethylene oxide and propylene oxide or a combination thereof. In other embodiments, the non-ionic surfactant is or comprises a polyether polyol, a polyoxyethylene $C_{8-20}$-alkyl ether, a polyoxyethylene $C_{8-20}$-alkylaryl ether (e.g., polyoxyethylene $C_{8-20}$-alkylphenyl ether), a polyoxyethylene $C_{8-20}$-alkyl amine, a polyoxyethylene $C_{8-20}$-alkenyl ether, a polyoxyethylene $C_{8-20}$-alkenyl amine, a polyethylene glycol alkyl ether or a combination thereof. Some non-limiting examples of suitable polyoxyethylene $C_{8-20}$-alkyl ethers include polyoxyethylene lauryl ether, polyoxyethylene cetyl ether, polyoxyethylene stearyl ether, polyoxyethylene branched decyl ether, polyoxyethylene tridecyl ether or a combination thereof. Some non-limiting examples of suitable polyoxyethylene $C_{8-20}$-alkylaryl ethers include polyoxyethylene dodecylphenyl ether, polyoxyethylene nonylphenyl ether, polyoxyethylene octylphenyl ether or a combination thereof. One non-limiting example of suitable polyoxyethylene $C_{8-20}$-alkenyl ether is polyoxyethylene oleic ether. Some non-limiting examples of suitable polyoxyethylene $C_{8-20}$-alkyl amines include polyoxyethylene lauryl amine, polyoxyethylene stearyl amine, polyoxyethylene tallow amine or a combination thereof. One non-limiting example of suitable polyoxyethylene $C_{8-20}$-alkenyl amine is polyoxyethylene oleyl amine. In other embodiments, the non-ionic surfactant is a polyether polyol, polyoxyethylene nonylphenyl ether, polyoxyethylene dodecylphenyl ether or a combination thereof. In certain embodiments, the non-ionic surfactant contains a polyoxyethylene hydrophilic tail.

The emulsion polymerization may occur in a reaction vessel containing an emulsion polymerization composition. In some embodiments, the emulsion polymerization composition comprising a polymerizable mixture comprising a farnesene and at least one vinyl monomer, at least one emulsifier, at least one free radical initiator and water.

The method for the emulsion polymerization of a farnesene with at least one vinyl monomer can be any known method suitable for the emulsion polymerization of olefins and/or vinyl monomers. In some embodiments, the method comprises copolymerizing the farnesene with the at least one vinyl monomer in an aqueous medium in the presence of at least one free radical initiator and at least one emulsifier.

The emulsion polymerization of the farnesene with the at least one vinyl monomer can be used to prepare a polymer emulsion. In some embodiments, the polymer emulsion can be prepared by a method comprising: (a) providing an aqueous emulsion comprising a polymerizable mixture comprising a farnesene and at least one vinyl monomer; at least one emulsifier; at least one initiator; and water; and (b) emulsion polymerizing at least a portion of the polymerizable mixture to form the polymer emulsion. In some embodiments, the method further comprises a step of drying the polymer emulsion to form an emulsion polymer. The polymer emulsion can be dried by any known drying techniques such as direct drying, indirect drying, contact drying, drum drying, vacuum drying, spraying drying, dielectric drying, freeze drying, supercritical drying, natural air drying, refractance window drying, infrared zone drying or a combination thereof. The dried emulsion polymer can be in any convenient form (e.g., powder, pellet or film) suitable for handling.

In certain embodiments, the farnesene is α-farnesene or β-farnesene or a combination thereof. In some embodiments, the farnesene is in an amount from about 10 wt. % to about 60 wt. %, from about 20 wt. % to about 50 wt. %, or from about 30 wt. % to about 40 wt. %, based on the total weight of the polymerizable mixture.

Any vinyl monomer disclosed herein can be used for the emulsion polymerization composition. In certain embodiments, the at least one vinyl monomer is styrene, substituted styrene, a C4-40 diene, a vinyl halide, vinyl ether, vinyl acetate, vinyl pyridine, vinylidene fluoride, acrylonitrile, acrylic acid, an acrylic ester, methacrylic acid, a methacrylic ester, acrylamide, methacrylamide or a combination thereof. In some embodiments, the at least one vinyl monomer is acrylic acid, an acrylic ester, methacrylic acid, a methacrylic ester, vinyl ether, vinyl acetate, acrylonitrile, acrylamide, methacrylamide or a combination thereof. In certain embodiments, the at least one vinyl monomer comprises methacrylic acid or acrylic acid and a methacrylic ester. In other embodiments, the methacrylic acid or acrylic acid is in an amount from about 0.1 wt. % to about 5 wt. %, from about 0.25 wt. % to about 4 wt. %, from about 0.5 wt. % to about 3 wt. %, or from about 0.75 wt. % to about 2 wt. %, based on the total weight of the polymerizable mixture. In other embodiments, the methacrylic acid or acrylic acid is in an amount from about 5 wt. % to about 50 wt. %, from about 10 wt. % to about 40 wt. %, from about 15 wt. % to about 35 wt. %, or from about 20 wt. % to about 30 wt. %, based on the total weight of the polymerizable mixture. In further embodiments, the methacrylic ester is methyl methacrylate, ethyl methacrylate, propyl methacrylate, butyl methacrylate or a combination thereof. In some embodiments, the at least one vinyl monomer further comprises an acrylic ester. In further embodiments, the methacrylic ester is methyl acrylate, ethyl acrylate, propyl acrylate, butyl acrylate or a combination thereof. In certain embodiments, the at least one vinyl monomer comprises acrylic acid, an acrylic ester, methacrylic acid, a methacrylic ester, styrene or a combination thereof. In some embodiments, the at least one vinyl monomer comprises an acrylic ester, methacrylic acid, a methacrylic ester, styrene or a combination thereof.

The ingredients of the emulsion polymerization composition may be brought together in any manner. In some embodiments, two or more of the ingredients of the emulsion polymerization composition, or portions thereof, may be mixed together before the composition of those ingredients or portions thereof is placed into the reaction vessel. In certain embodiments, any ingredients or portions thereof that are not mixed together outside of the reaction vessel may be added simultaneously or sequentially to the reaction vessel. In further embodiments, any combination of the above methods of providing the ingredients of the emulsion polymerization composition may be used.

After an emulsion polymerization composition is present in the reaction vessel, conditions are provided in which the emulsion polymerization composition undergoes emulsion polymerization. In certain embodiments, conditions will be provided as needed for the free radical initiator to form one or more free radicals. In some embodiments, depending on the free radical initiator used, the reaction mixture may be heated, or a reductant may be added, or the emulsion polymerization composition may be exposed to radiation, or a combination thereof. In certain embodiments, other conditions that allow emulsion polymerization to succeed (such as, for example, emulsification of monomer, concentration of monomer, concentration of free radical initiator, etc.) are also provided. Such conditions can be found in Chorng-Shyan Chern., "*Principles and Applications of Emulsion Polymerization*," John Wiley & Sons Inc., pp. 1-252 (2008); and Peter A. Lovell (Editor), "*Emulsion Polymerization and Emulsion Polymers*," John Wiley & Sons Inc., pp. 1-826 (1997), both of which are incorporated herein by reference.

In some embodiments, the conditions in which the emulsion polymerization composition undergoes emulsion polymerization are established simultaneously with the introduction of the emulsion polymerization composition into the reaction vessel. In other embodiments, the ingredients of the emulsion polymerization composition are not added simultaneously and the conditions in which the emulsion polymerization composition undergoes emulsion polymerization are established simultaneously with the introduction of the final charge of the emulsion polymerization composition into the reaction vessel.

In certain embodiments, the conditions in which the emulsion polymerization composition undergoes emulsion polymerization are established after the introduction of the emulsion polymerization composition into the reaction vessel. In some embodiments, all of the ingredients of the emulsion polymerization composition may be provided in the reaction vessel, and then the emulsion polymerization composition may be heated to a temperature at which at least a portion of the at least one free radical initiator forms one or more free radicals.

In some embodiments, after the conditions in which the emulsion polymerization composition undergoes emulsion polymerization are established, additional vinyl monomer(s) may be added, additional water may be added, additional emulsifier(s) may be added, additional free radical initiator(s) may be added, or a combination thereof may be added.

Emulsion polymerization processes may be characterized as single-stage or multi-stage. In one stage, a first composition of one or more vinyl monomers are polymerized until polymerization is complete. If a second composition of one or more vinyl monomers, which may be different from or same as the first composition, is then polymerized in the presence of the polymer formed in the first stage, the polymerization of the second composition is known as the second stage. Further subsequent stages may also be performed. In some embodiments, the emulsion polymerization process is a single-stage process.

In each stage of an emulsion polymerization process, the one or more vinyl monomers are added either as a shot addition or as a gradual addition or as a combination thereof. In a shot addition, the one or more vinyl monomers are added relatively quickly (compared to the duration of the polymerization time), and then addition of the one or more vinyl monomers is halted for a time. In a particular stage of an emulsion polymerization process involving shot addition of monomer, a single shot addition may be used to add all the one or more vinyl monomers for that stage, or multiple shot additions may be used.

In some embodiments, a free radical inhibitor, such as a nitroso or a nitroxide compound, is introduced into the reaction vessel prior to the start of polymerization. The presence of such an inhibitor may reduce or eliminate the generation of secondary particles and thus aids in careful control of the particle size of the emulsion polymer. In some embodiments, no free radical inhibitor, such as nitroso or nitroxide compound, is introduced into the reaction vessel prior to the start of polymerization.

In certain embodiments, the one or more vinyl monomers used do not include any vinyl monomer with any acid group (e.g., a carboxylic acid group). In some embodiments, the one or more vinyl monomers used do not include any vinyl monomer with any ionic group (e.g., an acid group). In some embodiments, the emulsion polymer produced by the process disclosed herein has no ionic group. An ionic group refers to a chemical group that is mostly or completely in ionized form when the emulsion polymer is at a pH ranging from about 2 to about 12.

In some embodiments, at least one of the vinyl monomers used has an acid group or an ionic group. In certain embodiments, the amount of the vinyl monomer with an acid group (e.g., acrylic acid or methacrylic acid) or ionic group is less than about 5 wt. %, less than about 4 wt. %, less than about 3 wt. %, less than about 2 wt. %, less than about 1.0 wt. %, less than about 0.5 wt. %, less than about 0.25 wt. %, or less than about 0.1 wt. %, based on the total weight of the polymerizable mixture. In some embodiments, the amount of the vinyl monomer with an acid group or ionic group is more than about 50 wt. %, more than about 40 wt. %, more than about 30 wt. %, more than about 20 wt. %, more than about 10 wt. %, more than about 5 wt. %, or more than about 1 wt. %, based on the total weight of the polymerizable mixture. In certain embodiments, the amount of the vinyl monomer with an acid group or ionic group is from about 0.1 wt. % to about 60 wt. %, from about 1 wt. % to about 50 wt. %, from about 5 wt. % to about 45 wt. %, from about 10 wt. % to about 40 wt. %, from about 15 wt. % to about 35 wt. %, from about 0.1 wt. % to about 20 wt. %, from about 0.1 wt. % to about 10 wt. %, or from about 0.1 wt. % to about 5 wt. %, based on the total weight of the polymerizable mixture.

The concentration of the emulsifier may be in any amount that can effectively emulsify the polymerizable mixture in water. In some embodiments, the concentration of the emulsifier is at least about 0.01%, about 0.1%, about 0.25%, about 0.5%, about 0.75%, about 1%, about 2%, about 3%, about 4%, about 5%, about 6%, about 7%, about 8%, about 9%, about 10%, about 15% or about 20% by weight (or by volume), based on the total weight (or volume) of the emulsion polymerization composition. In certain embodiments, the concentration of the surfactant is at most about 0.01%, about 0.1%, about 0.25%, about 0.5%, about 0.75%, about 1%, about 2%, about 3%, about 4%, about 5%, about 6%, about 7%, about 8%, about 9%, about 10%, about 15% or about 20% by weight (or by volume), based on the total weight (or volume) of the emulsion polymerization composition.

In some embodiments, the Mw of the emulsion polymers disclosed herein is greater than about 5,000, greater than about 10,000, greater than about 50,000, greater than about 100,000, greater than about 200,000, greater than about 500,000, greater than about 1,000,000, greater than about 1,000,000, greater than about 1,000,000, greater than about 2,000,000, greater than about 3,000,000 or greater than about 4,000,000.

In certain embodiments, the emulsion polymers disclosed herein has at least a glass transition temperature ($T_g$) from about −70° C. to about 40° C., from about −60° C. to about 30° C. or from about −50° C. to about 20° C., as measured according to ASTM D7426-08. In some embodiments, the $T_g$ is from about −60° C. to about 0° C., from about −50° C. to about 0° C., from about −40° C. to about 0° C., from about −30° C. to about 0° C., from about −60° C. to about 10° C. or from about −50° C. to about 20° C. In certain embodiments, the $T_g$ is from about −30° C. to about 30° C., from about −20° C. to about 30° C., from about −10° C. to about 20° C., from about −5° C. to about 25° C., from about 0° C. to about 20° C., or from about 5° C. to about 15° C.

In certain embodiments, the emulsion polymer disclosed herein is in the form of polymer particles dispersed in an aqueous continuous medium to form a polymer emulsion. In some embodiments, the polymer particles have a mean diameter greater than about 10 nm, greater than about 20 nm, greater than about 25 nm, greater than about 50 nm, greater than about 75 nm, or greater than about 100 nm. In some embodiments, the polymer particles have a mean diameter less than about 2000 nm, less than about 1000 nm, less than about 500 nm, less than about 250 nm, or less than about 100 nm.

In some embodiments, the polyfarnesene disclosed herein is prepared by polymerizing a β-farnesene in the presence of a catalyst, wherein the amount of the cis-1,4-microstructure in the polyfarnesene is at most about 80 wt. %, at most about 75 wt. %, at most about 70 wt. %, at most about 65 wt. %, or at most about 60 wt. %, based on the total weight of the polyfarnesene. In some embodiments, the β-farnesene is copolymerized with a vinyl monomer to form a farnesene copolymer. In other embodiments, the vinyl monomer is styrene. In further embodiments, the farnesene copolymer is a block copolymer.

In certain embodiments, the polyfarnesene disclosed herein is prepared by polymerizing an α-farnesene in the presence of a catalyst wherein the amount of the cis-1,4-microstructure in the polyfarnesene is from about 1 wt. % to about 99 wt. %, from about 10 wt. % to about 99 wt. %, from about 20 wt. % to about 99 wt. %, from about 30 wt. % to about 99 wt. %, from about 40 wt. % to about 99 wt. %, from about 50 wt. % to about 99 wt. %, from about 1 wt. % to about 99 wt. %, from about 1 wt. % to about 90 wt. %, from about 1 wt. % to about 80 wt. %, from about 1 wt. % to about 70 wt. %, or from about 1 wt. % to about 60 wt. %, based on the total weight of the polyfarnesene. In some embodiments, the α-farnesene is copolymerized with a vinyl monomer to form a farnesene copolymer. In other embodiments, the vinyl monomer is styrene. In further embodiments, the farnesene copolymer is a block copolymer.

In some embodiments, the polyfarnesene disclosed herein can be hydrogenated partially or completely by any hydrogenating agent known to a skilled artisan. For example, a saturated polyfarnesene can be prepared by (a) polymerizing a farnesene disclosed herein in the presence of a catalyst disclosed herein to form a polyfarnesene; and (b) hydrogenating at least a portion of the double bonds in the polyfarnesene in the presence of a hydrogenation reagent. In some embodiments, the farnesene is copolymerized with a vinyl monomer disclosed herein to form a farnesene copolymer. In other embodiments, the vinyl monomer is styrene. In further embodiments, the farnesene copolymer is a block copolymer. In still further embodiments, the farnesene is α-farnesene or β-farnesene or a combination thereof.

In certain embodiments, the hydrogenation reagent is hydrogen in the presence of a hydrogenation catalyst. In some embodiments, the hydrogenation catalyst is Pd, Pd/C, Pt, $PtO_2$, $Ru(PPh_3)_2Cl_2$, Raney nickel or a combination thereof. In one embodiment, the catalyst is a Pd catalyst. In another embodiment, the catalyst is 5% Pd/C. In a further embodiments, the catalyst is 10% Pd/C in a high pressure reaction vessel and the hydrogenation reaction is allowed to proceed until completion. Generally, after completion, the reaction mixture can be washed, concentrated, and dried to yield the corresponding hydrogenated product. Alternatively, any reducing agent that can reduce a C═C bond to a C—C bond can also be used. For example, the polyfarnesene can be hydrogenated by treatment with hydrazine in the presence of a catalyst, such as 5-ethyl-3-methyllumiflavinium perchlorate, under an oxygen atmosphere to give the corresponding hydrogenated products. The reduction reaction with hydrazine is disclosed in Imada et al., *J. Am. Chem. Soc.*, 127, 14544-14545 (2005), which is incorporated herein by reference.

In some embodiments, at least a portion of the C═C bonds of the polyfarnesene disclosed herein is reduced to the corresponding C—C bonds by hydrogenation in the presence of a catalyst and hydrogen at room temperature. In other embodiments, at least a portion of the C═C bonds of one or more of formulae (I')-(III'), (V')-(VII'), and (XI)-(XIV) and stereoisomers thereof is reduced to the corresponding C—C bonds by hydrogenation in the presence of a catalyst and hydrogen at room temperature. In further embodiments, the hydrogenation catalyst is 10% Pd/C.

In certain embodiments, the vinyl monomer is styrene. In some embodiments, the farnesene is α-farnesene or β-farnesene or a combination thereof. In other embodiments, the farnesene is prepared by using a microorganism. In further embodiments, the farnesene is derived from a simple sugar or non-fermentable carbon source.

Farnesene

The farnesene can be derived from any source or prepared by any method known to a skilled artisan. In some embodiments, the farnesene is derived from a chemical source (e.g., petroleum or coal) or obtained by a chemical synthetic method. In other embodiments, the farnesene is prepared by fractional distillation of petroleum or coal tar. In further embodiments, the farnesene is prepared by any known chemical synthetic method. One non-limiting example of suitable chemical synthetic method includes dehydrating nerolidol with phosphoryl chloride in pyridine as described in the article by Anet E. F. L. J., "*Synthesis of (E,Z)-α-, (Z,Z)-α-, and (Z)-β-farnesene,*" *Aust. J. Chem.*, 23(10), 2101-2108 (1970), which is incorporated herein by reference.

In some embodiments, the farnesene can be obtained or derived from naturally occurring terpenes that can be produced by a wide variety of plants, such as *Copaifera langsdorfii*, conifers, and spurges; insects, such as swallowtail butterflies, leaf beetles, termites, and pine sawflies; and marine organisms, such as algae, sponges, corals, mollusks, and fish.

*Copaifera langsdorfii* or Copaifera tree is also known as the diesel tree and kerosene tree. It has many names in local languages, including kupa'y, cabismo, and copaúva. Copaifera tree may produce a large amount of terpene hydrocarbons in its wood and leaves. Generally, one Copaifera tree can produce from about 30 to about 40 liters of terpene oil per year.

Terpene oils can also be obtained from conifers and spurges. Conifers belong to the plant division Pinophyta or Coniferae and are generally cone-bearing seed plants with vascular tissue. The majority of conifers are trees, but some conifers can be shrubs. Some non-limiting examples of suitable conifers include cedars, cypresses, douglas-firs, firs, junipers, kauris, larches, pines, redwoods, spruces, and yews. Spurges, also known as Euphorbia, are a very diverse worldwide genus of plants, belonging to the spurge family (Euphorbiaceae). Consisting of about 2160 species, spurges are one of the largest genera in the plant kingdom.

The farnesene is a sesquiterpene which are part of a larger class of compound called terpenes. A large and varied class of hydrocarbons, terpenes include hemiterpenes, monoterpenes, sesquiterpenes, diterpenes, sesterterpenes, triterpenes, tetraterpenes, and polyterpenes. As a result, the farnesene can be isolated or derived from terpene oils for use in the present invention.

In certain embodiments, the farnesene is derived from a biological source. In other embodiments, the farnesene can be obtained from a readily available, renewable carbon source. In further embodiments, the farnesene is prepared by contacting a cell capable of making a farnesene with a carbon source under conditions suitable for making the farnesene.

Any carbon source that can be converted into one or more isoprenoid compounds can be used herein. In some embodiments, the carbon source is a sugar or a non-fermentable carbon source. The sugar can be any sugar known to those of skill in the art. In certain embodiments, the sugar is a monosaccharide, disaccharide, polysaccharide or a combination thereof. In other embodiments, the sugar is a simple sugar (a monosaccharide or a disaccharide). Some non-limiting examples of suitable monosaccharides include glucose, galactose, mannose, fructose, ribose and combinations thereof. Some non-limiting examples of suitable disaccharides include sucrose, lactose, maltose, trehalose, cellobiose and combinations thereof. In still other embodiments, the simple sugar is sucrose. In certain embodiments, the bioengineered fuel component can be obtained from a polysaccharide. Some non-limiting examples of suitable polysaccharides include starch, glycogen, cellulose, chitin and combinations thereof.

The sugar suitable for making the farnesene can be found in a wide variety of crops or sources. Some non-limiting examples of suitable crops or sources include sugar cane, bagasse, miscanthus, sugar beet, sorghum, grain sorghum, switchgrass, barley, hemp, kenaf, potatoes, sweet potatoes, cassava, sunflower, fruit, molasses, whey or skim milk, corn, stover, grain, wheat, wood, paper, straw, cotton, many types of cellulose waste, and other biomass. In certain embodiments, the suitable crops or sources include sugar cane, sugar beet and corn. In other embodiments, the sugar source is cane juice or molasses.

A non-fermentable carbon source is a carbon source that cannot be converted by the organism into ethanol. Some non-limiting examples of suitable non-fermentable carbon sources include acetate and glycerol.

In certain embodiments, the farnesene can be prepared in a facility capable of biological manufacture of $C_{15}$ isoprenoids. The facility can comprise any structure useful for preparing the $C_{15}$ isoprenoids, such as α-farnesene, β-farnesene, nerolidol or farnesol, using a microorganism. In some embodiments, the biological facility comprises one or more of the cells disclosed herein. In other embodiments, the biological facility comprises a cell culture comprising at least a $C_{15}$ isoprenoid in an amount of at least about 1 wt. %, at least about 5 wt. %, at least about 10 wt. %, at least about 20 wt. %, or at least about 30 wt. %, based on the total weight of the cell culture. In further embodiments, the biological facility comprises a fermentor comprising one or more cells described herein.

Any fermentor that can provide cells or bacteria a stable and optimal environment in which they can grow or reproduce can be used herein. In some embodiments, the fermentor comprises a culture comprising one or more of the cells disclosed herein. In other embodiments, the fermentor comprises a cell culture capable of biologically manufacturing farnesyl pyrophosphate (FPP). In further embodiments, the fermentor comprises a cell culture capable of biologically manufacturing isopentenyl diphosphate (IPP). In certain embodiments, the fermentor comprises a cell culture comprising at least a $C_{15}$ isoprenoid in an amount of at least about 1 wt. %, at least about 5 wt. %, at least about 10 wt. %, at least about 20 wt. %, or at least about 30 wt. %, based on the total weight of the cell culture.

The facility can further comprise any structure capable of manufacturing the fuel component or fuel additive from the $C_{15}$ isoprenoid, such as α-farnesene, β-farnesene, nerolidol or farnesol. The structure may comprise a reactor for dehydrating the nerolidol or farnesol to α-farnesene or β-farnesene. Any reactor that can be used to convert an alcohol into an alkene under conditions known to skilled artisans may be used herein. The reactor may comprise a dehydrating catalyst disclosed herein. In some embodiments, the structure further comprises a mixer, a container, and a mixture of the dehydrating products from the dehydrating step.

The biosynthetic process of making $C_{15}$ isoprenoid compounds are disclosed in U.S. Pat. No. 7,399,323; U.S. Application Number US 2008/0274523; and PCT Publication Numbers WO 2007/140339 and WO 2007/139924, which are incorporated herein by reference.

α-Farnesene

α-Farnesene, whose structure is

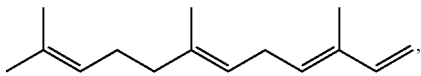

is found in various biological sources including, but not limited to, the Dufour's gland in ants and in the coating of apple and pear peels. Biochemically, α-farnesene is made from FPP by α-farnesene synthase. Some non-limiting examples of suitable nucleotide sequences that encode such an enzyme include (DQ309034; *Pyrus communis cultivar d'Anjou*) and (AY182241; *Malus domestica*). See Pechouus et al., *Planta* 219(1):84-94 (2004).

β-Farnesene

β-Farnesene, whose structure is

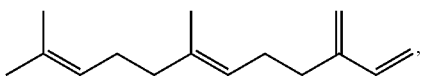

is found in various biological sources including, but not limited to, aphids and essential oils such as peppermint oil. In some plants such as wild potato, β-farnesene is synthesized as a natural insect repellent. Biochemically, β-farnesene is made from FPP by β-farnesene synthase. Some non-limiting examples of suitable nucleotide sequences that encode such an enzyme include (AF024615; *Mentha×piperita*) and (AY835398; *Artemisia annua*). See Picaud et al., *Phytochemistry* 66(9): 961-967 (2005).

Farnesol

Farnesol, whose structure is

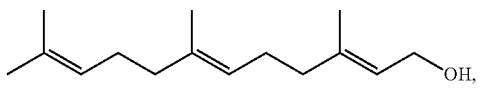 [SMILES: CC(C)=CCC/C(C)=C/CC/C(C)=C/CO]

is found in various biological sources including insects and essential oils from cintronella, neroli, cyclamen, lemon grass, tuberose, and rose. Biochemically, farnesol is made from FPP by a hydroxylase such as farnesol synthase. Some non-limiting examples of suitable nucleotide sequences that encode such an enzyme include (AF529266; *Zea mays*) and (YDR481C; *Saccharomyces cerevisiae*). See Song, L., *Applied Biochemistry and Biotechnology* 128:149-158 (2006).

Nerolidol

Nerolidol, whose structure is

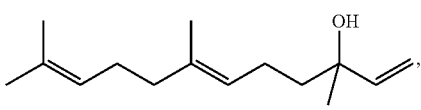 [SMILES: C=CC(C)(O)CC/C=C(\C)CCC=C(C)C]

is also known as peruviol which is found in various biological sources including essential oils from neroli, ginger, jasmine, lavender, tea tree, and lemon grass. Biochemically, nerolidol is made from FPP by a hydroxylase such as nerolidol synthase. A non-limiting example of a suitable nucleotide sequence that encodes such an enzyme includes AF529266 from *Zea mays* (maize; gene tps1).

The farnesol and nerolidol disclosed herein may be converted into α-farnesene, β-farnesene or a combination thereof by dehydration with a dehydrating agent or an acid catalyst. Any dehydrating agent or an acid catalyst that can convert an alcohol into an alkene can be used herein. Some non-limiting examples of suitable dehydrating agents or acid catalysts include phosphoryl chloride, anhydrous zinc chloride, phosphoric acid and sulfuric acid.

General Procedures of Making Polyfarnesenes

The polymerization of a farnesene or the copolymerization of a farnesene with a vinyl comonomer can be performed over a wide temperature range. In certain embodiments, the polymerization temperature is from about −30° C. to about 280° C., from about 30° C. to about 180° C., or from about 60° C. to about 100° C. The partial pressures of the vinyl comonomers can range from about 15 psig (0.1 MPa) to about 50,000 psig (245 MPa), from about 15 psig (0.1 MPa) to about 25,000 psig (172.5 MPa), from about 15 psig (0.1 MPa) to about 10,000 psig (69 MPa), from about 15 psig (0.1 MPa) to about 5,000 psig (34.5 MPa) or from about 15 psig (0.1 MPa) to about 1,000 psig (6.9 MPa).

The concentration of the catalyst used for making the polyfarnesenes disclosed herein depends on many factors. In some embodiments, the concentration ranges from about 0.01 micromoles per liter to about 100 micromoles per liter. The polymerization time depends on the type of process, the catalyst concentration, and other factors. Generally, the polymerization time is within several minutes to several hours.

A non-limiting example of solution polymerization procedure for farnesene homopolymer is outlined below. A farnesene such as β-farnesene can be added to a solvent such as cyclohexane to form a solution in a reactor which may be optionally under a nitrogen or argon atmosphere. The solution can be dried over a drying agent such as molecular sieves. A catalyst such as organolithium reagent can be added into the reactor, and then the reactor is heated to an elevated temperature until all or a substantial portion of farnesene is consumed. The farnesene homopolymer can then be precipitated from the reaction mixture and dried in a vacuum oven.

A non-limiting example of solution polymerization procedure for farnesene interpolymer is outlined below. A farnesene such as β-farnesene can be added to a solvent such as cyclohexane to form a farnesene solution in a reactor optionally under a nitrogen or argon atmosphere. The farnesene solution can be dried over a drying agent such as molecular sieves. In a second reactor optionally under nitrogen or argon atmosphere, a solution of styrene in cyclohexane with 10% is similarly prepared and dried over a drying agent such as molecular sieves. The styrene is polymerized by a catalyst such as organolithium reagent at an elevated temperature until all or a substantial portion of styrene is consumed. Then, the farnesene solution is transferred to the second reactor. The reaction is allowed to react until all or a substantial portion of farnesene is consumed. Then a dichlorosilane coupling agent (e.g., dichlorodimethylsilane in 1,2-dichloroethane) is then added into the second reactor to form a farnesene interpolymer.

A non-limiting example of free radical polymerization procedure for farnesene interpolymer is outlined below. A farnesene such as β-farnesene and one or more vinyl monomers disclosed herein and/or one or more functional comonomers disclosed herein can be added to a solvent such as cyclohexane to form a polymerizable mixture in a reactor optionally under a nitrogen or argon atmosphere. The polymerizable mixture can be dried over a drying agent such as molecular sieves. The polymerizable mixture is polymerized by a free radical catalyst disclosed herein at room temperature or an elevated temperature until all or a substantial portion of monomers is consumed.

A non-limiting example of emulsion polymerization procedure for farnesene interpolymer is outlined below. A farnesene such as β-farnesene, one or more vinyl monomers disclosed herein and/or one or more functional comonomers disclosed herein and a surfactant disclosed herein can be added to a water in a reactor optionally under a nitrogen or argon atmosphere. The mixture is stirred to form an emulsion mixture. The emulsion mixture is polymerized by a free radical catalyst disclosed herein at room temperature or an elevated temperature until all or a substantial portion of monomers is consumed.

Polyfarnesene Compositions

The polyfarnesenes can be used to prepare polyfarnesene compositions for a wide variety of applications. In some embodiments, the polyfarnesene compositions comprise the polyfarnesene disclosed herein and a second polymer or at least an additive. In certain embodiments, the polyfarnesene compositions comprise a second polymer. In other embodiments, the polyfarnesene compositions do not comprise a second polymer. The second polymer can be a vinyl polymer or polyfarnesene, a non-vinyl polymer or polyfarnesene, or a combination thereof. Some non-limiting examples of vinyl polymers and polyfarnesenes are disclosed in Malcolm P. Stevens, "*Polymer Chemistry, an Introduction*," Third Edition, Oxford University Press, pp. 17-21 and 167-279 (1999), which is incorporated herein by reference. Some non-limiting examples of suitable second polymer include a polyolefin, polyurethane, polyester, polyamide, styrenic polymer, phenolic resin, polyacrylate, polymethacrylate or a combination thereof.

In certain embodiments, the ratio of the polyfarnesene to the second polymer is from about 1:99 to about 99:1, from about 1:50 to about 50:1, from about 1:25 to about 25:1 or from about 1:10 to about 10:1.

In some embodiments, the second polymer is a polyolefin (e.g., polyethylene, polypropylene, an ethylene/α-olefin interpolymer, a copolymer of ethylene and propylene, and a copolymer of ethylene and vinyl acetate (EVA)), polyurethane, polyester, polyamide, styrenic polymer (e.g., polystyrene, poly(acrylonitrile-butadiene-styrene), poly(styrene-butadiene-styrene) and the like), phenolic resin, polyacrylate, polymethacrylate or a combination thereof. In some embodiments, the second polymer is polyethylene, polypropylene, polystyrene, a copolymer of ethylene and vinyl acetate, poly (acrylonitrile-butadiene-styrene), poly(styrene-butadiene-styrene) or a combination thereof. The second polymer may be blended with the farnesene interpolymer before it is added to the polyfarnesene composition. In some embodiments, the second polymer is added directly to the polyfarnesene composition without pre-blending with the farnesene interpolymer.

The weight ratio of the polyfarnesene to the second polymer in the polymer composition can be between about 1:99 and about 99:1, between about 1:50 and about 50:1, between about 1:25 and about 25:1, between about 1:10 and about 10:1, between about 1:9 and about 9:1, between about 1:8 and about 8:1, between about 1:7 and about 7:1, between about 1:6 and about 6:1, between about 1:5 and about 5:1, between about 1:4 and about 4:1, between about 1:3 and about 3:1, between about 1:2 and about 2:1, between about 3:7 and about 7:3 or between about 2:3 and about 3:2.

In some embodiments, the second polymer is a polyolefin. Any polyolefin that is partially or totally compatible with the polyfarnesene may be used. Non-limiting examples of suitable polyolefins include polyethylenes; polypropylenes; polybutylenes (e.g., polybutene-1); polypentene-1; polyhexene-1; polyoctene-1; polydecene-1; poly-3-methylbutene-1; poly-4-methylpentene-1; polyisoprene; polybutadiene; poly-1,5-hexadiene; interpolymers derived from olefins; interpolymers derived from olefins and other polymers such as polyvinyl chloride, polystyrene, polyurethane, and the like; and mixtures thereof. In some embodiments, the polyolefin is a homopolymer such as polyethylene, polypropylene, polybutylene, polypentene-1, poly-3-methylbutene-1, poly-4-methylpentene-1, polyisoprene, polybutadiene, poly-1,5-hexadiene, polyhexene-1, polyoctene-1 and polydecene-1.

Some non-limiting examples of suitable polyethylenes include ultra low density polyethylene (ULDPE), linear low density polyethylene (LLDPE), low density polyethylene (LDPE), medium density polyethylene (MDPE), high density polyethylene (HDPE), high molecular weight high density polyethylene (HMW-HDPE), ultra high molecular weight polyethylene (UHMW-PE) and combinations thereof. Some non-limiting examples of polypropylenes include low density polypropylene (LDPP), high density polypropylene (HDPP), high-melt strength polypropylene (HMS-PP) and combination thereof. In some embodiments, the second polymer is or comprises high-melt-strength polypropylene (HMS-PP), low density polyethylene (LDPE) or a combination thereof.

In some embodiments, the polyfarnesene compositions disclosed herein comprise at least one additive for the purposes of improving and/or controlling the processibility, appearance, physical, chemical, and/or mechanical properties of the polyfarnesene compositions. In some embodiments, the polyfarnesene compositions do not comprise an additive. Any plastics additive known to a person of ordinary skill in the art may be used in the polyfarnesene compositions disclosed herein. Non-limiting examples of suitable additives include fillers, grafting initiators, tackifiers, slip agents, anti-blocking agents, plasticizers, antioxidants, blowing agents, blowing agent activators (e.g., zinc oxide, zinc stearate and the like), UV stabilizers, acid scavengers, colorants or pigments, coagents (e.g., triallyl cyanurate), lubricants, antifogging agents, flow aids, processing aids, extrusion aids, coupling agents, cross-linking agents, stability control agents, nucleating agents, surfactants, solvents, flame retardants, antistatic agents, and combinations thereof.

The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the polymer composition. Some polymer additives have been described in Zweifel Hans et al., "*Plastics Additives Handbook*," Hanser Gardner Publications, Cincinnati, Ohio, 5th edition (2001), which is incorporated herein by reference in its entirety.

Optionally, the polyfarnesene compositions disclosed herein can comprise an anti-blocking agent. In some embodiments, the polyfarnesene compositions disclosed herein do not comprise an anti-blocking agent. The anti-blocking agent can be used to prevent the undesirable adhesion between touching layers of articles made from the polyfarnesene compositions, particularly under moderate pressure and heat during storage, manufacture or use. Any anti-blocking agent known to a person of ordinary skill in the art may be added to the polyfarnesene compositions disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the polymer composition can be from about greater than 0 to about 3 wt %, from about 0.0001 to about 2 wt %, from about 0.001 to about 1 wt %, or from about 0.001 to about 0.5 wt % of the total weight of the polymer composition. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

Optionally, the polyfarnesene compositions disclosed herein can comprise a plasticizer. In general, a plasticizer is a chemical that can increase the flexibility and lower the glass transition temperature of polymers. Any plasticizer known to a person of ordinary skill in the art may be added to the polyfarnesene compositions disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the polymer composition can be from greater than 0 to about 15 wt %, from about 0.5 to about 10 wt %, or from about 1 to about 5 wt % of the total weight of the polymer composition. Some plasticizers have been described in George Wypych, "*Handbook of Plasticizers*," ChemTec Publishing, Toronto-Scarborough, Ontario (2004), which is incorporated herein by reference.

In some embodiments, the polyfarnesene compositions disclosed herein optionally comprise an antioxidant that can prevent the oxidation of polymer components and organic additives in the polyfarnesene compositions. Any antioxidant known to a person of ordinary skill in the art may be added to the polyfarnesene compositions disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer composition can be from about greater than 0 to about 5 wt %, from about 0.0001 to about 2.5 wt %, from about 0.001 to about 1 wt %, or from about 0.001 to about 0.5 wt % of the total weight of the polymer composition. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, the polyfarnesene compositions disclosed herein optionally comprise an UV stabilizer that may prevent or reduce the degradation of the polyfarnesene compositions by UV radiations. Any UV stabilizer known to a person of ordinary skill in the art may be added to the polyfarnesene compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer composition can be from about greater than 0 to about 5 wt %, from about 0.01 to about 3 wt %, from about 0.1 to about 2 wt %, or from about 0.1 to about 1 wt % of the total weight of the polymer composition. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

In further embodiments, the polyfarnesene compositions disclosed herein optionally comprise a colorant or pigment that can change the look of the polyfarnesene compositions to human eyes. Any colorant or pigment known to a person of ordinary skill in the art may be added to the polyfarnesene compositions disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer composition can be from about greater than 0 to about 10 wt %, from about 0.1 to about 5 wt %, or from about 0.25 to about 2 wt % of the total weight of the polymer composition. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the polyfarnesene compositions disclosed herein can comprise a filler which can be used to adjust, inter alia, volume, weight, costs, and/or technical performance. Any filler known to a person of ordinary skill in the art may be added to the polyfarnesene compositions disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the polymer composition can be from about greater than 0 to about 80 wt %, from about 0.1 to about 60 wt %, from about 0.5 to about 40 wt %, from about 1 to about 30 wt %, or from about 10 to about 40 wt % of the total weight of the polymer composition. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, the polyfarnesene compositions disclosed herein can comprise a lubricant. In general, the lubricant can be used, inter alia, to modify the rheology of the molten polyfarnesene compositions, to improve the surface finish of molded articles, and/or to facilitate the dispersion of fillers or pigments. Any lubricant known to a person of ordinary skill in the art may be added to the polyfarnesene compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer composition can be from about greater than 0 to about 5 wt %, from about 0.1 to about 4 wt %, or from about 0.1 to about 3 wt % of the total weight of the polymer composition. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polyfarnesene compositions disclosed herein can comprise an antistatic agent. Generally, the antistatic agent can increase the conductivity of the polyfarnesene compositions and to prevent static charge accumulation. Any antistatic agent known to a person of ordinary skill in the art may be added to the polyfarnesene compositions disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer composition can be from about greater than 0 to about 5 wt %, from about 0.01 to about 3 wt %, or from about 0.1 to about 2 wt % of the total weight of the polymer composition. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

Optionally, the polyfarnesene compositions disclosed herein can comprise a blowing agent for preparing foamed articles. The blowing agents can include, but are not limited to, inorganic blowing agents, organic blowing agents, chemical blowing agents and combinations thereof. Some blowing agents are disclosed in Sendijarevic et al., "*Polymeric Foams And Foam Technology*," Hanser Gardner Publications, Cincinnati, Ohio, 2nd edition, Chapter 18, pages 505-547 (2004), which is incorporated herein by reference.

Non-limiting examples of suitable inorganic blowing agents include carbon dioxide, nitrogen, argon, water, air, nitrogen, and helium. Non-limiting examples of suitable organic blowing agents include aliphatic hydrocarbons having 1-6 carbon atoms, aliphatic alcohols having 1-3 carbon atoms, and fully and partially halogenated aliphatic hydrocarbons having 1-4 carbon atoms. Non-limiting examples of suitable aliphatic hydrocarbons include methane, ethane, propane, n-butane, isobutane, n-pentane, isopentane, neopentane, and the like. Non-limiting examples of suitable aliphatic alcohols include methanol, ethanol, n-propanol, and isopropanol. Non-limiting examples of suitable fully and partially halogenated aliphatic hydrocarbons include fluorocarbons, chlorocarbons, and chlorofluorocarbons. Non-limiting examples of suitable fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Non-limiting examples of suitable partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1 difluoroethane (HCFC-142b), 1,1-dichloro-2,2,2-trifluoroethane (HCFC-123) and 1-chloro-1,2,2,2-tetrafluoroethane(HCFC-124). Non-limiting examples of suitable fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Non-limiting examples of suitable chemical blowing agents include azodicarbonamide, azodiisobutyro-nitrile, benezenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. In some embodiments, the blowing agent is azodicarbonamide isobutane, $CO_2$, or a mixture of thereof.

The amount of the blowing agent in the polymer composition disclosed herein may be from about 0.1 to about 20 wt. %, from about 0.1 to about 10 wt. %, or from about 0.1 to about 5 wt. %, based on the weight of the farnesene interpolymer or the polymer composition. In other embodiments, the amount of the blowing agent is from about 0.2 to about 5.0 moles per kilogram of the interpolymer or polymer composition, from about 0.5 to about 3.0 moles per kilogram of the interpolymer or polymer composition, or from about 1.0 to about 2.50 moles per kilogram of the interpolymer or polymer composition.

In some embodiments, the polyfarnesene compositions disclosed herein comprise a slip agent. In other embodiments, the polyfarnesene compositions disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to the polyfarnesene compositions disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof.

In some embodiments, the slip agent is a primary amide with a saturated aliphatic group having between 18 and about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In further embodiments, the slip agent is erucamide, oleamide, stearamide, behenamide, ethylene-bis-stearamide, ethylene-bis-oleamide, stearyl erucamide, behenyl erucamide or a combination thereof. In a particular embodiment, the slip agent is erucamide. In further embodiments, the slip agent is commercially available having a trade name such as ATMER™ SA from Uniqema, Everberg, Belgium; ARMOSLIP® from Akzo Nobel Polymer Chemicals, Chicago, Ill.; KEMAMIDE® from Witco, Greenwich, Conn.; and CRODAMIDE® from Croda, Edison, N.J. Where used, the amount of the slip agent in the polymer composition can be from about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer composition. Some slip agents have been described in Zweifel Hans et al., "*Plastics Additives Handbook*," Hanser Gardner Publications, Cincinnati, Ohio, 5th edition, Chapter 8, pages 601-608 (2001), which is incorporated herein by reference.

In some embodiments, the polyfarnesene compositions disclosed herein comprise a tackifier. In other embodiments, the polyfarnesene compositions disclosed herein do not comprise a tackifier. Any material that can be added to an elastomer to produce an adhesive can be used herein as a tackifier. Some non-limiting examples of tackifiers include a natural and modified resin; a glycerol or pentaerythritol ester of natural or modified rosin; a copolymer or terpolymer of natured terpene; a polyterpene resin or a hydrogenated polyterpene resin; a phenolic modified terpene resin or a hydrogenated derivative thereof; an aliphatic or cycloaliphatic hydrocarbon resin or a hydrogenated derivative thereof; an aromatic hydrocarbon resin or a hydrogenated derivative thereof; an aromatic modified aliphatic or cycloaliphatic hydrocarbon resin or a hydrogenated derivative thereof; or a combination thereof. In certain embodiments, the tackifier has a ring and ball (R&B) softening point equal to or greater than 60° C., 70° C., 75° C., 80° C., 85° C., 90° C. or 100° C., as measured in accordance with ASTM 28-67, which is incorporated herein by reference. In certain embodiments, the tackifier has a R&B softening point equal to or greater than 80° C., as measured in accordance with ASTM 28-67.

In certain embodiments, the amount of tackifier in the polyfarnesene compositions disclosed herein is in the range from about 0.1 wt. % to about 70 wt. %, from about 0.1 wt. % to about 60 wt. %, from about 1 wt. % to about 50 wt. %, or from about 0.1 wt. % to about 40 wt. % or from about 0.1 wt. % to about 30 wt. % or from about 0.1 wt. % to about 20 wt. %, or from about 0.1 wt. % to about 10 wt. %, based on the total weight of the composition. In other embodiments, the amount of tackifier in the compositions disclosed herein is in the range from about 1 wt. % to about 70 wt. %, from about 5 wt. % to about 70 wt. %, from about 10 wt. % to about 70 wt. %, from about 15 wt. % to about 70 wt. %, from about 20 wt. % to about 70 wt. %, or from about 25 wt. % to about 70 wt. %, based on the total weight of the composition.

Optionally, the polyfarnesene compositions disclosed herein can comprise a wax, such as a petroleum wax, a low molecular weight polyethylene or polypropylene, a synthetic wax, a polyolefin wax, a beeswax, a vegetable wax, a soy wax, a palm wax, a candle wax or an ethylene/α-olefin interpolymer having a melting point of greater than 25° C. In certain embodiments, the wax is a low molecular weight polyethylene or polypropylene having a number average molecular weight of about 400 to about 6,000 g/mole. The wax can be present in the range from about 10% to about 50% or 20% to about 40% by weight of the total composition.

Optionally, the polyfarnesene compositions disclosed herein may be crosslinked, partially or completely. When crosslinking is desired, the polyfarnesene compositions disclosed herein comprise a cross-linking agent that can be used to effect the cross-linking of the polyfarnesene compositions, thereby increasing their modulus and stiffness, among other things. An advantage of a polyfarnesene composition is that crosslinking can occur in its side chains instead of the polymer backbone like other polymers such as polyisoprene and polybutadiene. Any cross-linking agent known to a person of ordinary skill in the art may be added to the polyfarnesene compositions disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the polymer composition can be from about greater than 0 to about 20 wt. %, from about 0.1 wt. % to about 15 wt. %, or from about 1 wt. % to about 10 wt. % of the total weight of the polymer composition. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

In some embodiments, the farnesene interpolymers disclosed herein includes farnesene-modified polymers prepared by copolymerizing one or more farnesene with one or more vinyl monomers. In certain embodiments, the unmodified polymer derived from the one or more vinyl monomers can be any known olefin homopolymer or interpolymer. In further embodiments, none of the one or more other vinyl monomers has an unsaturated side chain capable of reacting with a cross-linking agent. Because of the unsaturated side chains derived from the farnesene, the farnesene-modified polymer disclosed herein can be cross-linked by a cross-linking agent disclosed herein.

In certain embodiments, the amount of the farnesene in the farnesene-modified polymer disclosed herein is from about 1 wt. % to about 20 wt. %, from about 1 wt. % to about 10 wt. %, from about 1 wt. % to about 7.5 wt. %, from about 1 wt. % to about 5 wt. %, from about 1 wt. % to about 4 wt. %, from about 1 wt. % to about 3 wt. %, or from about 1 wt. % to about 2 wt. %, based on the total weight of the farnesene-modified polymer. In other embodiments, the amount of the one or more other vinyl monomers in the farnesene-modified polymer disclosed herein is from about 80 wt. % to about 99 wt. %, from about 90 wt. % to about 99 wt. %, from about 92.5 wt. % to about 99 wt. %, from about 95 wt. % to about 99 wt. %, from about 96 wt. % to about 99 wt. %, from about 97 wt. % to about 99 wt. %, or from about 98 wt. % to about 99 wt. %, based on the total weight of the farnesene-modified polymer.

The cross-linking of the polyfarnesene compositions can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range of about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example, 0° C. to about 60° C., may also be employed. Preferably, the irradiation is carried out after shaping or fabrication of the article. Also, in a preferred embodiment, the farnesene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases; carboxylic acids; and organometallic compounds including organic titanates and complexes or carboxylates of lead, cobalt, iron, nickel, zinc and tin; dibutyltinlaurate, dioctyltinmaleate, dibutyltindilaurate, dioctyltinmaleate, dibutyltindiacetate, dibutyltindioctoate, stannous acetate, stannous octoate, lead naphthenate, zinc caprylate, cobalt naphthenate; and the like. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as C=C, C=N or C=O.

At least one pro-rad additive can be introduced to the farnesene interpolymer by any method known in the art. However, preferably the pro-rad additive(s) is introduced via a masterbatch concentrate comprising the same or different base resin as the farnesene interpolymer. Preferably, the pro-rad additive concentration for the masterbatch is relatively high e.g., about 25 weight percent (based on the total weight of the concentrate).

The at least one pro-rad additive is introduced to the polyfarnesene in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the farnesene interpolymer.

In addition to electron-beam irradiation, crosslinking can also be effected by UV irradiation. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monacetals is the homolytic cleavage of the α-bond to give acyl and dialkoxyalkyl radicals. This type of α-cleavage is known as a Norrish Type I reaction which is more fully described in W. Horspool and D. Armesto, "*Organic Photochemistry: A Comprehensive Treatment*," Ellis Horwood Limited, Chichester, England, 1992; J. Kopecky, "*Organic Photochemistry: A Visual Approach*," VCH Publishers, Inc., New York, N.Y. 1992; N. J. Turro, et al., *Acc. Chem. Res.,* 1972, 5, 92; and J. T. Banks, et al., *J. Am. Chem. Soc.,* 1993, 115, 2473. The synthesis of monoacetals of aromatic 1,2 diketones, Ar—CO—C(OR)$_2$—Ar' is described in U.S. Pat. No. 4,190, 602 and Ger. Offen. 2,337,813. The preferred compound from this class is 2,2-dimethoxy-2-phenylacetophenone, $C_6H_5$—CO—C(OCH$_3$)$_2$—$C_6H_5$, which is commercially available from Ciba-Geigy as IRGACURE™ 651. Examples of other aromatic ketones useful herein as photoinitiators are IRGACURE™ 184, 369, 819, 907 and 2959, all available from Ciba-Geigy.

In one embodiment of the invention, the photoinitiator is used in combination with a photocrosslinker. Any photocrosslinker that will upon the generation of free radicals, link two or more polyolefin backbones together through the formation of covalent bonds with the backbones can be used herein. Preferably these photocrosslinkers are polyfunctional, i.e., they comprise two or more sites that upon activation will form a covalent bond with a site on the backbone of the polyfarnesene. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in the present invention are compounds which have polyfunctional (i.e., at least two) moieties. Particularly preferred photocrosslinkers are triallycyanurate (TAC) and triallylisocyanurate (TAIC).

Certain compounds act as both a photoinitiator and a photocrosslinker herein. These compounds are characterized by the ability to generate two or more reactive species (e.g., free radicals, carbenes, nitrenes, etc.) upon exposure to UV-light and to subsequently covalently bond with two polymer chains. Any compound that can perform these two functions can be used herein, and representative compounds include sulfonyl azides.

In another embodiment, the polyfarnesene is subjected to secondary crosslinking, i.e., crosslinking other than and in addition to photocrosslinking. In this embodiment, the photoinitiator is used either in combination with a nonphotocrosslinker, e.g., a silane, or the polyfarnesene is subjected to a secondary crosslinking procedure, e.g, exposure to E-beam radiation. The use of a photocrosslinker in this embodiment is optional.

At least one photoadditive, i.e., photoinitiator and optional photocrosslinker, can be introduced to the polyfarnesene by any method known in the art. However, preferably the photoadditive(s) is (are) introduced via a masterbatch concentrate comprising the polyfarnesene. Preferably, the photoadditive concentration for the masterbatch is high than about 10 wt. %, about 15 wt. %, about 20 wt. %, or about 25 wt. %, based on the total weight of the concentrate.

The at least one photoadditive is introduced to the polyfarnesene in any effective amount. Preferably, the at least one photoadditive introduction amount is from about 0.001 wt. % to about 5 wt. %, more preferably from about 0.005 wt. % to about 2.5 wt. % and most preferably from about 0.015 wt. % to about 1 wt. %, based on the total weight of the polyfarnesene.

The photoinitiator(s) and optional photocrosslinker(s) can be added during different stages of the fiber or film manufacturing process. If photoadditives can withstand the extrusion temperature, a polyolefin resin can be mixed with additives before being fed into the extruder, e.g., via a masterbatch addition. Alternatively, additives can be introduced into the extruder just prior the slot die, but in this case the efficient mixing of components before extrusion is important. In another approach, polyolefin fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with the polyolefin using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with a polyolefin resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 $J/cm^2$. The irradiation source can be any UV-light generator operating in a range of about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 $J/cm^2$ to about 500 $J/scm^{2'}$, preferably between about 5 $J/cm^2$ to about 100 $J/cm^2$. Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the polyfarnesene which has been incorporated with a photoadditive is irradiated with UV-radiation at about 10 $J/cm^2$ to about 50 $J/cm^2$.

Blending of the Ingredients of the Polymer Compositions

The ingredients of the polyfarnesene compositions, i.e., the farnesene interpolymer, the additive, the optional second polymer (e.g., polyethylene, and polypropylene) and additives (e.g., the cross-linking agent) can be mixed or blended using methods known to a person of ordinary skill in the art. Non-limiting examples of suitable blending methods include melt blending, solvent blending, extruding, and the like.

In some embodiments, the ingredients of the polyfarnesene compositions are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 ton (1333 Pa). Next, the ingredients are weighed into a vessel in the desired proportions and the foam is formed by heating the contents of the vessel to a molten state while stirring.

In other embodiments, the ingredients of the articles are processed using solvent blending. First, the ingredients of the desired foam are dissolved in a suitable solvent and the mixture is then mixed or blended. Next, the solvent is removed to provide the foam.

In further embodiments, physical blending devices that can provide dispersive mixing, distributive mixing, or a combination of dispersive and distributive mixing can be used in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the farnesene interpolymer, the optional second polymer or the foam. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polyfarnesene compositions, the desired amounts of the additives can be added in one charge or multiple charges to the farnesene interpolymer, the second polymer or the polymer composition. Furthermore, the addition can take place in any order. In some embodiments, the additives are first added and mixed or blended with the farnesene interpolymer and then the additive-containing interpolymer is blended with the second polymer. In other embodiments, the additives are first added and mixed or blended with the second polymer and then the additive-containing second polymer is blended with the farnesene interpolymer. In further embodiments, the farnesene interpolymer is blended with the second polymer first and then the additives are blended with the polymer composition.

The ingredients of the polymer composition can be mixed or blended in any suitable mixing or blending devices known to skilled artisans. The ingredients in the polymer composition can then be mixed at a temperature below the decomposition temperature of the blowing agent and the cross-linking agent to ensure that all ingredients are homogeneously mixed and remain intact. After the polymer composition is relatively homogeneously mixed, the composition is shaped and then exposed to conditions (e.g. heat, pressure, shear, etc.) over a sufficient period of time to activate the blowing agent and the cross-linking agent to make the foam.

Applications of the Compositions Comprising the Polyfarnesenes

The polyfarnesenes or polyfarnesene compositions disclosed herein can be used for a wide variety of applications. For example, they can be used in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the present polymers, include blends with other natural or synthetic polymers, additives, reinforcing agents, ignition resistant additives, antioxidants, stabilizers, colorants, extenders, crosslinkers, blowing agents, and plasticizers. Of particular utility are multi-component fibers such as core/sheath fibers, having an outer surface layer, comprising at least in part, one or more polymers of the invention.

Fibers that may be prepared from the polyfarnesenes or polyfarnesene compositions disclosed herein include staple fibers, tow, multicomponent, sheath/core, twisted, and monofilament. Any fiber forming processes can be used herein. For example, suitable fiber forming processes include spinbonded, melt blown techniques, gel spun fibers, woven and nonwoven fabrics, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The polyfarnesenes or polyfarnesene compositions disclosed herein are also useful for wire and cable coating operations, as well as in sheet extrusion for vacuum forming operations, and forming molded articles, including the use of injection molding, blow molding process, or rotomolding processes. The polyfarnesenes or polyfarnesene compositions disclosed herein can also be formed into fabricated articles such as those previously mentioned using conventional polyolefin processing techniques which are well known to those skilled in the art of polyolefin processing.

Dispersions or emulsions (both aqueous and non-aqueous) can also be formed using the polyfarnesenes or polyfarnesene compositions disclosed herein. Frothed foams comprising the polyfarnesenes or polyfarnesene compositions disclosed herein can also be formed. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Suitable end uses for the foregoing products include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

The polyfarnesene compositions disclosed herein can also be used to manufacture articles for various applications such as the automotive, construction, medical, food and beverage, electrical, appliance, business machine, and consumer markets. In some embodiments, the polyfarnesene compositions are used to manufacture molded parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles.

The polymer emulsions disclosed herein can be used for various applications such as paints, coatings such as paper coatings and textile coatings, adhesives and rheology modifiers.

In some embodiments, the polyfarnesene compositions disclosed herein are used to prepare molded articles, films, sheets and foams with known polymer processes such as extrusion (e.g., sheet extrusion and profile extrusion); molding (e.g., injection molding, rotational molding, and blow molding); fiber spinning; and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding*," Hanser Gardner Publications, Cincinnati, Ohio (2000), which is incorporated herein by reference in its entirety.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Purification of Starting Materials

β-farnesene having 97.6% purity by weight was obtained from Amyris Biotechnologies Inc., Emeryville, Calif. β-Farnesene included hydrocarbon-based impurities such as zingiberene, bisabolene, farnesene epoxide, farnesol isomer, E,E-farnesol, squalene, ergosterol, and some dimers of farnesene. β-farnesene was purified with a 3Å molecular sieve to remove the impurities and were then redistilled under nitrogen atmosphere to improve purity. Cyclohexane was distilled under nitrogen atmosphere to eliminate moisture and stored with a drying agent.

Differential Scanning Calorimetry

A TA Q200 differential scanning calorimeter was utilized to determine glass transition temperatures ($T_g$) of polymer samples disclosed herein. A 5 mg sample was placed in an aluminum pan. An empty reference pan and the sample pan were maintained within ±0.01 mg. Samples were scanned from about −175° C. to about 75° C. at a rate of 10° C./min. $T_g$ was identified as a step change transition in the heat flow. The mid-point of the transition was reported as the $T_g$ of the sample.

Gel Permeation Chromatography

GPC was utilized to determine the molecular weights and polydispersities of polymer samples. A Waters 2414 refractive index detector was used with a Waters 1515 isocratic HPLC pump. HPLC grade tetrahydrofuran was used as solvent. Polydispersed fractions were collected from GPC. The molecular weight of a sample was generally recorded as the number averaged molecular weight ($M_n$) or the weight average ($M_w$). When there were overlapping peaks which prohibited the determination of a unique polydispersity of each peak, a peak molecular weight ($M_p$) was incorporated herein.

Thermal Gravimetric Analysis

The degradation temperatures of samples were determined by thermal gravimetric analysis (TGA). About 20 mg of a sample was placed in a tared pan. The pan was then loaded into a furnace. Air flow was allowed to equilibrate. The sample was then heated from room temperature to 580° C. at 10° C./min. Temperatures for 1% and 5% weight loss of samples were reported respectively.

Ultraviolet-Visible Spectroscopy

Ultraviolet-visible (UV-Vis) spectroscopy was utilized to monitor monomer consumption during the reaction. The reaction was allowed to continue until all monomers had been consumed. A Shimadzu UV-2450 UV-Vis spectrophotometer was utilized. Background measurement was averaged from five measurements with an empty quartz cuvette. Aliquots were periodically taken from the reaction vessel, which was then placed in a square quartz cuvette with having 1 cm beam distance. The absorbance of the sample is directly proportional to the concentration of the monomer in the aliquot. The progress of the reaction was monitored by UV-Vis spectroscopy with the characteristic absorption peak of β-farnesene at 230 nm.

Tensile Strength

Tensile strength of samples were determined using an INSTRON™ tensile tester. A sample was cast into films and cut to the appropriate dimensions. The thickness and width of the sample after processing were measured. A gauge length of 2.54 cm was used with a crosshead speed 25 mm/min.

Lap Test

Lap test was used to characterize adhesive properties of samples. Two substrates were held together by an adhesive. Substrates were then pulled apart, shearing the adhesive. The construct fails in one of three ways. When the substrate failed, it was called a substrate failure. When the adhesive was torn apart, it was called a cohesive failure. When the interface between the substrate and adhesive failed, it was called an adhesive failure. An INSTRON™ tensile tester was used to characterize the forces involved in the failure. The adhesive was applied to a 2 $cm^2$ section of the substrate with a crosshead speed of 25 mm/min. Aluminum was used as the substrate. Aluminum was cleaned with acetone before bonding.

$^1$H and $^{13}$C Nuclear Magnetic Resonance $^1$H and $^{13}$C Nuclear Magnetic Resonance was utilized to characterize chemical microstructures of the samples. A Varian Mercury 300 MHz NMR was utilized for these measurements. Deuterated chloroform was used as the solvent. Several measurements were repeated for collecting spectra.

Example 1

1,4-Polyfarnesene Having a $M_n$ of 105,000

To a dried three-neck reactor under argon atmosphere, a pre-dried solution comprising 92.29 g of β-farnesene in 13.7% in cyclohexane was added. n-Butyl lithium (1.85×10$^{-3}$ mol, obtained from Acros, Morris Plains, N.J.) was added into the reactor as an initiator, and the reactor was heated at about 50° C. for about 19 hours, until all β-farnesene was consumed, monitored by UV-Vis spectroscopy. Example 1 was precipitated from the reaction mixture with a 1% solution of ethanol and t-butyl catachol (obtained from Sigma-Aldrich, St. Louis, Mo.). After drying in a vacuum oven at about 60° C. for about 2 hours, Example 1 was kept under vacuum for about 16 hours. Afterwards, Example 1, collected at 89.83 g (yield 97%), was stored in a refrigerator to prevent any crosslinking before characterization.

The progress of synthesizing Example 1 was monitored by the disappearance of β-farnesene, as measured by UV-Vis in the reaction mixture. FIG. 1 shows the Ultraviolet-Visible (UV-Vis) spectra of Example 1 and β-farnesene. The characteristic absorption peak of β-farnesene at 230 nm is present in the UV-Vis spectrum for β-farnesene in FIG. 1, but absent in the UV-Vis spectrum for Example 1 in FIG. 1.

Figure 2:
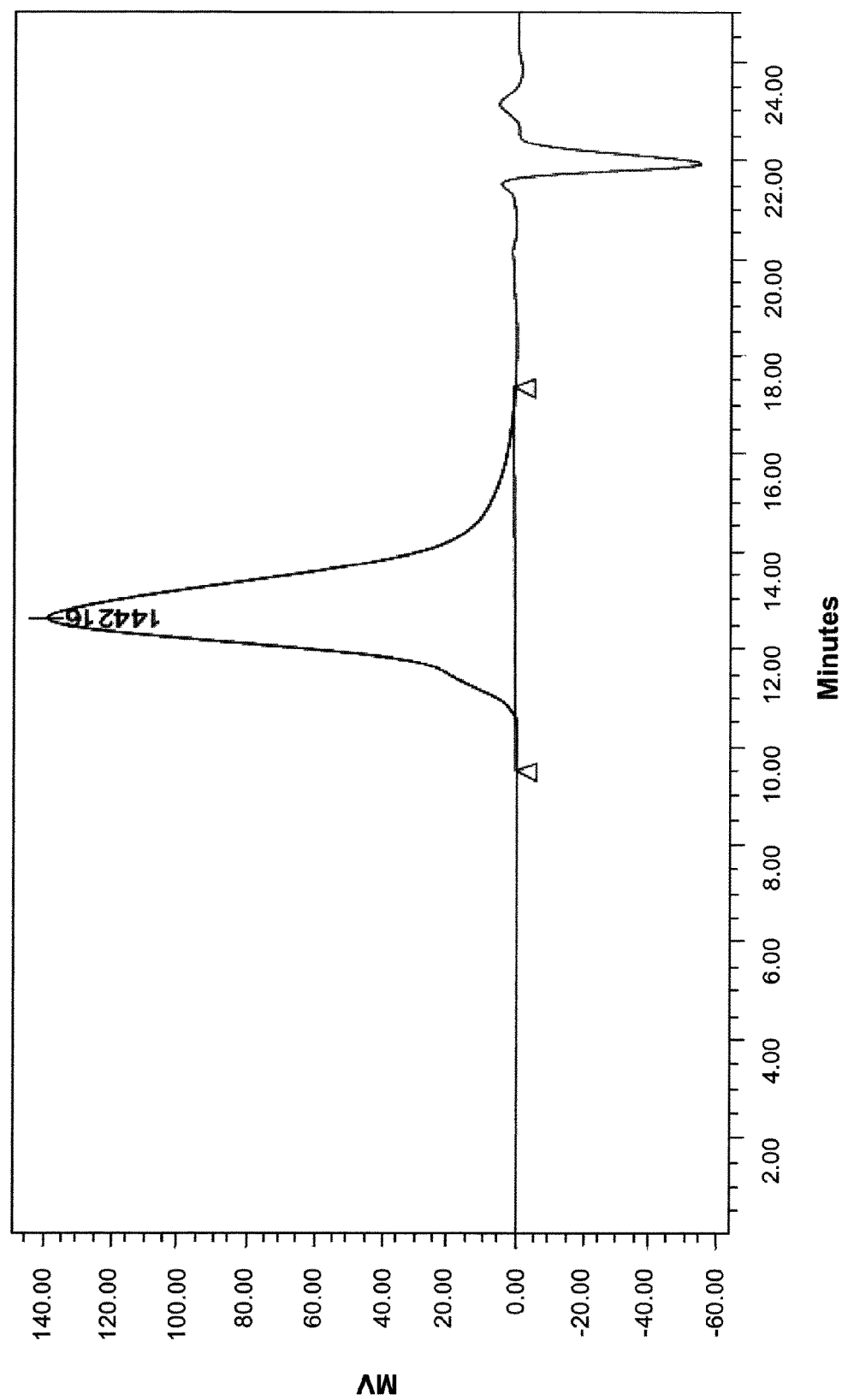
FIG. 2 depicts a Gel Permeation Chromatography (GPC) curve of Example 1.

The molecular weight and polydispersity of Example 1 were determined by GPC. FIG. 2 shows the GPC curve of Example 1. The number average molecular weight (M$_n$), weight average molecular weight (M$_w$), peak molecular weight (M$_p$), z average molecular weight (M$_z$), z+1 average molecular weight (M$_{z+1}$), M$_w$/M$_n$, (i.e., polydispersity), M$_z$/M$_w$, and M$_{z+1}$/M$_w$ of Example 1 are shown in Table 1. The definitions of M$_n$, M$_w$, M$_z$, M$_{z+1}$, M$_p$, and polydispersity can be found in Technical Bulletin TB021, "Molecular Weight Distribution and Definitions of MW Averages," published by Polymer Laboratories, which is incorporated herein by reference. Some methods of measuring the molecular weights of polymers can be found in the book by Malcolm P. Stevens, "Polymer Chemistry: An Introduction," Oxford University Press, Chapter 2 (1999), pp. 35-58, which is incorporated herein by reference. The number of farnesene units in Example 1 was calculated to be about 490.

TABLE 1

| Properties | Example 1 |
|---|---|
| M$_n$ | 104,838 g/mol |
| M$_w$ | 147,463 g/mol |
| M$_p$ | 144,216 g/mol |
| M$_z$ | 207,084 g/mol |
| M$_{z+1}$ | 314,887 g/mol |
| Polydispersity | 1.406588 |
| M$_z$/M$_w$ | 1.404311 |
| M$_{z+1}$/M$_w$ | 2.135360 |

Figure 3:
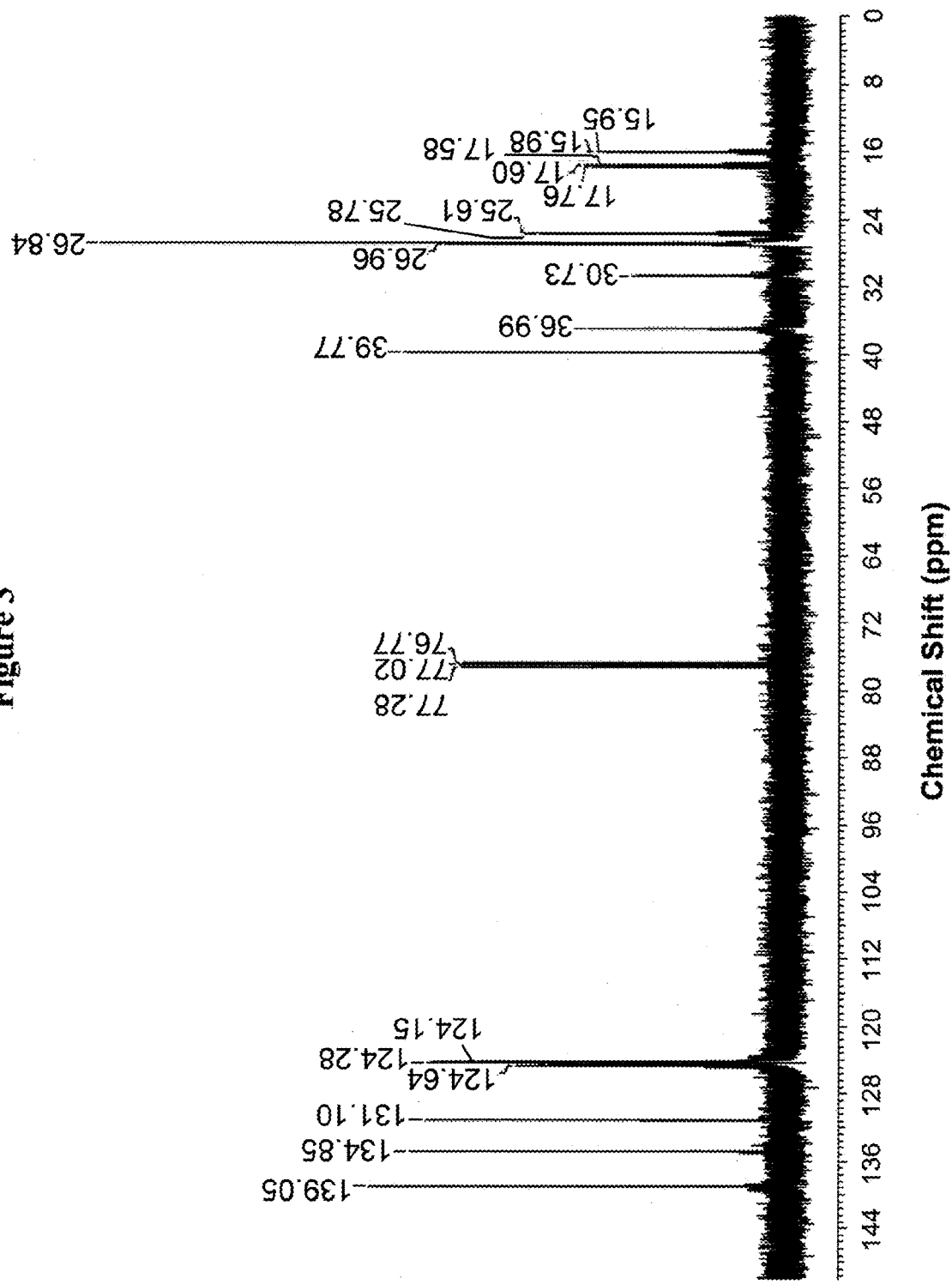
FIG. 3 depicts a $C^{13}$ Nuclear Magnetic Resonance (NMR) spectrum of Example 1.

FIG. 3 shows the $^{13}$C NMR spectrum of Example 1. Peaks at 77.28 ppm, 77.02 ppm, and 76.77 ppm were peaks associated with the deuterated chloroform used for collecting the $^{13}$C NMR spectrum. The characteristic peak identifying Example 1 was at 139.05 ppm.

Figure 4:
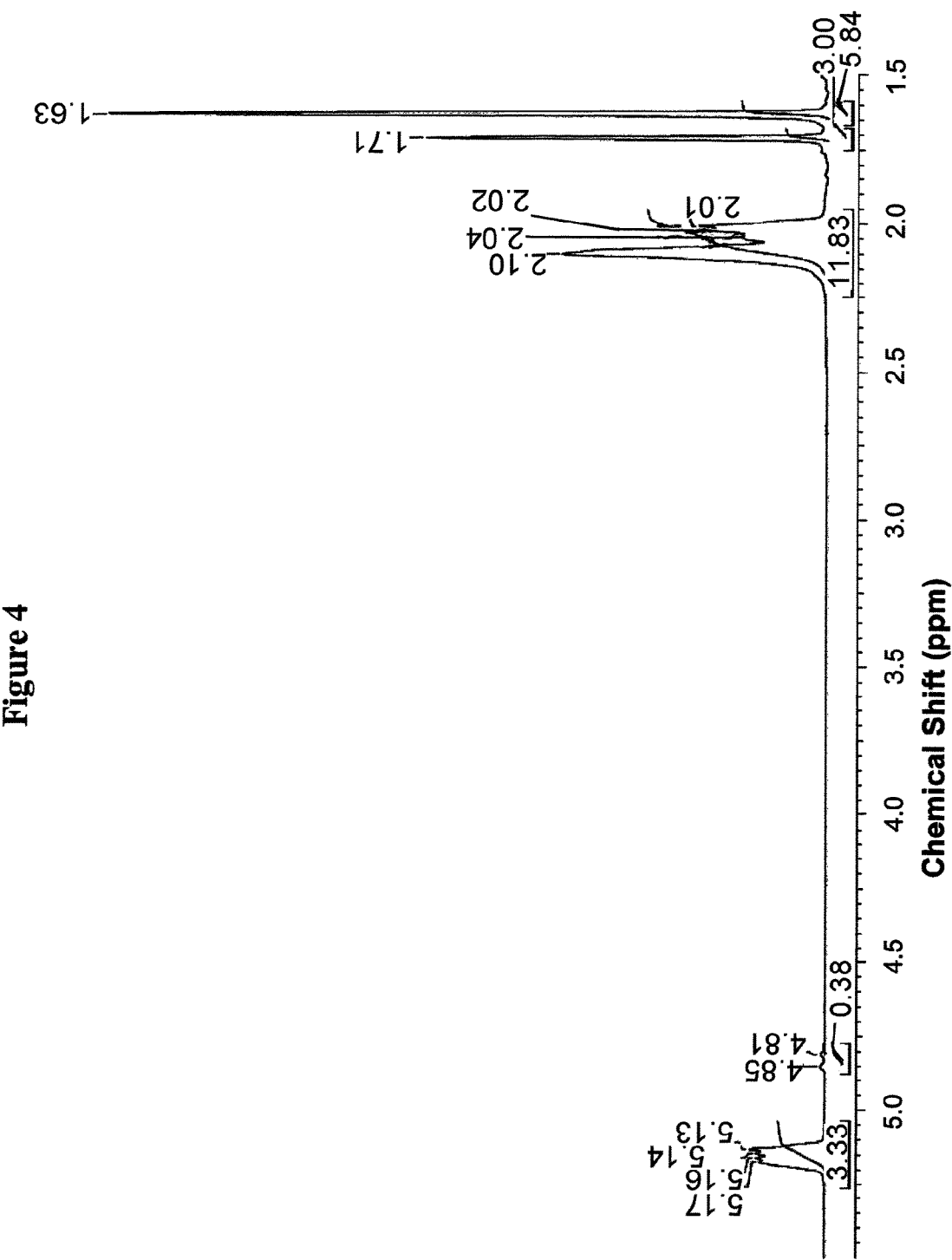
FIG. 4 depicts a $H^1$ NMR spectrum of Example 1.

FIG. 4 shows the $^1$H NMR spectrum of Example 1. Peaks at 4.85 ppm and 4.81 ppm were peaks associated with 3,4-microstructure. Peaks at 5.17 ppm, 5.16 ppm, 5.14 ppm, and 5.13 ppm were peaks associated with 1,4- and 3,4-microstructures. Based on the areas under the peaks of FIG. 4, about 12% of farnesene units in Example 1 was found to have 3,4-microstructure.

Figure 5:
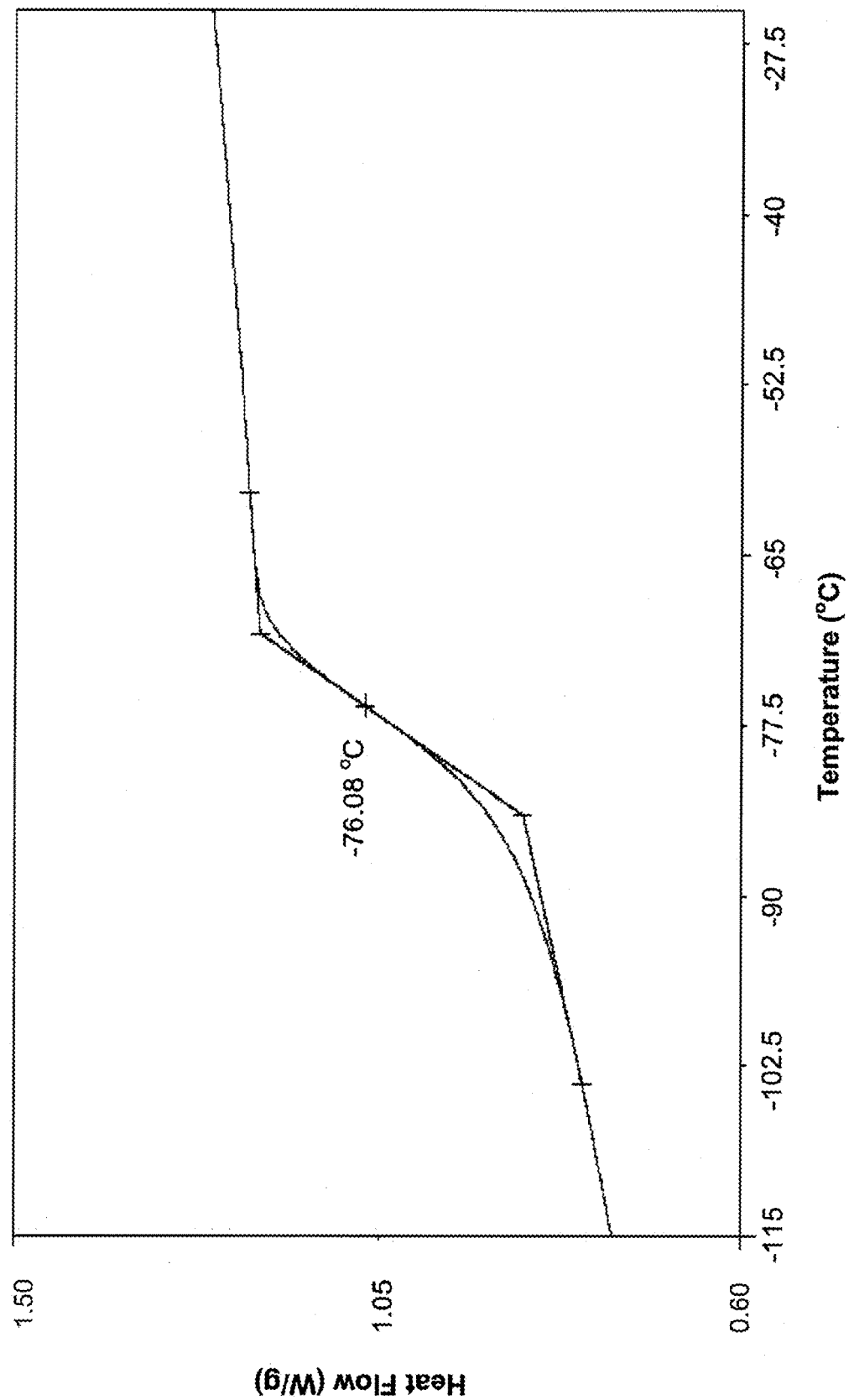
FIG. 5 depicts a Differential Scanning Calorimetry (DSC) curve of Example 1.

The DSC curve of Example 1 is shown in FIG. 5. The thermal characteristics of Example 1 were measured by DSC. The T$_g$ of Example 1 was found to be about −76° C. No other thermal event was detected between −175° C. and 75° C.

Figure 6:
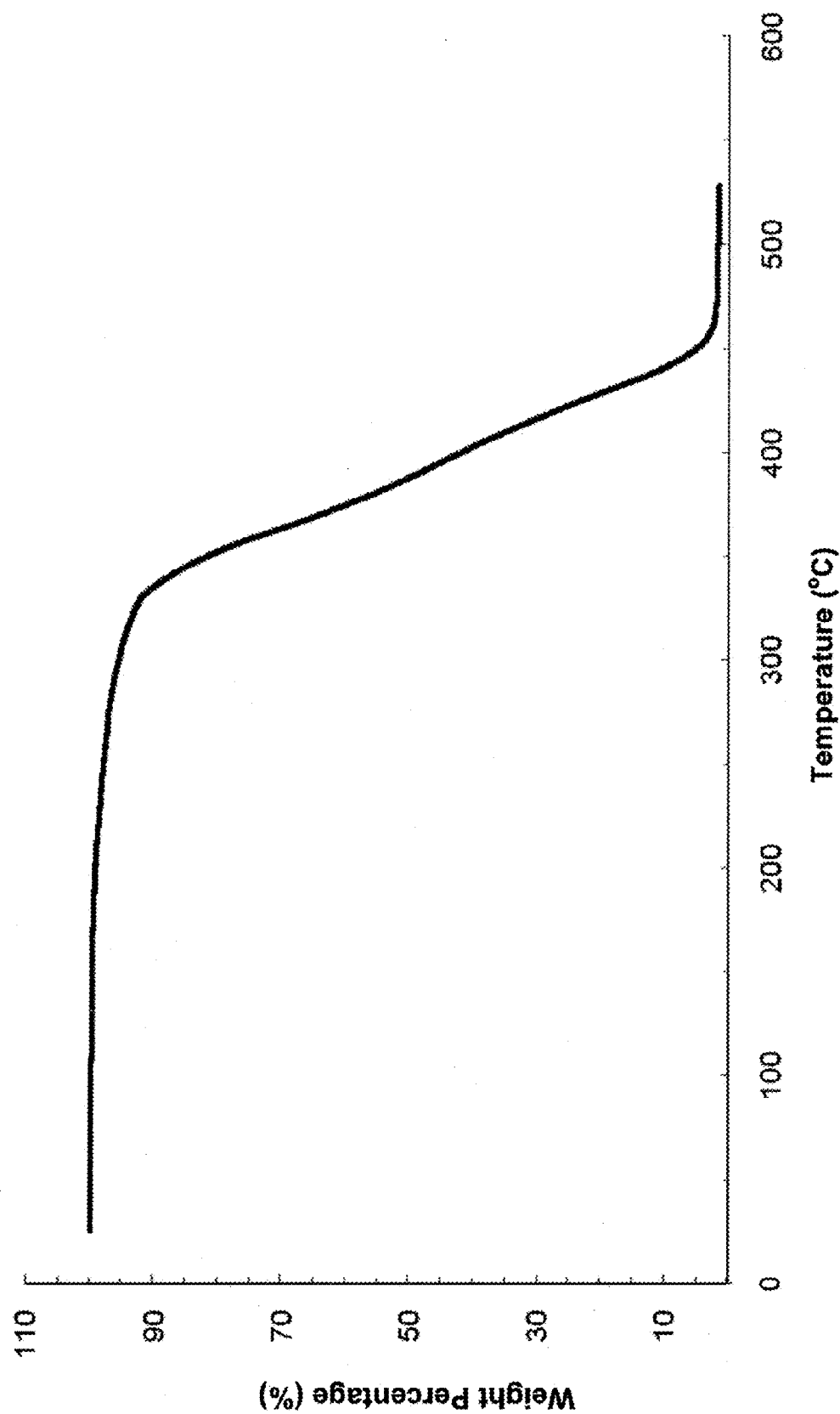
FIG. 6 depicts a Thermal Gravimetric Analysis (TGA) curve of Example 1 measured in air.

The TGA curve of Example 1 measured in air is shown in FIG. 6. The decomposition temperature of Example 1 in air was determined by TGA. The 1% weight loss of Example 1 in air was recorded at 210° C. and the 5% weight loss of Example 1 in air was recorded at 307° C.

Figure 7:
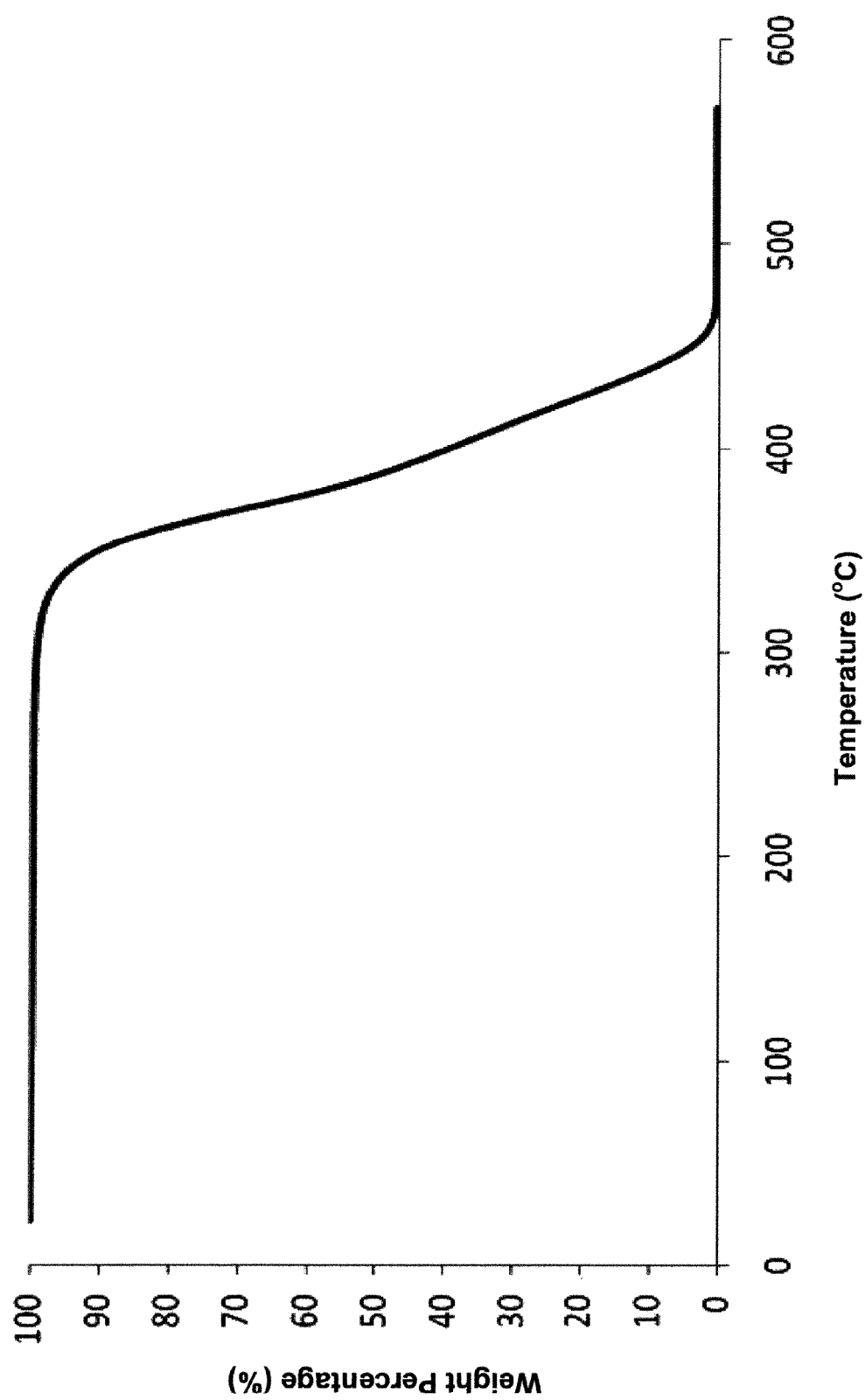
FIG. 7 depicts a Thermal Gravimetric Analysis (TGA) curve of Example 1 measured in nitrogen.

The TGA curve of Example 1 measured under nitrogen atmosphere is shown in FIG. 7. The 1% weight loss of Example 1 under nitrogen atmosphere was recorded at 307° C. and the 5% weight loss of Example 1 under nitrogen atmosphere was recorded at 339° C.

Figure 8:
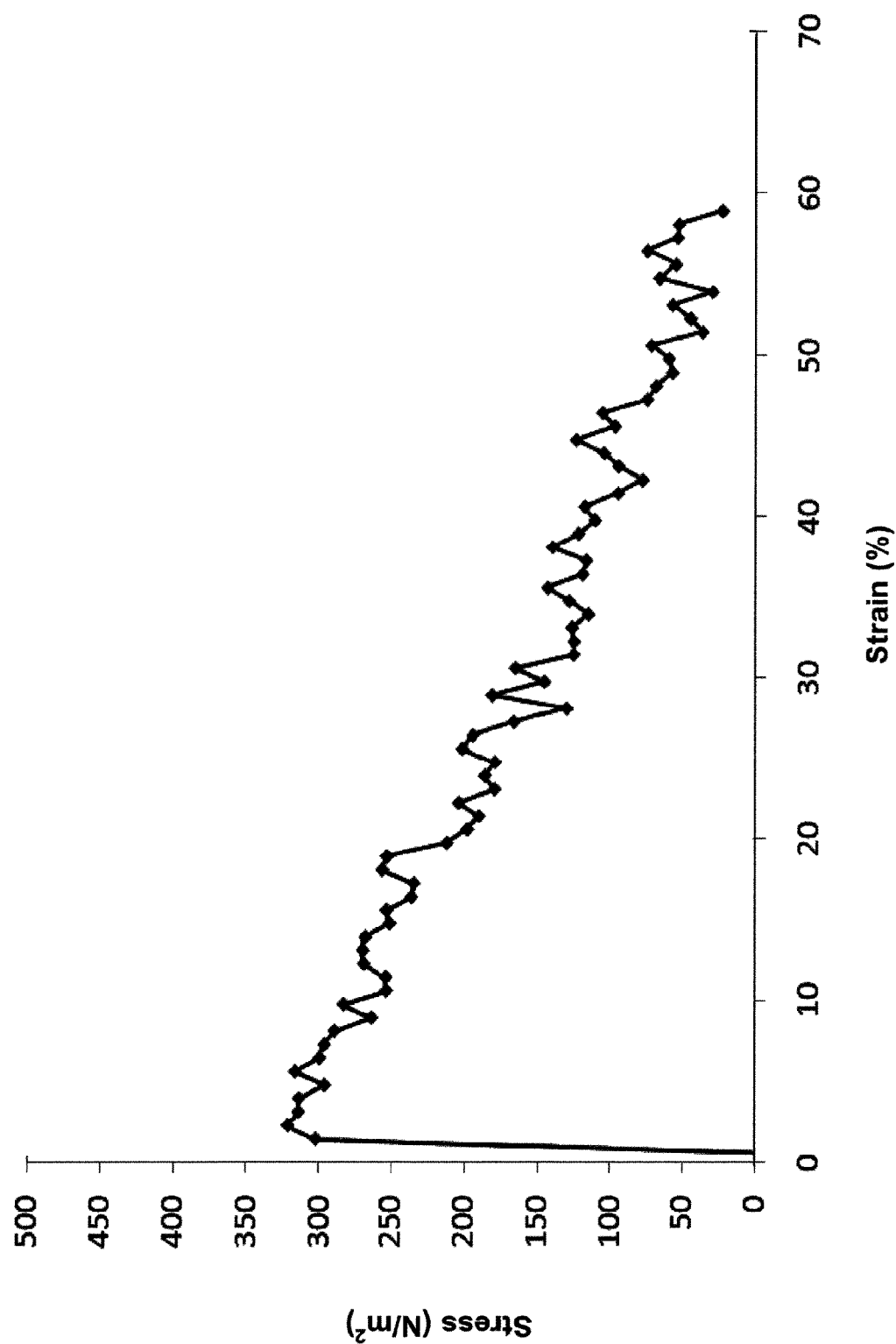
FIG. 8 depicts lap test results of Example 1.

Example 1 was observed to be tacky. The lap test results of Example 1 are shown in FIG. 8. The adhesive capability of Example 1 was measured by the lap test. The adhesive energy of Example 1 was found to be about 11,400 J/m$^2$ with a peak stress of about 314 N/m$^2$.

Example 2

1,4-Polyfarnesene Having a M$_n$ of 245,000

Example 2 is a 1,4-polyfarnesene having a M$_n$ of about 245,000 g/mol. Example 2 was synthesized similarly according to the procedure for Example 1, except sec-butyl lithium was used as the initiator. The net weight of Example 2 was found to be 83.59 g (yield 71.4%). The yield is lower because aliquots were removed to monitor the progression of the reaction.

Figure 9:
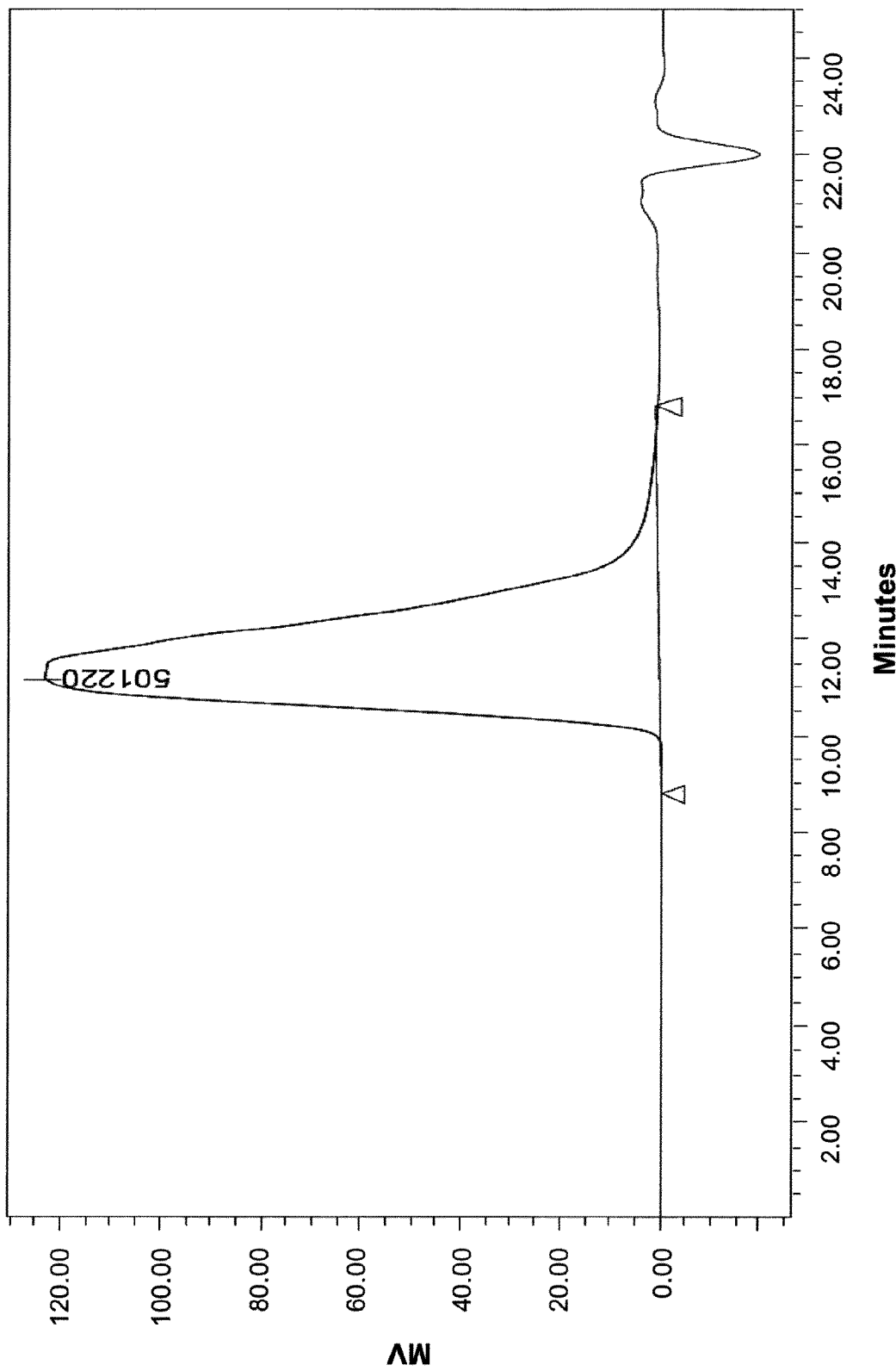
FIG. 9 depicts a GPC curve of Example 2.

The molecular weight and polydispersity of Example 2 were determined by GPC. FIG. 9 shows the GPC curve of Example 2. The M$_n$, M$_w$, M$_p$, M$_z$, M$_{z+1}$, polydispersity, M$_z$/M$_w$, and M$_{z+1}$/M$_w$ of Example 2 are shown in Table 2. The number of farnesene units in Example 2 was calculated to be about 2000. Because of the increased molecular weight of Example 2, it had a higher level of entanglement and longer relaxation time than Example 1.

TABLE 2

| Properties | Example 2 |
|---|---|
| M$_n$ | 244,747 g/mol |
| M$_w$ | 457,340 g/mol |
| M$_p$ | 501,220 g/mol |
| M$_z$ | 768,187 g/mol |
| M$_{z+1}$ | 1,132,362 g/mol |
| Polydispersity | 1.868622 |
| M$_z$/M$_w$ | 1.679684 |
| M$_{z+1}$/M$_w$ | 2.475971 |

Figure 10:
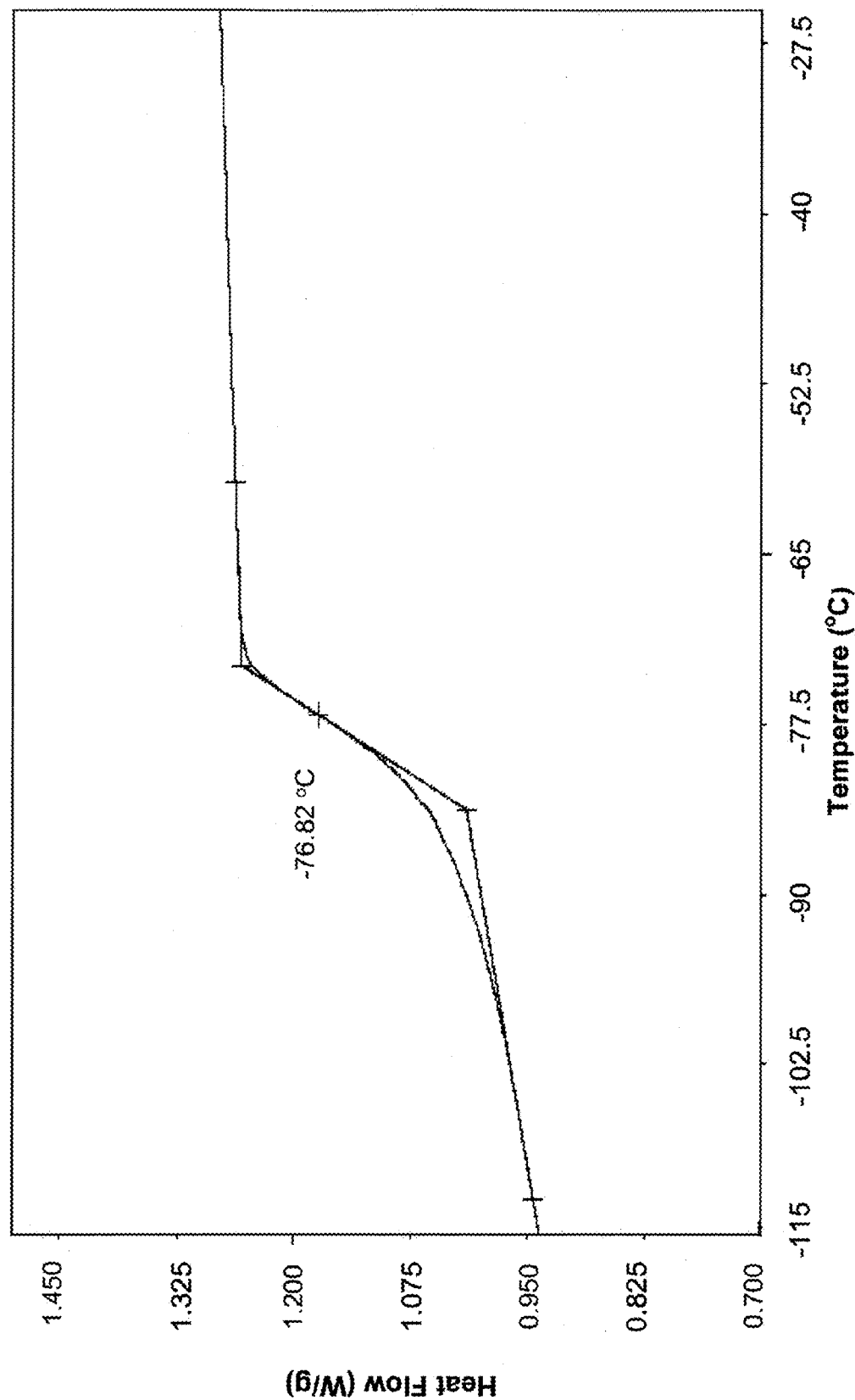
FIG. 10 depicts a DSC curve of Example 2.

The DSC curve of Example 2 is shown in FIG. 10. The thermal characteristics of Example 2 were measured by DSC. The T$_g$ of Example 2 was found to be about −76° C.

Figure 11:
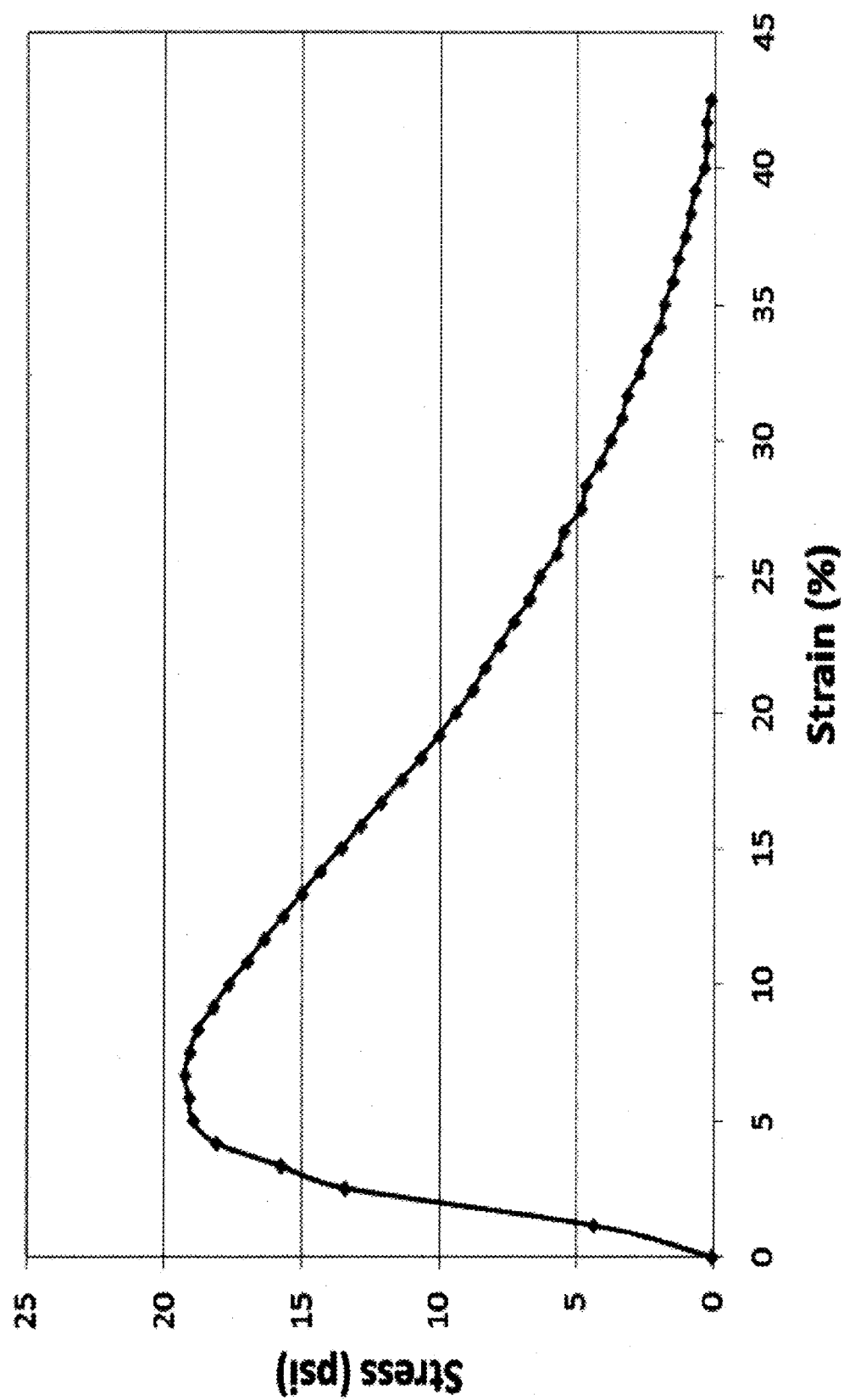
FIG. 11 depicts tensile test results of Example 2.

The tensile test results of Example 2 are shown in FIG. 11. The tensile strength of Example 2 was measured by a tensile test. Example 2 was observed to be soft, tacky and yielded quickly. As shown in FIG. 11, the peak elongation of Example 2 was found to be about 6% with a maximum tensile strength of about 19 psi. The modulus of Example 2 was calculated to be about 4.6 kpsi. Example 2 continued to yield to about 40% elongation.

Example 3

3,4-Polyfarnesene

Example 3 was synthesized similarly according to the procedure for Example 1 except that n-butyl lithium (1.71×10$^{-3}$ mol) was added in the presence of N,N,N',N'-tetramethylethylenediamine (1.71×10$^{-3}$ mol, TMEDA, obtained from Sigma-Aldrich, St. Louis, Mo.). The net weight of Example 3 was found to be 82.72 g (yield 97%).

Figure 12:
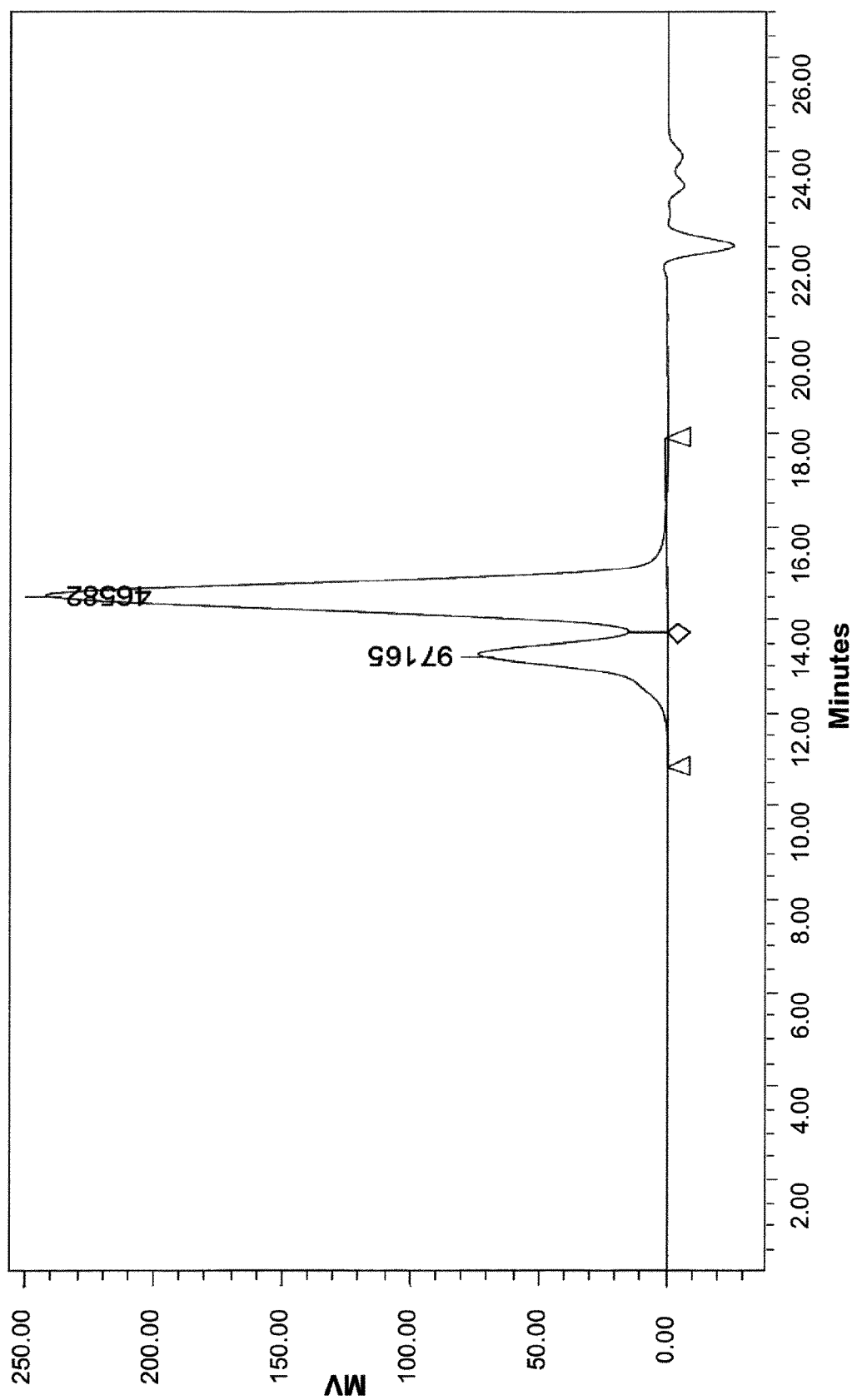
FIG. 12 depicts a GPC curve of Example 3.

The molecular weight and polydispersity of Example 3 were determined by GPC. FIG. 12 shows the GPC curve of Example 3. The two peaks in FIG. 12 indicated that two distinct weight fractions formed in Example 3. The M$_n$, M$_w$, M$_z$, M$_{z+1}$, polydispersity, M$_z$/M$_w$, and M$_{z+1}$/M$_w$ of Example 3 are shown in Table 3. The M$_p$ of the first peak in FIG. 12 was about 97,165 g/mol. The M$_p$ of the second peak in FIG. 12 was about 46,582 g/mol. The number of farnesene units in Example 3 was calculated to be about 240.

TABLE 3

| Properties | Example 3 |
|---|---|
| M$_n$ | 45,818 g/mol |
| M$_w$ | 47,644 g/mol |
| M$_z$ | 49,134 g/mol |
| M$_{z+1}$ | 50,527 g/mol |
| Polydispersity | 1.039844 |
| M$_z$/M$_w$ | 1.031269 |
| M$_{z+1}$/M$_w$ | 1.060509 |

Figure 13:
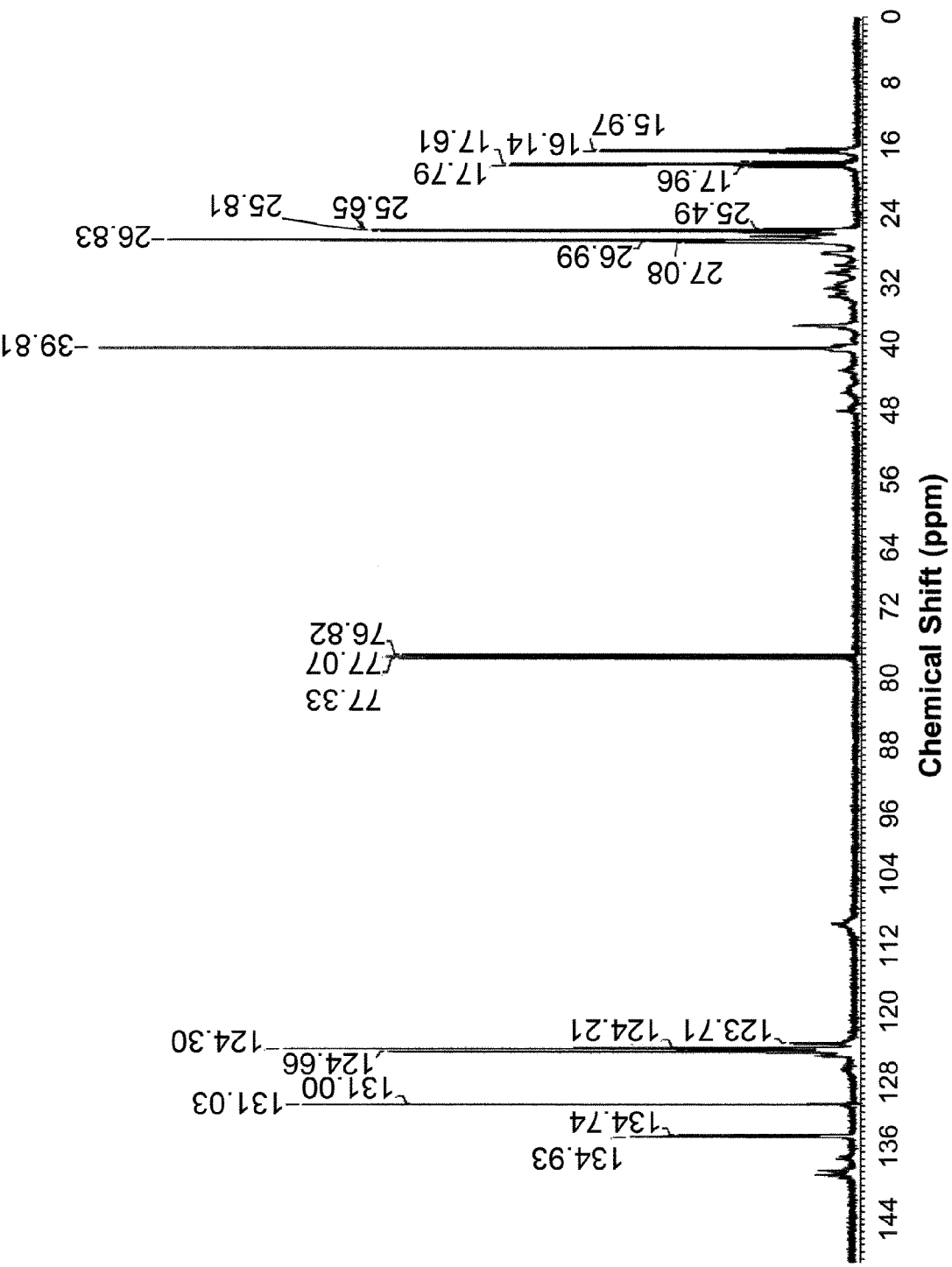
FIG. 13 depicts a $C^{13}$ NMR spectrum of Example 3.

FIG. 13 shows the $^{13}$C NMR spectrum of Example 3. Peaks at 77.33 ppm, 77.07 ppm, and 76.82 ppm were peaks of deuterated chloroform used for collecting the $^{13}$C NMR spectrum. The characteristic peak identifying Example 1 at 139.05 ppm was absent in FIG. 13, indicating a regular microstructure of Example 3.

Figure 14:
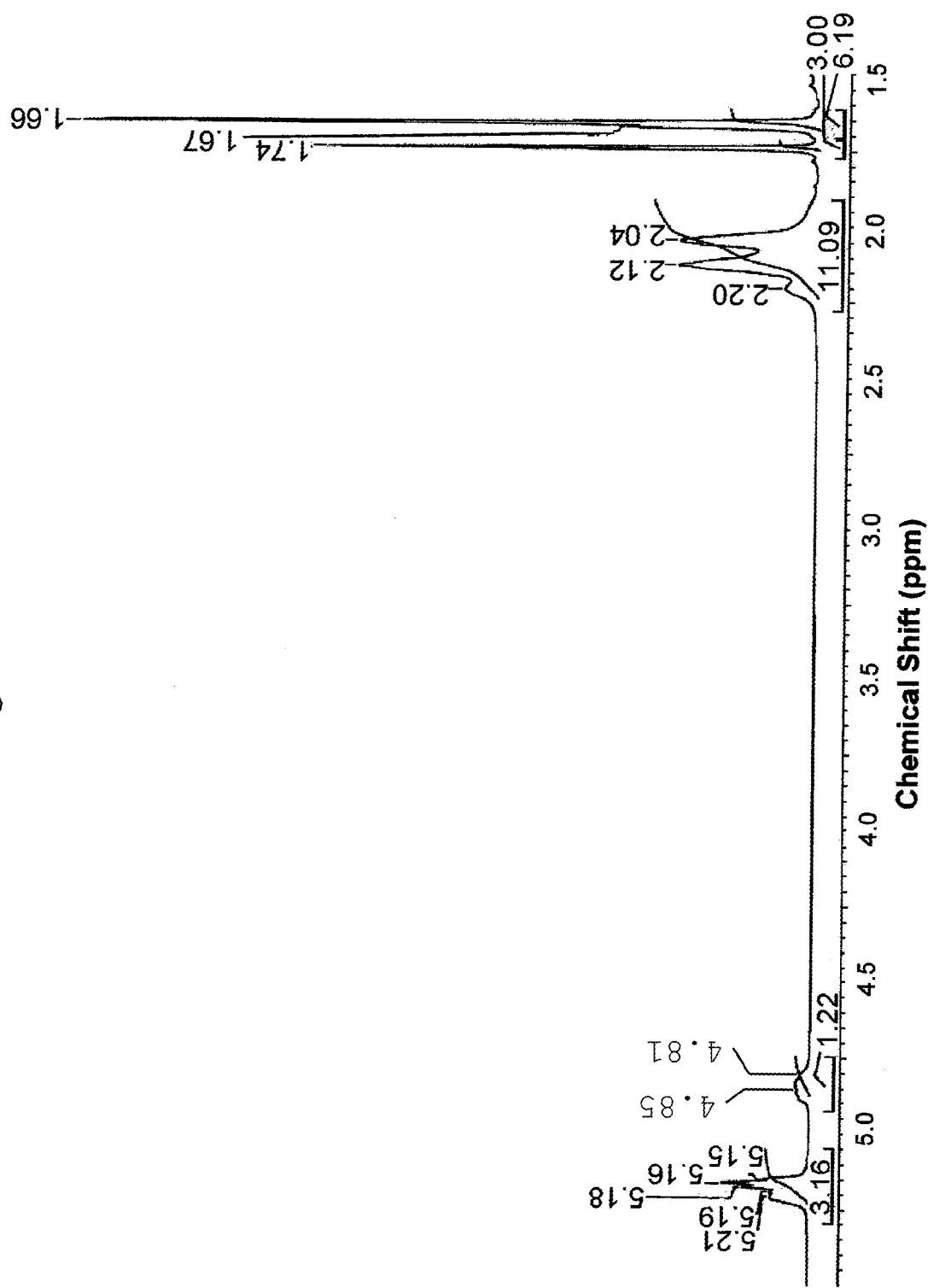
FIG. 14 depicts a $H^1$ NMR spectrum of Example 3.

FIG. 14 shows the $^1$H NMR spectrum of Example 3. Peaks at 4.85 ppm and 4.81 ppm were peaks associated with 3,4-microstructure. Peaks at 5.21 ppm, 5.19 ppm, 5.18 ppm, 5.16 ppm and 5.15 ppm were peaks associated with 1,4- and 3,4-microstructures. Based on the areas under the peaks of FIG. 14, about 10% of farnesene units in Example 3 was found to have 1,4-microstructure.

Figure 15:
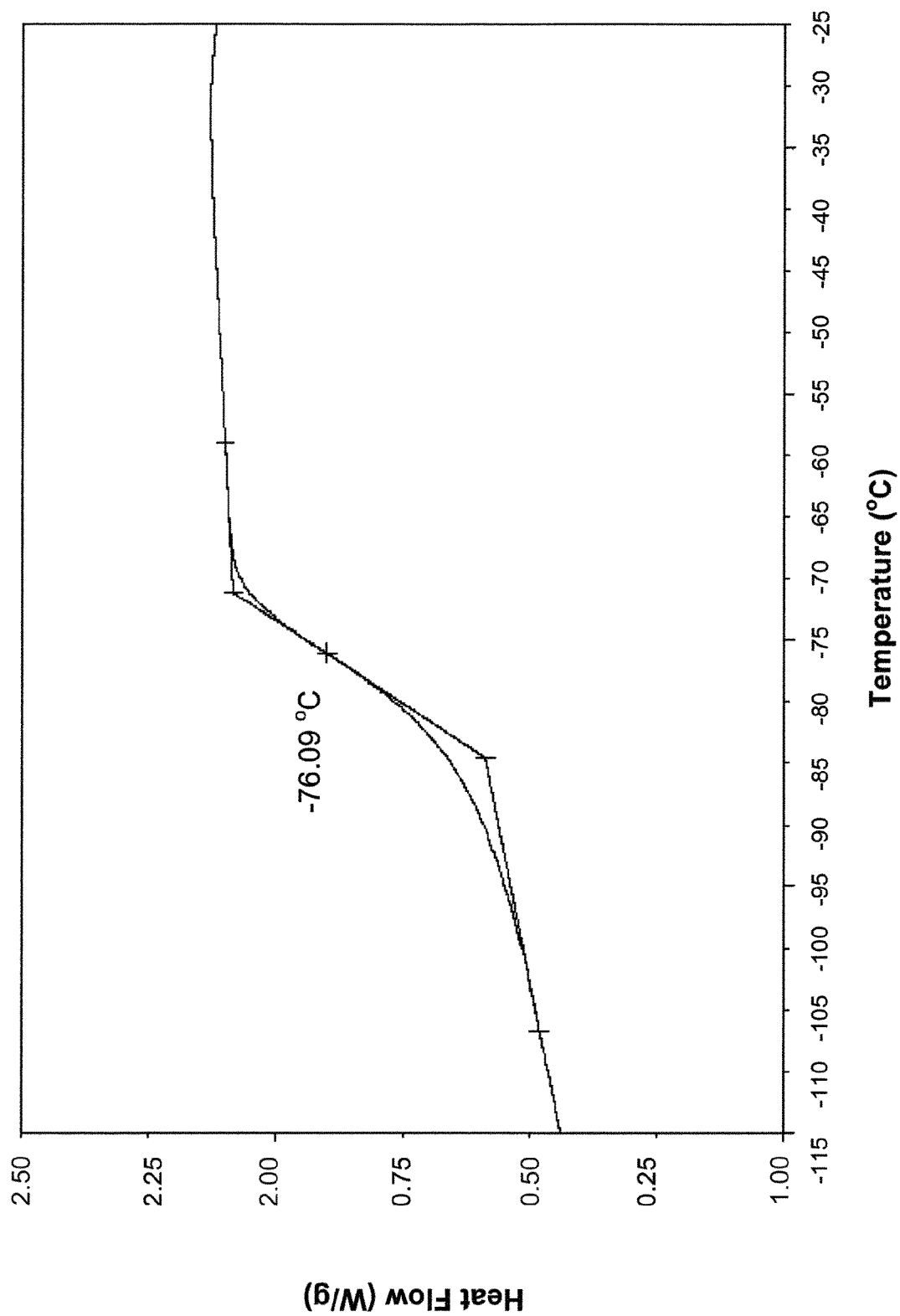
FIG. 15 depicts a DSC curve of Example 3.

The DSC curve of Example 3 is shown in FIG. 15. The thermal characteristics of Example 3 were measured by DSC. The $T_g$ of Example 3 was found to be about −76° C. No other thermal event was detected between −175° C. and 75° C.

Figure 16:
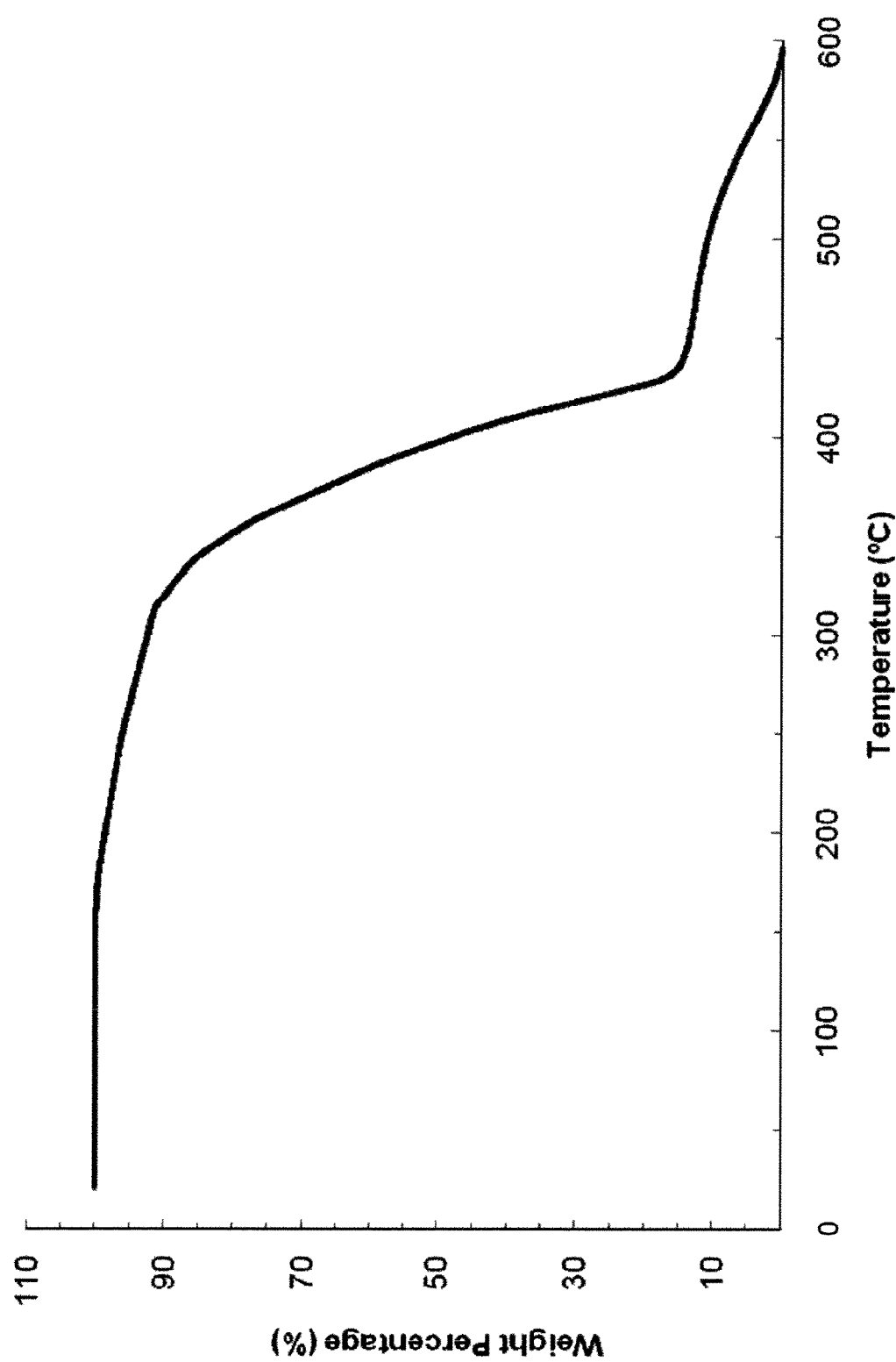
FIG. 16 depicts a TGA curve of Example 3.

The TGA curve of Example 3 measured in air is shown in FIG. 16. The decomposition temperature of Example 3 in air was determined by TGA. The 1% weight loss of Example 3 in air was recorded at 191° C. and the 5% weight loss of Example 3 in air was recorded at 265° C.

Figure 17:
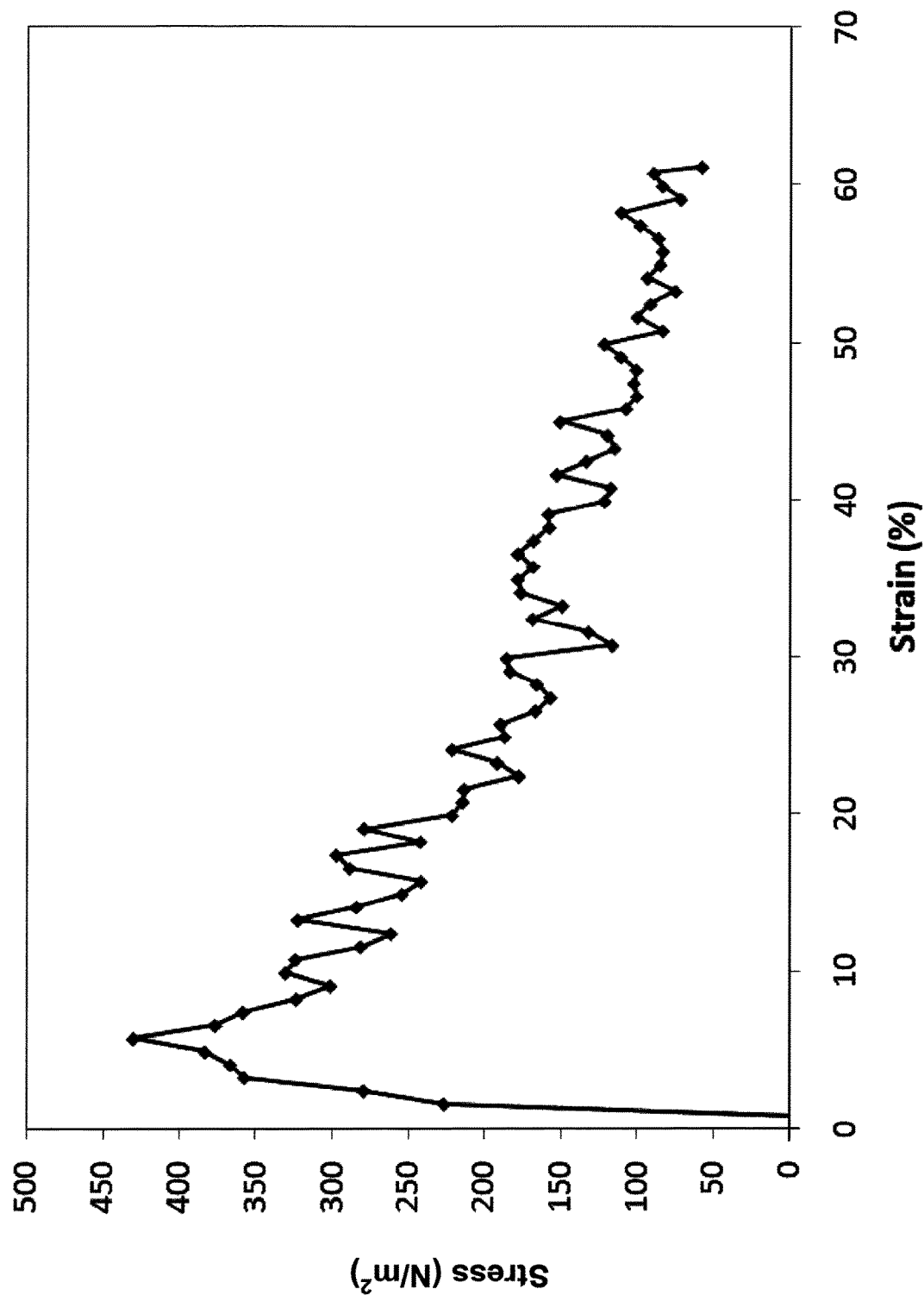
FIG. 17 depicts lap test results of Example 3.

Example 3 was observed to be a highly tacky viscous fluid. The lap test results of Example 3 are shown in FIG. 17. The adhesive capability of Example 3 was measured by the lap test. The adhesive energy of Example 3 was found to be about 12,900 J/m$^2$ with a peak stress of about 430 N/m$^2$.

Example 4

Polystyrene-1,4-Polyfarnesene-Polystyrene

To a first dried three neck reactor under argon atmosphere, a pre-dried solution of 12% β-farnesene in cyclohexane was added. To a second dried three neck reactor under argon atmosphere, a 20.65 g solution of 10% styrene in cyclohexane was added. Afterwards, to the styrene solution, n-butyl lithium (6.88×10$^{-4}$ mol) was added into the reactor as an initiator, and the reactor was heated at about 50° C. for about 16 hours, until all styrene was consumed, as monitored by GPC. Then, 161.8 β-farnesene solution (i.e., 19.6 g of β-farnesene) was transferred to the reactor under argon atmosphere. The reaction was allowed to react until completion for about 7 hours, monitored by GPC. Three equal aliquots of dichlorosilane coupling agent (3.44×10$^{-4}$ mol, obtained from Acros, Morris Plains, N.J.) were then added into the reactor such that the mole ratio of Li to Cl of the reaction mixture was 1:2. The reaction mixture was allowed to react until completion as indicated by a color change from yellow to clear in the reactor. Example 4 was precipitated from the reaction mixture with a 1% solution of t-butyl catachol in ethanol. After drying in a vacuum oven at about 60° C. for about 2 hours, Example 4 was kept under vacuum for about 16 hours. Afterwards, Example 4, collected at 39.15 g (yield 97%), was stored in a refrigerator to prevent any crosslinking before characterization.

Figure 18:
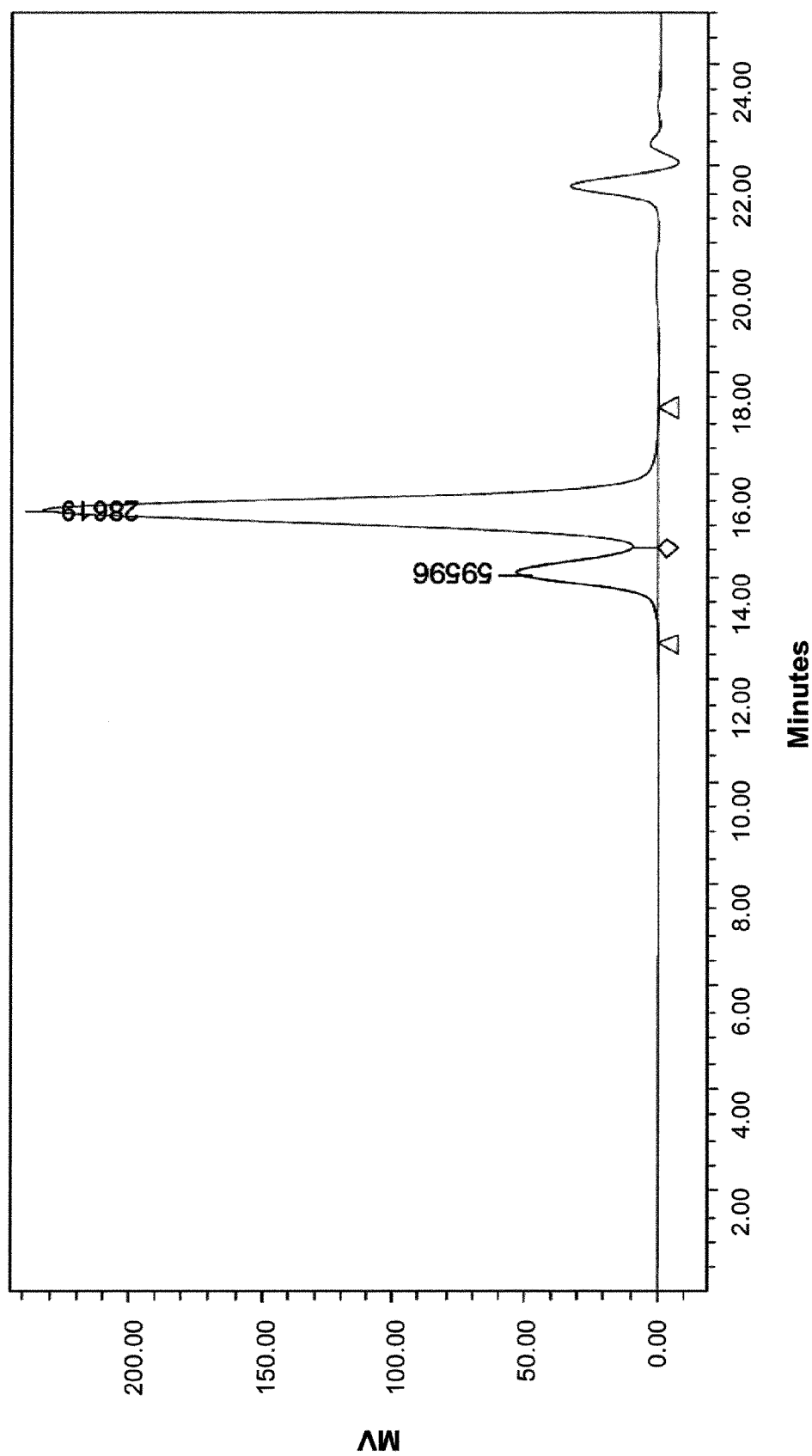
FIG. 18 depicts a GPC curve of polystyrene formed.

The GPC curve of polystyrene is shown in FIG. 18. The progress of polystyrene synthesis reaction was monitored by GPC. The two peaks in FIG. 18 indicated that there were two distinct weight fractions of polystyrene formed. The $M_n$, $M_w$, $M_z$, $M_{z+1}$, polydispersity, $M_z/M_w$, and $M_{z+1}/M_w$ of the polystyrene are shown in Table 4. The $M_p$ of the first peak in FIG. 18 was found to be about 59,596 g/mol. The $M_p$ of the second peak in FIG. 18 was found to be about 28,619 g/mol.

TABLE 4

| Properties | Polystyrene |
| --- | --- |
| $M_n$ | 28,396 g/mol |
| $M_w$ | 29,174 g/mol |
| $M_z$ | 29,895 g/mol |
| $M_{z+1}$ | 30,598 g/mol |
| Polydispersity | 1.027385 |
| $M_z/M_w$ | 1.024739 |
| $M_{z+1}/M_w$ | 1.048810 |

Figure 19:
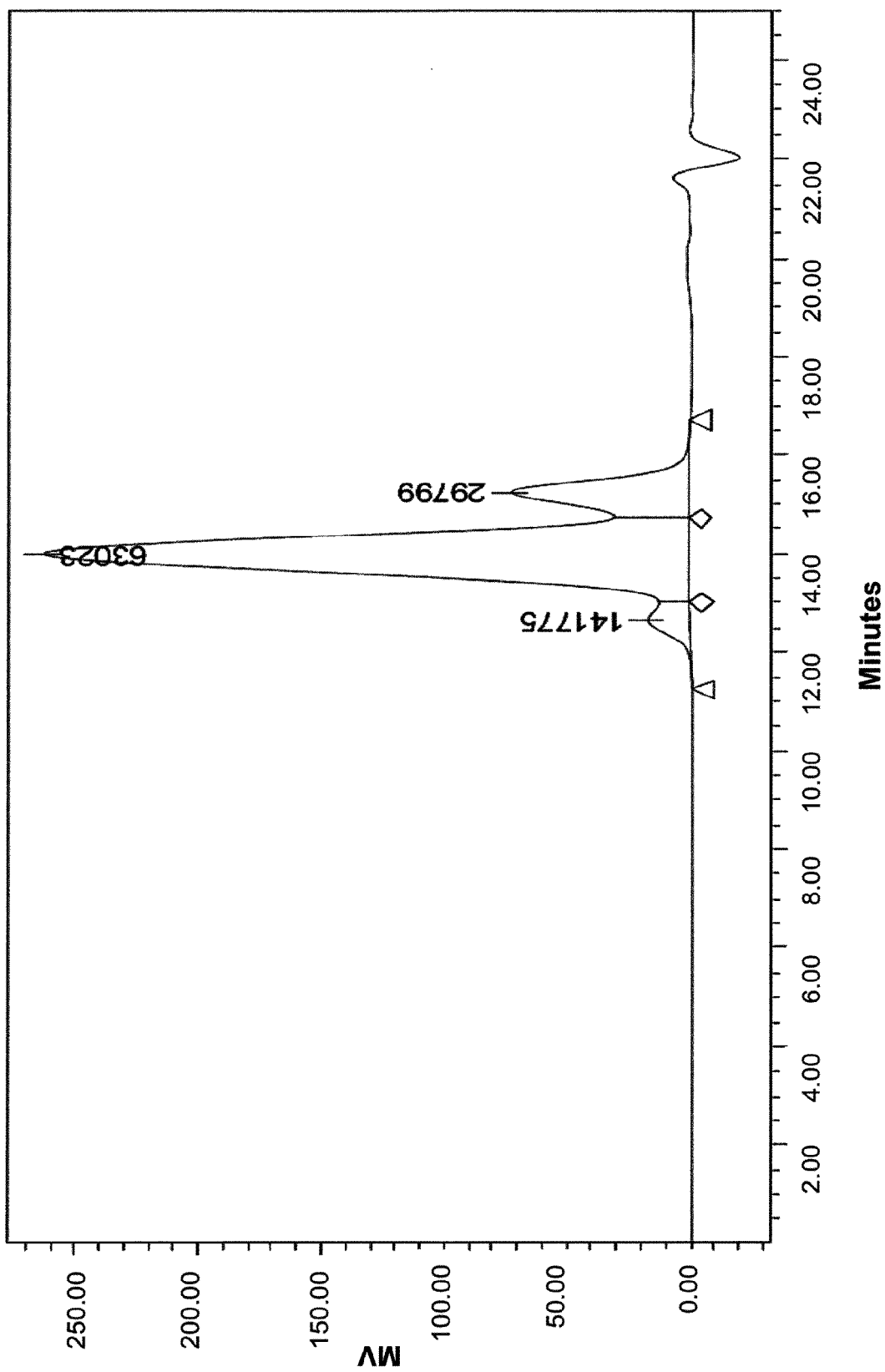
FIG. 19 depicts a GPC curve of polystyrene-1,4-polyfarnesene di-block copolymer formed.

The polystyrene formed then acted as an initiator to initiate the polymerization with β-farnesene to form a polystyrene-1,4-polyfarnesene di-block copolymer. The GPC curve of the di-block copolymer is shown in FIG. 19. The progress of the di-block copolymer synthetic reaction was monitored by GPC. The three peaks in FIG. 19 indicated that there were three distinct weight fractions in the di-block copolymer reaction solution. The $M_n$, $M_w$, $M_p$, $M_z$, $M_{z+1}$, polydispersity, $M_z/M_w$, and $M_{z+1}/M_w$ of the di-block copolymer are shown in Table 5. The $M_p$ of the first peak in FIG. 19, corresponding to polystyrene-1,4-polyfarnesene-polystyrene, was found to be about 141,775 g/mol. The $M_p$ of the second peak in FIG. 19, corresponding to the di-block copolymer, was found to be about 63,023 g/mol. The molecular weight of 1,4-polyfarnesene in the di-block copolymer was calculated to be about 35,000 g/mol. The $M_p$ of the third peak in FIG. 19, corresponding to polystyrene, was found to be about 29,799 g/mol.

TABLE 5

| Properties | Polystyrene-1,4-polyfarnesene Di-block Copolymer |
| --- | --- |
| $M_n$ | 29,434 g/mol |
| $M_w$ | 30,345 g/mol |
| $M_p$ | 29,799 g/mol |
| $M_z$ | 31,172 g/mol |
| $M_{z+1}$ | 31,936 g/mol |
| Polydispersity | 1.030949 |
| $M_z/M_w$ | 1.027264 |
| $M_{z+1}/M_w$ | 1.052449 |

Figure 20:
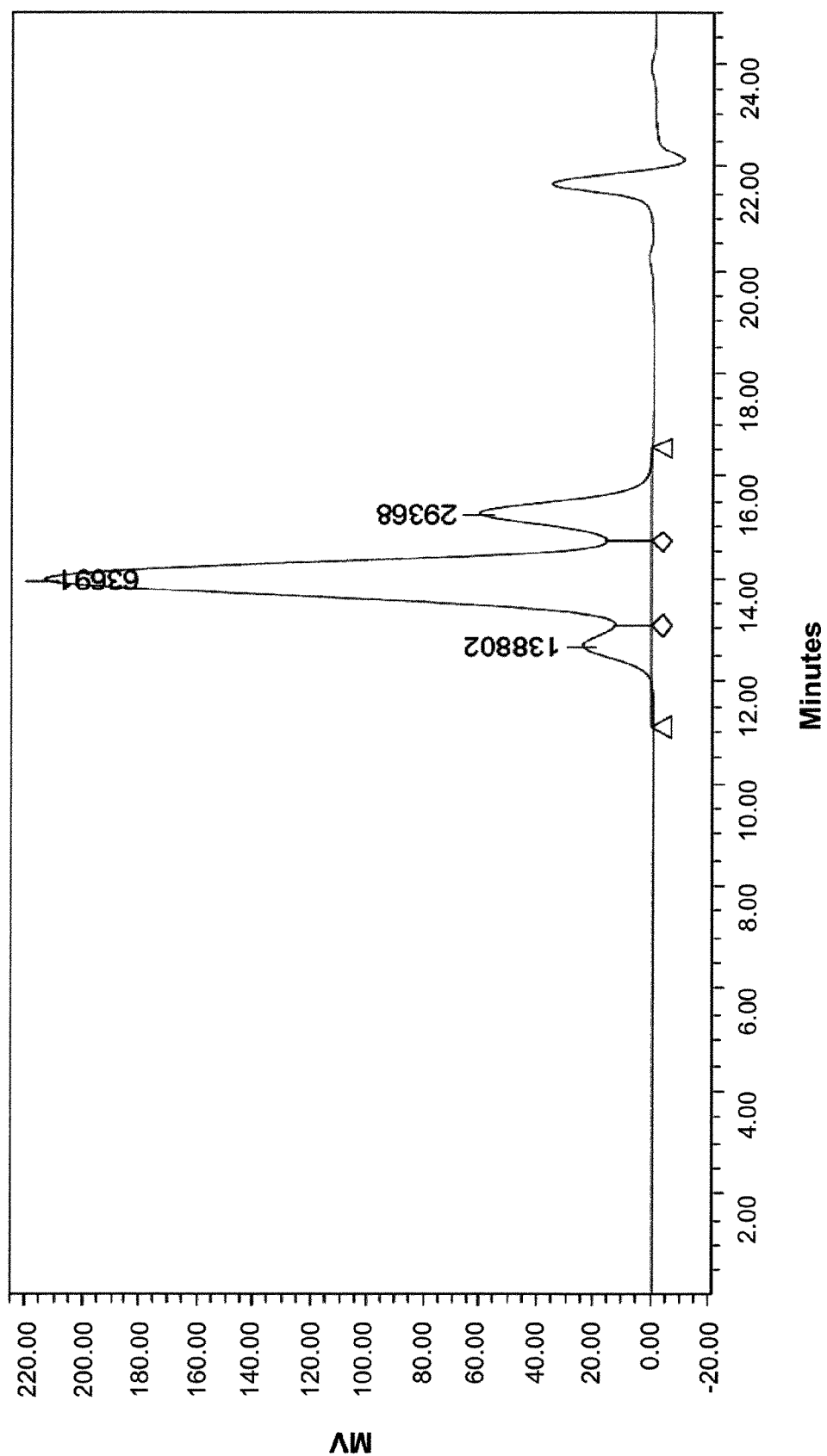
FIG. 20 depicts a GPC curve of Example 4.

The polystyrene-1,4-polyfarnesene di-block copolymer was further coupled to form Example 4. FIG. 20 shows the GPC curve of Example 4. The molecular weight and polydispersity of Example 4 were determined by GPC. The three peaks in FIG. 20 indicated that there were three distinct weight fractions for the coupling product formed. The $M_n$, $M_w$, $M_z$, $M_{z+1}$, polydispersity, $M_z/M_w$, and $M_{z+1}/M_w$ of the coupling product are shown in Table 6. The $M_p$ of the first peak in FIG. 20, corresponding to Example 4, was found to be about 138,802 g/mol. Example 4 was obtained in about 10% of the coupling product. The number of farnesene monomer units in Example 4 was calculated to be about 300. The $M_p$ of the second peak in FIG. 20, which corresponds to polystyrene-1,4-polyfarnesene di-block copolymers, was found to be about 63,691 g/mol. The $M_p$ of the third peak in FIG. 20, corresponding to polystyrene, was found to be about 29,368 g/mol.

TABLE 6

| Properties | Example 4 |
| --- | --- |
| $M_n$ | 138,240 g/mol |
| $M_w$ | 142,147 g/mol |
| $M_z$ | 146,636 g/mol |
| $M_{z+1}$ | 151,848 g/mol |
| Polydispersity | 1.028264 |

TABLE 6-continued

| Properties | Example 4 |
|---|---|
| $M_z/M_w$ | 1.031576 |
| $M_{z+1}/M_w$ | 1.068242 |

Figure 21:
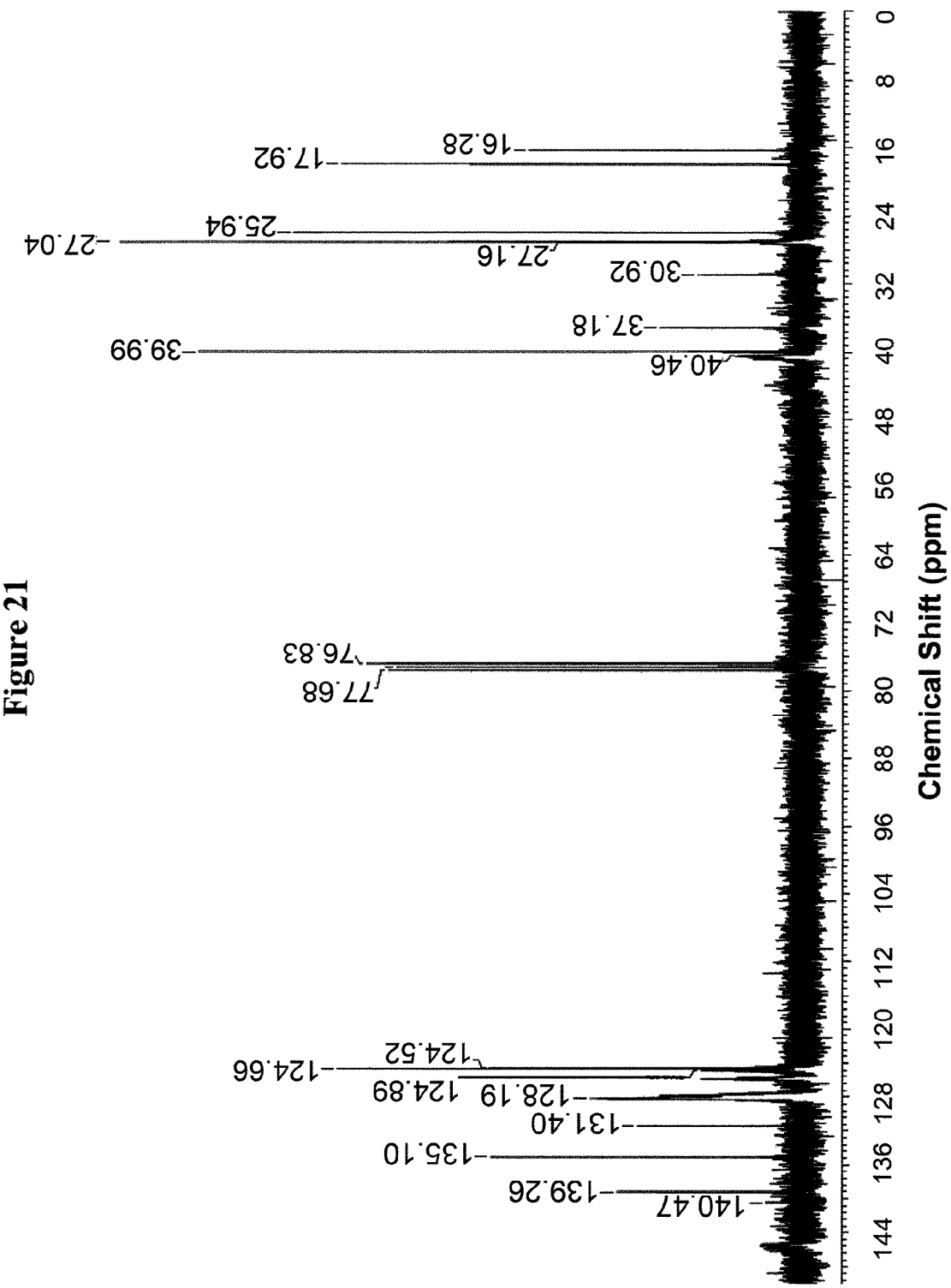
FIG. 21 depicts a $^{13}C$ NMR spectrum of Example 4.

FIG. 21 shows the $^{13}$C NMR spectrum of Example 4. Peaks at 77.68 ppm and 76.83 ppm were peaks of associated with the deuterated chloroform used for collecting the $^{13}$C NMR spectrum. Other peaks in FIG. 21 were peaks associated with 1,4-polyfarnesene and polystyrene. The characteristic peak identifying 1,4-polyfarnesene at 139.26 ppm was present in FIG. 21, indicating the presence of 1,4-polyfarnesene in Example 4.

Figure 22:
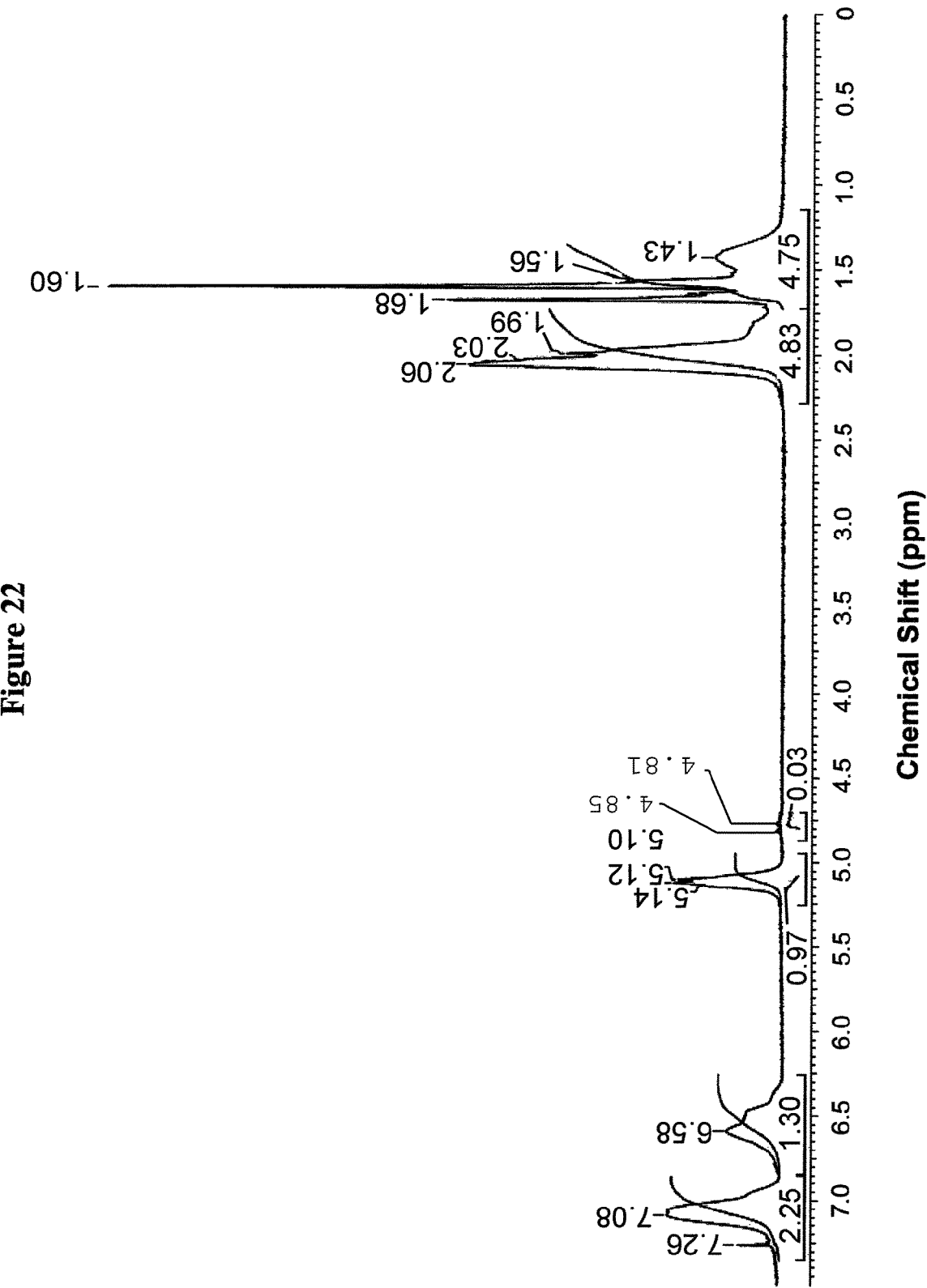
FIG. 22 depicts a $^1H$ NMR spectrum of Example 4.

FIG. 22 shows the $^1$H NMR spectrum of Example 4. Peaks at 4.85 ppm and 4.81 ppm were peaks associated with 3,4-microstructure. Peaks at 5.10 ppm, 5.12 ppm, and 5.14 ppm were peaks associated with 1,4- and 3,4-microstructures. Based on the areas under the peaks of FIG. 22, about 3% of farnesene units in Example 4 was found to have 3,4-microstructure.

Figure 23:
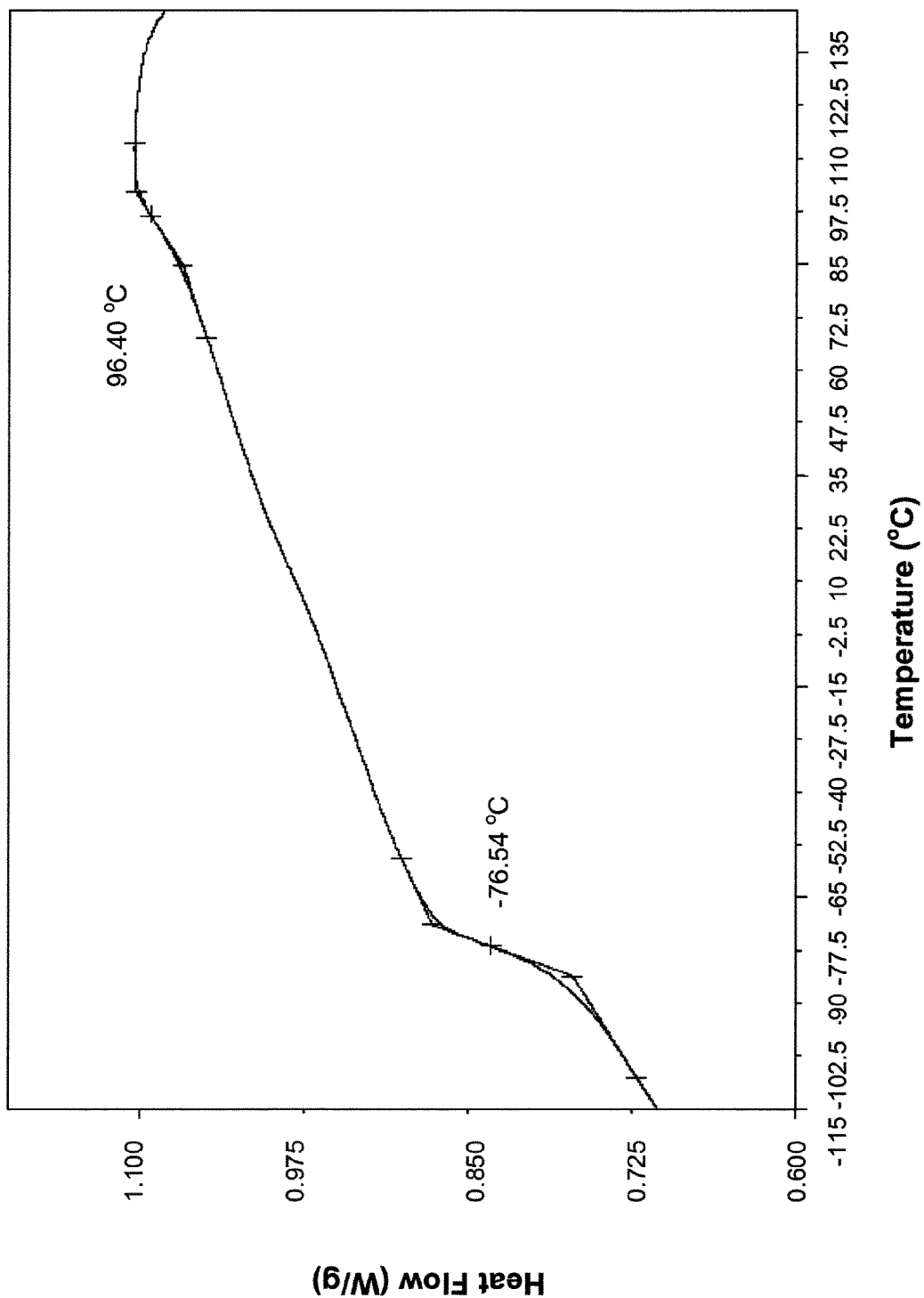
FIG. 23 depicts a DSC curve of Example 4.

The DSC curve of Example 4 is shown in FIG. 23. The thermal characteristics of Example 4 were measured by DSC. The $T_g$ of 1,4-polyfarnesene in Example 4 was found to be about $-76°$ C. The $T_g$ of polystyrene in Example 4 was found to be about $96°$ C. No other thermal event was detected between $-175°$ C. and $75°$ C.

Figure 24:
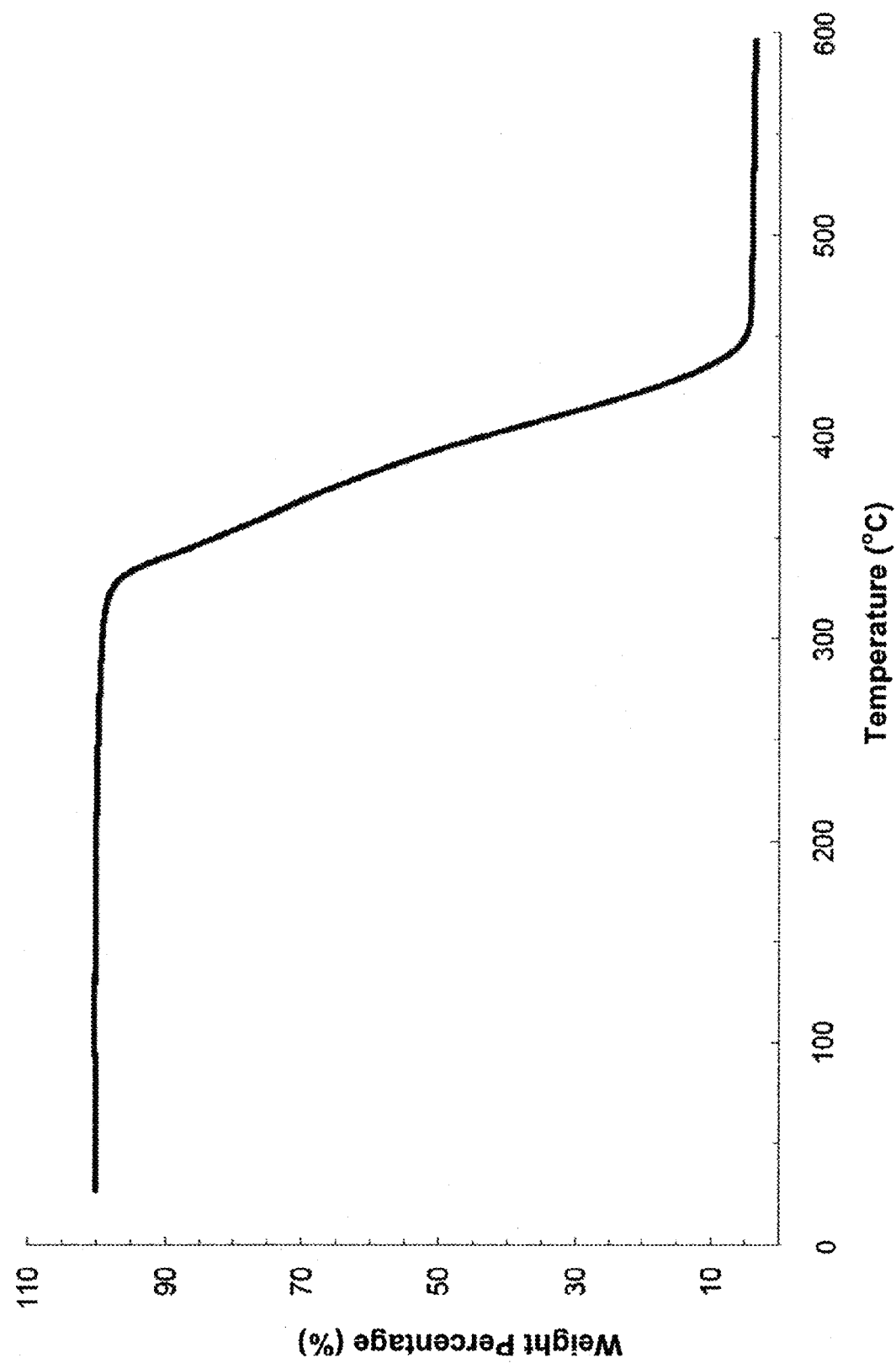
FIG. 24 depicts a TGA curve of Example 4.

The TGA curve of Example 4 measured in air is shown in FIG. 24. The decomposition temperature of Example 4 in air was determined by TGA. The 1% weight loss of Example 4 in air was recorded at $307°$ C. and the 5% weight loss of Example 4 in air was recorded at $333°$ C.

Figure 25:
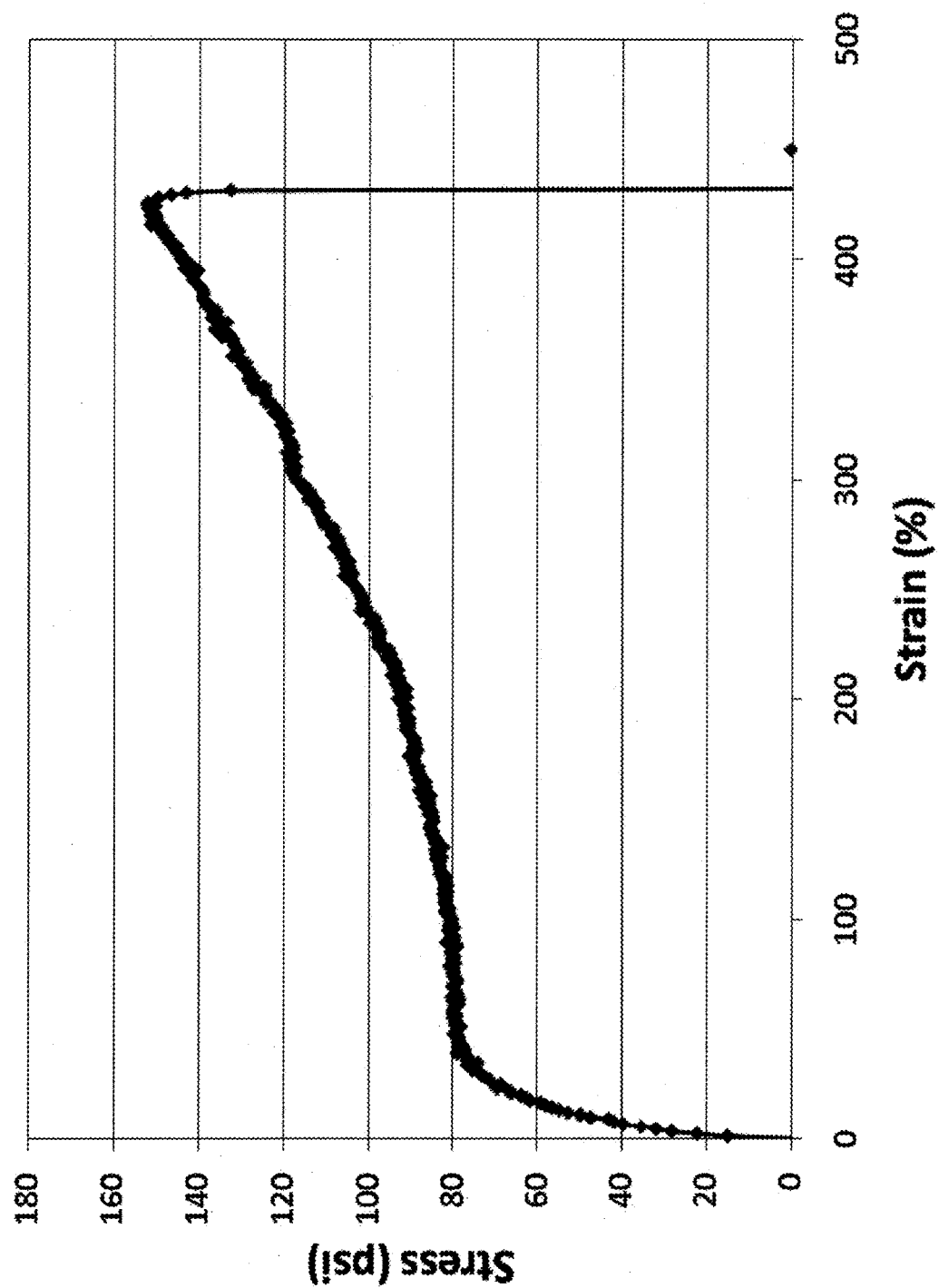
FIG. 25 depicts tensile test results of Example 4.

The tensile test results of Example 4 are shown in FIG. 25. The tensile strength of Example 4 was measured by a tensile test. Example 4 was stiff but yielded. As shown in FIG. 25, the elongation at break of Example 4 was found to be about 425% with a maximum tensile strength of about 152 psi. The modulus of Example 4 was calculated to be about 31.9 kpsi. Stress at 330% elongation of Example 4 was about 122 psi.

Figure 26:
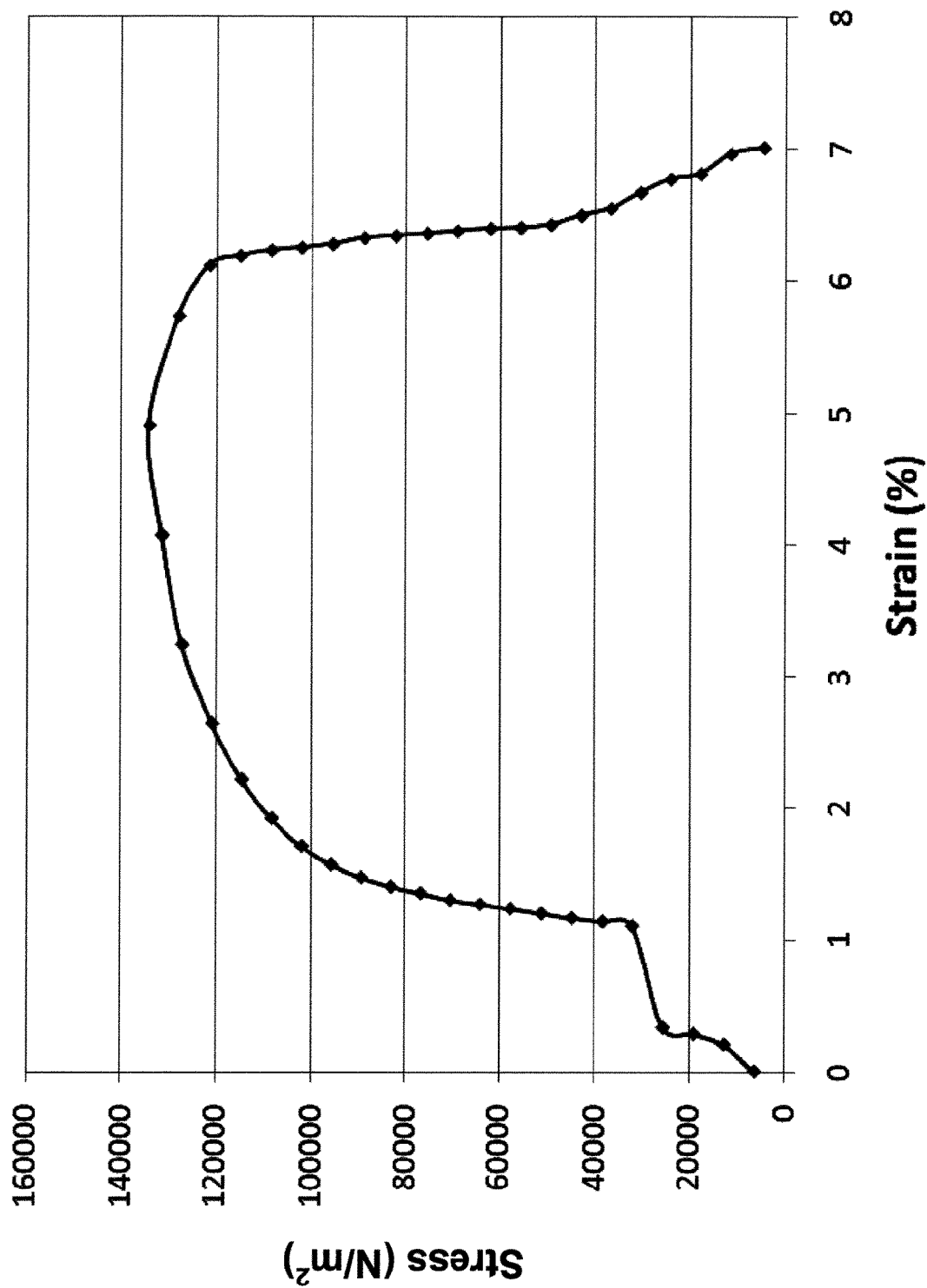
FIG. 26 depicts lap test results of Example 4.

Example 4 was observed to be tacky. The lap test results of Example 4, due to an adhesive failure, are shown in FIG. 26. The adhesive energy of Example 4 was found to be about 2,928,000 J/m$^2$ with a peak stress of about 134,000 N/m$^2$.

Example 5

Polystyrene-3,4-Polyfarnesene-Polystyrene

To a first dried three neck reactor under argon atmosphere, a pre-dried 12% solution of β-farnesene in cyclohexane was added. To a second dried three neck reactor under argon atmosphere, a pre-dried solution of 10% styrene in cyclohexane was added. Afterwards, 141.1 g of the styrene solution (i.e., 14.82 g of styrene) was transferred to a dried reactor under argon atmosphere. A mixture of n-butyl lithium (5.84× $10^{-4}$ mol) and TMEDA (5.02×$10^{-4}$ mol) was added into the reactor as an initiator, and the reactor was heated at about $50°$ C. for about 16 hours, until all styrene was consumed, as monitored by GPC. Then, 143.07 g of β-farnesene solution (i.e., 15.74 g of β-farnesene) was transferred to the reactor under argon atmosphere. The reaction was allowed to react until completion for about 16 hours, as monitored by GPC. Dichlorosilane coupling agent was then added into the reactor in three equal aliquots, such that the mole ratio of Li to Cl was 1:2. The reaction mixture was allowed react until completion as indicated by a color change from yellow to clear in the reactor. Example 5 was precipitated from the reaction mixture by a 1% solution of t-butyl catachol in ethanol. After drying in a vacuum oven at about $60°$ C. for about 2 hours, Example 5 was kept under vacuum for about 16 hours. Afterwards, Example 5, collected at 28.75 g (yield 96%), was stored in a refrigerator to prevent any crosslinking before characterization.

Figure 27:
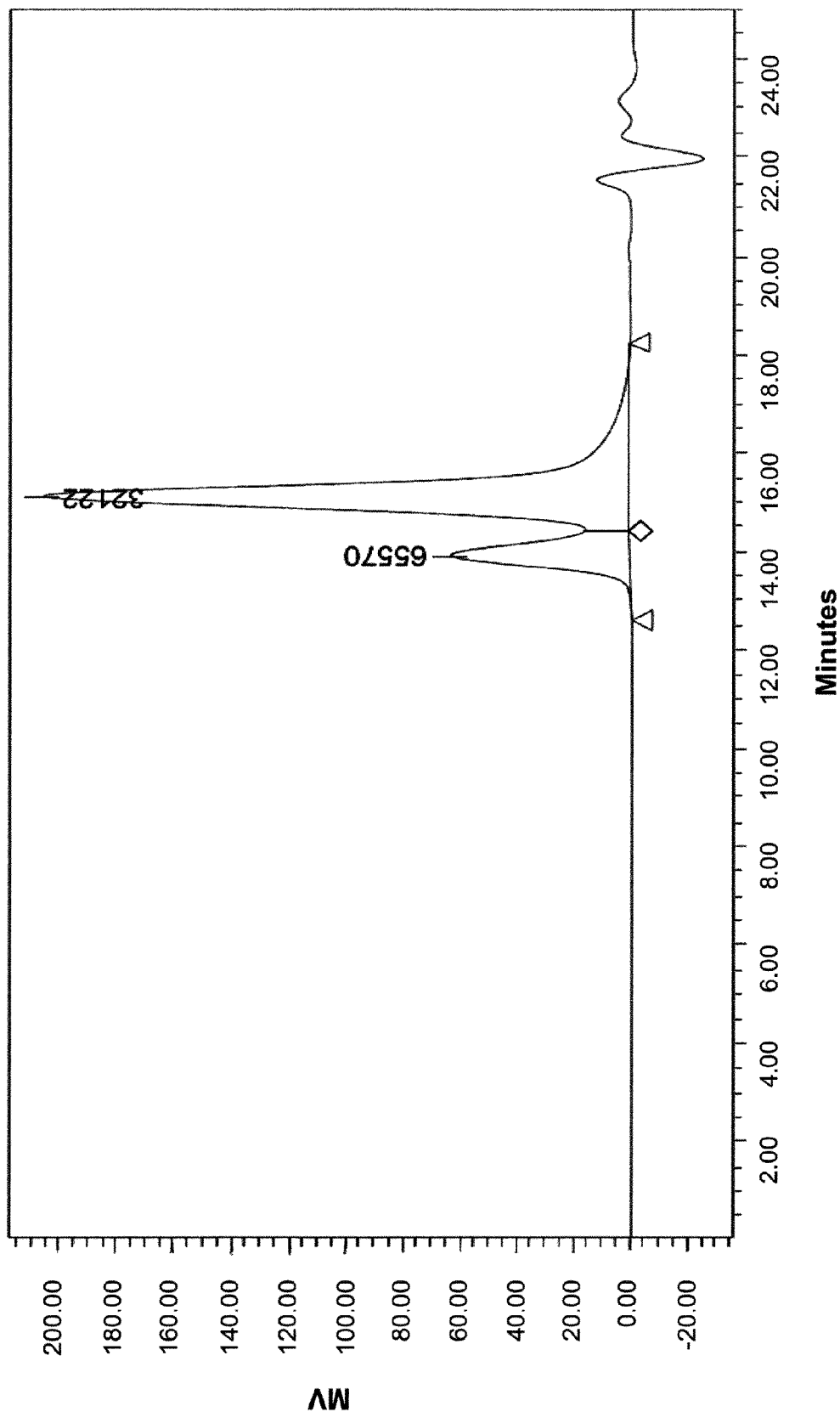
FIG. 27 depicts a GPC curve of polystyrene formed.

The GPC curve of polystyrene is shown in FIG. 27. The progress of synthesizing polystyrene was monitored by GPC. The two peaks in FIG. 27 indicated that there were two distinct weight fractions of polystyrene. The $M_n$, $M_w$, $M_z$, $M_{z+1}$, polydispersity, $M_z/M_w$, and $M_{z+1}/M_w$ of polystyrene are shown in Table 7. The $M_p$ of the first peak in FIG. 27 was found to be about 65,570 g/mol. The $M_p$ of the second peak in FIG. 27 was found to be about 32,122 g/mol.

TABLE 7

| Properties | Polystyrene |
|---|---|
| $M_n$ | 27,915 g/mol |
| $M_w$ | 30,898 g/mol |
| $M_z$ | 32,608 g/mol |
| $M_{z+1}$ | 33,819 g/mol |
| Polydispersity | 1.106849 |
| $M_z/M_w$ | 1.055361 |
| $M_{z+1}/M_w$ | 1.094557 |

Figure 28:
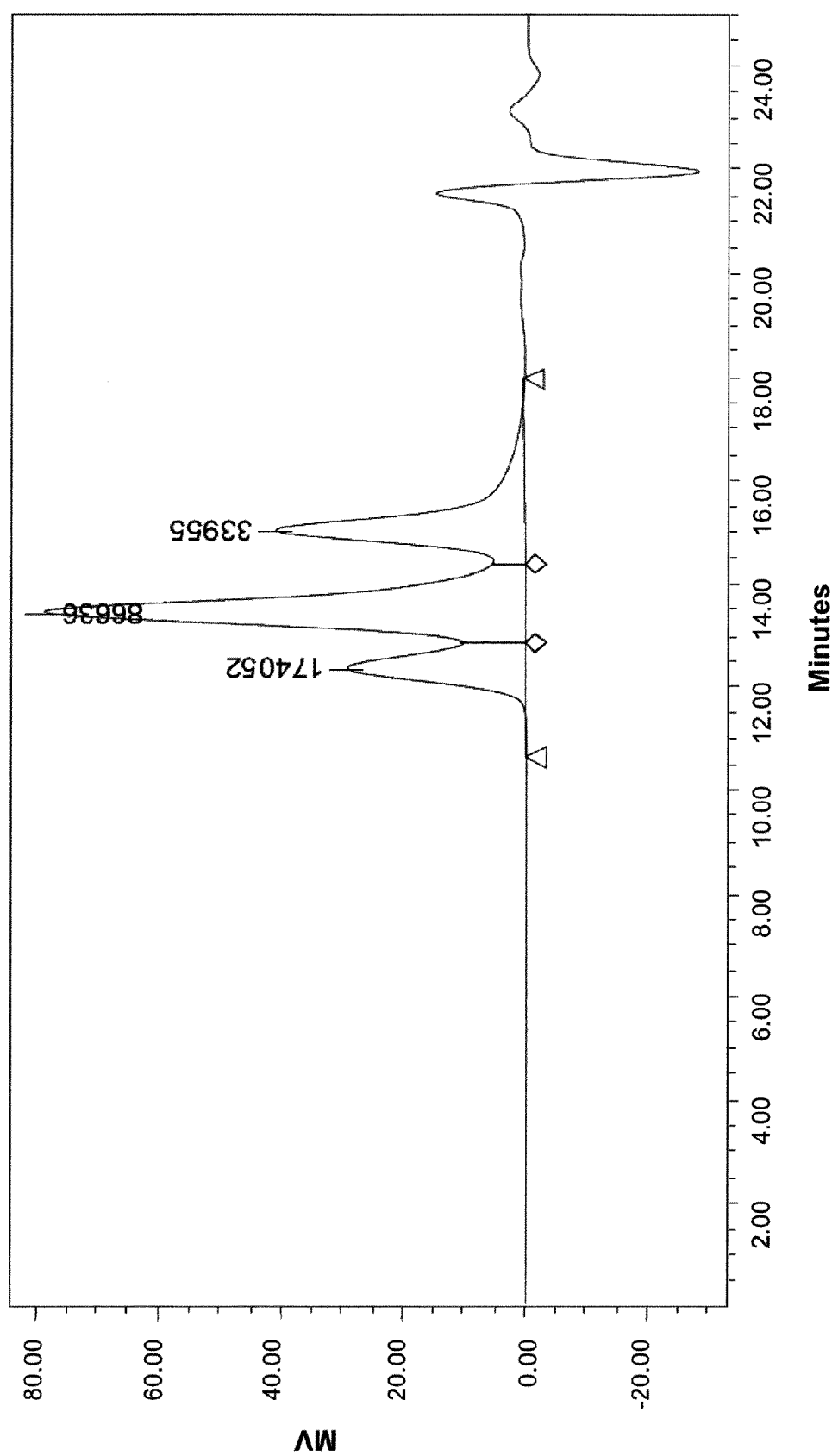
FIG. 28 depicts a GPC curve of polystyrene-3,4-polyfarnesene di-block copolymer formed.

The polystyrene formed then acted as an initiator to initiate the polymerization with β-farnesene to form a polystyrene-3,4-polyfarnesene di-block copolymer. The GPC curve of the di-block copolymer is shown in FIG. 28. The progress of the di-block copolymer synthesis was monitored by GPC. The three peaks in FIG. 28 indicated that there were three distinct weight fractions in the di-block copolymer reaction solution. The $M_n$, $M_w$, $M_z$, $M_{z+1}$, polydispersity, $M_z/M_w$, and $M_{z+1}/M_w$ of the di-block copolymer are shown in Table 8. The $M_p$ of the first peak in FIG. 28, corresponding to polystyrene-3,4-polyfarnesene-polystyrene, was found to be about 174,052 g/mol. The $M_p$ of the second peak in FIG. 28, corresponding to the di-block copolymer, was found to be about 86,636 g/mol. The molecular weight of 3,4-polyfarnesene in the di-block copolymer was calculated to be about 54,000 g/mol. The $M_p$ of the third peak in FIG. 28, corresponding to polystyrene, was found to be about 33,955 g/mol.

TABLE 8

| Properties | Polystyrene-3,4-polyfarnesene Di-block Copolymer |
|---|---|
| $M_n$ | 27,801 g/mol |
| $M_w$ | 31,379 g/mol |
| $M_z$ | 33,539 g/mol |
| $M_{z+1}$ | 35,033 g/mol |
| Polydispersity | 1.128697 |
| $M_z/M_w$ | 1.068833 |
| $M_{z+1}/M_w$ | 1.116447 |

Figure 29:
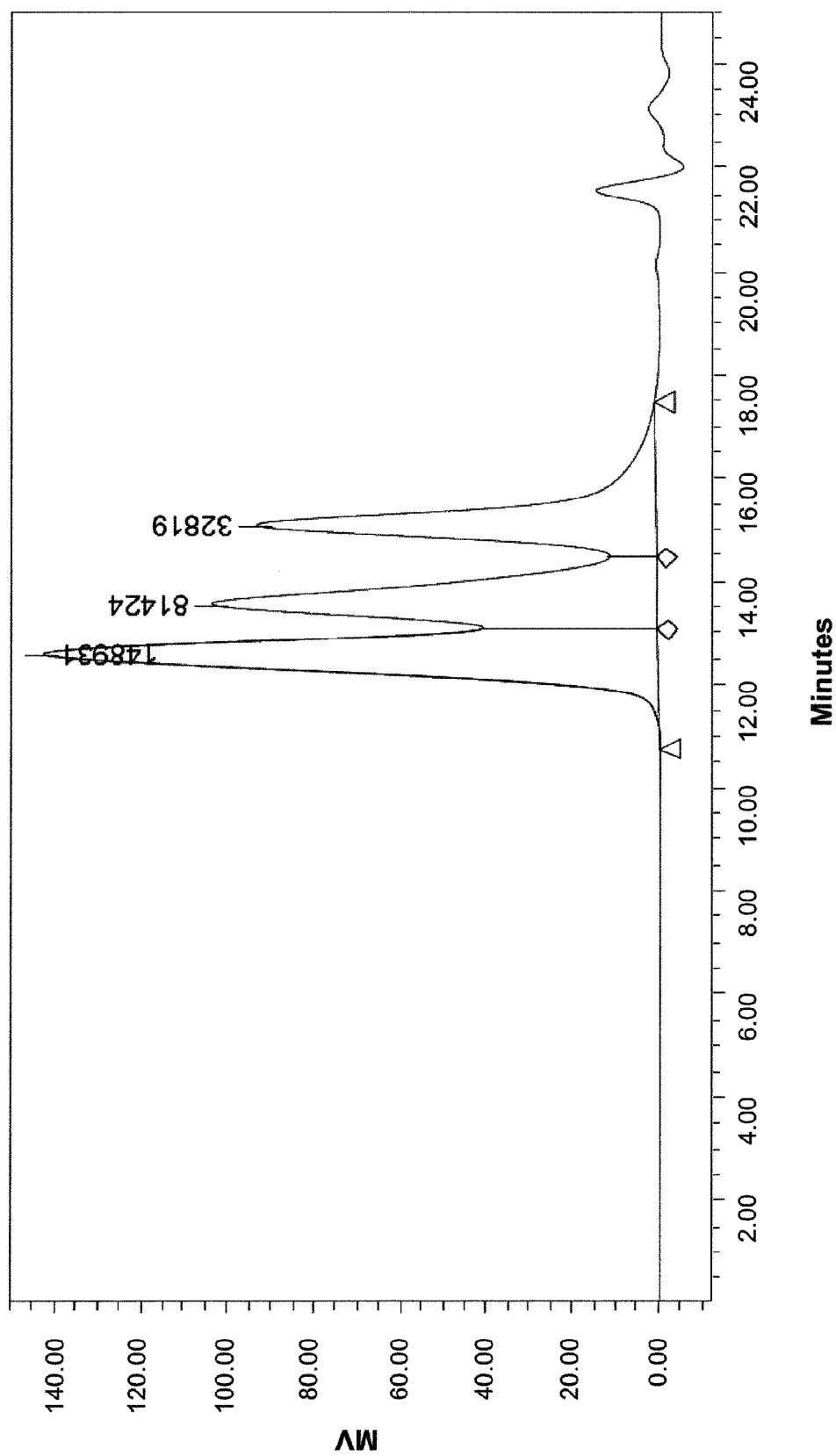
FIG. 29 depicts a GPC curve of Example 5.

The polystyrene-3,4-polyfarnesene di-block copolymer was further coupled to form Example 5. FIG. 29 shows the GPC curve of Example 5. The molecular weight and polydispersity of Example 5 were determined by GPC. The three peaks in FIG. 29 indicated that there were three distinct weight fractions for the coupling product formed. The $M_n$, $M_w$, $M_z$, $M_{z+1}$, polydispersity, $M_z/M_w$, and $M_{z+1}/M_w$ of Example 5 are shown in Table 9. The $M_p$ of the first peak in FIG. 29, corresponding to Example 5, was found to be about 148,931 g/mol. Example 5 was obtained at about 33% of the coupling product. The number of farnesene monomer units in Example 5 was calculated to be about 300. The peak molecular weight of the blocks in Example 5 was found to be about 32,000-108,000-32,000 g/mol. The $M_p$ of the second peak in FIG. 29, corresponding to the polystyrene-3,4-polyfarnesene di-block copolymer, was found to be about 81,424 g/mol. The $M_p$ of the third peak in FIG. 29, corresponding to polystyrene, was found to be about 32,819 g/mol.

TABLE 9

| Properties | Example 4 |
|---|---|
| $M_n$ | 28,179 g/mol |
| $M_w$ | 30,815 g/mol |
| $M_z$ | 32,590 g/mol |
| $M_{z+1}$ | 33,905 g/mol |
| Polydispersity | 1.093554 |
| $M_z/M_w$ | 1.057606 |
| $M_{z+1}/M_w$ | 1.100250 |

Figure 30:
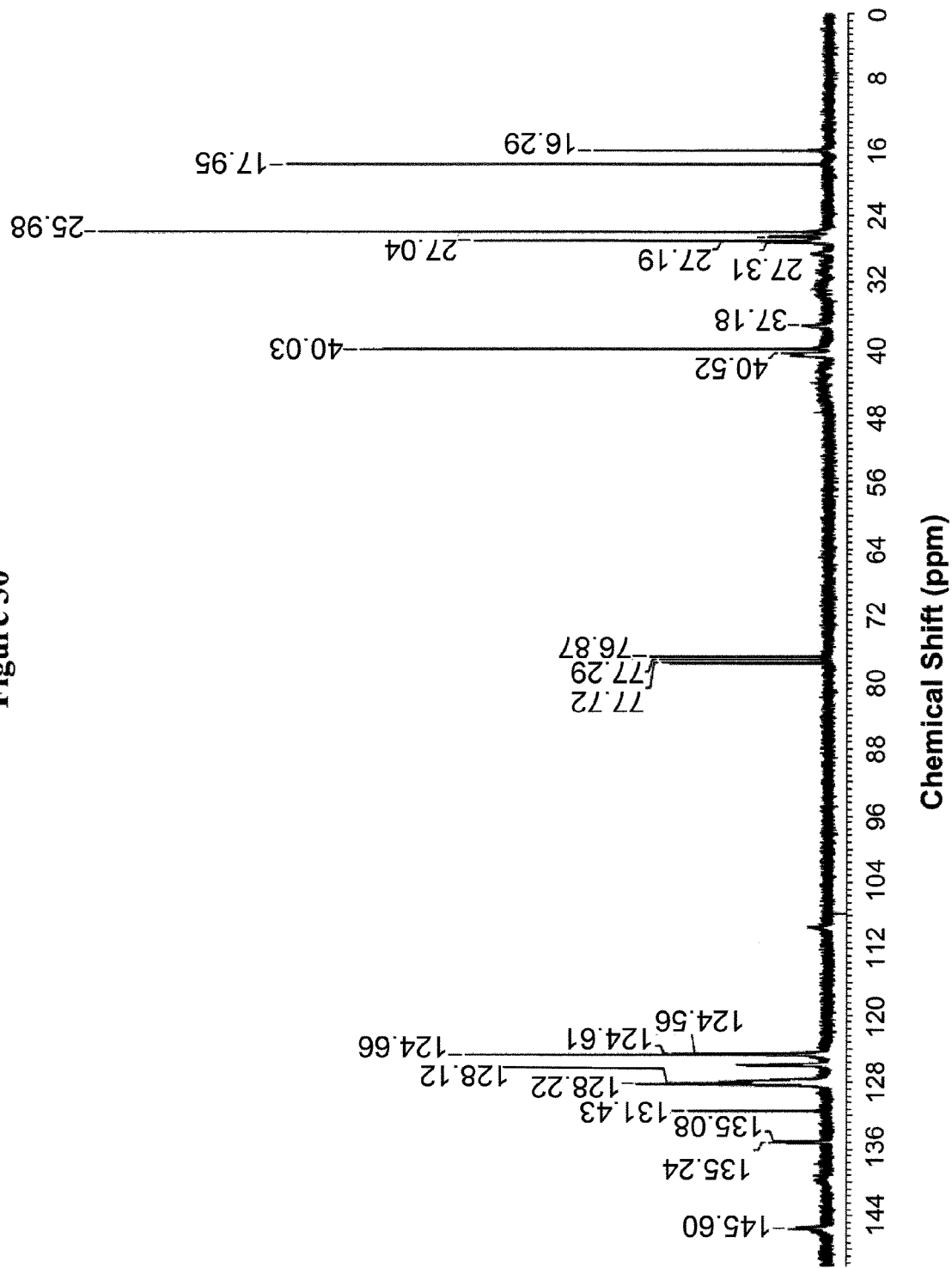
FIG. 30 depicts a $^{13}C$ NMR spectrum of Example 5.

FIG. 30 shows the $^{13}$C NMR spectrum of Example 5. Peaks at 77.72 ppm, 77.29 ppm, and 76.87 ppm were peaks of associated with the deuterated chloroform used for collecting the $^{13}$C NMR spectrum. Other peaks in FIG. 30 were peaks associated with 3,4-polyfarnesene and polystyrene. The characteristic peak identifying 1,4-polyfarnesene at 139.05 ppm was absent in FIG. 30, indicating a regular microstructure of Example 5.

Figure 31:
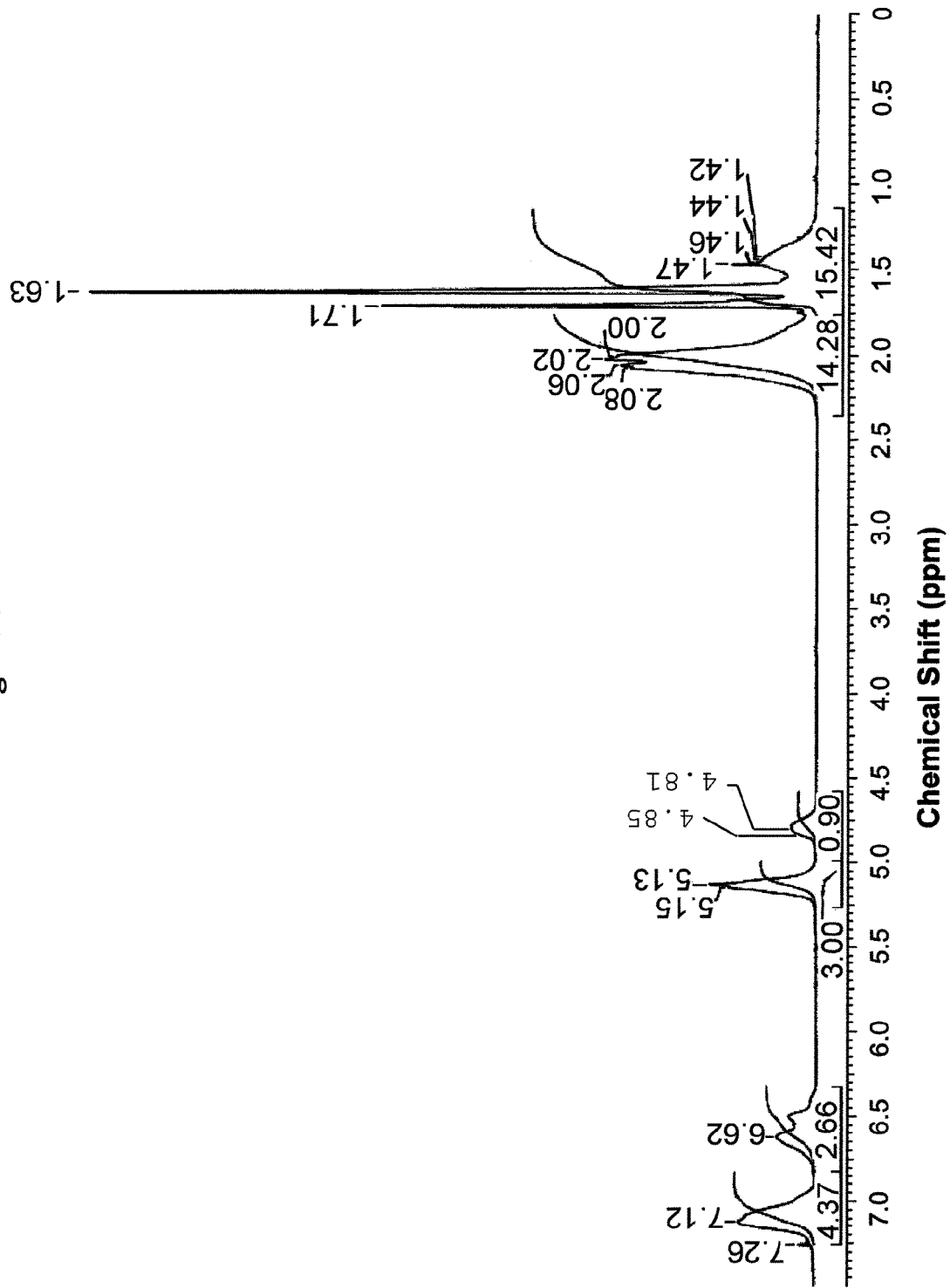
FIG. 31 depicts a $^1H$ NMR spectrum of Example 5.

FIG. 31 shows the $^1$H NMR spectrum of Example 5. Peaks at 4.85 ppm and 4.81 ppm were peaks associated with 3,4-microstructure. Peaks at 5.15 ppm and 5.13 ppm were peaks associated with 1,4- and 3,4-microstructures. Based on the areas under the peaks of FIG. 31, about 5% of farnesene units in Example 5 was found to have 1,4-microstructure.

Figure 32:
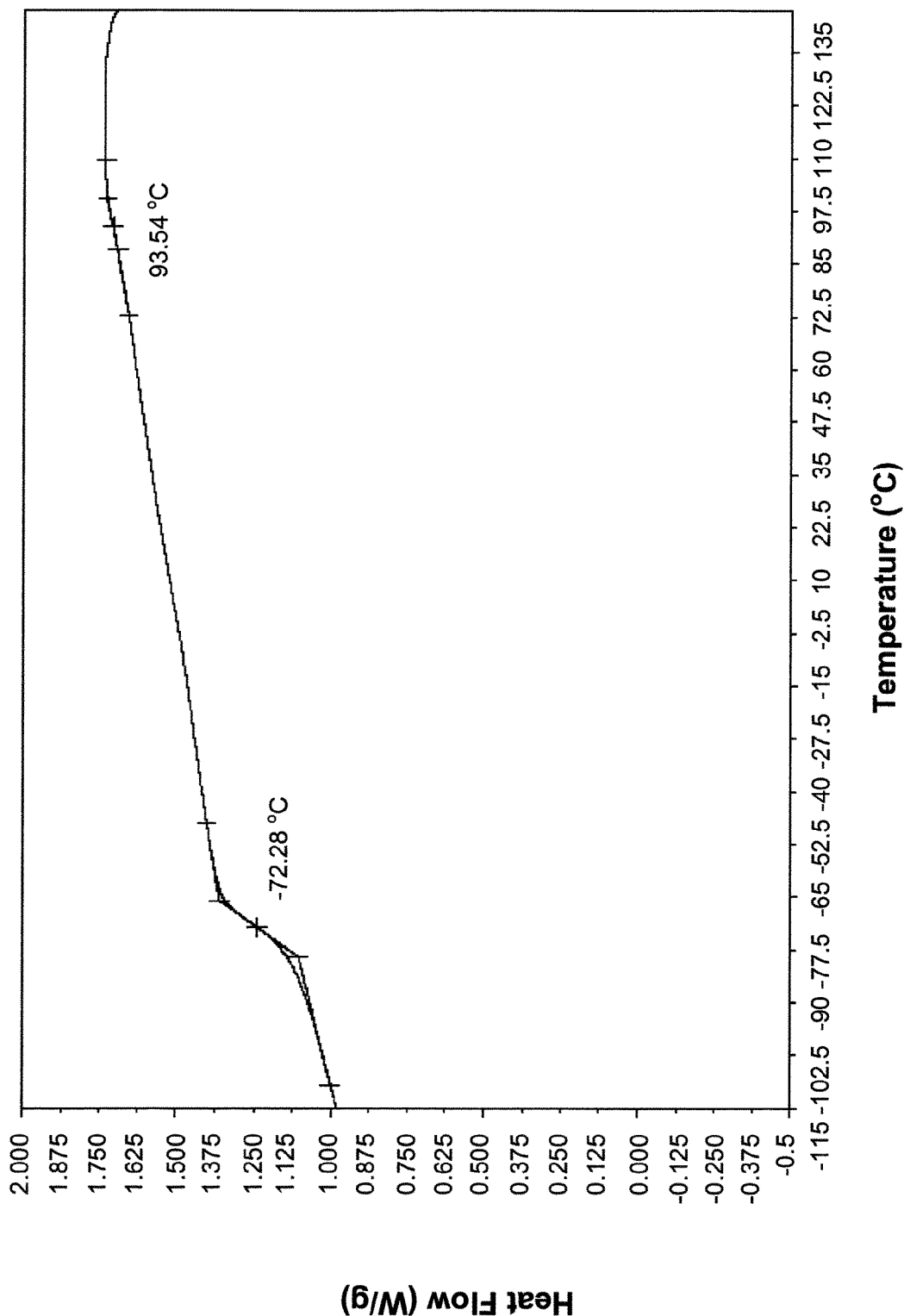
FIG. 32 depicts a DSC curve of Example 5.

The DSC curve of Example 5 is shown in FIG. 32. The thermal characteristics of Example 5 were measured by DSC. The $T_g$ of 3,4-polyfarnesene in Example 5 was found to be about −72° C. The $T_g$ of polystyrene in Example 5 was found to be about 94° C. No other thermal event was detected between −175° C. and 75° C.

Figure 33:
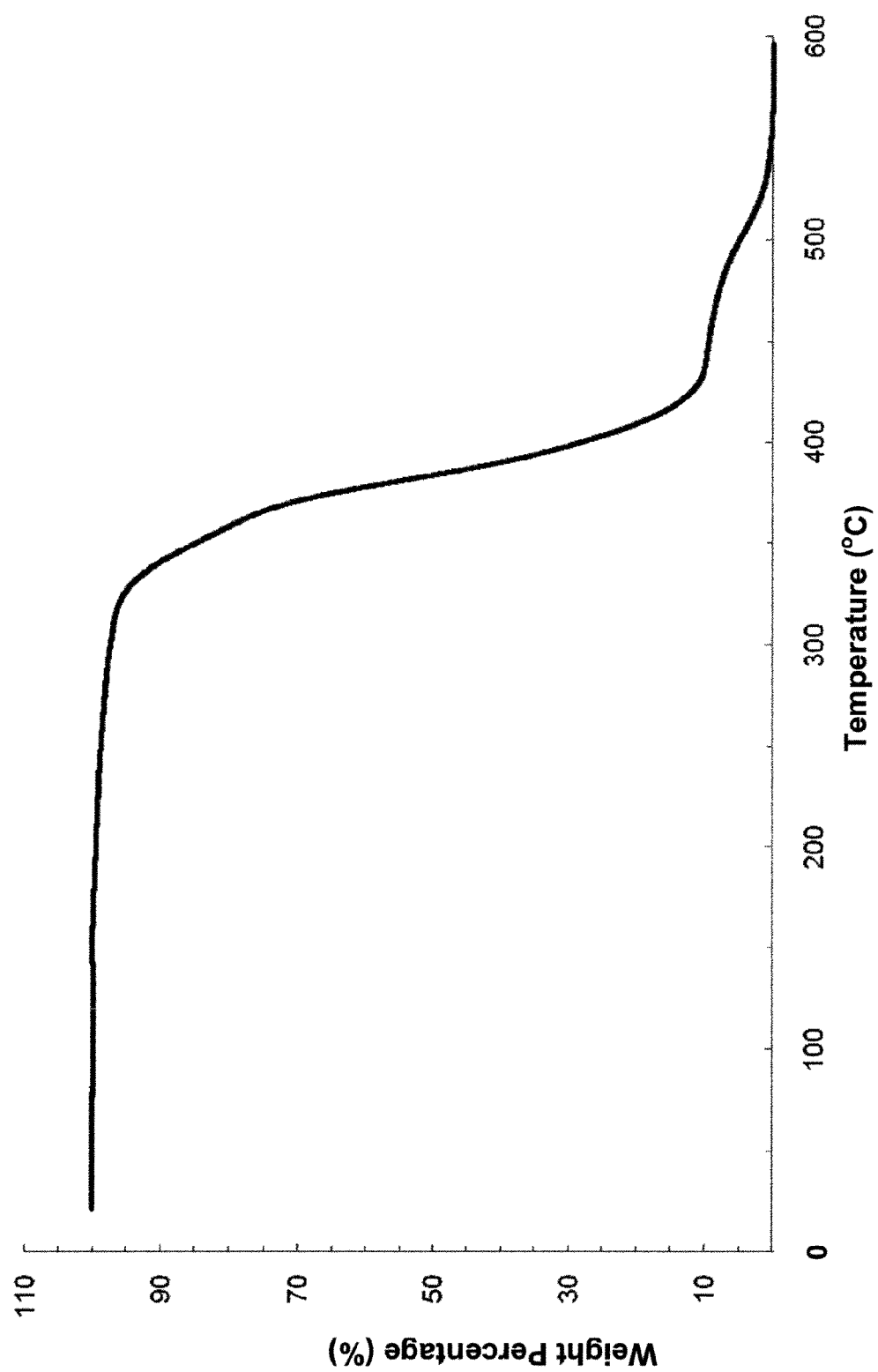
FIG. 33 depicts a TGA curve of Example 5.

The TGA curve of Example 5 measured in air is shown in FIG. 33. The decomposition temperature of Example 5 in air was determined by TGA. The 1% weight loss of Example 5 in air was recorded at 240° C. and the 5% weight loss of Example 5 in air was recorded at 327° C.

Figure 34:
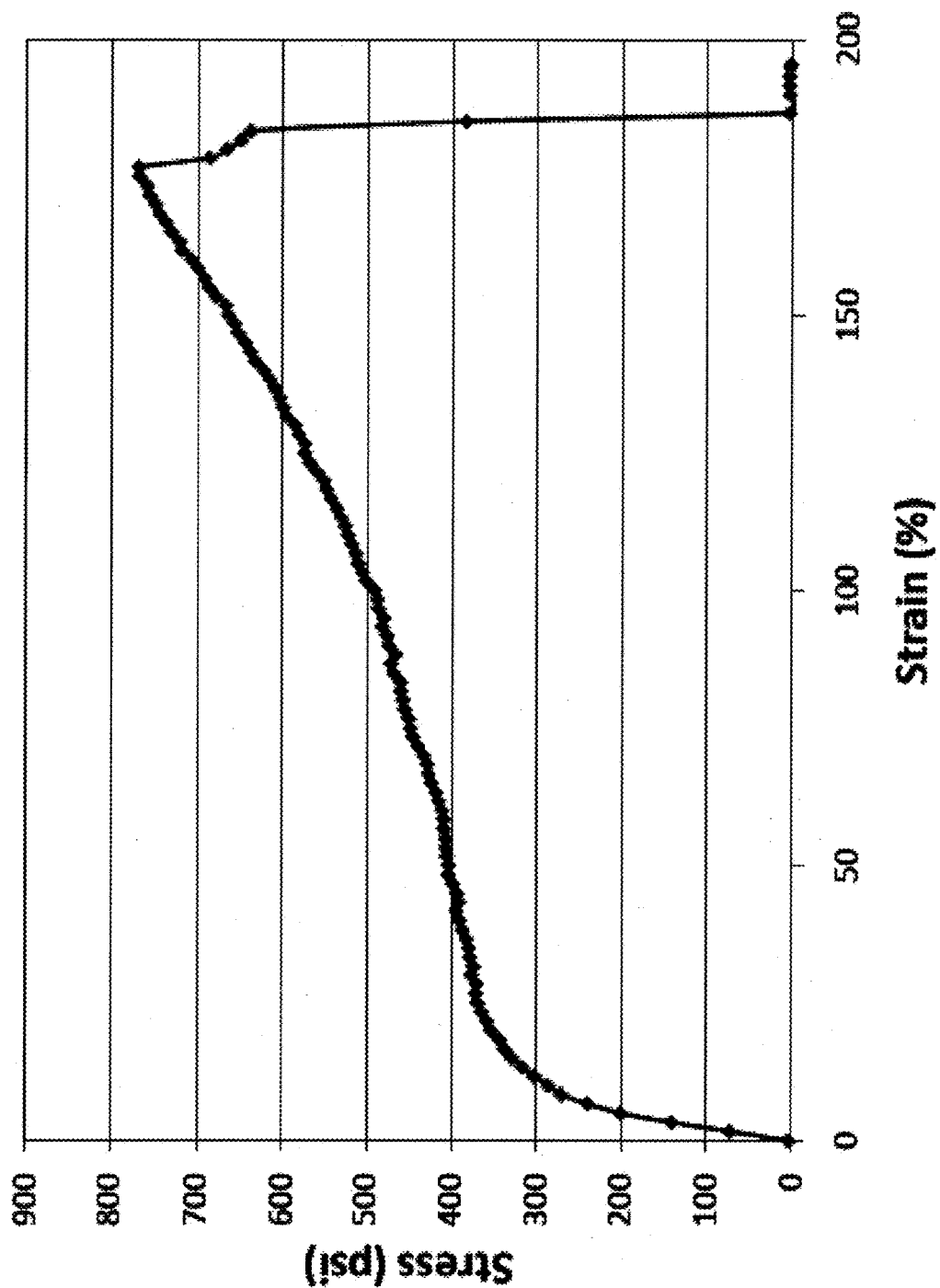
FIG. 34 depicts tensile test results of Example 5.

The tensile test results of Example 5 are shown in FIG. 34. The tensile strength of Example 5 was measured by a tensile test. Example 5 was stiff but yielded. As shown in FIG. 34, the elongation at break of Example 5 was found to be about 175% with a maximum tensile strength of about 768 psi. The modulus of Example 5 was calculated to be about 39.5 kpsi.

Figure 35:
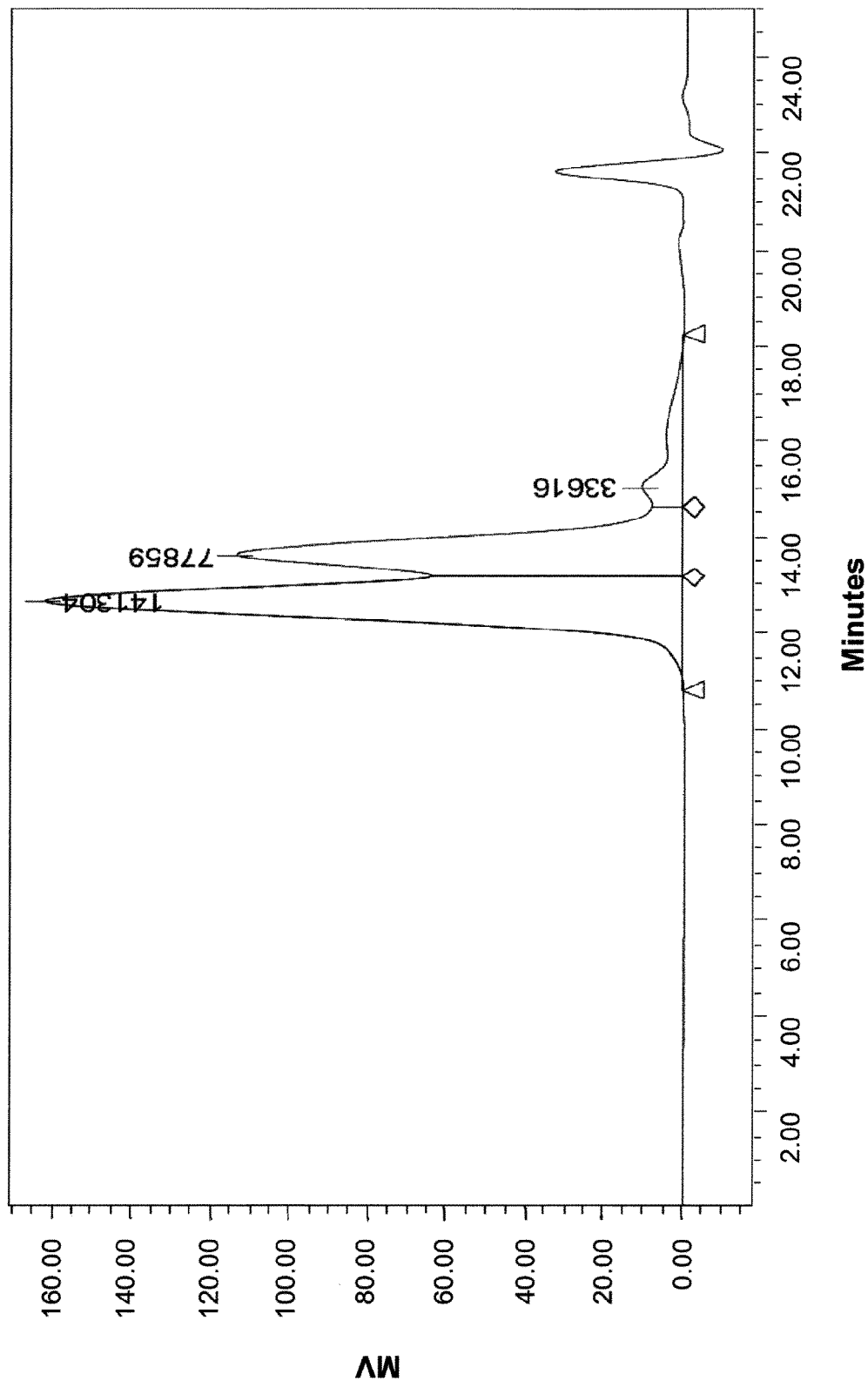
FIG. 35 depicts a GPC curve of Example 5 after extraction with hexane.

Example 5 was further purified by repeated extraction with solvent hexane 4 times. The GPC curve of the purified Example 5 is shown in FIG. 35. The extraction of Example 5 from the coupling product was evaluated by GPC. After the extraction, Example 5, shown as the first peak in FIG. 35, was increased to about 60% of the extracted product. The polystyrene-3,4-polyfarnesene di-block copolymer, shown as the second peak in FIG. 35, was reduced to about 30% of the extracted product. Polystyrene, shown as the third peak in FIG. 35, was reduced to about 10% of the extracted product.

Figure 36:
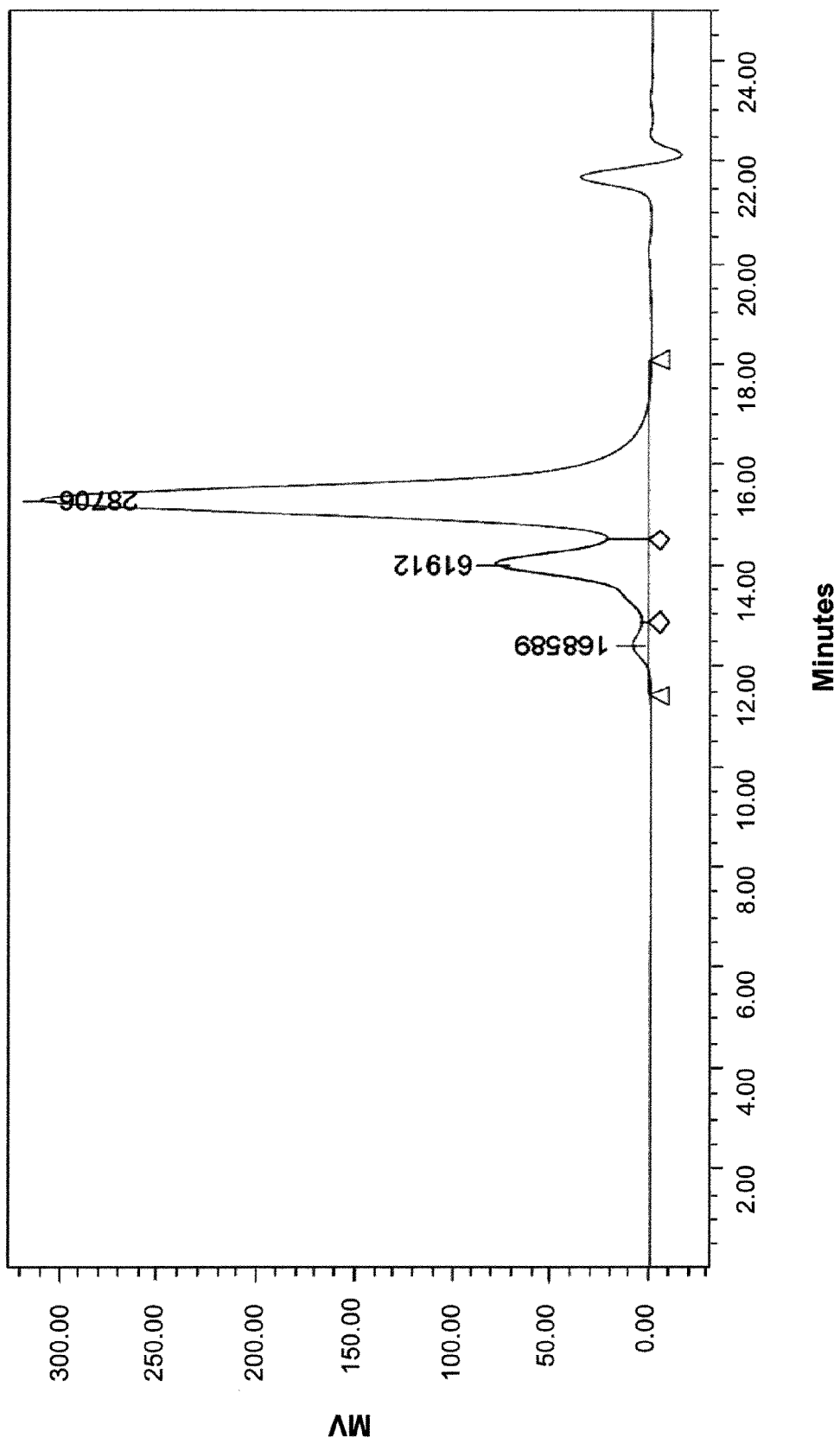
FIG. 36 depicts a GPC curve of hexane after extraction for Example 5.

The GPC curve of the extraction solvent hexane is shown in FIG. 36. After the extraction, Example 5 existed in very low amount in the extraction solvent, shown as the first peak in FIG. 36. A significant amount of the polystyrene-3,4-polyfarnesene di-block copolymer was extracted to the extraction solvent, shown as the second peak in FIG. 36. A majority of polystyrene was extracted to the extraction solvent, shown as the third peak in FIG. 36.

Figure 37:
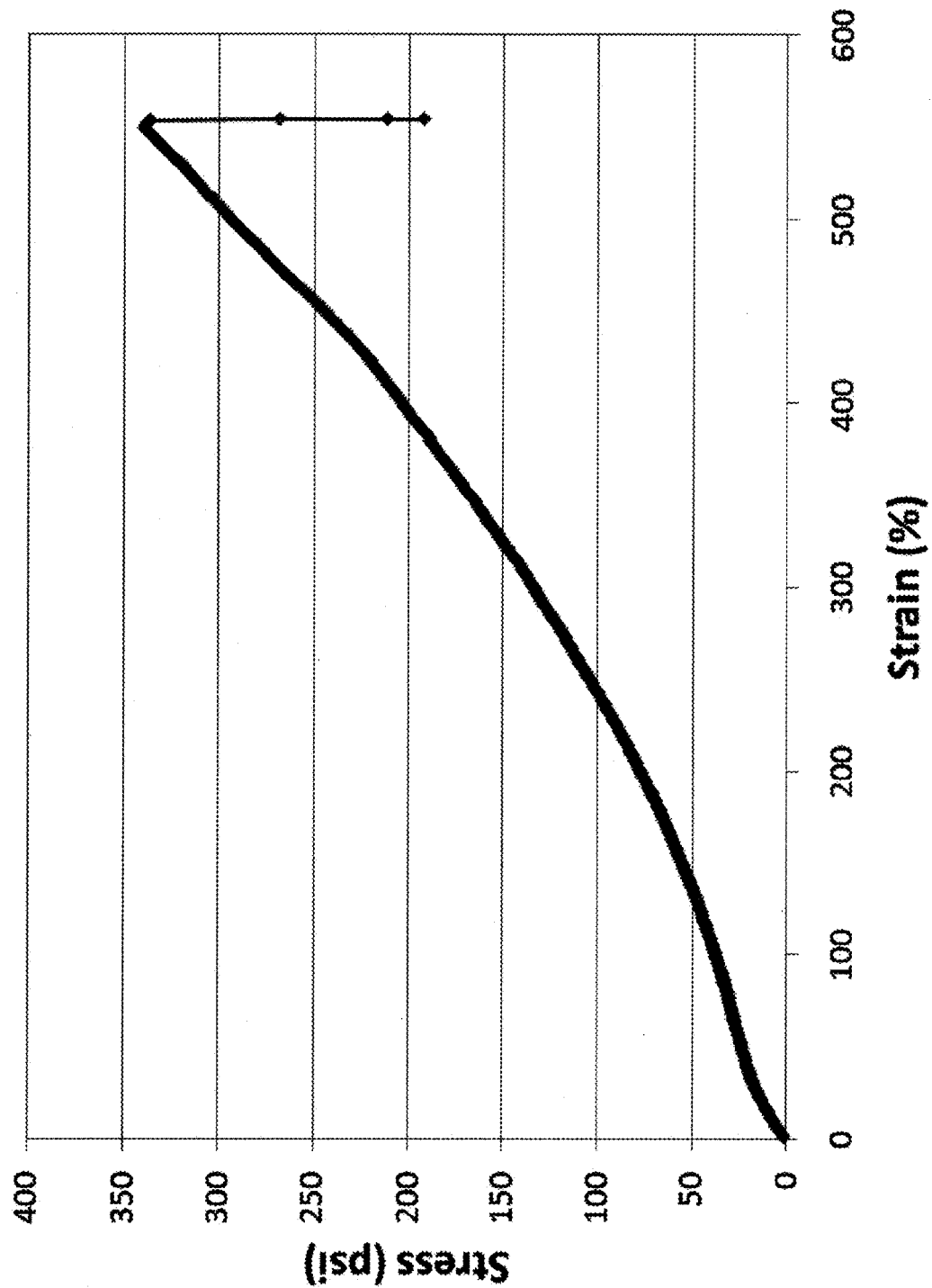
FIG. 37 depicts tensile test results of Example 5.

The tensile test results of the purified Example 5 are shown in FIG. 37. The tensile strength of the purified Example 5 was measured by a tensile test. Example 5 was soft and readily yielded. As shown in FIG. 37, the elongation at break of the purified Example 5 was found to be about 550% with a maximum tensile strength of about 340 psi. The modulus of the purified Example 5 was calculated to be about 65.9 kpsi. Stress at 300% elongation of the purified Example 5 was found to be about 133 psi.

Figure 38:
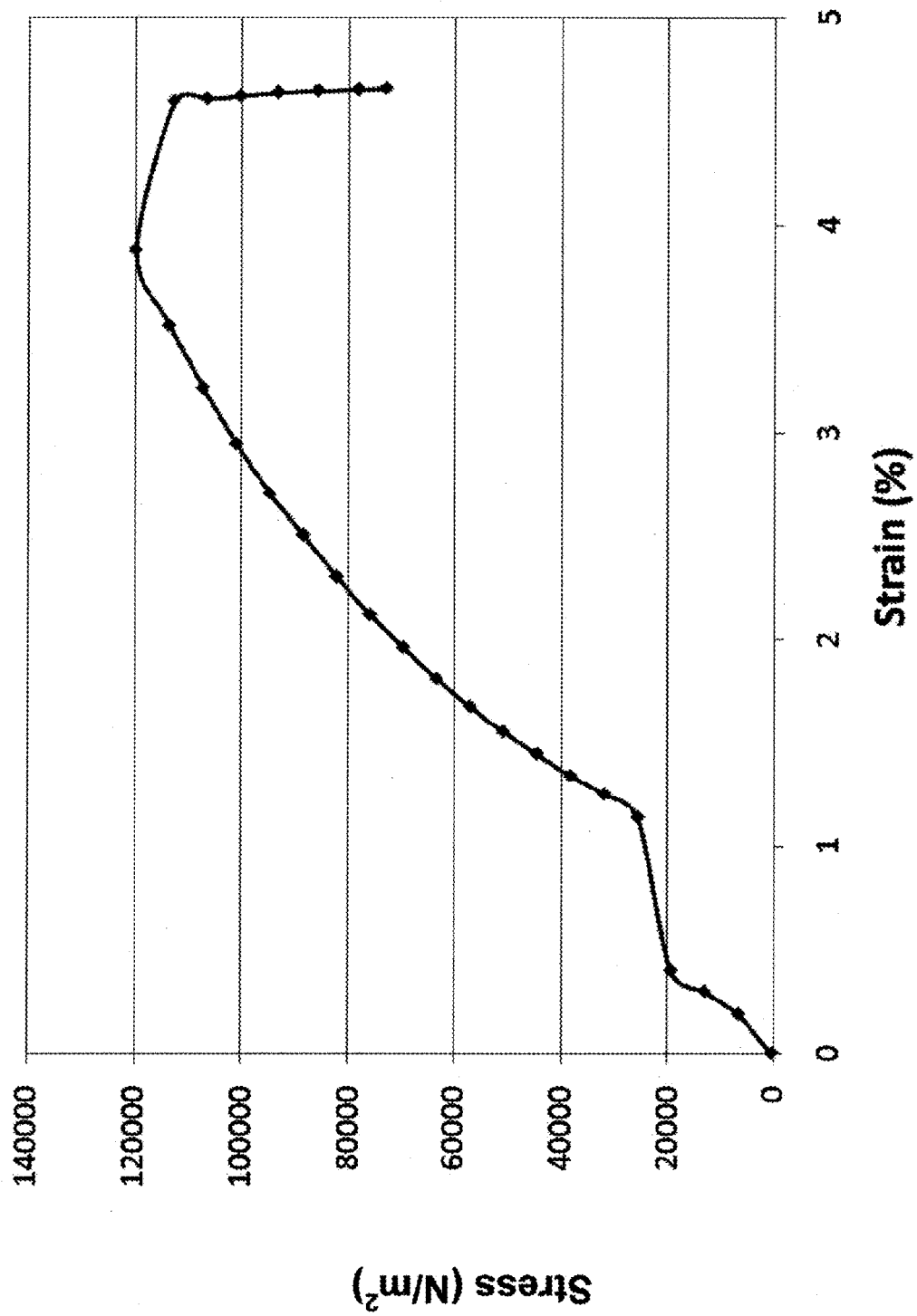
FIG. 38 depicts lap test results of Example 5.

The purified Example 5 was observed to be highly tacky. The lap test results of the purified Example 5, due to an adhesive failure, are shown in FIG. 38. The adhesive capability of the purified Example 5 was measured by a lap test. The adhesive energy of the purified Example 5 was found to be about 1,787,000 J/m$^2$ with a peak stress of about 120,000 N/m$^2$.

Example 6

Example 6 was formed by the vulcanization of Example 1. To formulate the reaction mixture, 62.7 g of Example 1 was mixed with 3.20 g zinc oxide, 1.25 g stearic acid, 0.94 g Rubbermakers Sulfur MC-98, 0.13 g Accelerator TMTD (tetramethylthiuram disulfide), and 0.63 g Accelerator OBTS (N-oxydiethylene-2-benzothiazole sulfenamide). Zinc oxide, stearic acid, Rubbermakers Sulfur MC-98, Accelerator TMTD, and Accelerator OBTS were obtained from Akrochem Corporation, Akron, Ohio. The mixture was then placed in a vulcanization mold and degassed at about 140° C. for about 30 minutes. After degassing, the mixture was cured at about 170° C. for about 15 minutes. After de-molding, Example 6, an elastic solid, was collected at 70.4 g (yield 81%).

Figure 39:
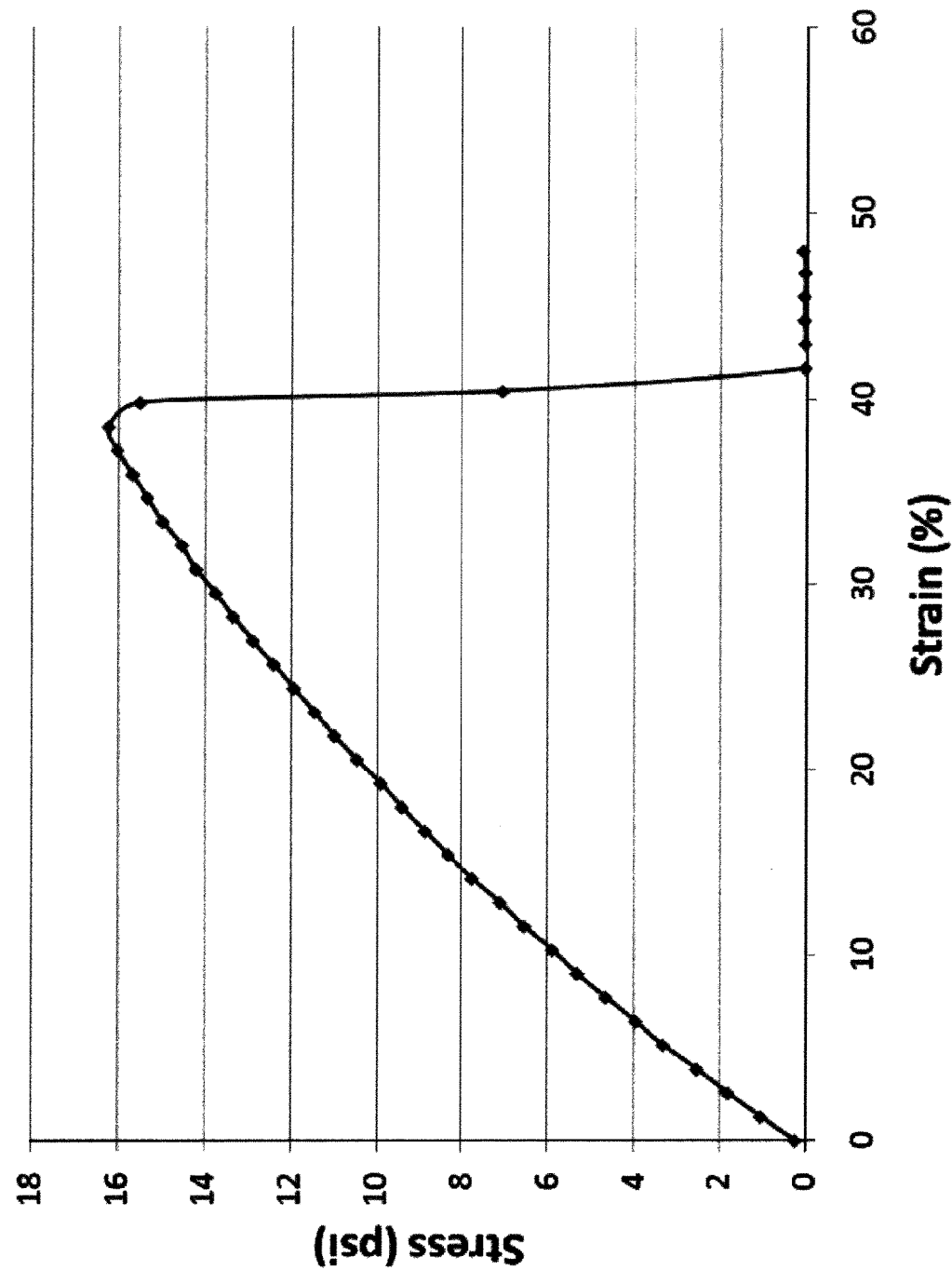
FIG. 39 depicts tensile test results of Example 6.

The tensile test results of Example 6 are shown in FIG. 39. The tensile strength of Example 6 was measured by a tensile test. As shown in FIG. 39, the elongation at break of Example 6 was about 38% with a maximum tensile strength of about 16 psi. The modulus of Example 6 was calculated to be about 58 psi.

Example 7

Example 7 was formed by the vulcanization of Example 2. Example 7 was synthesized similarly according to the procedure for Example 6 except that Example 1 was replaced by 60.3 g Example 2. The net weight of Example 7 was found to be 68.1 g (yield 78%).

Figure 40:
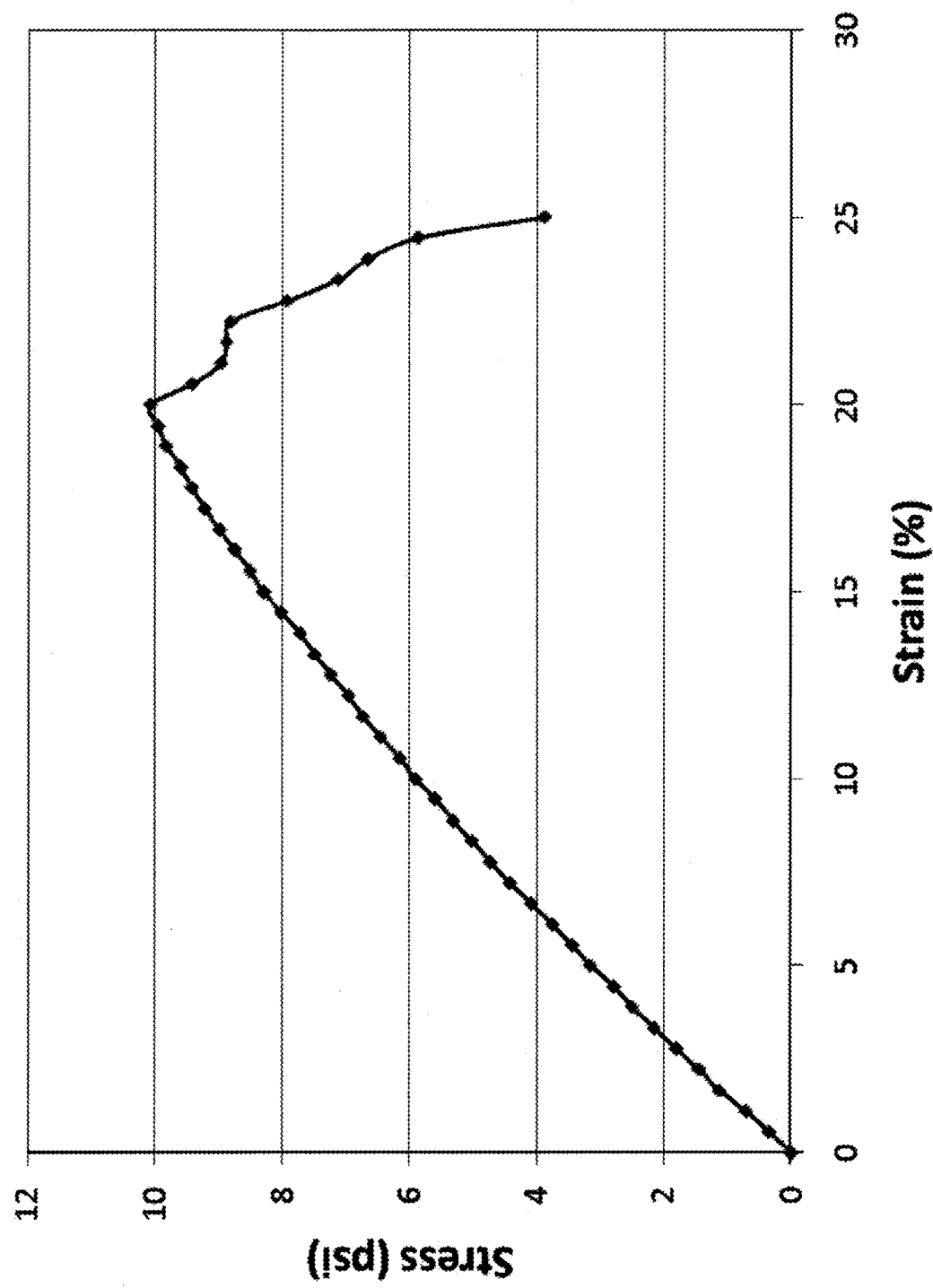
FIG. 40 depicts tensile test results of Example 7.

The tensile test results of Example 7 are shown in FIG. 40. The tensile strength of Example 7 was measured by a tensile test. As shown in FIG. 40, the elongation at break of Example 7 was found to be about 25% with a maximum tensile strength of about 10 psi. The modulus of Example 7 was calculated to be about 66 psi.

Example 8

TERGITOL™ 15-S-20 nonionic surfactant (obtained from Dow Chemical Co.), a secondary alcohol ethoxylate nonionic surfactant, was diluted from an activity 79.50% to 15.33% with deionized water. AEROSOL™ EF-810, an anionic sulfosuccinate surfactant (obtained from Cytec Industries Inc.), was used as is at 30.10% activity.

In a 250 mL round bottom flask, 55.00 mL deionized water was sparged with nitrogen for at least 15 minutes to remove any dissolved oxygen.

The diluted TERGITOL™ 15-S-20 (8.39 g) and AEROSOL™ EF-810 (1.84 g) were added into the round bottom flask and stirred for at least 15 minutes. In a separate flask, 38.50 g farnesene, 70.40 g methyl methacrylate ("MMA"), and 1.10 g methacrylic acid ("MAA") were combined and stirred to form a mixture. The mixture was slowly added into the water/surfactant mixture and stirred for about 15 minutes to form a pre-emulsion.

In a 500 mL four-necked round bottom flask equipped with a stir shaft with a PTFE stir blade; a condenser; a temperature thermocouple with nitrogen inlet; and an inlet for tubing from syringe pump connected to the pre-emulsion, 90.00 mL deionized water was sparged with nitrogen gas for about 15 minutes.

The diluted TERGITOL™ 15-S-20 (4.17 g) and AEROSOL™ EF-810 (0.91 g) were added into the flask and stirred at 200 rpm for about 15 minutes under heat. The solution was heated to about 70° C. When the solution was from about 65° C. to about 70° C., sodium bicarbonate (0.55 g in 5.0 g deionized water) was added as a buffer.

The syringe pump was primed and the tubing was filled with the pre-emulsion. When the temperature was stabilized, 22 mL of the pre-emulsion (about 10%) was added into the flask at a rate of 7.5 mL/min.

After the addition of the pre-emulsion, the solution was stirred for about 2 minutes and then the ammonium persulfate initiator (0.55 g in 4.0 g deionized water) was added and stirred for about 15 minutes. The temperature of the solution increased by about 4-7° C.

After a reaction was started, 220 mL of the pre-emulsion was pumped into the flask over three hours time.

After the addition of the pre-emulsion was completed, the solution was held at about 70° C. for about 30 minutes. The flask was then raised to and held at 75° C. for 30 minutes. After that the flask was raised to and held at 80° C. for 30 minutes. Finally, the flask was raised to and held at 85° C. for 60 minutes and then a sample was analyzed with gas chromatography ("GC"). The GC analysis was used to measure the conversion of the monomer in the reaction.

The polymer in the flask was then cooled to room temperature and filtered into a suitable container. The weight average molecular weight and polydispersity index ("PDI") of Example 8 were measured by size-exclusion chromatography.

The polymer was dried in a vacuum oven at about 55° C. for about two hours to remove water. The glass transition temperature ("Tg") of Example 8 was measured by differential scanning calorimetry ("DSC") at a scan rate of 10° C./min.

Example 9

The preparation procedure for Example 9 was the same as that for Example 8, except 44 g of farnesene (40 wt. %) and 64.9 g of MMA (59.00 wt. %) were used instead of 38.5 g of farnesene (35 wt. %) and 70.4 g of MMA (64 wt. %). The weight average molecular weight, PDI and Tg of Example 9 are shown in Table 10.

Example 10

The preparation procedure for Example 10 was the same as that for Example 8, except 33 g of farnesene (30.00 wt. %) and 75.9 g (69.00 wt. %) of MMA were used instead of 38.5 g of farnesene (35.00 wt. %) and 70.4 g of MMA (64.00 wt. %). The weight average molecular weight, PDI and Tg of Example 10 are shown in Table 10.

Example 11

The preparation procedure for Example 11 was the same as that for Example 8, except 27.5 g of farnesene (25.00 wt. %) and 81.4 g (74.00 wt. %) of MMA were used instead of 38.5 g of farnesene (35 wt. %) and 70.4 g of MMA (64 wt. %). The weight average molecular weight, PDI and Tg of Example 11 are shown in Table 10.

Example 12

The preparation procedure for Example 12 was the same as that for Example 8, except 22 g of farnesene (20 wt. %) and 86.9 g (79 wt. %) of MMA were used instead of 38.5 g of farnesene (35 wt. %) and 70.40 g of MMA (64 wt. %). The weight average molecular weight, PDI and Tg of Example 12 are shown in Table 10.

Example 13

Example 13 was a comparative example. The preparation procedure for Example 13 was the same as that for Example 8, except 55 g of butyl acrylate ("BA") (50 wt. %) and 53.9 g (49 wt. %) of MMA were used instead of 38.5 g of farnesene (35.00 wt. %) and 70.4 g of MMA (64 wt. %). The weight average molecular weight, PDI and Tg of Example 13 are shown in Table 10.

TABLE 10

| Example No. | Farnesene (wt. %) | BA (wt. %) | MMA (wt %) | MAA (wt. %) | Mw (KDa) | PDI | Tg (Inflection Point) (° C.) |
|---|---|---|---|---|---|---|---|
| 8 | 35 | 0 | 64 | 1 | 218 | 2.67 | 7.52 |
| 9 | 40 | 0 | 59 | 1 | 134 | 2.49 | −4.47 |
| 10 | 30 | 0 | 69 | 1 | 157 | 2.81 | 23.41 |
| 11 | 25 | 0 | 74 | 1 | 138 | 3.18 | 35.59 |
| 12 | 20 | 0 | 79 | 1 | 95 | 3.47 | 53.99 |
| 13 | 0 | 50 | 49 | 1 | 156 | 3.35 | 12.05 |

Example 14

The preparation procedure for Example 14 was the same as that for Example 8, except 35.2 g of farnesene (32 wt. %) and 73.7 g (67 wt. %) of MMA were used instead of 38.5 g of farnesene (35 wt. %) and 70.4 g of MMA (64 wt. %). The experiment was preformed twice. The average values of the weight average molecular weight, PDI and Tg of Example 14 are shown in Table 11.

Example 19

Example 19 was a comparative experiment. The preparation procedure for Example 19 was the same as that for Example 8, except 55 g of BA (50 wt. %) and 53.9 g (49 wt. %) of MMA were used instead of 38.5 g of farnesene (35 wt. %) and 70.4 g of MMA (64 wt. %). The experiment was preformed twice. The average values of the weight average molecular weight, PDI and Tg of Example 19 are shown in Table 11.

TABLE 11

| Example No. | Farnesene (wt. %) | BA (wt. %) | MMA (wt. %) | MAA (wt. %) | Mw (KDa) | PDI | Tg (Inflection Point) (° C.) | % Conv. of Total Monomers |
|---|---|---|---|---|---|---|---|---|
| 14 | 32 | 0 | 67 | 1 | 187 | 2.75 | 15.66 | 99.83 |
| 15 | 33 | 0 | 66 | 1 | 163 | 3.05 | 13.20 | 99.84 |
| 16 | 34 | 0 | 65 | 1 | 162 | 3.1 | 12.14 | 99.80 |
| 17 | 35 | 0 | 64 | 1 | 184 | 2.75 | 6.07 | 99.83 |
| 18 | 36 | 0 | 63 | 1 | 141 | 3.65 | 5.37 | 99.86 |
| 19 | 0 | 50 | 49 | 1 | 168 | 3.35 | 12.02 | 100 |

Example 15

The preparation procedure for Example 15 was the same as that for Example 8, except 36.3 g of farnesene (33 wt. %) and 72.6 g (66 wt. %) of MMA were used instead of 38.5 g of farnesene (35 wt. %) and 70.4 g of MMA (64 wt. %). The experiment was preformed twice. The average values of the weight average molecular weight, PDI and Tg of Example 15 shown in Table 11.

Example 16

The preparation procedure for Example 16 was the same as that for Example 8, except 37.4 g of farnesene (34 wt. %) and 71.5 g (65 wt. %) of MMA were used instead of 38.5 g of farnesene (35 wt. %) and 70.4 g of MMA (64 wt. %). The experiment was preformed twice. The average values of the weight average molecular weight, PDI and Tg of Example 16 are shown in Table 11.

Example 17

The preparation procedure for Example 17 was the same as that for Example 8, except 38.5 g of farnesene (35 wt. %) and 70.4 g (64 wt. %) of MMA were used instead of 38.5 g of farnesene (35 wt. %) and 70.4 g of MMA (64 wt. %). The experiment was preformed twice. The average values of the weight average molecular weight, PDI and Tg of Example 17 are shown in Table 11.

Example 18

The preparation procedure for Example 18 was the same as that for Example 8, except 39.6 g of farnesene (36 wt. %) and 69.3 g (63 wt. %) of MMA were used instead of 38.5 g of farnesene (35 wt. %) and 70.4 g of MMA (64 wt. %). The experiment was preformed twice. The average values of the weight average molecular weight, PDI and Tg of Example 18 are shown in Table 11.

Figure 41:
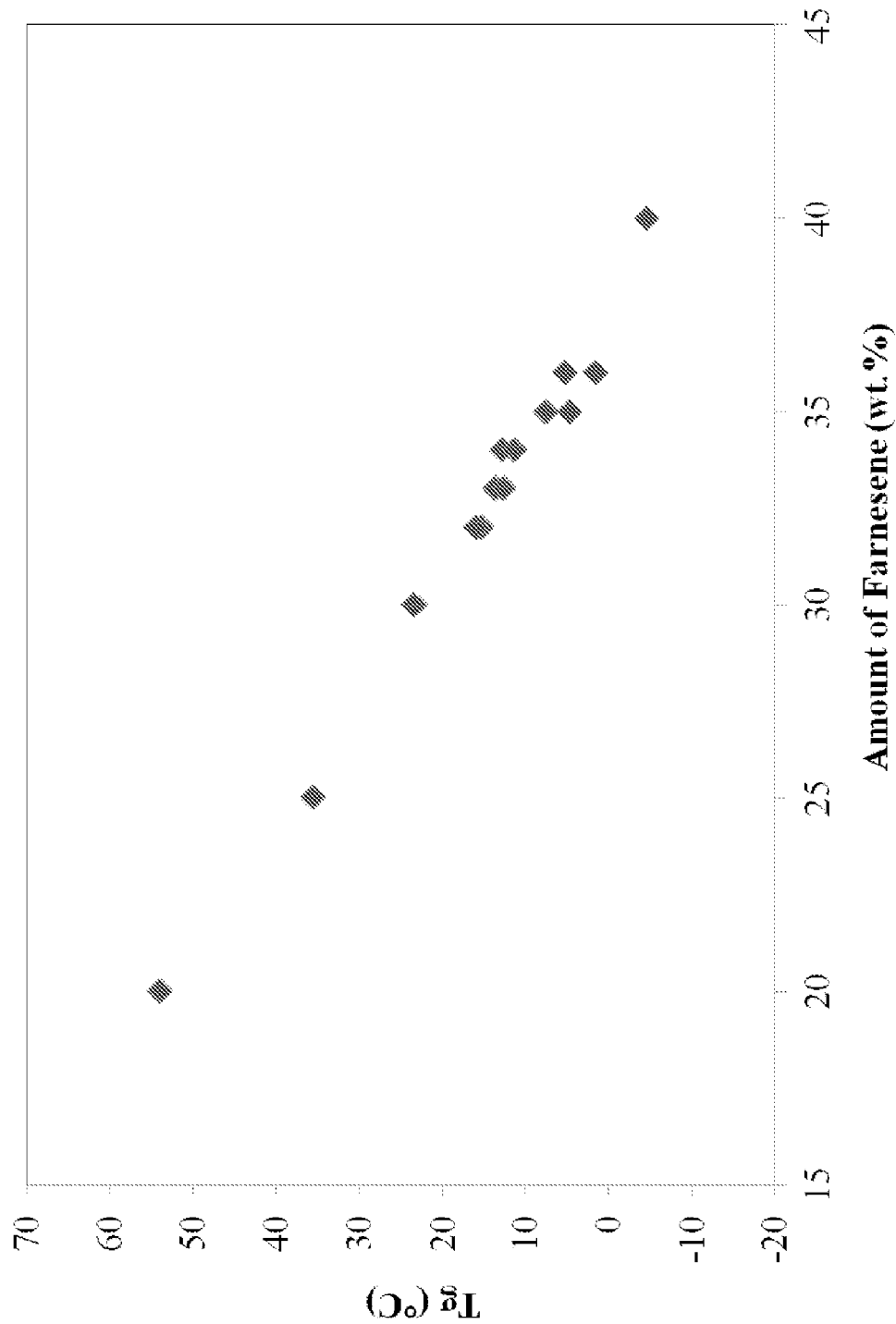
FIG. 41 depicts Tg results of Examples 8-12 and 14-18.

The conversion data in Table 11 shows that each of Examples 8-19 has a total monomer conversion greater than 99%. The Tg of Examples 8-12 and 14-18 are shown in FIG. 41.

Example 20

The preparation procedure for Example 20 was the same as that for Example 8, except two additional ingredients were added into the pre-emulsion; and 44 g farnesene (40 wt. %), 11 g BA (10 wt. %) and 53.9 g MMA (49 wt. %) were used instead of 38.5 g of farnesene (35 wt. %) and 70.4 g of MMA (64 wt. %). The ingredients were 0.50 g 1-dodecane thiol and 1.00 g methyl-β-cyclodextrin. 1-Dodecane thiol was added as a chain transfer agent to prevent the growing polymer from reacting upon itself. Methyl-β-cyclodextrin was added as a phase transfer agent to assist in the transport of both farnesene and 1-dodecane thiol through the aqueous medium. The weight average molecular weight, PDI and Tg of Example 20 are shown in Table 12.

Example 21

The preparation procedure for Example 21 was the same as that for Example 20, except 33 g farnesene (30 wt. %) and 22 g BA (20 wt. %) were used instead of 44 g farnesene (40 wt. %) and 11 g BA (10 wt. %). The weight average molecular weight, PDI and Tg of Example 21 are shown in Table 12.

Example 22

The preparation procedure for Example 22 was the same as that for Example 20, except 22 g farnesene (20 wt. %) and 33 g BA (30 wt. %) were used instead of 44 g farnesene (40 wt. %) and 11 g BA (10 wt. %). The weight average molecular weight, PDI and Tg of Example 22 are shown in Table 12.

Example 23

The preparation procedure for Example 23 was the same as that for Example 20, except 11 g farnesene (10 wt. %) and 44 g BA (40 wt. %) were used instead of 44 g farnesene (40 wt. %) and 11 g BA (10 wt. %). The weight average molecular weight, PDI and Tg of Example 23 are shown in Table 12.

Example 24

Example 24 was a comparative example. The preparation procedure for Example 24 was the same as that for Example 20, except 55 g BA (50 wt. %) were used instead of 44 g farnesene (40 wt. %) and 11 g BA (10 wt. %). The weight average molecular weight, PDI and Tg of Example 24 are shown in Table 12.

TABLE 12

| Example No. | Farnesene (wt. %) | BA (wt. %) | MMA (wt. %) | MAA (wt. %) | Mw (KDa) | PDI | Tg (° C.) (Inflection Point) |
|---|---|---|---|---|---|---|---|
| 20 | 40.00 | 10.00 | 49.00 | 1.00 | 56 | 1.89 | −23.64 |
| 21 | 30.00 | 20.00 | 49.00 | 1.00 | 34 | 1.79 | −27.83 |
| 22 | 20.00 | 30.00 | 49.00 | 1.00 | 44 | 1.71 | −14.86 |
| 23 | 10.00 | 40.00 | 49.00 | 1.00 | 54 | 1.72 | 4.68 |
| 24 | 0.00 | 50.00 | 49.00 | 1.00 | 362 | 4.39 | 10.58 |

Figure 42:
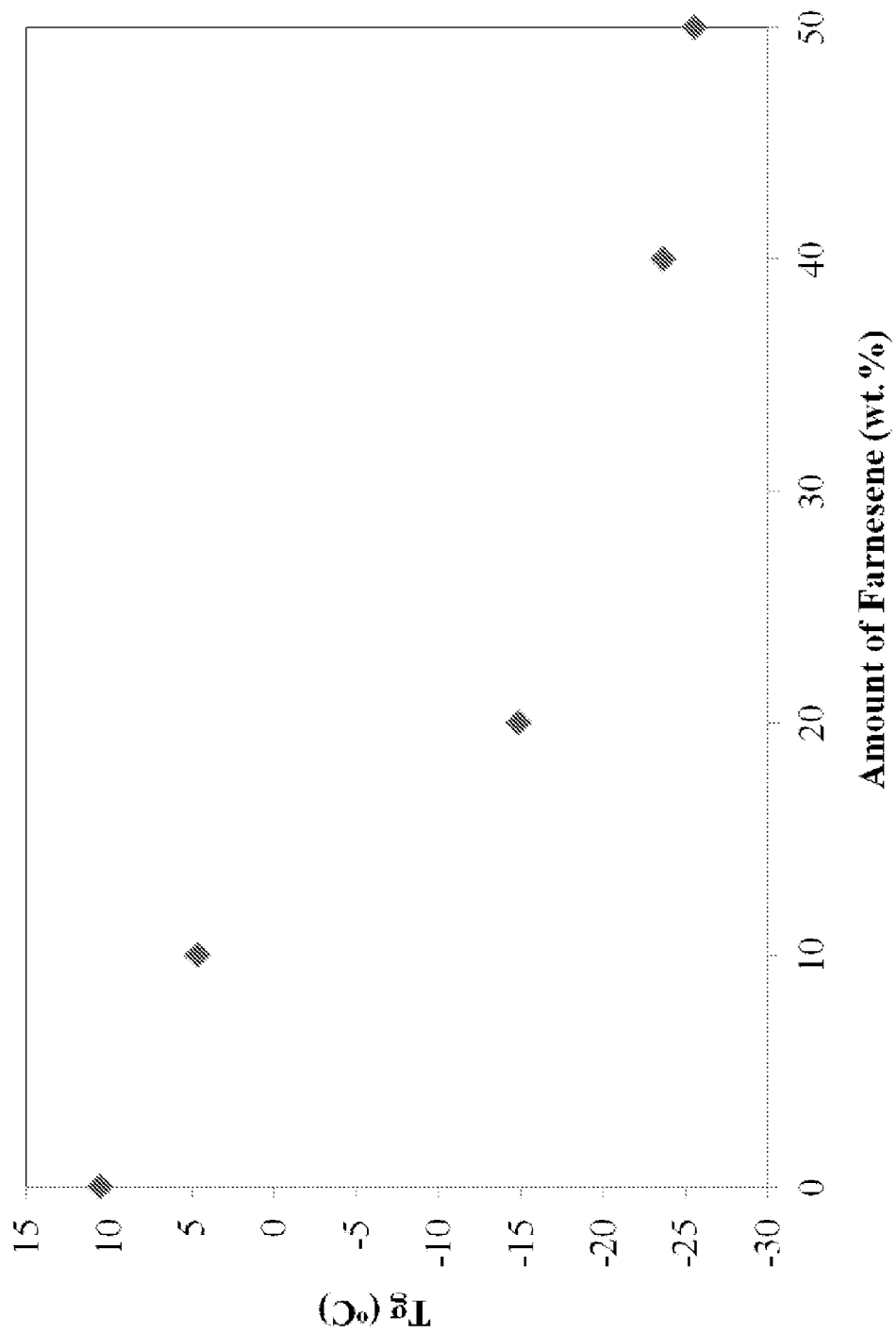
FIG. 42 depicts Tg results of Examples 20-23.

Examples 20-23 have a lower molecular weight and a lower PDI than Example 24. The Tg of Example 20-23 are shown in FIG. 42.

Example 25

A mixture of 11.05 g MMA (0.1104 mols), 67.69 g β-farnesene (0.3312 mols) and 0.574 g benzoyl peroxide ("BPO", 0.00237 mols) were added to a 250 mL three-necked round bottomed flask, equipped with an overhead stir shaft with a PTFE stir blade, in a glove box with an atmosphere of $N_2$. The ratio of farnesene to MMA was 3:1. The flask was sealed and removed from the glove box, placed on a heating mantle, and attached to an overhead stirrer. An argon inlet was connected to the flask as well as an oil bubbler. A stir rate of 250 rpm was set on the overhead stirrer and the flow of argon was adjusted such that argon bubbled through the bubbler at a rate of about 1 bubble per second. The heating mantle was set to 75° C. and the reaction was allowed to proceed for 15 hours. The heating mantle and argon gas inlet were removed and 1.107 g butylated hydroxytoluene ("BHT", 0.005024 mols) was added to the flask. The solution was stirred for 5 minutes before polymer was precipitated from the solution. Precipitation was done by dripping the solution dropwise into 2 L of ice-cold methanol. Once the polymer was precipitated, the methanol solution was decanted and the polymer was redissolved in tetrahydrofuran ("THF"). The resulting solution of polymer in THF was precipitated into 2 L of ice-cold methanol, and then the methanol solution was decanted. The polymer was redissolved in THF and reprecipitated into 2 L of ice-cold methanol. The methanol was decanted and the polymer was dried by removing residual solvent on a rotary evaporator and then placing the isolated polymer under vacuum (50 microns) overnight. A yield of 19.62 g (24.91%) of a clear, transparent, viscous liquid was realized.

Example 25 was characterized by the following analytical data: $^1$HNMR (CDCl$_3$, 400 MHz): δ=5.2-5.0 (m, 30H), 4.8-4.7 (s, 1H), 3.7-3.6 (s, 6H), 2.1-1.9 (m, 120H), 1.7-1.6 (s, 32H), 1.6 (s, 63H), 1.1 (m, 3H). $^{13}$CNMR (THF-d8, 400 MHz): δ=135.9, 135.7, 131.8, 125.5, 125.4, 125.3, 40.9, 28.2, 28.1, 27.9, 26.6, 18.1, 16.5; GPC (THF, PS Standards): $M_w$=146 kDa, $M_w/M_n$=2.4. DSC (2° C./min, $N_2$): $T_g$ (inflection)=−66.15° C. The weight average molecular weight, PDI and Tg of Example 25 are shown in Table 13.

Example 26

The preparation procedure for Example 26 was the same as that for Example 25, except the ratio of farnesene to MMA was 1:0. The following amounts of reactants were used: farnesene (79.008 g, 0.38661 mols), MMA (0 g, 0.0 mols), BPO (0.607 g, 0.00251 mols). The reaction was heated for 7 hours at 75° C. before addition of BHT (0.565 g, 0.00256 mols). A yield of 8.412 g (10.65%) of a clear, transparent, viscous liquid was obtained. The weight average molecular weight, PDI and Tg of Example 26 were measured and are shown in Table 13.

Example 27

The preparation procedure for Example 27 was the same as that for Example 25, except the ratio of farnesene to MMA was 1:0. The following amounts of reactants were used: farnesene (79.25 g, 0.3878 mols), MMA (0 g, 0.0 mols), BPO (0.607 g, 0.00251 mols). The reaction was heated for 18.5 hours at 75° C. before addition of BHT (1.111 g, 0.005042 mols). A yield of 19.349 g (24.42%) of a clear, transparent, viscous liquid was obtained. The weight average molecular weight, PDI and Tg of Example 27 were measured and are shown in Table 13.

Example 28

The preparation procedure for Example 28 was the same as that for Example 25, except the ratio of farnesene to MMA was 5:1. The following amounts of reactants were used: farnesene (66.788 g, 0.32682 mols), MMA (6.54 g, 0.0653 mols), BPO (0.532 g, 0.00220 mols). The reaction was heated for 13.5 hours at 75° C. before addition of BHT (0.969 g, 0.00440 mols). A yield of 13.949 g (19.02%) of a clear, transparent, viscous liquid was obtained. The weight average molecular weight, PDI and Tg of Example 28 were measured and are shown in Table 13.

Example 29

The preparation procedure for Example 29 was the same as that for Example 25, except the ratio of farnesene to MMA was 1:1. The following amounts of reactants were used: farnesene (58.47 g, 0.2861 mols), MMA (26.17 g, 0.2614 mols), BPO (0.603 g, 0.00249 mols). The reaction was heated for 15.25 hours at 75° C. before addition of BHT (1.102 g, 0.005001 mols). A yield of 29.98 g (35.42%) of a clear, transparent, viscous liquid was obtained. The weight average molecular weight, PDI and Tg of Example 29 were measured and are shown in Table 13.

Example 30

The preparation procedure for Example 30 was the same as that for Example 25, except the ratio of farnesene to MMA was 1:1. The following amounts of reactants were used: farnesene (52.328 g, 0.25606 mols), MMA (25.633 g, 0.25602 mols), BPO (0.551 g, 0.00227 mols). The reaction was heated for 7.75 hours at 75° C. before addition of BHT (1.008 g, 0.004574 mols). A yield of 16.354 g (21.0%) of a clear, transparent, viscous liquid was obtained. The weight average molecular weight, PDI and Tg of Example 30 were measured and are shown in Table 13.

Example 31

The preparation procedure for Example 31 was the same as that for Example 25, except the ratio of farnesene to MMA was 1:2. The following amounts of reactants were used: farnesene (47.618 g, 0.23301 mols), MMA (46.659 g, 0.46603 mols), BPO (0.653 g, 0.00270 mols). The reaction was heated for 6 hours at 75° C. before addition of BHT (1.196 g, 0.005427 mols). A yield of 19.7 g (20.9%) of a clear, transparent, viscous liquid was obtained. The weight average molecular weight, PDI and Tg of Example 31 were measured and are shown in Table 13.

Example 32

The preparation procedure for Example 32 was the same as that for Example 25, except the ratio of farnesene to MMA was 1:5. The following amounts of reactants were used: farnesene (29.842 g, 0.14603 mols), MMA (73.088 g, 0.73000 mols), BPO (0.690 g, 0.00285 mols). The reaction was heated for 6 hours at 75° C. before addition of BHT (1.254 g, 0.005691 mols). A yield of 28.026 g (27.2%) of a white, opaque, tough solid was obtained. The weight average molecular weight, PDI and Tg of Example 32 were measured and are shown in Table 13.

Example 33

The preparation procedure for Example 33 was the same as that for Example 25, except the ratio of farnesene to MMA was 1:5. The following amounts of reactants were used: farnesene (29.839 g, 0.14601 mols), MMA (73.943 g, 0.73854 mols), BPO (0.691 g, 0.00285 mols). The reaction was heated for 4.25 hours at 75° C. before addition of BHT (1.254 g, 0.00569 mols). A yield of 20.030 g (19.3%) of a white, opaque, tough solid was obtained. The weight average molecular weight, PDI and Tg of Example 33 were measured and are shown in Table 13.

TABLE 13

| Example No. | Ratio of farnesene to MMA | Mw (KDa) | PDI | Tg (Inflection Point) (° C.) |
|---|---|---|---|---|
| 25 | 3:1 | 146 | 2.4 | −65.15 |
| 26 | 1:0 | 67 | 1.6 | −71.33 |
| 27 | 1:0 | 132 | 2.6 | −75.73 |
| 28 | 5:1 | 105 | 2 | −70.58 |
| 29 | 1:1 | 224 | 3 | −49.07 |
| 30 | 1:1 | 157 | 2.3 | −50.50 |
| 31 | 1:2 | 172 | 2.3 | −28.30 |
| 32 | 1:5 | 271 | 2.7 | −2.49 |
| 33 | 1:5 | 199 | 2.4 | −2.86 |

Example 34

Example 26 (7.966 g) was dissolved in heptane (250 mL) and added into a 1 L Hastelloy pressure reactor, followed by 5% Pd/C catalyst (0.402 g). The reactor was sealed, placed in the reactor housing, and connected to an overhead stirrer and a gas inlet. The solution was stirred at 240 rpm and the reactor was pressurized to 880 psi with $N_2$ gas. Minimal pressure drop was observed over 30 minutes. The reactor was then evacuated and refilled with 900 psi $H_2$ gas. The reactor was heated to 95° C. for 2 hours and then the temperature was raised to 140° C. The reaction proceeded overnight before the pressure was slowly released. The solution was filtered through a plug of celite, concentrated under reduced pressure, and then dried under high vacuum (50 microns) overnight. The isolated polymer (7.608 g, 92.76%) was a transparent viscous liquid.

Example 34 was characterized by the following analytical data: $^1$HNMR (THF-d8, 400 MHz): δ=1.6-1.5 (m, 6H), 1.5-1.0 (m, 100H), 0.9-0.8 (m, 50H). $^{13}$CNMR (THF-d8, 100 MHz): δ=39.4, 37.6, 37.4, 34.0, 32.8, 31.9, 28.0, 22.6, 22.3, 22.2, 19.3, 13.5; GPC (THF, PS Standards): $M_w$=70 kDa, $M_w/M_n$=1.6; DSC (2° C./min, $N_2$): $T_g$ (inflection)=−74.88° C. The weight average molecular weight, PDI and Tg of Example 34 are shown in Table 14.

Example 35

The preparation method was the same as in Example 34, except the polymer obtained from Example 27 (17.264 g) was dissolved in THF (800 mL) and the catalyst used was 5% Ru/C (0.902 g). The stir rate was 300 rpm and the reactor was pressurized to 600 psi with $H_2$ gas. The reactor was heated to 140° C. and the reaction was proceeded overnight. A yield of 12.028 g of a clear, transparent, viscous liquid was obtained. The weight average molecular weight, PDI, and Tg of Example 35 were measured and are shown in Table 14.

Example 36

The preparation method was the same as in Example 34, except the polymer obtained from Example 28 (7.883 g) was dissolved in heptane (820 mL) and the catalyst used was 5% Ru/C (0.394 g). The stir rate was 300 rpm and the reactor was pressurized to 600 psi with $H_2$ gas. The reactor was heated to 140° C. and the reaction proceeded overnight. A yield of 7.666 g (99.88%) of a slightly cloudy, viscous liquid was obtained. The weight average molecular weight, PDI, and Tg of Example 36 were measured and are shown in Table 14.

Example 37

The preparation method was the same as in Example 34, except the polymer obtained from Example 25 (18.018 g) was dissolved in a 1:1 volume to volume ratio of a mixture of ethyl acetate and heptane (850 mL) and the catalyst used was 5% Pd/C (0.906 g). The stir rate was 300 rpm and the reactor was pressurized to 600 psi with $H_2$ gas. The reactor was heated to 140° C. and the reaction proceeded overnight. A yield of 16.946 g (96.457%) of a translucent, slightly grey, viscous liquid was obtained. The weight average molecular weight, PDI, and Tg of Example 37 were measured and are shown in Table 14.

Example 38

The preparation method was the same as in Example 34, except the polymer obtained from Example 29 (28.95 g) was dissolved in THF (800 mL) and the catalyst used was 5% Pd/C (1.453 g). The stir rate was 300 rpm and the reactor was pressurized to 600 psi with $H_2$ gas. The reactor was heated to 140° C. and the reaction proceeded overnight. A yield of 6.002 g of a translucent, slightly grey, highly viscous/glassy material was obtained. The weight average molecular weight, PDI, and Tg of Example 38 were measured and are shown in Table 14.

Example 39

The preparation method was the same as in Example 34, except the polymer obtained from Example 30 (14.09 g) was dissolved in heptane (500 mL) and ethyl acetate (230 mL) and the catalyst used was 5% Pd/C (0.706 g). The stir rate was 250 rpm and the reactor was pressurized to 600 psi with $H_2$ gas. The reactor was heated to 140° C. and the reaction proceeded overnight. A yield of 9.872 g (71.46%) of a slightly grey, translucent, highly viscous/glassy solid was obtained. The weight average molecular weight, PDI, and Tg of Example 39 were measured and are shown in Table 14.

Example 40

The preparation method was the same as in Example 34, except the polymer obtained from Example 31 (17.4 g) was dissolved in heptane (730 mL) and ethyl acetate (200 mL) and the catalyst used was 5% Pd/C (0.873 g). The stir rate was 300 rpm and the reactor was pressurized to 600 psi with $H_2$ gas. The reactor was heated to 140° C. and the reaction proceeded overnight. A yield of 13.666 g (79.7%) of a clear, glassy solid was realized. The weight average molecular weight, PDI, and Tg of Example 40 were measured and are shown in Table 14.

Example 41

The preparation method was the same as in Example 34, except the polymer obtained from Example 32 (22.674 g) was dissolved in THF (700 mL) and the catalyst used was 5% Ru/C (1.138 g). The stir rate was 300 rpm and the reactor was pressurized to 600 psi with $H_2$ gas. The reactor was heated to 140° C. and the reaction proceeded overnight. A yield of 16.477 g (73.296%) of a white, glassy solid was obtained. The weight average molecular weight, PDI, and Tg of Example 41 were measured and are shown in Table 14.

Example 42

The preparation method was the same as in Example 34, except the polymer obtained from Example 33 (19.624 g) was dissolved in THF (800 mL) and the catalyst used was 5% Ru/C (0.993 g). The stir rate was 300 rpm and the reactor was pressurized to 600 psi with $H_2$ gas. The reactor was heated to 140° C. and the reaction proceeded overnight. A yield of 11.863 g (60.973%) of a grey, glassy solid was obtained. The weight average molecular weight, PDI, and Tg of Example 42 were measured and are shown in Table 14.

TABLE 14

| Example | Prepared from Example No. | Mw (KDa) | PDI | Tg (Inflection Point) (° C.) |
|---|---|---|---|---|
| 34 | 26 | 70 | 1.6 | −74.88 |
| 35 | 27 | 143 | 2.4 | −62.46 |
| 36 | 28 | 115 | 1.9 | −69.97 |
| 37 | 25 | 149 | 2.3 | −64.52 |
| 38 | 29 | 242 | 2.8 | −38.10 |
| 39 | 30 | 162 | 2.5 | −49.20 |
| 40 | 31 | 172 | 2.1 | −28.24 |
| 41 | 32 | 279 | 2.7 | −2.97 |
| 42 | 33 | 196 | 2.3 | −7.93 |

Example 43

Maleic anhydride (34.323 g, 0.3500 mols), benzoyl peroxide (2.921 g, 0.01206 mols) and dioxane (190 mL) were added into a three-necked, round bottomed flask equipped with an overhead stirrer, an argon inlet and an addition funnel. The overhead stirrer was set to a stir rate of 250 rpm and the solution was sparged with argon for about 35 minutes. The flask was placed in a heating block and the solution was heated to about 30° C. Meanwhile, diethylaniline (0.627 g, 0.00425 mols), β-farnesene (71.510 g, 0.34992 mols) and dioxane (50 mL) were added into the funnel and the diethylaniline solution was sparged with argon for about 15 minutes. The diethylaniline solution was added dropwise into the flask over 4.5 hours. The heating block was removed from the flask, butylated hydroxytoluene (2.644 g, 0.01200 mols) was added into the flask, and stirred for 5 minutes. The solution was precipitated into 2 L of ice-cold methanol while methanol was stirred with an overhead stirrer at 500 rpm. The polymer precipitated as a large, pink mass of fibers and the methanol solution turned pink. The methanol solution was decanted and the polymer was redissolved in dioxane (250 mL) and reprecipitated into drop-wise into 2 L of ice-cold methanol. The methanol solution was decanted and the polymer was redissolved in dioxane (250 mL) and reprecipitated into drop-wise into 2 L of ice-cold methanol. The methanol was again decanted and the polymer was redissolved in dioxane (250 mL) and reprecipitated into 2 L of ice-cold methanol. The methanol from the third precipitation was decanted and the polymer was dried under high vacuum (50 microns) overnight to yield 29.65 g (28.02%) of a tough, yellow-brown solid. Example 43 was characterized by the following analytical data: $^1$HNMR (Dioxane-d8, 400 MHz): δ=5.0-4.8 (m, 3H), 3.6-3.3 (m, 9H), 2.6-2.3 (m, 2H), 2.3-2.0 (s, 3H), 1.9-1.7 (m, 7H), 1.5-1.3 (m, 9H); $^{13}$C NMR (Dioxane-d8, 400 MHz): δ=174, 173, 135.0, 130.6, 124.2, 124.2, 123.8, 50.7, 39.5, 26.4, 25.2, 24.9, 16.9, 15.3; GPC (THF, PS Standards): $M_w$=55 kDa, $M_w/M_n$=1.4; DSC (2° C./min, $N_2$): $T_g$ (inflection)=8.85° C.

Example 44

Styrene (11.50 g, 0.1104 mols), β-farnesene (67.69 g, 0.3312 mols) and benzoyl peroxide (0.574 g, 0.00237 mols) are added to a 250 mL three-necked round bottomed flask, equipped with an overhead stir shaft with a PTFE stir blade, in a glove box with an atmosphere of $N_2$. The flask is sealed and removed from the glove box, placed on a heating mantle and attached to an overhead stirrer. An argon inlet is connected to the flask as well as an oil bubbler. A stir rate of 250 rpm is set on the overhead stirrer and the flow of argon was adjusted such that argon bubbled through the bubbler at a rate of about 1 bubble per second. The heating mantle is set to about 75° C. and the reaction was allowed to proceed for 15 hours. The heating mantle and the argon gas inlet are removed and butylated hydroxytoluene (1.107 g, 0.005024 mols) is added into the flask. The resulting solution is allowed to stir for five minutes before the polymer is precipitated from solution. The precipitation is done by dripping the resulting solution dropwise into 2 L of ice-cold methanol. Once the polymer is precipitated, the methanol solution is decanted and the polymer is redissolved in tetrahydrofuran (THF). The resulting solution of polymer in THF is precipitated into ice-cold methanol (2 L), and the methanol solution is decanted. The polymer is again redissolved in THF and reprecipitated into ice-cold methanol (2 L), the methanol is decanted, and the polymer is dried. The polymer is dried by removing residual solvent on a rotary evaporator and then placing the isolated polymer under vacuum (50 microns) overnight.

The polyfarnesenes of Examples 8-43 can be tested by the following tests.

Minimum Film Forming Temperature ("MFFT")

The MFFT Test is conducted in accordance with the American Society of Testing Materials ("ASTM") D2354 test, which is incorporated herein by reference. It provides a method for the determination of the minimum temperature at which emulsion vehicles coalesce to form a continuous film.
Standard Test Method for Effect of Household Chemicals on Clear and Pigmented Organic Film This test is conducted in accordance with the ASTM D1308 test, which is incorporated herein by reference. The test provides a method for the determination of the effect of chemicals on clear and pigmented organic films resulting in any objectionable alteration in the surface, such as discoloration, change in gloss, blistering, softening, swelling, loss of adhesion, or special phenomena. The chemicals used can include one or more of ethyl alcohol, isopropyl alcohol ("IPA"), xylene, acidic or alkali solutions, soap or detergent solutions, oil or grease and the like.

Films are formed from Examples 8-13. The sample is double rubbed (up and down motion) with IPA.
Pencil Hardness The pencil hardness test evaluates the coatings film hardness when subjected to scratching by lead pencils. This test is conducted in accordance with the ASTM D3363 test, which is incorporated herein by reference. Standard lead pencils in various lead softness from 6B to 8H are used. The hardness scale (softest to hardest) is 6B<5B<4B<3B<2B<B<HB<F<H<2H<3H<4H<5H<6H<8H.

Films are formed from Examples 8-13. The pencils are placed on the surface of the film. The pencil is kept at a 45° and pushing at about 5 cm/sec. The film is scratched by using successively harder pencils until the film is marred. At this point, the lead which first scratches the film is considered to be the film's pencil hardness. A rating of 6B indicates the film is very soft. A rating of 8H indicates extremely hard film.
Accelerated Film Aging Test This test is conducted in accordance with the ASTM D4587 test, which is incorporated herein by reference. It determines film's ability to resist deterioration of its physical and optical properties caused by exposure to light, heat, and moisture. It provide a method for the selection of test conditions for accelerated exposure testing of products in fluorescent ultraviolet light ("UV") and condensation devices. The test is conducted with repeating cycles of fluorescent UV light exposure and condensation. Films are formed Examples 8-13. The films are tested with a test duration of 250 and 500 hours.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A polyfarnesene derived from a farnesene and a vinyl monomer, wherein the polyfarnesene comprises one or more polymer molecules, each of the molecules independently having formula (X'):

(X')

wherein each of n and m is independently an integer from 1 to about 100,000; X is derived from the farnesene and has one or more of formulae (I')-(VIII'):

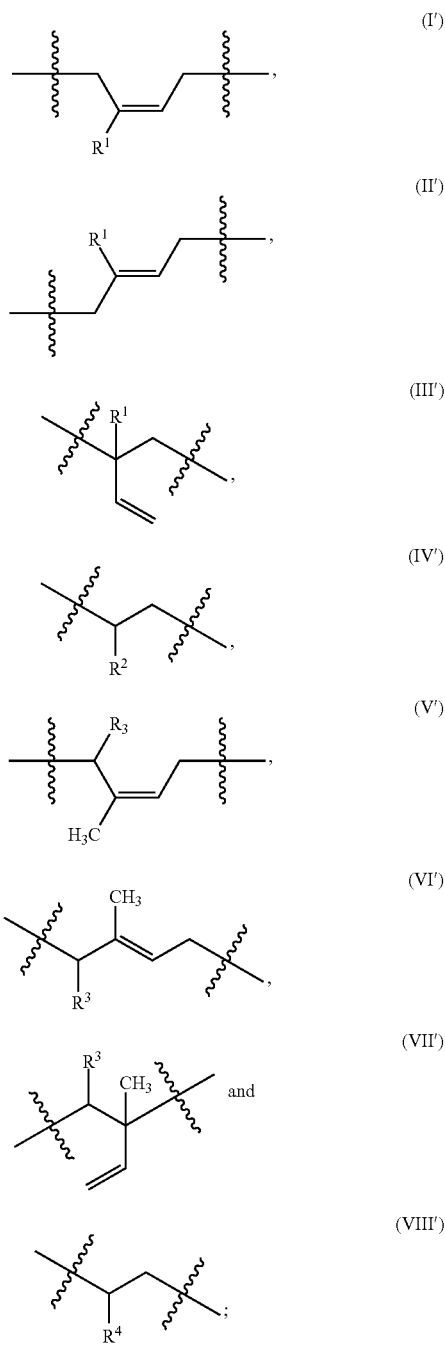

and

Y is derived from the vinyl monomer and has formula (IX'):

(IX')

wherein $R^1$ has formula (XI):

(XI)

$R^2$ has formula (XII):

(XII)

$R^3$ has formula (XIII):

(XIII)

and
$R^4$ has formula (XIV):

(XIV)

wherein $R^5$ is carboxy, alkoxycarbonyl, hydroxyalkoxycarbonyl, aminoalkoxycarbonyl, pyridyl, cyano, halo or acyloxy; $R^7$ is H, alkyl or halo; and each of $R^6$ and $R^8$ is independently H, wherein the farnesene is α-farnesene or β-farnesene or a combination thereof, wherein an amount of the farnesene is at least 25 mole %, based on the total amount of the polyfarnesene.

2. The polyfarnesene of claim 1, wherein the amount of the farnesene is greater than 30 mole %, based on the total amount of the polyfarnesene.

3. The polyfarnesene of claim 1, wherein $R^5$ is carboxy; and $R^7$ is H or alkyl.

4. The polyfarnesene of claim 1, wherein $R^5$ is alkoxycarbonyl; and $R^7$ is H or alkyl.

5. The polyfarnesene of claim 4, wherein the alkoxycarbonyl is methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, or decoxycarbonyl.

6. The polyfarnesene of claim 1, wherein $R^5$ is hydroxyalkoxycarbonyl or aminoalkoxycarbonyl; and $R^7$ is H or alkyl.

7. The polyfarnesene of claim 6, wherein the hydroxyalkoxycarbonyl is hydroxyethoxycarbonyl; and the aminoalkoxycarbonyl is aminoethoxycarbonyl.

8. The polyfarnesene of claim 1, wherein $R^5$ is pyridyl or cyano; and $R^7$ is H.

9. The polyfarnesene of claim 1, wherein $R^5$ is acyloxy; and $R^7$ is H.

10. The polyfarnesene of claim 9, wherein the acyloxy is $CH_3C(=O)-O-$.

11. The polyfarnesene of claim 1, wherein $R^5$ is halo; and $R^7$ is H or halo.

12. The polyfarnesene of claim 11, wherein $R^5$ is chloro; and $R^7$ is H.

13. The polyfarnesene of claim 11, wherein $R^5$ is fluoro; and $R^7$ is fluoro.

14. A polyfarnesene comprising units derived from a farnesene and units derived from two different vinyl monomers, wherein the farnesene is α-farnesene or β-farnesene or a combination thereof, and wherein each of the two different vinyl monomers independently has formula (XV):

(XV)

wherein $R^5$ is carboxy, alkoxycarbonyl, hydroxyalkoxycarbonyl, aminoalkoxycarbonyl, pyridyl, cyano, halo or acyloxy; $R^7$ is H, alkyl or halo; and each of $R^6$ and $R^8$ is independently H.

15. The polyfarnesene of claim 14, wherein $R^5$ of one of the two different vinyl monomers is carboxy or alkoxycarbonyl; and $R^7$ of the one of the two different vinyl monomers is H or alkyl.

16. The polyfarnesene of claim 15, wherein $R^5$ of the remaining one of the two different vinyl monomers is alkoxycarbonyl, hydroxyalkoxycarbonyl or aminoalkoxycarbonyl; and $R^7$ of the remaining one of the two different vinyl monomers is H or alkyl.

17. The polyfarnesene of claim 16, wherein each of the alkoxycarbonyl groups is independently methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, or decoxycarbonyl; the hydroxyalkoxycarbonyl is hydroxyethoxycarbonyl; and the aminoalkoxycarbonyl is aminoethoxycarbonyl.

18. The polyfarnesene of claim 14, wherein $R^5$ of one of the two different vinyl monomers is alkoxycarbonyl or hydroxyalkoxycarbonyl; and $R^7$ of the one of the two different vinyl monomers is alkyl; $R^5$ of the remaining one of the two different vinyl monomers is alkoxycarbonyl; and $R^7$ of the remaining one of the two different vinyl monomers is H or alkyl.

19. A polyfarnesene comprising units derived from a farnesene and units derived from three different vinyl monomers, wherein the farnesene is α-farnesene or β-farnesene or a combination thereof,
and wherein each of the three different vinyl monomers independently has formula (XV):

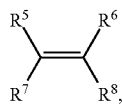 (XV)

wherein R⁵ is carboxy, alkoxycarbonyl, hydroxyalkoxycarbonyl, aminoalkoxycarbonyl, pyridyl, cyano, halo or acyloxy; R⁷ is H, alkyl or halo; and each of R⁶ and R⁸ is independently H.

20. The polyfarnesene of claim 19, wherein R⁵ of one of the three different vinyl monomers is carboxy or alkoxycarbonyl; and R⁷ of the one of the three different vinyl monomers is H or alkyl.

21. The polyfarnesene of claim 20, wherein R⁵ of another one of the three different vinyl monomers is alkoxycarbonyl, hydroxyalkoxycarbonyl or aminoalkoxycarbonyl; and R⁷ of the another one of the three different vinyl monomers is H or alkyl.

22. The polyfarnesene of claim 21, wherein each of the alkoxycarbonyl groups is independently methoxycarbonyl, ethoxycarbonyl, propoxycarbonyl, butoxycarbonyl, pentoxycarbonyl, isopentoxycarbonyl, neopentoxycarbonyl, hexoxycarbonyl, heptoxycarbonyl, octoxycarbonyl, or decoxycarbonyl; the hydroxyalkoxycarbonyl is hydroxyethoxycarbonyl; and the aminoalkoxycarbonyl is aminoethoxycarbonyl.

23. The polyfarnesene of claim 20, wherein R⁵ of another one of the three different vinyl monomers is alkoxycarbonyl; and R⁷ of the another one of the three different vinyl monomers is H or alkyl.

24. The polyfarnesene of claim 23, wherein R⁵ of the remaining one of the three different vinyl monomers is alkoxycarbonyl; and each of R⁶, R⁷ and R⁸ of the remaining one of the three different vinyl monomers is independently H.

25. The polyfarnesene of claim 1, wherein each of n and m is independently an integer from 1 to about 5,000.

26. The polyfarnesene of claim 1, wherein each of n and m is independently an integer from 1 to about 1,000.

27. The polyfarnesene of claim 1, wherein an amount of the vinyl monomer is greater than 20 mole %, based on the total amount of the polyfarnesene.

* * * * *